(12) United States Patent
Nakamura et al.

(10) Patent No.: US 6,782,035 B1
(45) Date of Patent: Aug. 24, 2004

(54) BASE STATION APPARATUS OF MOBILE COMMUNICATION SYSTEM

(75) Inventors: Takehiro Nakamura, Kanagawa (JP); Junichiro Hagiwara, Kanagawa (JP); Etsuhiro Nakano, Kanagawa (JP); Koji Ohno, Kanagawa (JP); Seizo Onoe, Kanagawa (JP); Akihiro Higashi, Kanagawa (JP); Motoshi Tamura, Kanagawa (JP); Masatomo Nakano, Kanagawa (JP); Hiroshi Kawakami, Kanagawa (JP); Hiroki Morikawa, Kanagawa (JP)

(73) Assignee: NTT Docomo Inc., Tokyo (JP)

( * ) Notice: Subject to any disclaimer, the term of this patent is extended or adjusted under 35 U.S.C. 154(b) by 0 days.

(21) Appl. No.: 09/403,161

(22) PCT Filed: Apr. 17, 1998

(86) PCT No.: PCT/JP98/01786
§ 371 (c)(1),
(2), (4) Date: Jan. 31, 2000

(87) PCT Pub. No.: WO98/47246
PCT Pub. Date: Oct. 22, 1998

(30) Foreign Application Priority Data

Apr. 17, 1997 (JP) ............................................. 9/116192

(51) Int. Cl.[7] .............................................. H04B 1/713
(52) U.S. Cl. ....................................... 375/130; 370/342
(58) Field of Search ................................. 375/130, 146, 375/325, 354; 370/342; 455/522

(56) References Cited

U.S. PATENT DOCUMENTS

| 5,309,474 A | 5/1994 | Gilhousen et al. .............. 375/1 |
| 5,416,797 A | 5/1995 | Gilhousen et al. .......... 375/705 |
| 5,442,625 A | 8/1995 | Gitlin et al. ................... 370/18 |
| 5,479,397 A | 12/1995 | Lee ............................... 370/18 |
| 5,495,498 A | 2/1996 | Tominaga .................... 375/200 |
| 5,519,730 A * | 5/1996 | Jasper et al. ................. 375/260 |

(List continued on next page.)

FOREIGN PATENT DOCUMENTS

| EP | 0 565 507 A2 | 4/1993 |
| EP | 0 652 650 A2 | 10/1994 |
| EP | 0 810 742 A2 | 6/1997 |

(List continued on next page.)

OTHER PUBLICATIONS

Tomohiro Dohi, et al., *IEICE Trans. Commun.*, vol. E79–B, No. 9, Sep. 1996, "Experiments on Coherent Multicode DS–CDMA".

*Primary Examiner*—Stephen Chin
*Assistant Examiner*—Kevin Kim
(74) *Attorney, Agent, or Firm*—Workman Nydegger

(57) ABSTRACT

A base station including a transmitting and receiving amplifier for amplifying CDMA signals exchanged with a mobile station; a radio stage connected to the transmitting and receiving amplifier for carrying out D/A conversion of a transmitted signal that undergoes baseband spreading, followed by quadrature modulation, and for carrying out quasi-coherent detection of a received signal, followed by A/D conversion; a baseband signal processor connected with the radio stage for carrying out baseband signal processing of the transmitted signal and the received signal; a transmission interface connected with the baseband signal processor for implementing interface with external channels; and a base station controller for carrying out control such as management of radio channels and establishment and release of the radio channels. The base station communicates with the external channels using ATM cells, and with the mobile stations using the CDMA signals by mapping a plurality of logical channels into a plurality of physical channels. The CDMA signals are spreading using two types of spreading code sequences, that is, a short code and a long code.

14 Claims, 134 Drawing Sheets

U.S. PATENT DOCUMENTS

| | | | | |
|---|---|---|---|---|
| 5,596,333 | A | | 1/1997 | Bruckert .................... 342/457 |
| 5,596,601 | A | | 1/1997 | Bar-David |
| 5,604,766 | A | | 2/1997 | Dohi et al. |
| 5,673,260 | A | * | 9/1997 | Umeda et al. ............... 370/342 |
| 5,802,110 | A | * | 9/1998 | Watanabe et al. ........... 375/259 |

FOREIGN PATENT DOCUMENTS

| | | |
|---|---|---|
| GB | 2300337 | 10/1996 |
| JP | 6-152487 | 5/1994 |
| JP | 7-170223 | 7/1995 |
| JP | 8-32513 | 2/1996 |
| JP | 8-51662 | 2/1996 |
| JP | 8-79133 | 3/1996 |
| JP | 8-125604 | 5/1996 |
| JP | 9-46270 | 2/1997 |
| JP | 9-93220 | 4/1997 |
| WO | WO92-17011 | 10/1992 |
| WO | WO 95/12943 | 5/1995 |
| WO | WO 95/12943 | 11/1995 |
| WO | WO 95/35002 | 12/1995 |
| WO | WO95-35615 | 12/1995 |
| WO | WO 97/02665 | 1/1997 |
| WO | WO 97/50194 | 12/1997 |

* cited by examiner

ENCODING RATE = 1/3 CONSTRAINT LENGTH = 9

$$c_0(0) = 1$$

$$\begin{bmatrix} c_1(0) \\ c_1(1) \end{bmatrix} = \begin{bmatrix} c_0(0) & c_0(0) \\ c_0(0) & \overline{c_0(0)} \end{bmatrix} = \begin{bmatrix} 1 & 1 \\ 1 & 0 \end{bmatrix}$$

$$\begin{bmatrix} c_2(0) \\ c_2(1) \\ c_2(2) \\ c_2(3) \end{bmatrix} = \begin{bmatrix} c_1(0) & c_1(0) \\ c_1(0) & \overline{c_1(0)} \\ c_1(1) & c_1(1) \\ c_1(1) & \overline{c_1(1)} \end{bmatrix} = \begin{bmatrix} 1 & 1 & 1 & 1 \\ 1 & 1 & 0 & 0 \\ 1 & 0 & 1 & 0 \\ 1 & 0 & 0 & 1 \end{bmatrix}$$

$$\vdots$$

$$\begin{bmatrix} c_{n+1}(0) \\ c_{n+1}(1) \\ c_{n+1}(2) \\ c_{n+1}(3) \\ \vdots \\ c_{n+1}(2^{n+1}-2) \\ c_{n+1}(2^{n+1}-1) \end{bmatrix} = \begin{bmatrix} c_n(0) & c_n(0) \\ c_n(0) & \overline{c_n(0)} \\ c_n(1) & c_n(1) \\ c_n(1) & \overline{c_n(1)} \\ \vdots & \vdots \\ c_n(2^n-1) & c_n(2^n-1) \\ c_n(2^n-1) & \overline{c_n(2^n-1)} \end{bmatrix}$$

FIG.20

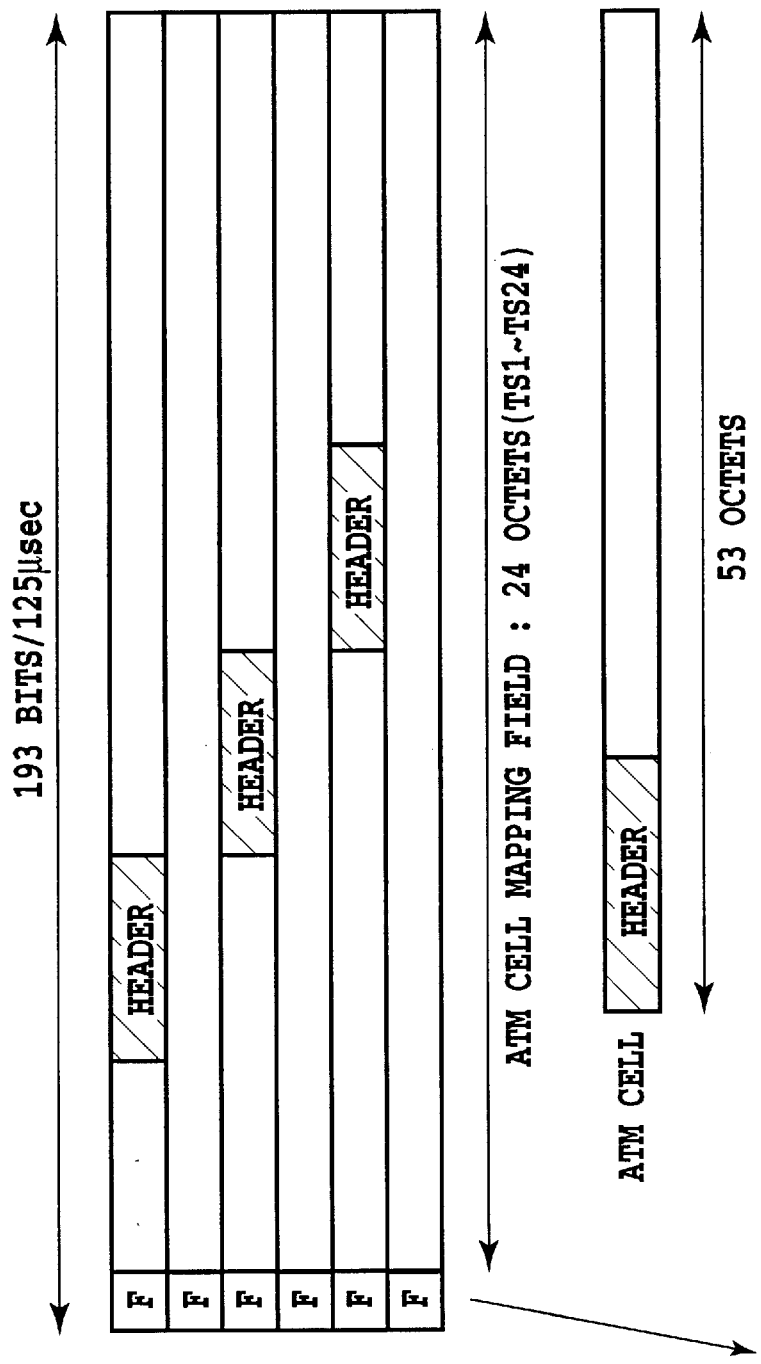

ASSEMBLE/DISASSEMBLE IN AAL-5 PROCESSOR

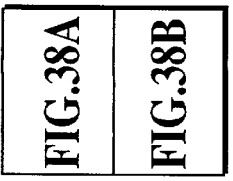
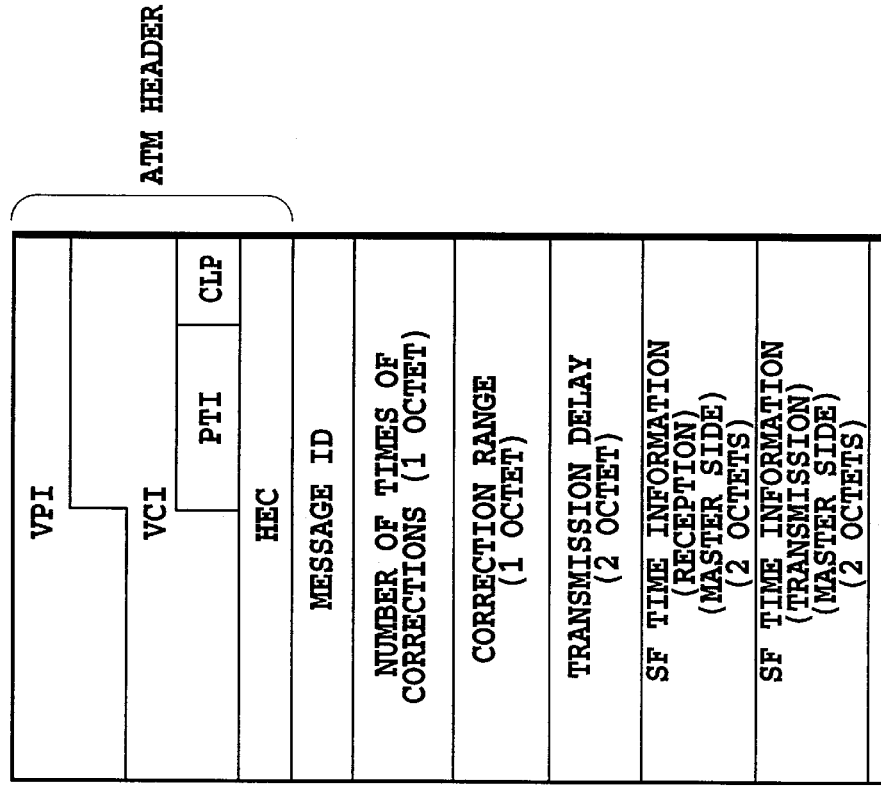
FIG.38A

| SF TIME INFORMATION (RECEPTION) (SLAVE SIDE) (2 OCTETS) | SF TIME INFORMATION (TRANSMISSION) (SLAVE SIDE) (2 OCTETS) | SF PHASE SHIFT VALUE (2 OCTETS) | LC COUNTER INFORMATION (RECEPTION) (MASTER SIDE) (3 OCTETS) | LC COUNTER INFORMATION (TRANSMISSION) (MASTER SIDE) (3 OCTETS) | LC COUNTER INFORMATION (RECEPTION) (SLAVE SIDE) (3 OCTETS) | LC COUNTER INFORMATION (TRANSMISSION) (SLAVE SIDE) (3 OCTETS) | LC COUNTER SHIFT VALUE (3 OCTETS) | UNUSED (6A (h)) 000000 | CRC-10 |
|---|---|---|---|---|---|---|---|---|---|

FIG.38B

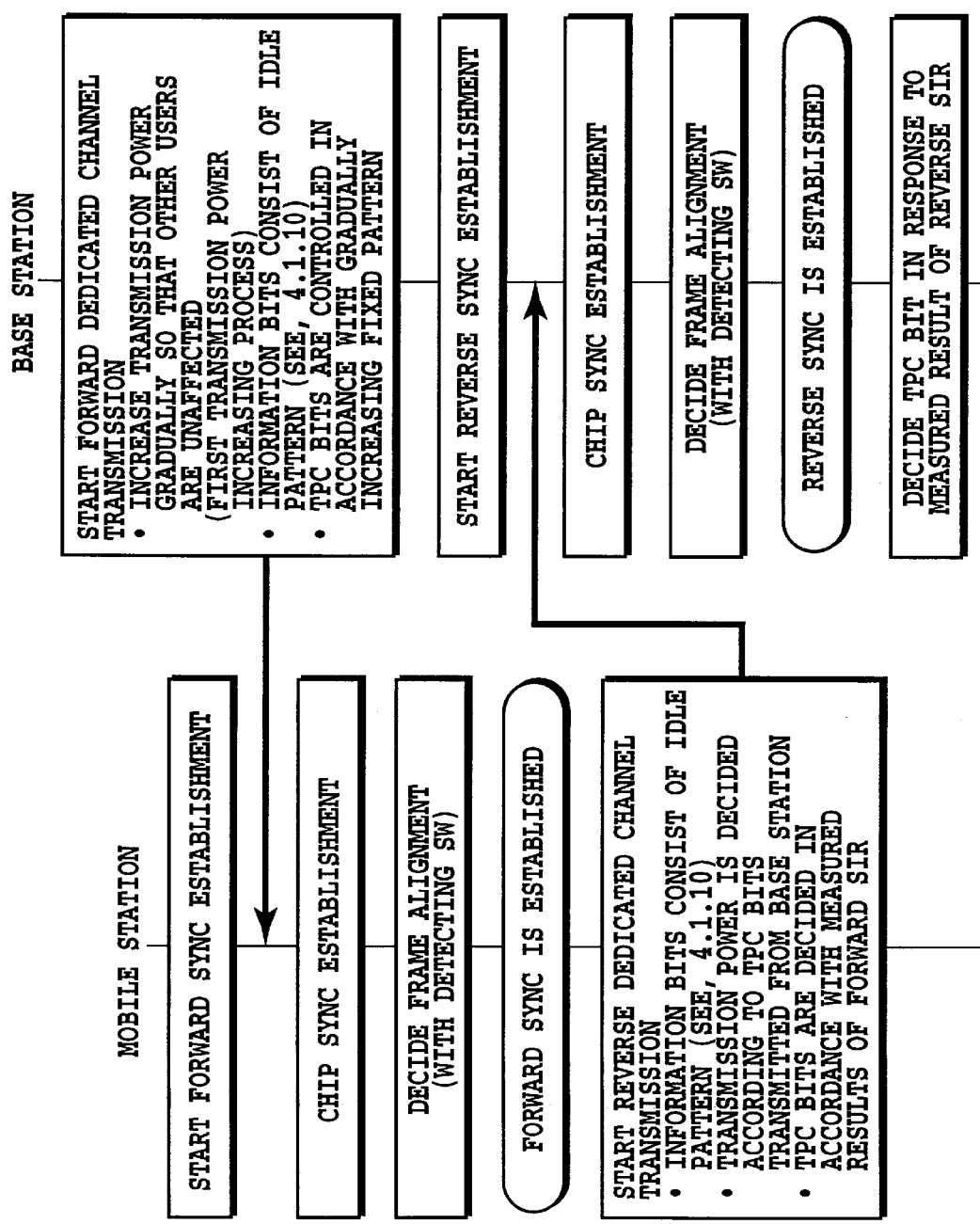

REVERSE DEDICATED PHYSICAL CHANNEL (UPCH)

FORWARD DEDICATED PHYSICAL CHANNEL (UPCH)

REVERSE COMMON CONTROL PHYSICAL CHANNEL (RACH)

FIG.51 FORWARD COMMON CONTROL PHYSICAL CHANNEL (FACH)

FROM COMMON CONTROL PHYSICAL CHANNEL TO DEDICATED PHYSICAL CHANNEL

ATM CELL TRANSMISSION SEQUENCE TABLE

TRANSMISSION ORDER (ABOUT 256 AT MAXIMUM)

PRIORITY ↓

| E | F | A | E | F | B | E | F | C | E | ... |
|---|---|---|---|---|---|---|---|---|---|---|
| F | A | B | F | A | C | F | A | D | F | ... |
| A | B | C | A | B | D | A | B | E | A | ... |
| B | C | D | B | C | E | B | C | F | B | ... |
| C | D | E | C | D | F | C | D | A | C | ... |
| D | E | F | D | E | A | D | E | B | D | ... |

FIG.58A

SHORT CELL TRANSMISSION SEQUENCE TABLE (QUALITY CLASS (6))

TRANSMISSION ORDER (ABOUT 128 AT MAXIMUM)

PRIORITY ↓

| E1 | E1 | E1 | E2 | E1 | E1 | E1 | E3 | ... |
|----|----|----|----|----|----|----|----|----|
| E2 | E2 | E2 | E3 | E2 | E2 | E2 | E4 | ... |
| E3 | E3 | E3 | E4 | E3 | E3 | E3 | E1 | ... |
| E4 | E4 | E4 | E1 | E4 | E4 | E4 | E2 | ... |

FIG.58B

SHORT CELL TRANSMISSION SEQUENCE TABLE (QUALITY CLASS (7))

TRANSMISSION ORDER (ABOUT 128 AT MAXIMUM)

PRIORITY ↓

| F1 | F1 | F2 | F1 | F1 | F3 | F1 | F1 | ... |
|----|----|----|----|----|----|----|----|----|
| F2 | F2 | F3 | F2 | F2 | F4 | F2 | F2 | ... |
| F3 | F3 | F4 | F3 | F3 | F1 | F3 | F3 | ... |
| F4 | F4 | F1 | F4 | F4 | F2 | F4 | F4 | ... |

FIG.58C

- CARRY OUT CELL EXTRACTION PROCESSING IN ACCORDANCE WITH TRANSMISSION SEQUENCE DETERMINED FOR EACH OUTPUT TIMING.
- IF NO CELL IS PRESENT IN HIGHER PRIORITY QUALITY CLASS, A CELL IN THE NEXT PRIORITY IS EXTRACTED.

PAD : PADDING BITS (ALL "0s")
Len : NUMBER OF BYTES OF EFFECTIVE DATA LENGTH OF USER FRAME
CRC-32 : CRC CHECKING BITS OVER 32 BITS
CRC-32 : GENERATOR POLYNOMIAL
$G(X) = X^{32}+X^{26}+X^{23}+X^{22}+X^{16}+X^{12}+X^{11}+X^{10}+X^{8}+X^{7}+X^{5}+X^{4}+X^{2}+X^{1}+1$
CHECK BITS ARE OBTAINED BY INVERTING BITS OF REMAINDER GENERATED BY THE GENERATOR POLYNOMIAL.

| FIG.64A |
| FIG.64B |

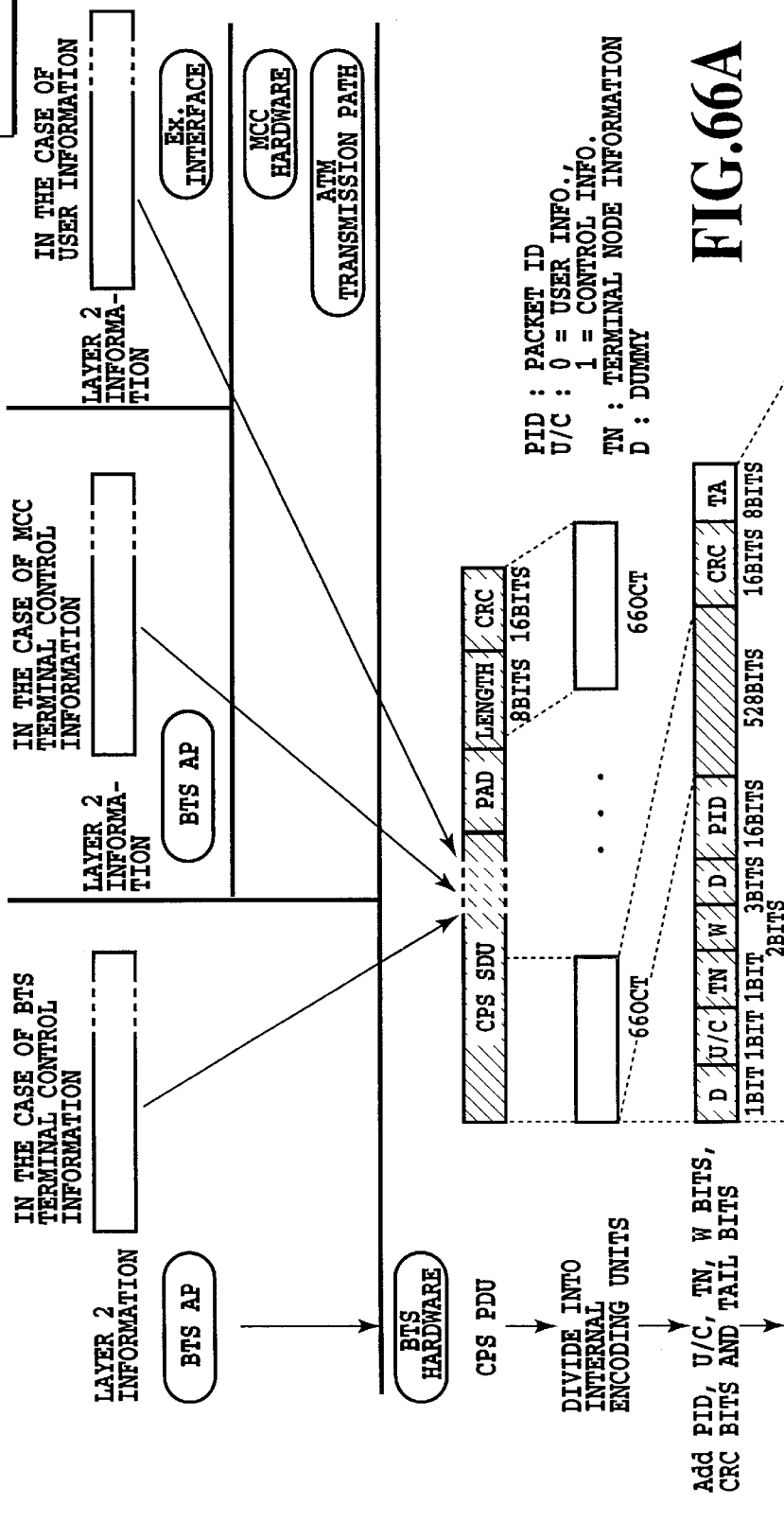

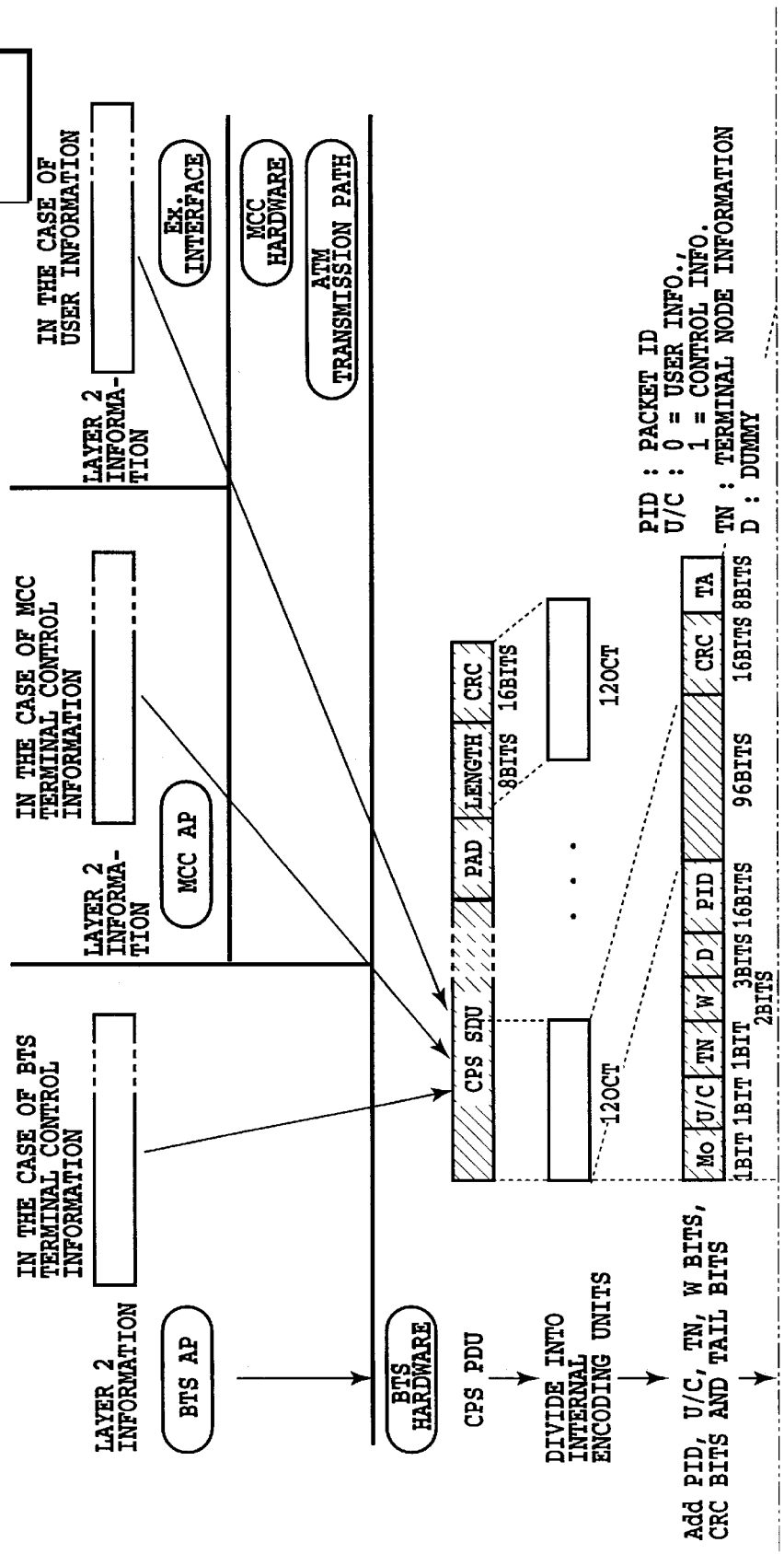

FIG.68
| FIG.68A |
|---|
| FIG.68B |
FIG.68A
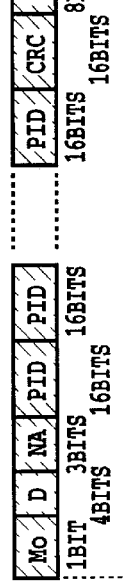
Mo : MODE DESIGNATION
D : : DUMMY
NA : NUMBER OF TIMES OF ACK TRANSMISSION IN UNIT (1-7)
PID: PACKET ID OF RACH WHEN CRC IS CORRECT; WHEN THE NUMBER OF TIMES OF ACK TRANSMISSION IS LESS THAN 7, REMAINING FIELDS ARE FILLED WITH ALL "0s"
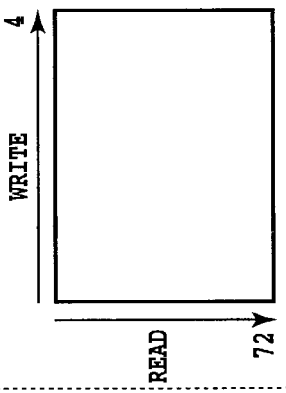
 BTS HARDWARE
ASSEMBLE ACK AND CRC BITS
↓
CONVOLUTIONAL ENCODING
R = 1/2 K = 9
↓
BIT INTERLEAVING
4 × 72
↓
FACH-S RADIO UNIT

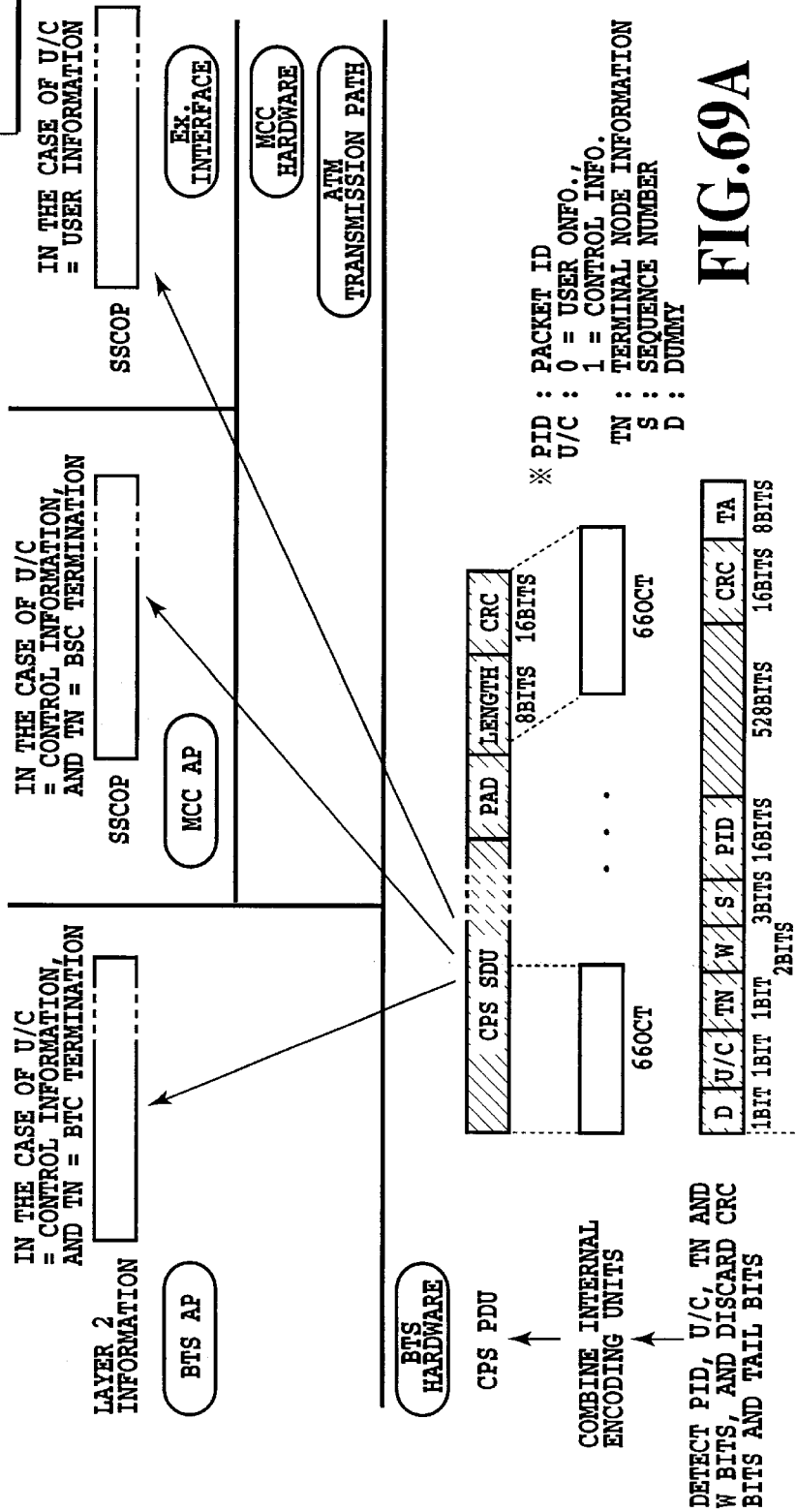

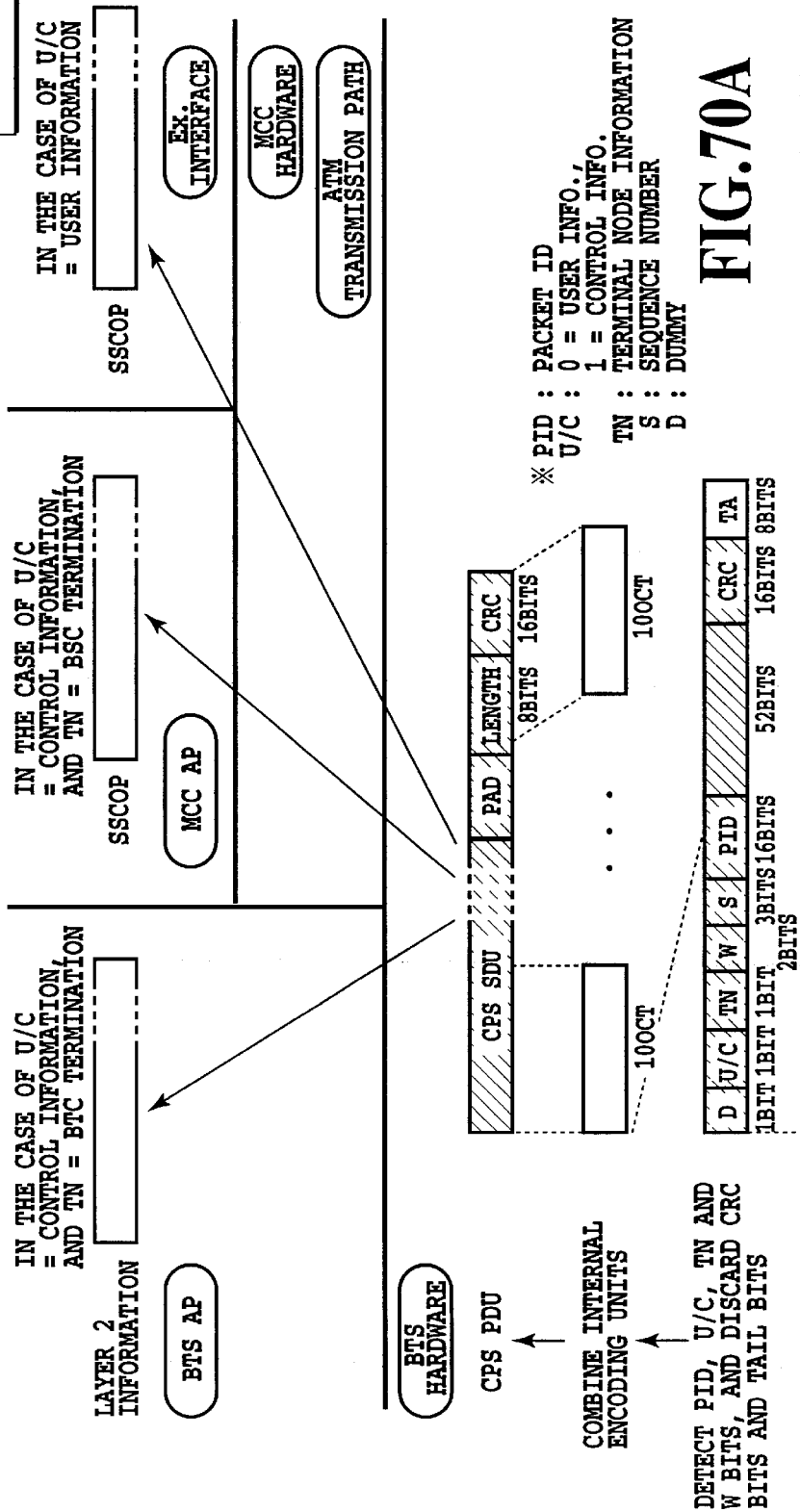

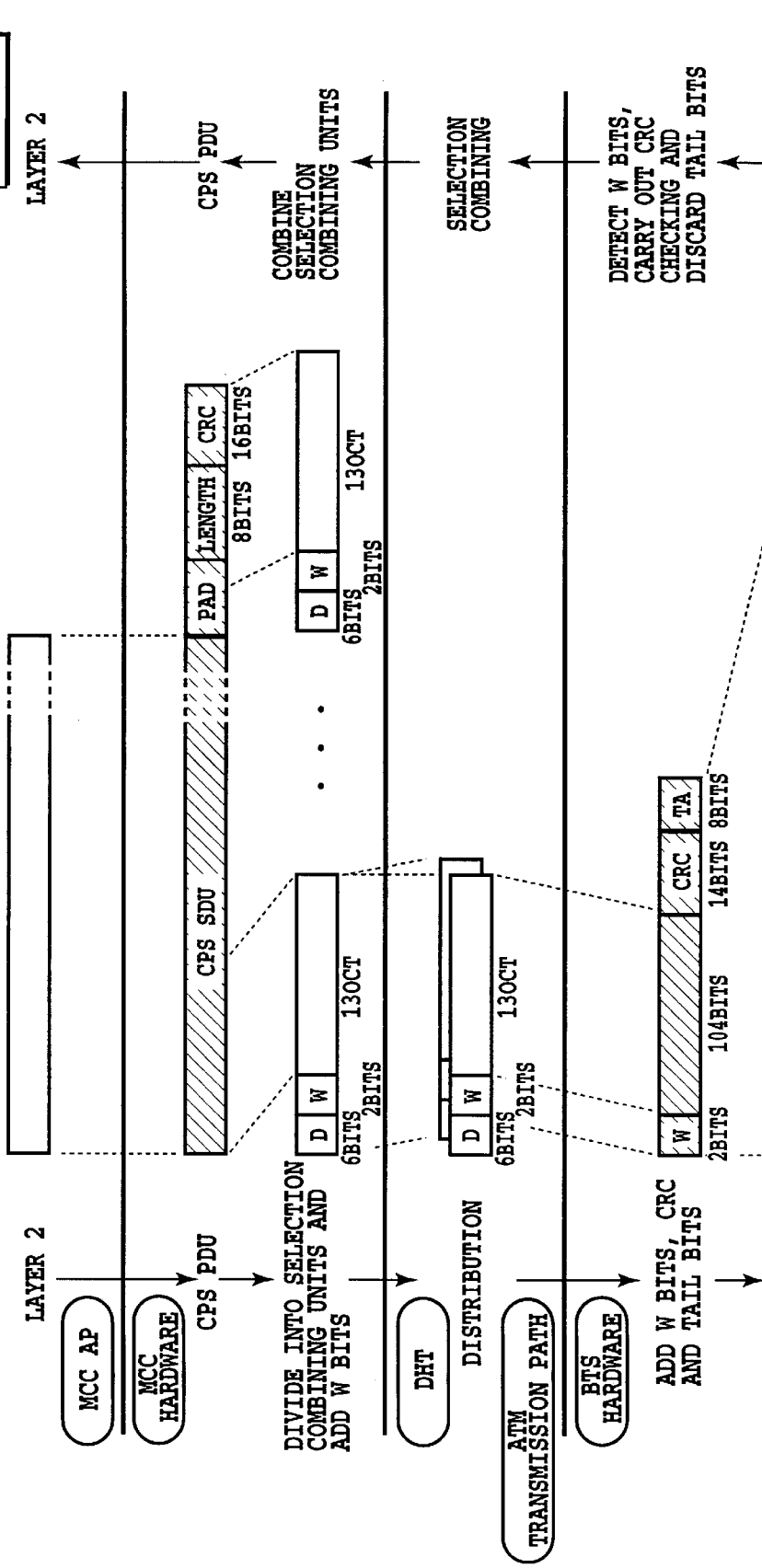

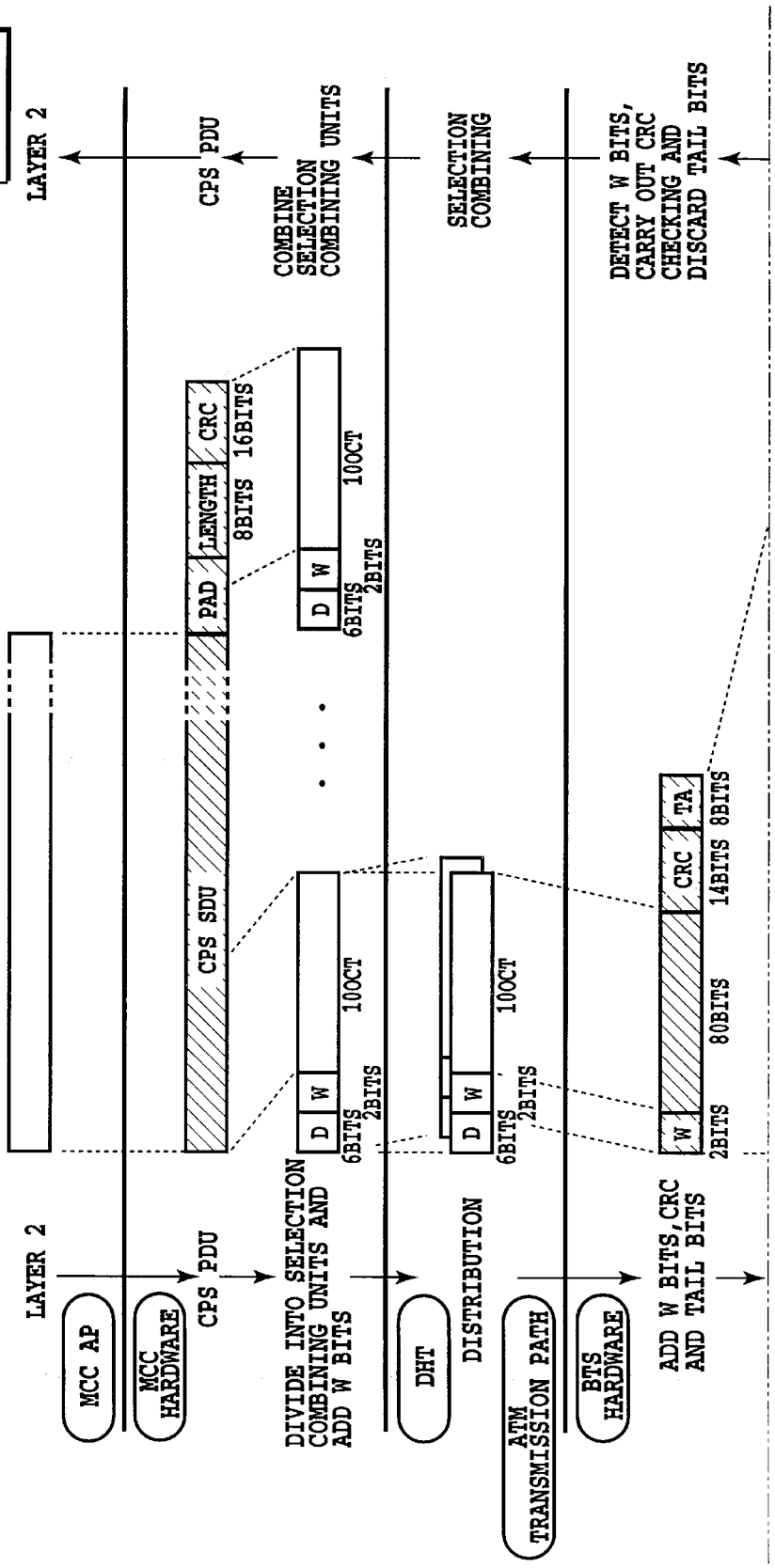

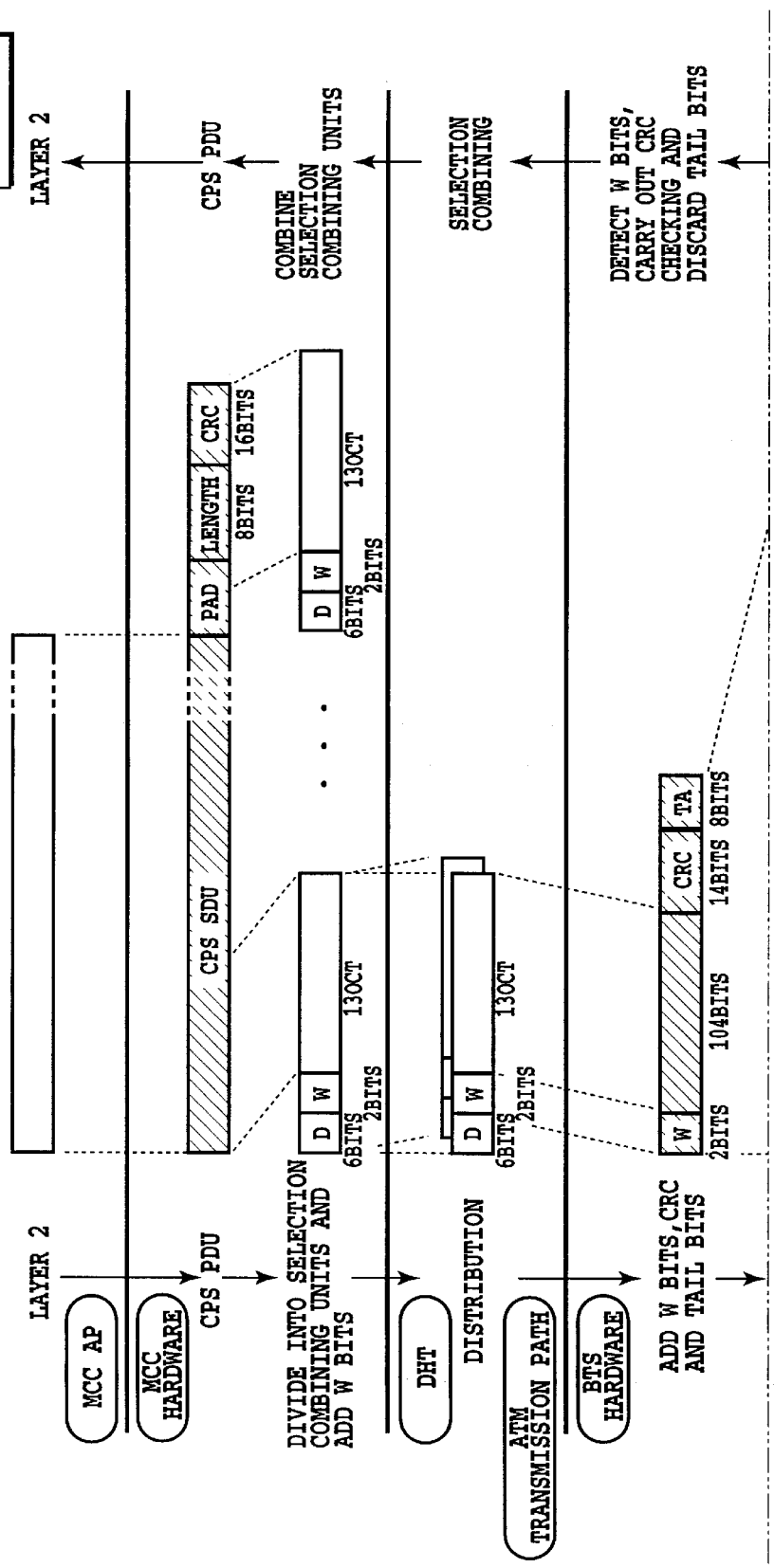

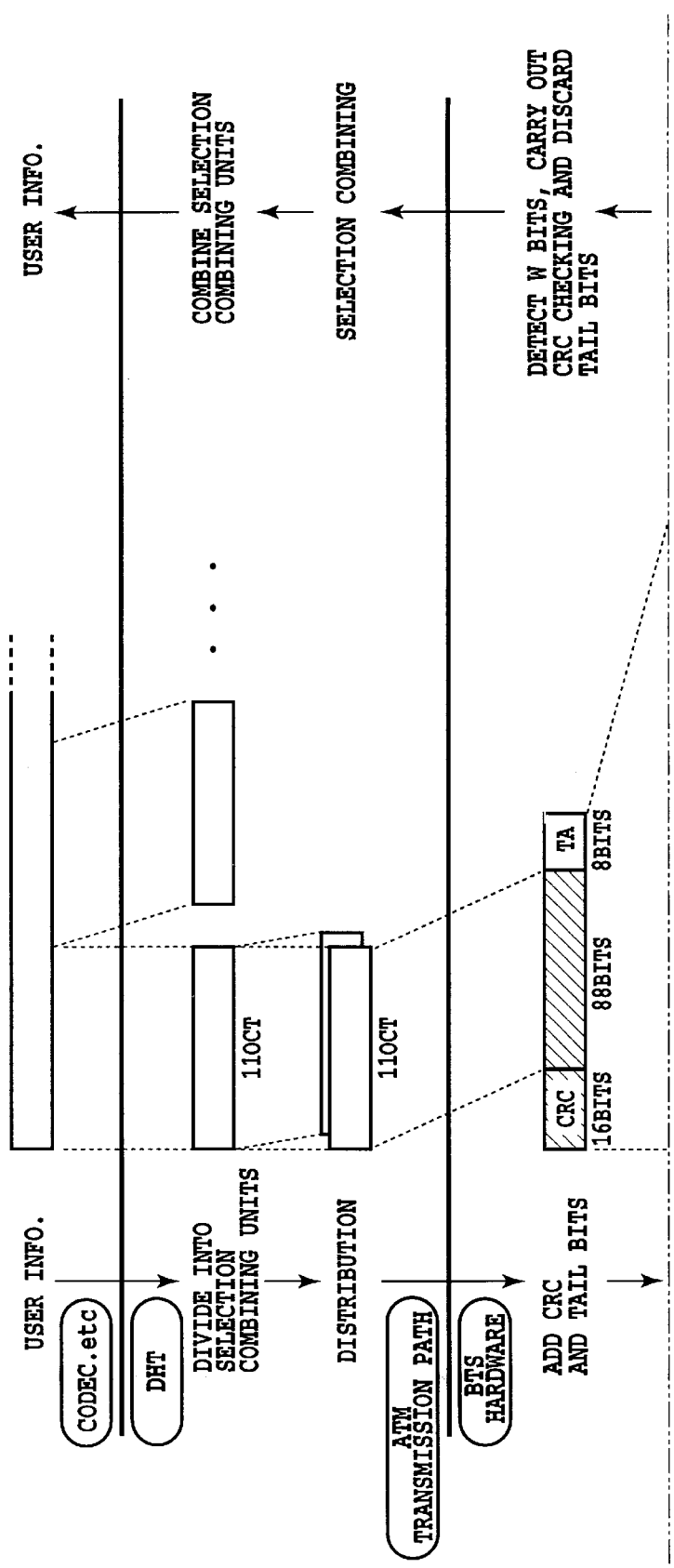

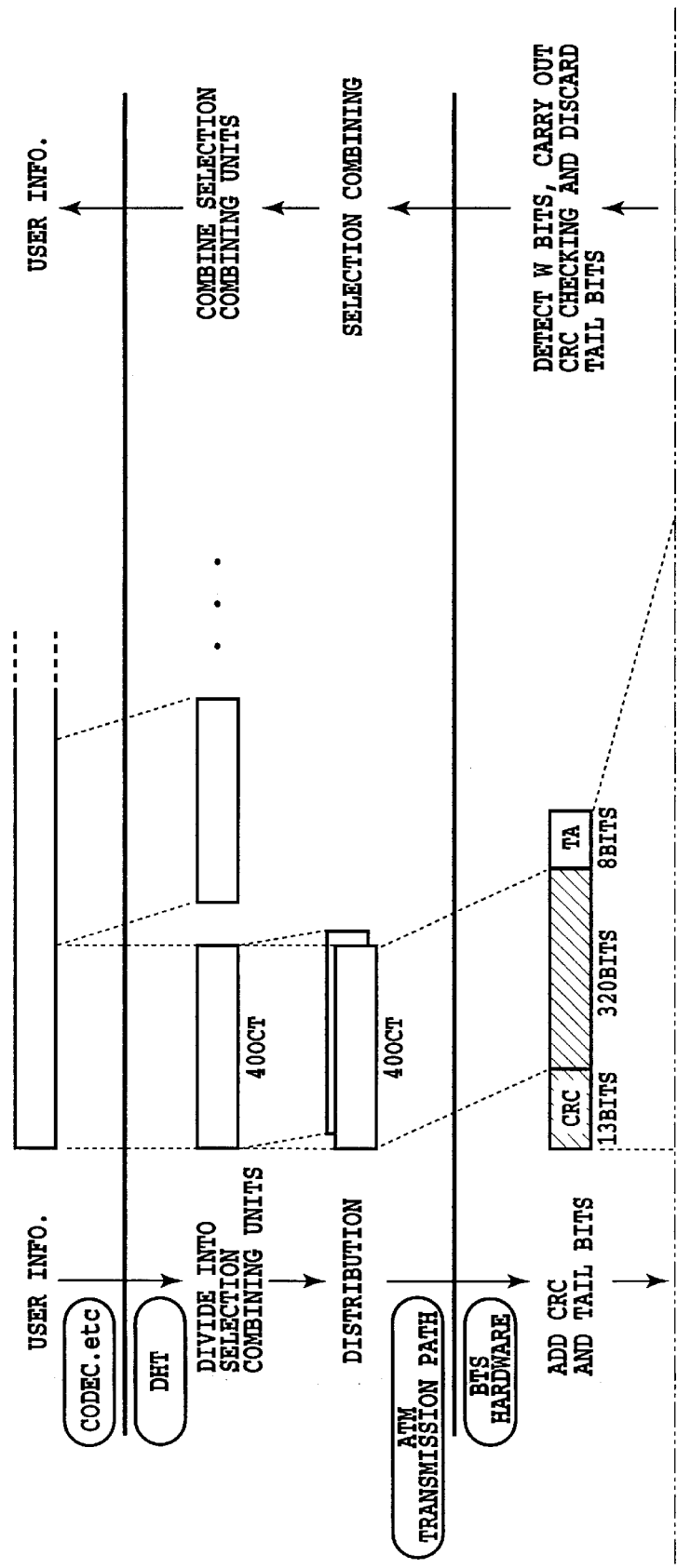

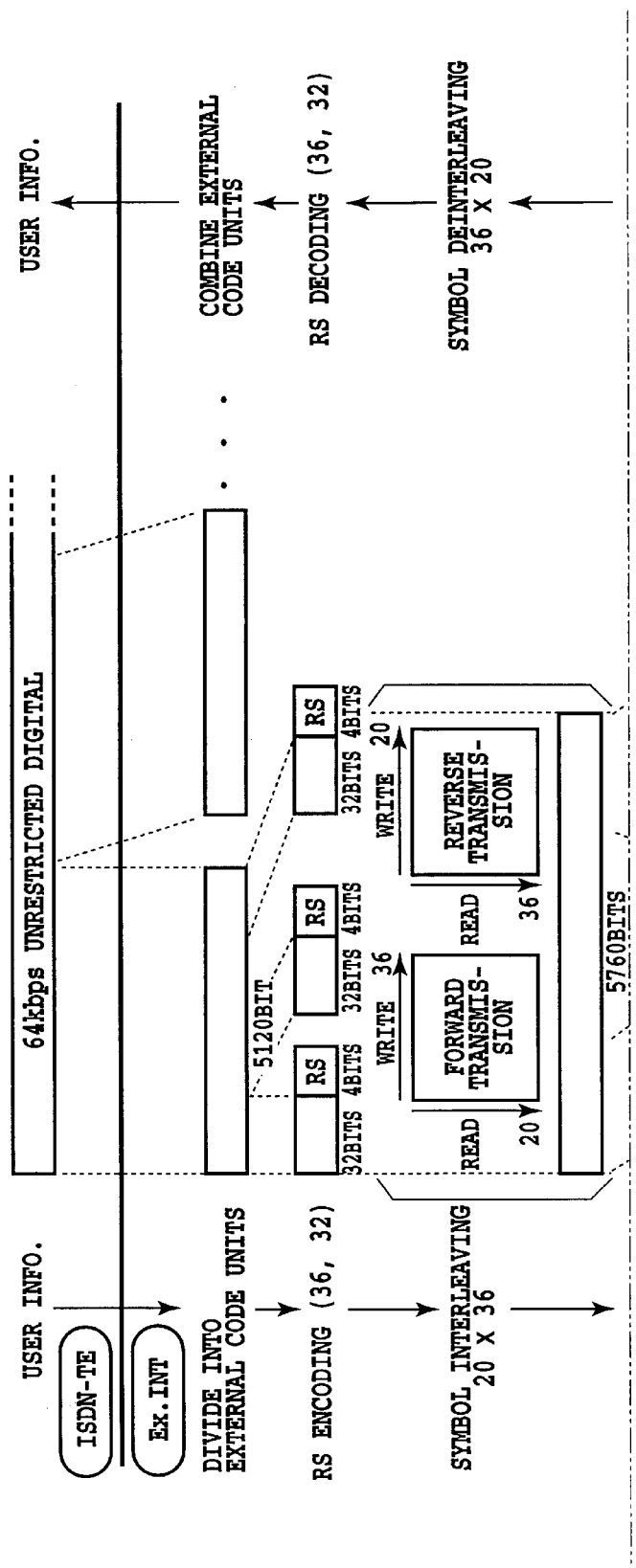
FIG.77A

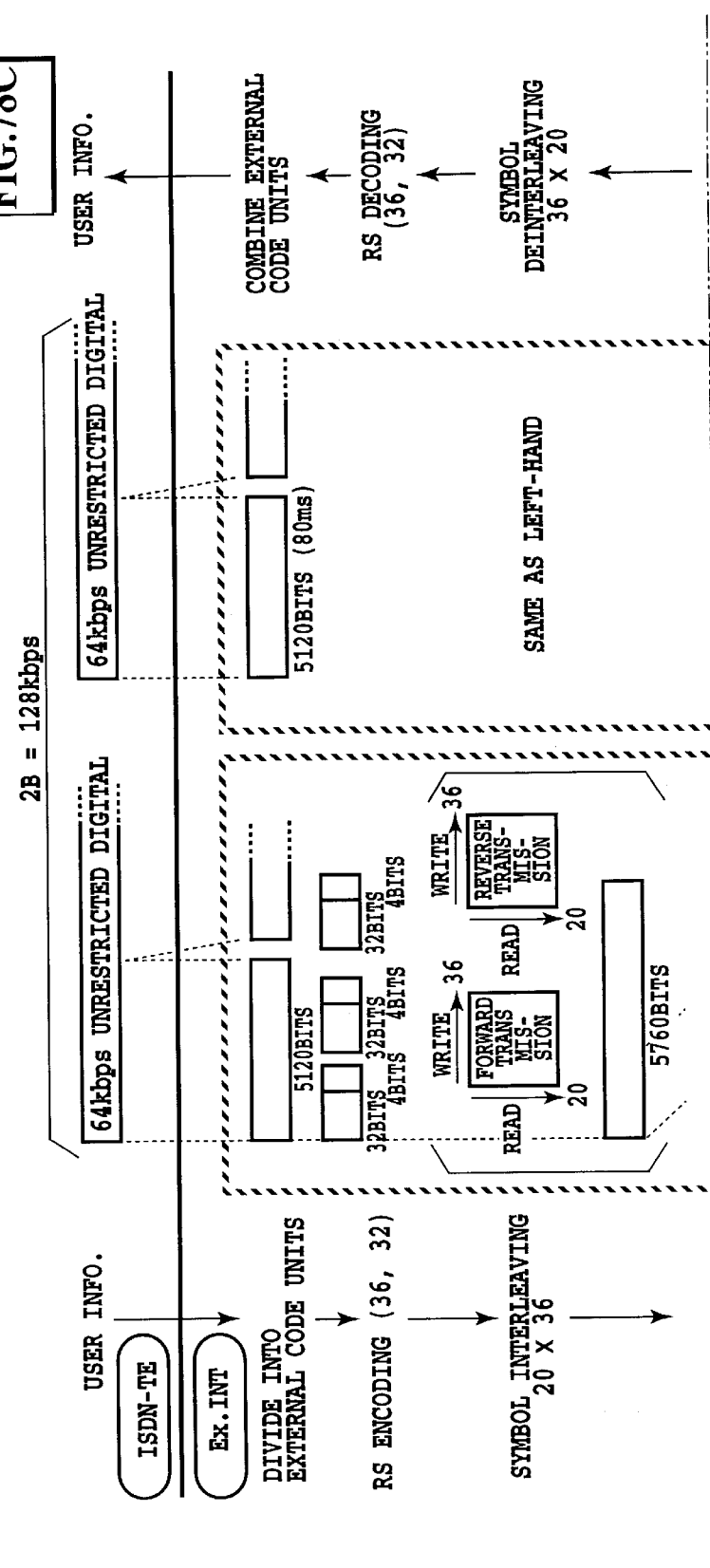

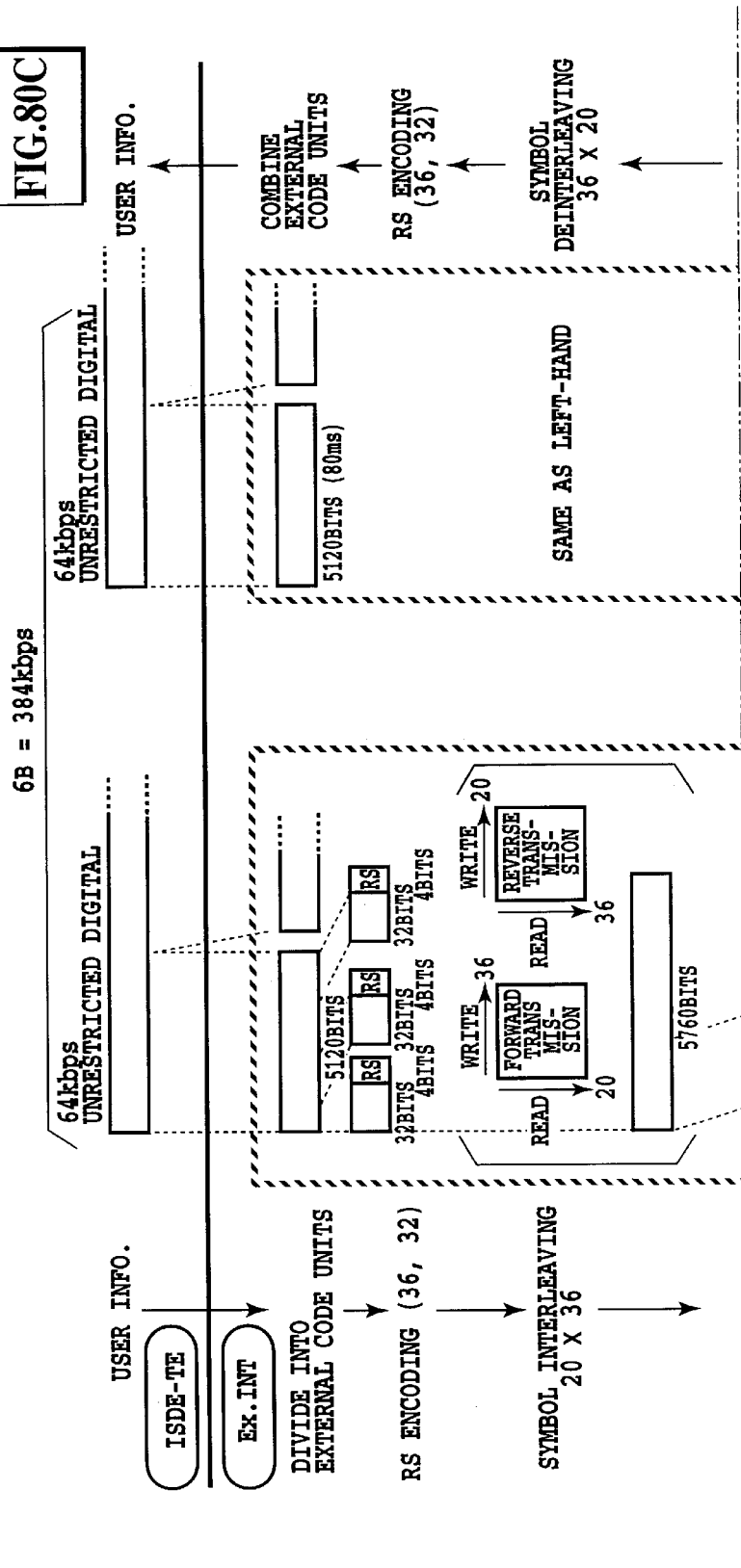

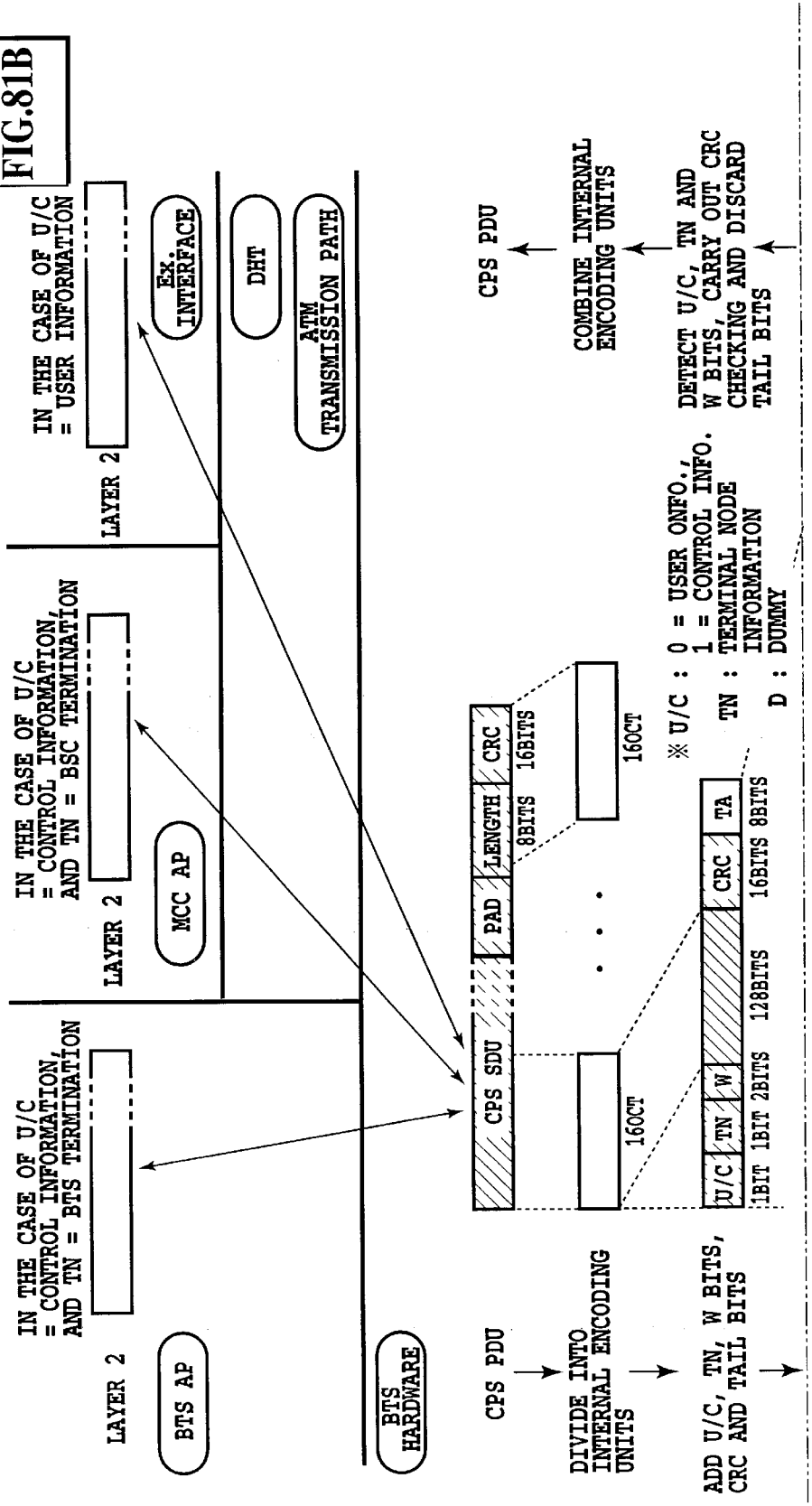

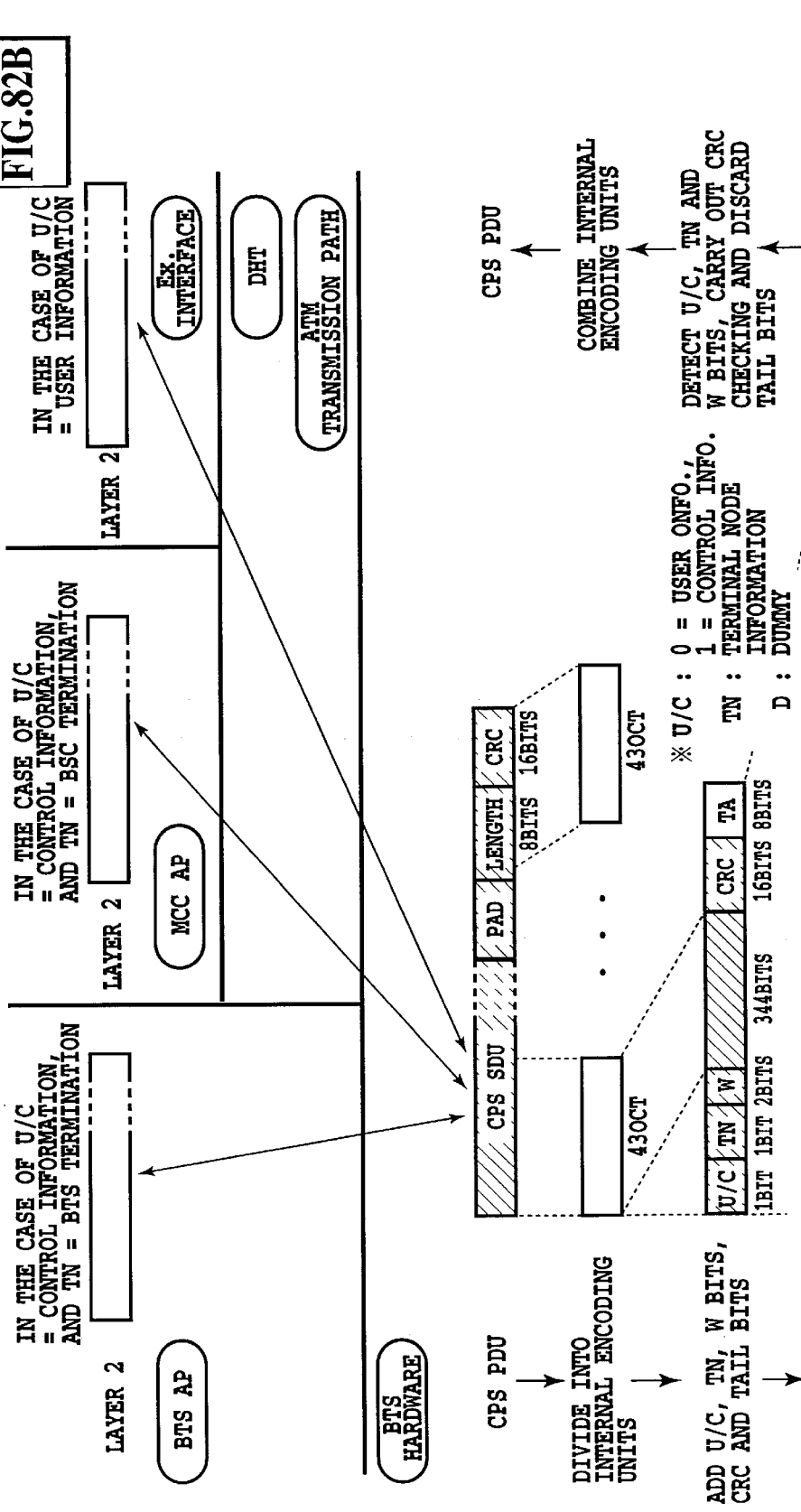

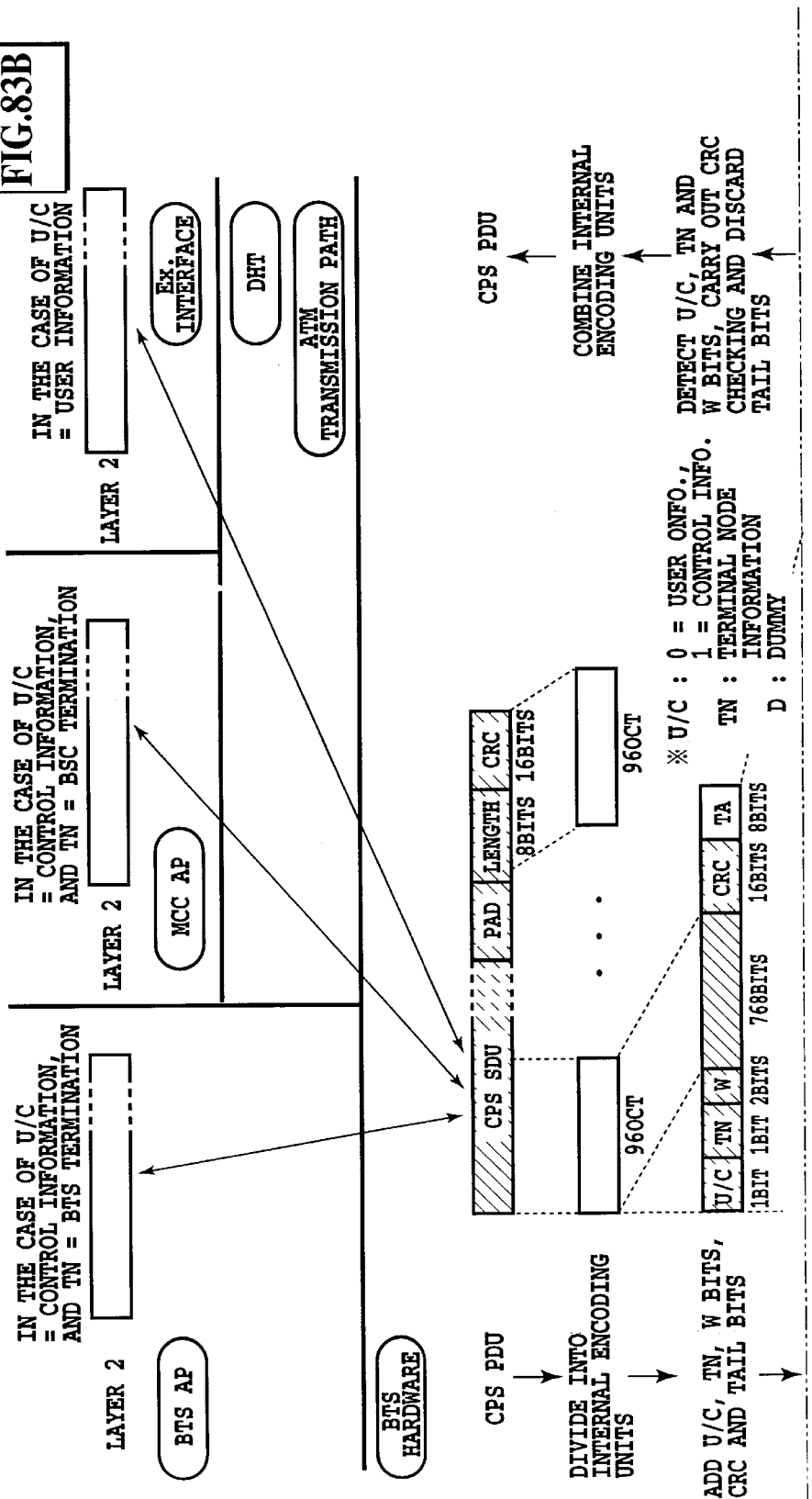

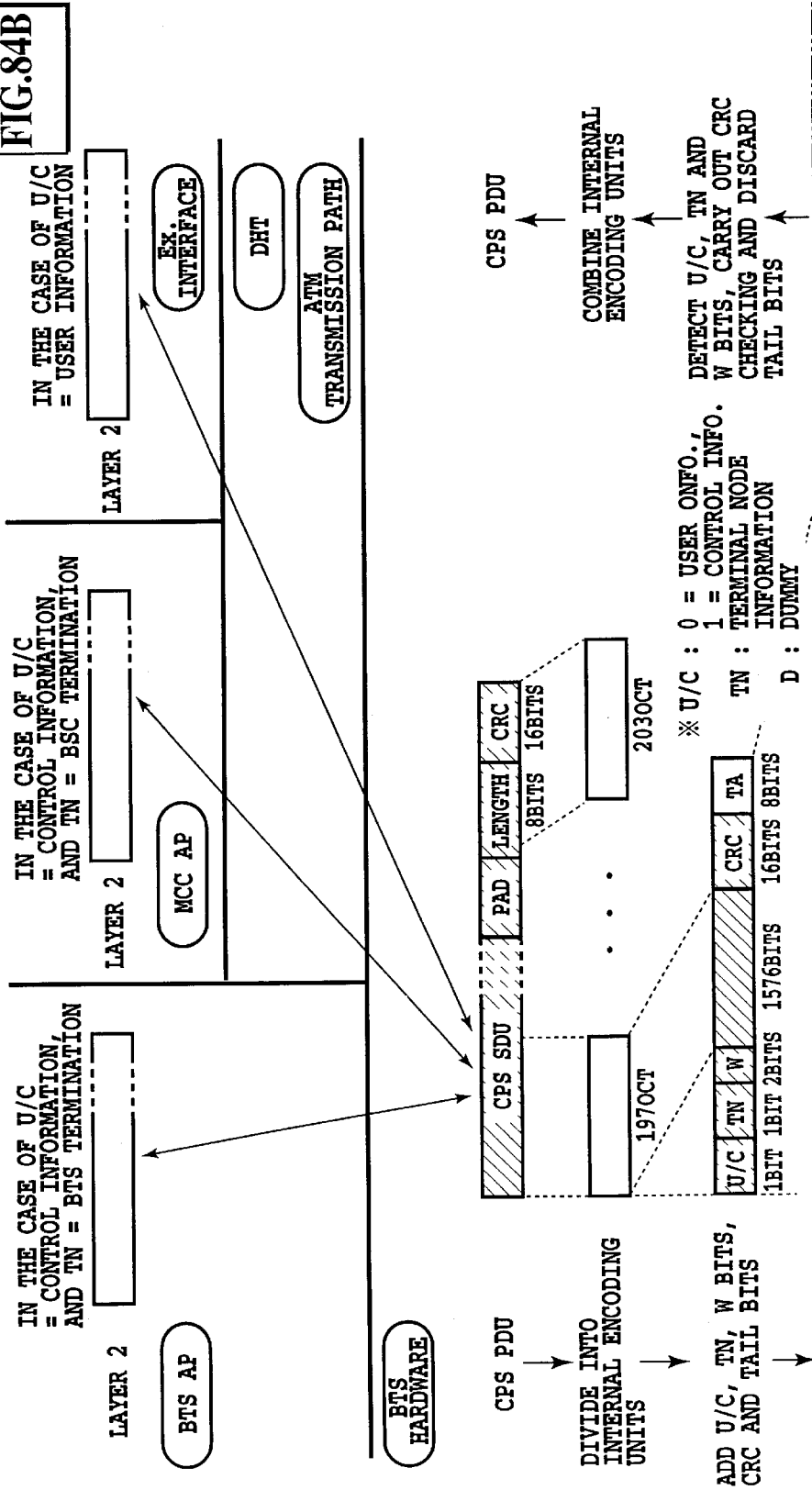

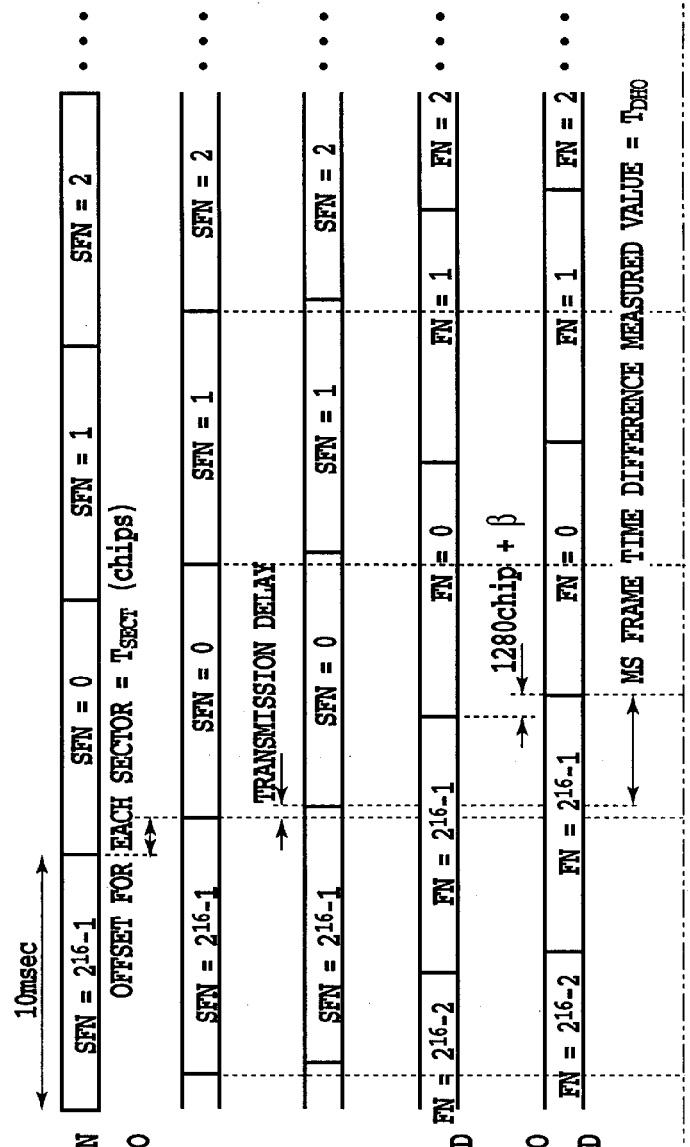

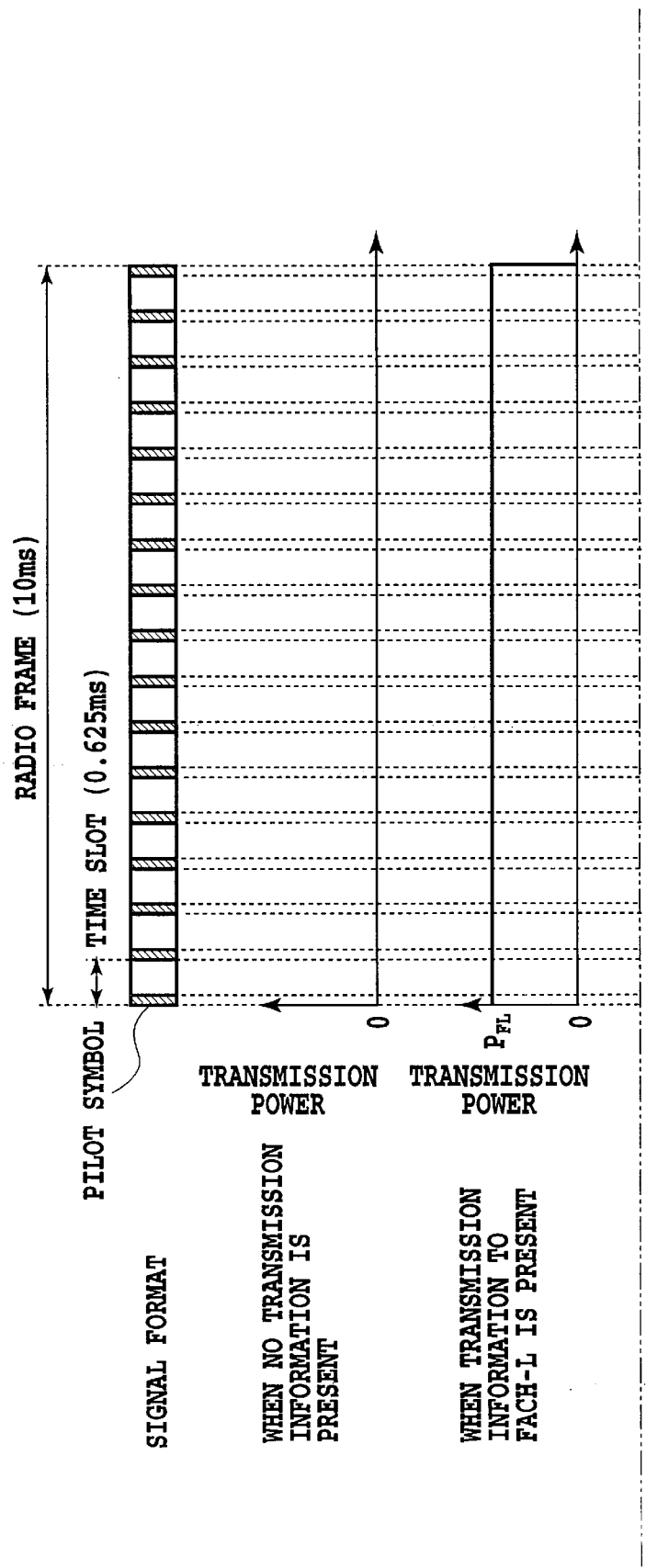

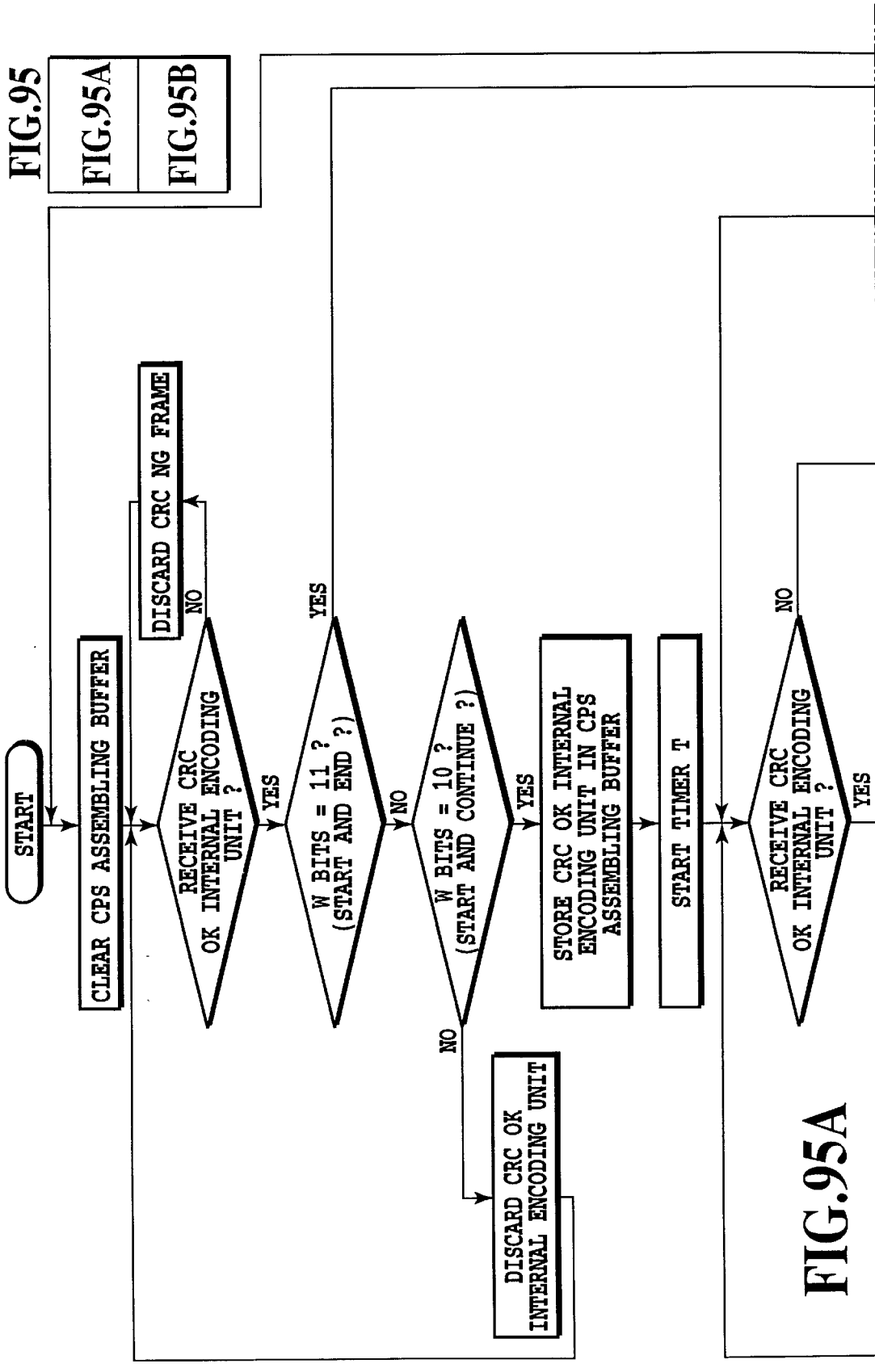

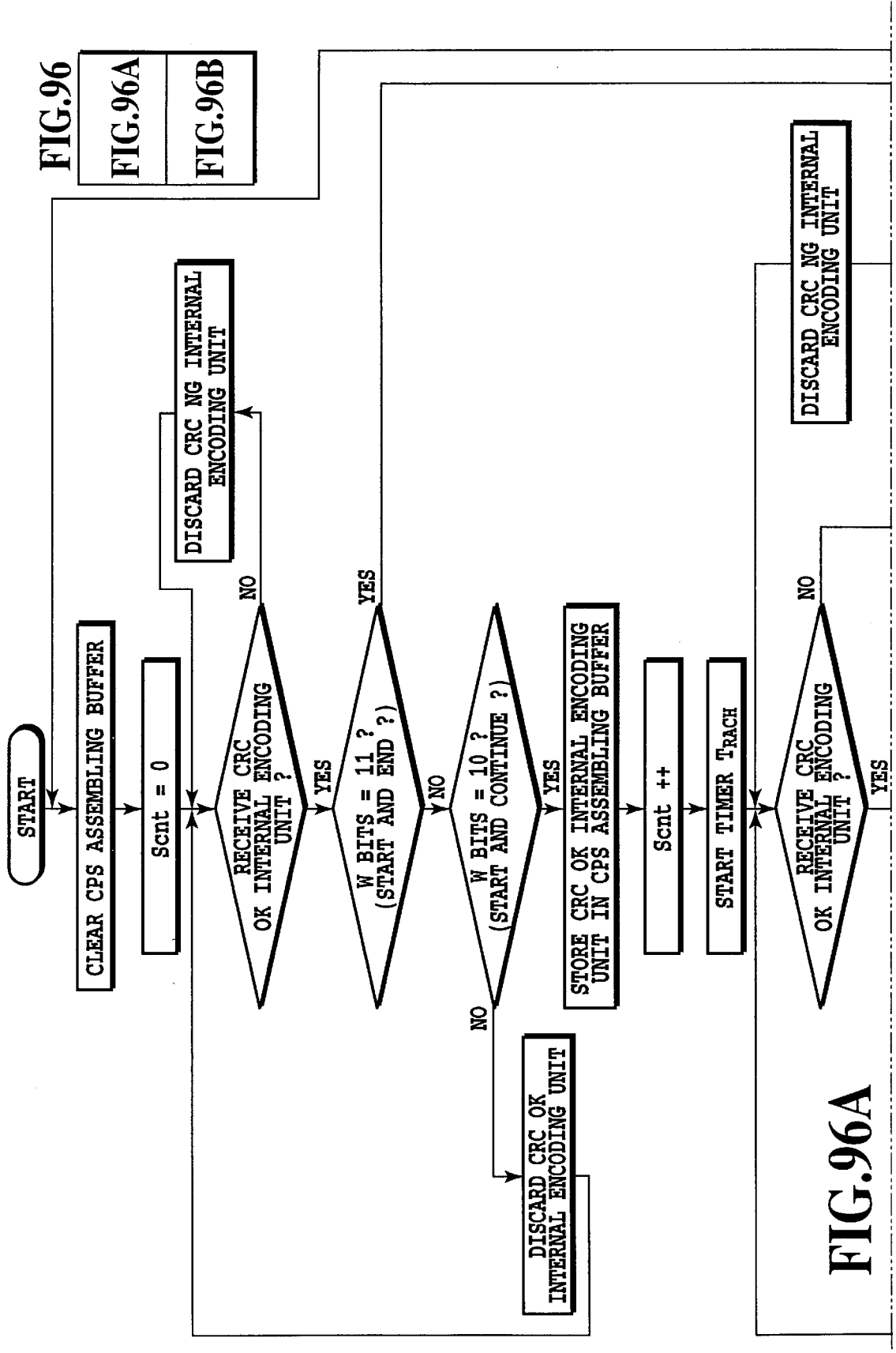

BASE STATION APPARATUS OF MOBILE COMMUNICATION SYSTEM

TECHNICAL FIELD

The present invention relates to a base station in a mobile communications system, and more particularly to a base station capable of carrying out communications with mobile stations through high speed digital communication channels using CDMA.

BACKGROUND ART

Recently, base stations in mobile communication systems have become increasingly faster owing to the development of novel communications methods such as CDMA (code division multiple access), which become possible with recent advances in digital communications techniques. In addition, fixed stations are also digitized, and come to use new switching networks such as ATM networks.

Thus, new base stations are required which meet such advances in technology.

DISCLOSURE OF THE INVENTION

An object of the present invention is to provide a novel, high speed, digital base station best suited to achieving communications with mobile stations by CDMA, and with a control office by ATM.

In the first aspect of the present invention, there is provided a digital radio communication system comprising:

transmitting one or more known pilot symbols at every fixed interval; and receiving, on a receiving side, the pilot symbols, and carrying out coherent detection using the received pilot symbols, wherein a number of the pilot symbols that are transmitted periodically is variable in accordance with a transmission rate.

According to the configuration above, a trade-off can be optimized between degradation in accuracy of coherent detection due to a reduction of the number of the pilot symbols and an increase in overhead due to the increase of the number of pilot symbols.

In the second aspect of the present invention, there is provided a digital radio communication system comprising:

transmitting, on a transmitting side, one or more known pilot symbols at every fixed slot interval;

assembling a frame from a plurality of the slots; and receiving, on a receiving side, the pilot symbols, and carrying out coherent detection using the received pilot symbols, wherein the pilot symbols consist of a known pilot symbol portion and a sync word portion for frame alignment.

Here, the pilot symbol portion and the sync word portion may be transmitted alternately at fixed intervals in the pilot symbols.

The receiving side may carry out the coherent detection using the known pilot symbol portion, and may employ, after establishing the frame alignment using the sync word portion, the sync word portion for the coherent detection.

Using sync word as a part of the pilot symbols makes possible to prevent an increase in overhead of the coherent detection.

In the third aspect of the present invention, there is provided a mobile communication system using a digital radio communication scheme, wherein mapping, which maps into one physical channel a plurality of logical channels for transmitting information to be broadcasted by a base station, is varied in accordance with a changing rate of data to be transmitted over each of the logical channel.

Here, the mapping may be carried out by varying an occurrence rate of the logical channels.

The mapping may fix a position of at least one logical channel.

The information to be broadcasted over the logical channels may be information on a reverse direction interfering power amount.

The information to be broadcasted over the logical channels may be control channel information on a contiguous cell or on a current cell.

Such an arrangement enables transmission to be implemented in accordance with characteristics of broadcasted information, thereby implementing efficient transmission.

In the fourth aspect of the present invention, there is provided a mobile communication system using a digital radio communication scheme, wherein a number of radio frames of a fixed duration on a physical channel is varied in accordance with a transmission rate, the radio frames constituting a processing unit on a logical channel.

Such an arrangement makes it possible to optimize the unit to which the error detecting code (CRC) is provided, reducing the overhead of processings.

In the fifth aspect of the present invention, there is provided a mobile communication system using CDMA, the mobile communication system uses for an inphase component and a quadrature component a same short code and different long codes as spreading codes.

Here, the different long codes may have their phases shifted.

This configuration prevents short codes which are finite resources from being wasted.

In the sixth aspect of the present invention, there is provided a mobile communication system employing a digital radio communication scheme, wherein frame transmission timings on physical channels from a base station to mobile stations are delayed by random durations for respective sectors associated with the same base station.

Here, the random durations may be assigned to respective dedicated physical channels at a call setup.

Providing the random delay in this way makes it possible for the interfering power to be uniformly distributed along the time axis when there are multiple physical channels which are transmitted intermittently, thereby reducing collision of signals.

In the seventh aspect of the present invention, there is provided a multicode transmission system in a CDMA mobile communication system, which communicates with a mobile station over a plurality of physical channels that use different spreading codes, the multicode transmission system comprising:

transmitting one or more pilot symbols and a transmission power control command through one of the plurality of physical channels; and carrying out in common with the plurality of physical channels coherent detection using the same pilot symbols and transmission power control in accordance with the same transmission power control command.

Here, transmission power of a portion of the pilot symbols and the transmission power control command transmitted over the one of the plurality of physical channels may be greater than transmission power of other data portions.

Transmission power of the portion of the pilot symbols and the transmission power control command transmitted over the one of the plurality of physical channels may be greater than transmission power of other data portions by a factor of a number of the multicodes.

In the eighth aspect of the present invention, there is provided a multicode transmission system in a CDMA mobile communication system, which communicates with a mobile station over a plurality of physical channels that use different spreading codes, the multicode transmission system comprising:

assigning to the plurality of physical channels same one or more pilot symbols and a same transmission power control command;

transmitting a portion of the pilot symbols and the transmission power control command on the plurality of physical channels by spreading only that portion using a same spreading code; and carrying out in common with the plurality of physical channels coherent detection using the same pilot symbols and transmission power control in accordance with the same transmission power control command.

This makes it possible to implement efficient multicode transmission.

In the ninth aspect of the present invention, there is provided a transmission power control system in a CDMA mobile communication system, wherein a base station carries out transmission power control in accordance with a predetermined pattern until synchronization in the base station is established, receives, when the synchronization is established, a transmission power control command based on SIR measurement results in a mobile station, carries out transmission power control in response to the transmission power control command, and transmits a transmission power control command based on SIR measurement results in the base station; and the mobile station carries out transmission power control from an initial value, and transmits, after the synchronization has been established, the transmission power control command based on the SIR measurement results in the mobile station.

Here, the predetermined pattern may be a pattern for rapidly increasing transmission power up to a predetermined value, and subsequently gradually increasing the transmission power.

The predetermined pattern may be variable in the base station.

The initial value in the mobile station may be transmitted from the base station.

The base station may transmit, before the synchronization in the base station is established, to the mobile station a transmission power control command of a predetermined second pattern; and the mobile station may control transmission power in response to the transmission power control command which is transmitted.

The transmission power control command of the second pattern may be varied by the base station.

The mobile station may carry out, until the synchronization in the base station is established, the transmission power control in accordance with a pattern predetermined in the mobile station.

Thus gradually increasing forward transmission power can prevent communications with other mobile stations from being adversely affected. Furthermore, since the control is carried out in two stages, the synchronization can be established quickly. Since the base station takes the initiative of the power control, optimum control patterns can be selected. In addition, using the fixed control pattern in the mobile station simplifies the configuration.

In the tenth aspect of the present invention, there is provided a mobile communication system employing a packet digital radio communication scheme between a base station and mobile stations, wherein the base station makes a decision as to whether to switch physical radio channels to be used; and switches, if necessary, the physical radio channels to be used, and wherein the foregoing control is carried out between the base station and the mobile stations without involving connection control of the base station with a wire section.

Here, the switching may be carried out in accordance with traffic volume between the base station and the mobile stations.

The physical radio channels may be a common physical radio channel and a plurality of dedicated physical radio channels.

Since the switching control in accordance with the present invention carries out the switching control based on the decision of the base station (BTS) in this way, it does not involve the switching control in the wire section (between the base station and control center (BSC), for example). This makes it possible to reduce the load of the switching control, and to implement high speed switching control.

BRIEF DESCRIPTION OF THE DRAWINGS

FIG. 4 is a diagram showing the relationship of FIGS. 4A and 4B;

FIG. 20 is a diagram illustrating a short code generating method;

FIGS. 28A and 28B are diagrams illustrating a frame structure for 1544 kbits/s used for transmitting ATM cells;

FIG. 38 is a diagram showing the relationship of FIGS. 38A and 38B;

FIG. 38A is a diagram illustrating a signal format of a timing cell;

FIG. 38B is a diagram illustrating a signal format of a timing cell;

FIG. 46 is a diagram showing the relationship of FIGS. 46A and 46B;

FIG. 46A is a flowchart illustrating a synchronization establishment flow of a dedicated physical channel;

FIGS. 58A–58C are diagrams illustrating examples of cell transmission sequence data;

FIG. 66 is a diagram showing the relationship of FIGS. 66A and 66B;

FIG. 66A is a diagram illustrating a coding scheme of a FACH-long (64 ksps) logical channel;

FIG. 67 is a diagram showing the relationship of FIGS. 67A and 67B;

FIG. 67A is a diagram illustrating a coding scheme of a FACH-short (normal mode) (64 ksps) logical channel;

FIG. 68 is a diagram showing the relationship of FIGS. 68A and 68B;

FIG. 68A is a diagram illustrating a coding scheme of a FACH-short (Ack mode) (64 ksps) logical channel;

FIG. 69 is a diagram showing the relationship of FIGS. 69A and 69B;

FIG. 69A is a diagram illustrating a coding scheme of a RACH-long (64 ksps) logical channel;

FIG. 70 is a diagram showing the relationship of FIGS. 70A and 70B;

FIG. 70A is a diagram illustrating a coding scheme of a RACH-short (64 ksps) logical channel;

FIG. 71 is a diagram showing the relationship of FIGS. 71A and 71B;

FIG. 72 is a diagram showing the relationship of FIGS. 72A and 72B;

FIG. 72A is a diagram illustrating a coding scheme of an ACCH (32/64 ksps) logical channel;

FIG. 73 is a diagram showing the relationship of FIGS. 73A and 73B;

FIG. 73A is a diagram illustrating a coding scheme of an ACCH (128 ksps) logical channel;

FIG. 74 is a diagram showing the relationship of FIGS. 74A and 74B;

FIG. 74A is a diagram illustrating a coding scheme of an ACCH (256 ksps) logical channel;

FIG. 75 is a diagram showing the relationship of FIGS. 75A and 75B;

FIG. 75A is a diagram illustrating a coding scheme of a DTCH (32 ksps) logical channel;

FIG. 76 is a diagram showing the relationship of FIGS. 76A and 76B;

FIG. 76A is a diagram illustrating a coding scheme of a DTCH (64 ksps) logical channel;

FIG. 77 is a diagram showing the relationship of FIGS. 77A, 77B and 77C;

FIG. 77A is a diagram illustrating a coding scheme of a DTCH (128 ksps) logical channel;

FIG. 78 is a diagram showing the relationship of FIGS. 78A, 78B and 78C;

FIG. 78A is a diagram illustrating a coding scheme of a DTCH (256 ksps) logical channel;

FIG. 79 is a diagram showing the relationship of FIGS. 79A, 79B and 79C;

FIG. 80A is a diagram illustrating a coding scheme of a DTCH (1024 ksps) logical channel;

FIG. 80B is a diagram illustrating a coding scheme of a DTCH (1024 ksps) logical channel;

FIG. 80C is a diagram illustrating a coding scheme of a DTCH (1024 ksps) logical channel;

FIG. 81 is a diagram showing the relationship of FIGS. 81A and 81B;

FIG. 81A is a diagram illustrating a coding scheme of an UPCH (32 ksps) logical channel;

FIG. 81B is a diagram illustrating a coding scheme of an UPCH (32 ksps) logical channel;

FIG. 82 is a diagram showing the relationship of FIGS. 82A and 82B;

FIG. 82A is a diagram illustrating a coding scheme of an UPCH (64 ksps) logical channel;

FIG. 82B is a diagram illustrating a coding scheme of an UPCH (64 ksps) logical channel;

FIG. 83 is a diagram showing the relationship of FIGS. 83A and 83B;

FIG. 83A is a diagram illustrating a coding scheme of an UPCH (128 ksps) logical channel;

FIG. 83B is a diagram illustrating a coding scheme of an UPCH (128 ksps) logical channel;

Figure 84B:
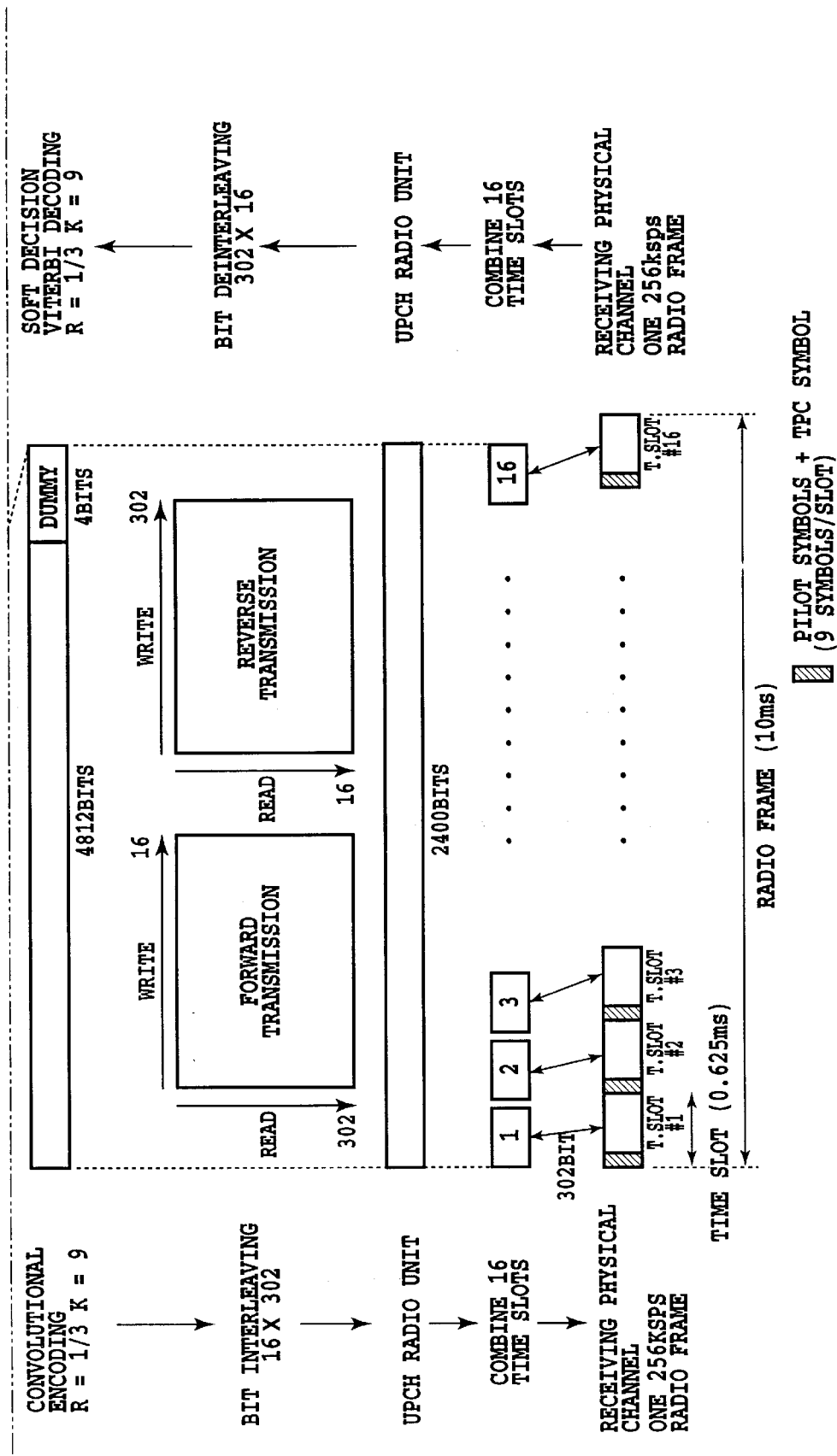
Figure 85:
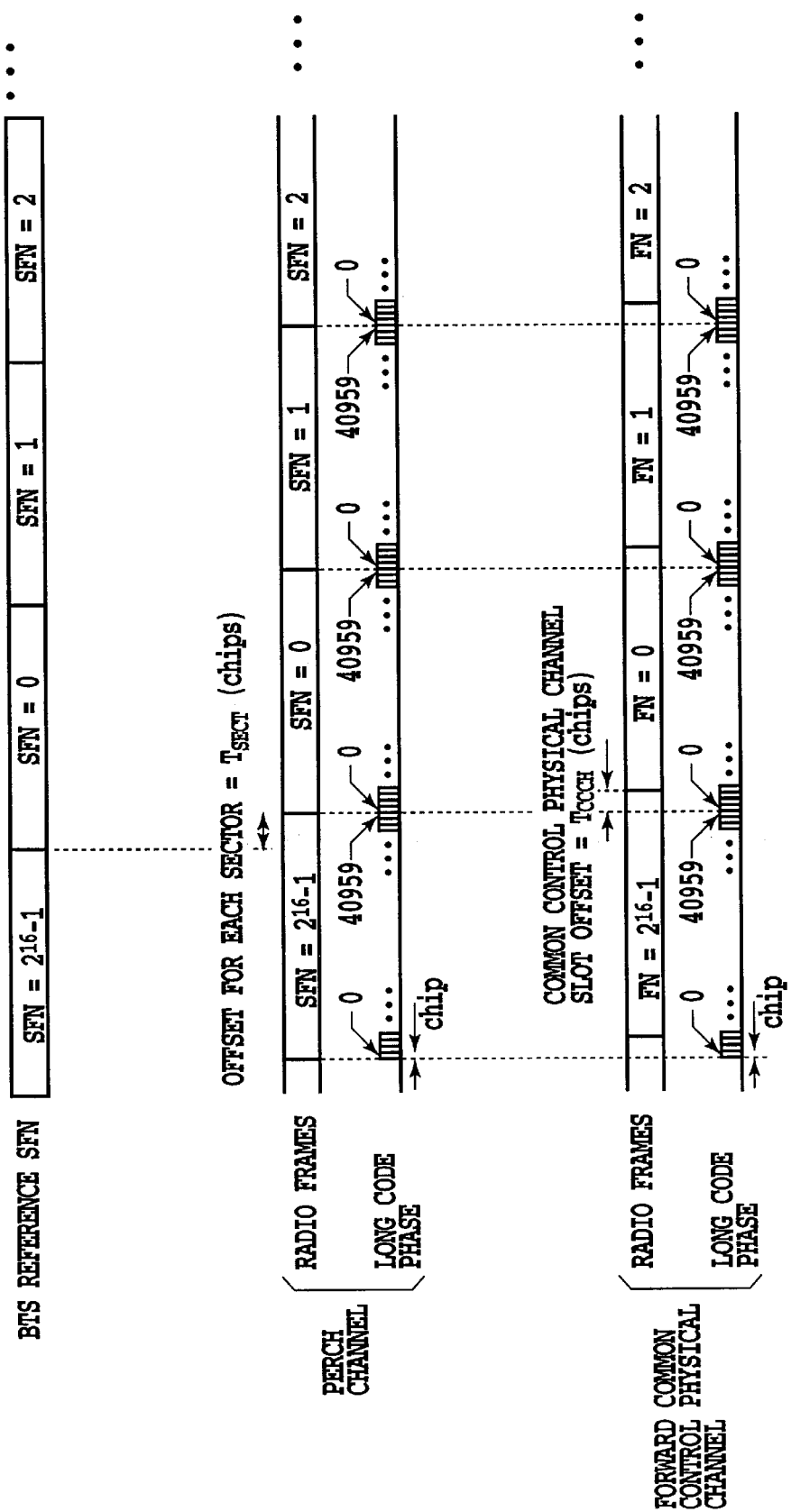
Figure 86:
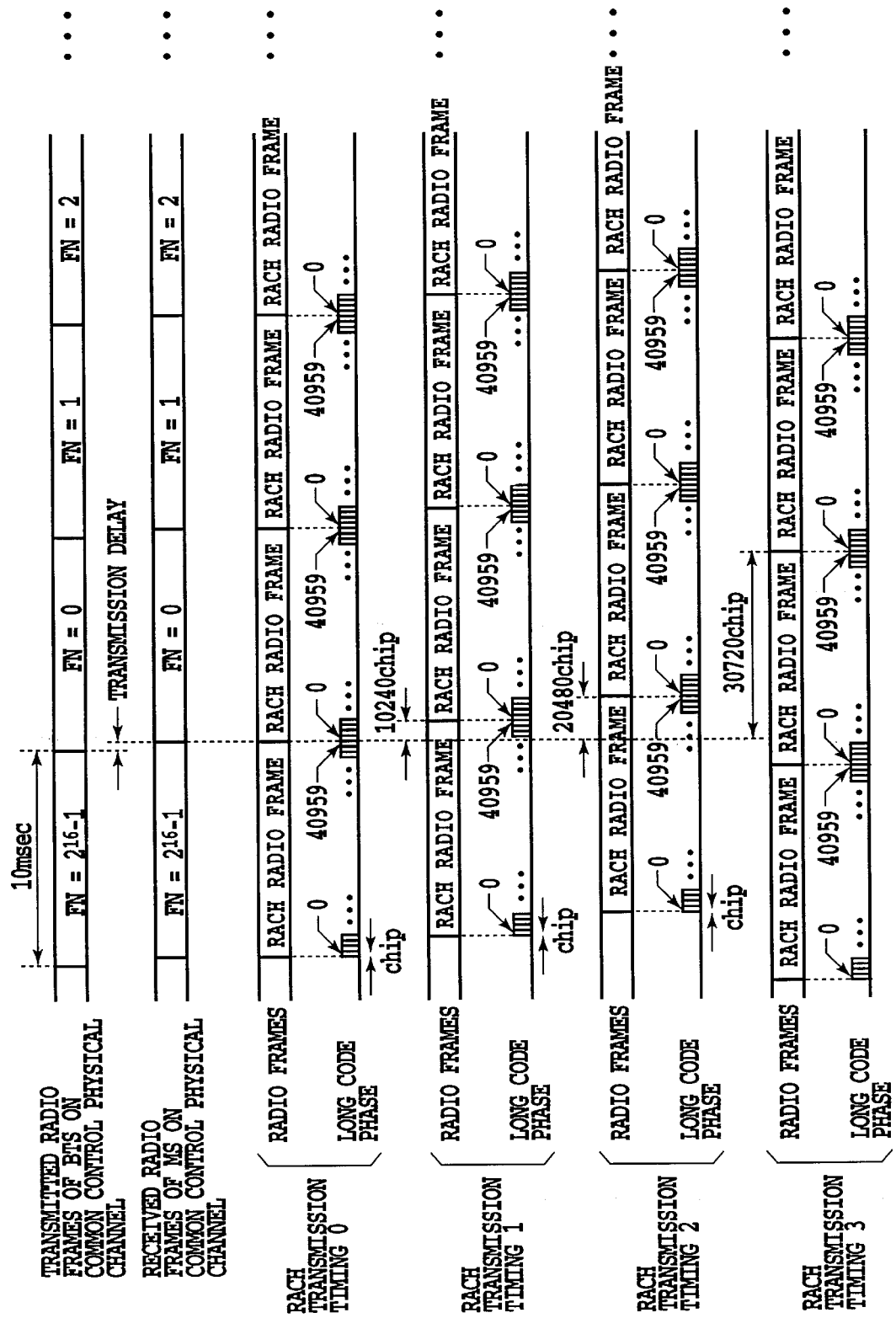
Figure 87A:
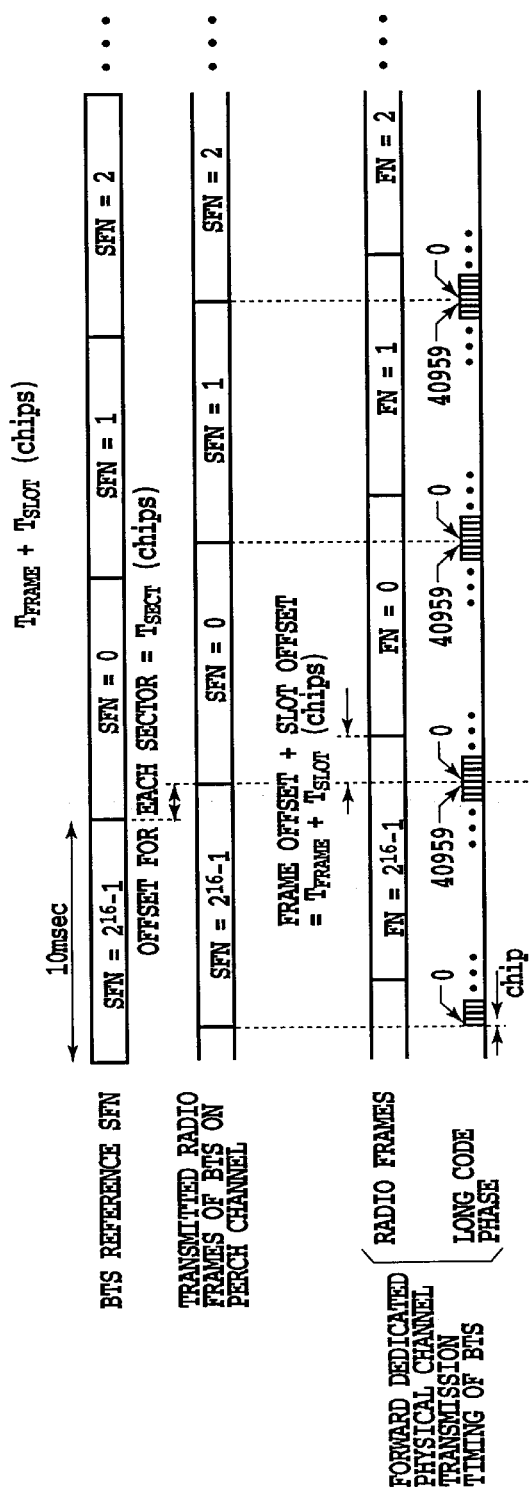
Figure 87B:
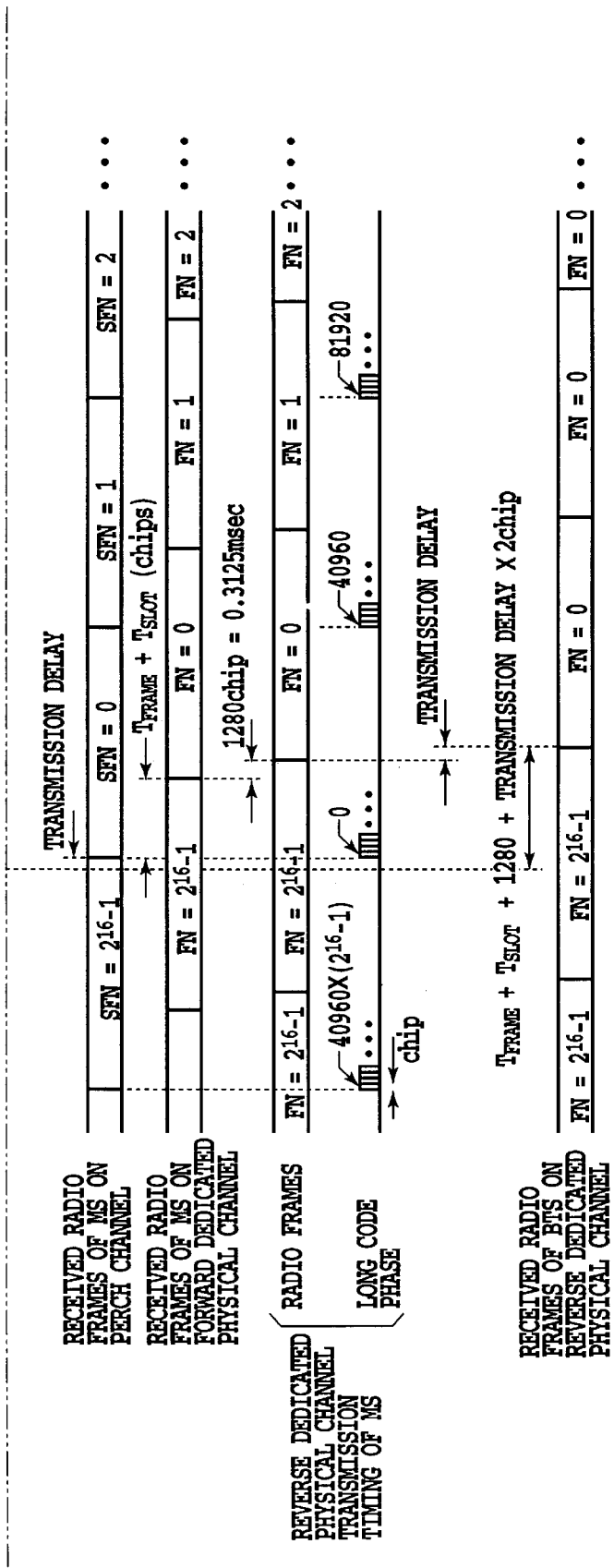
Figure 88B:
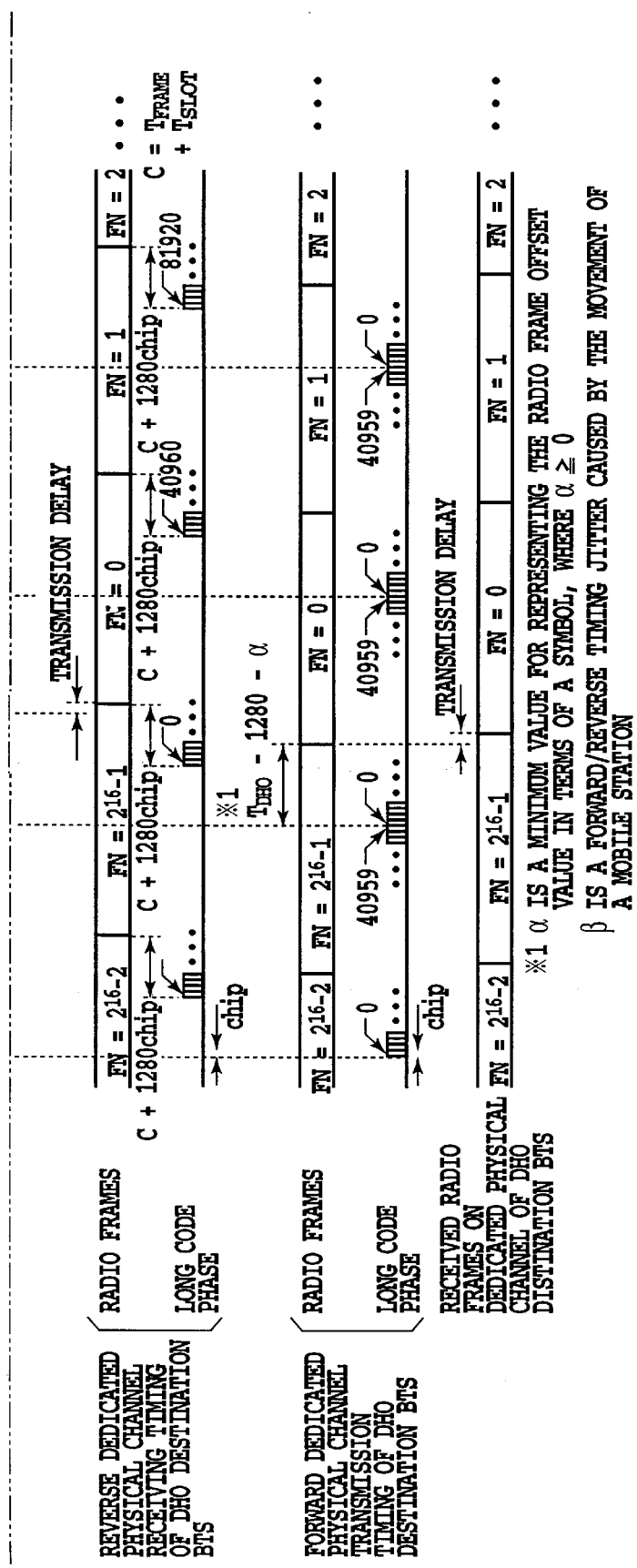
Figure 89:
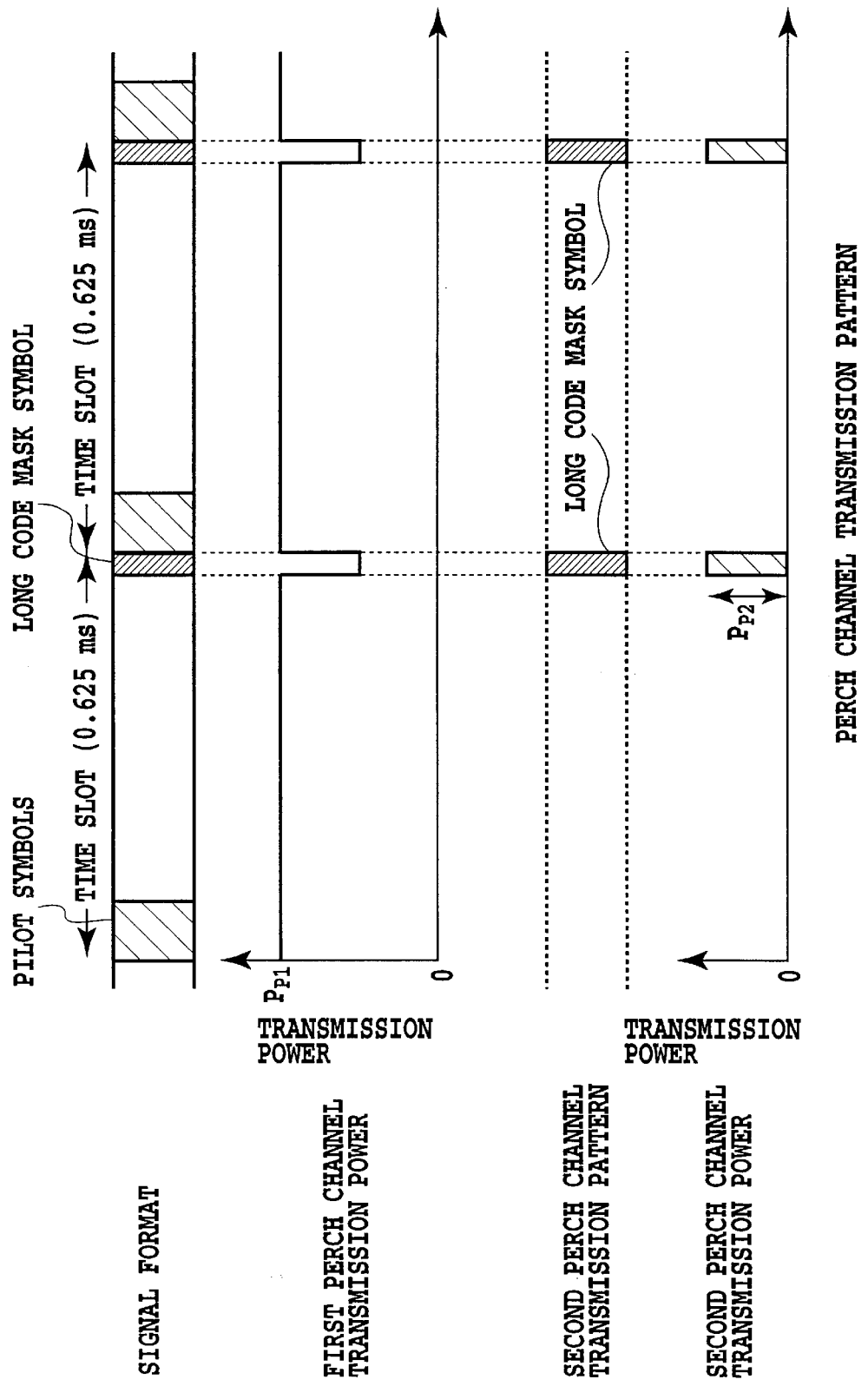
Figure 90B:
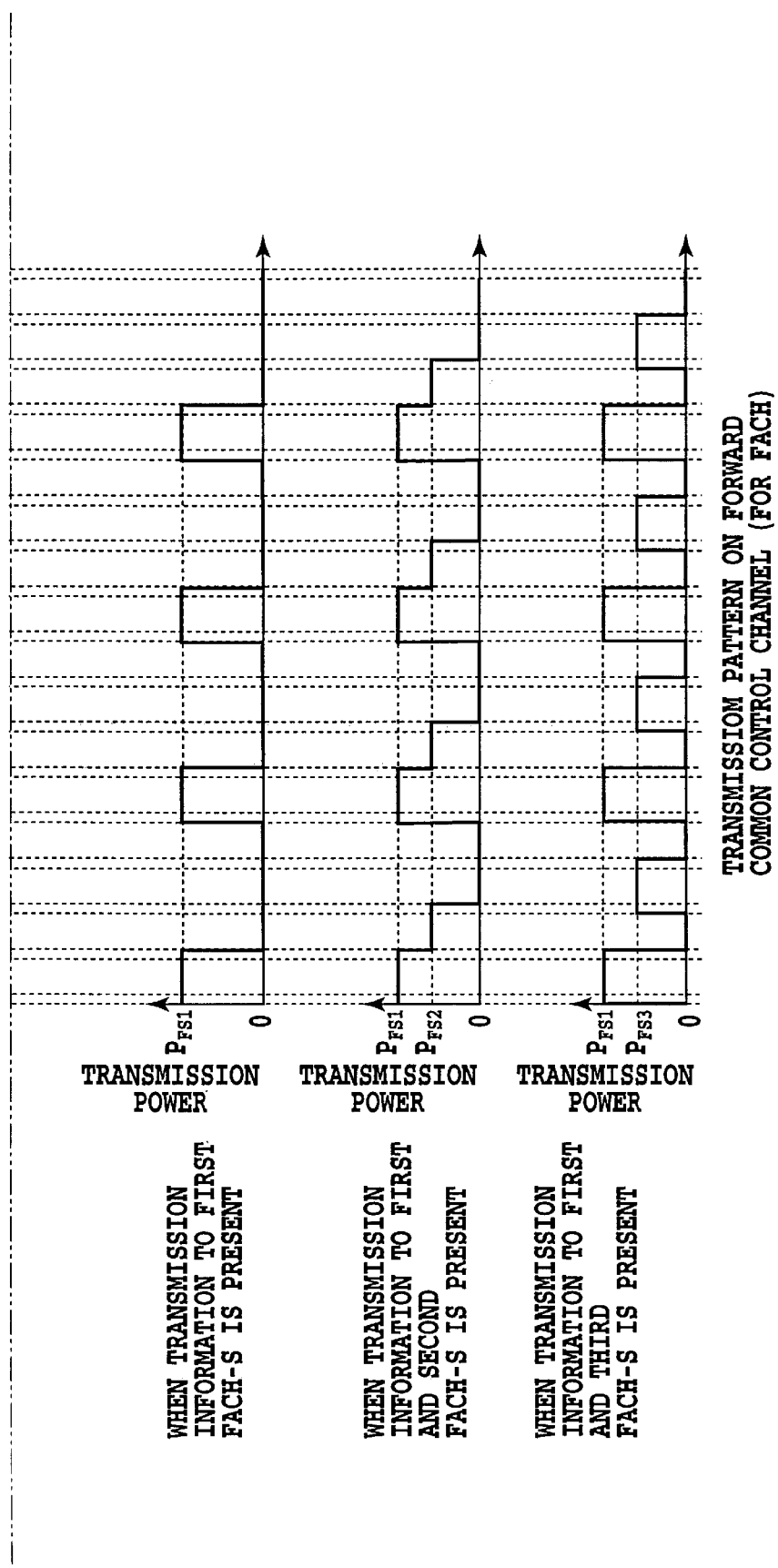
Figure 91:
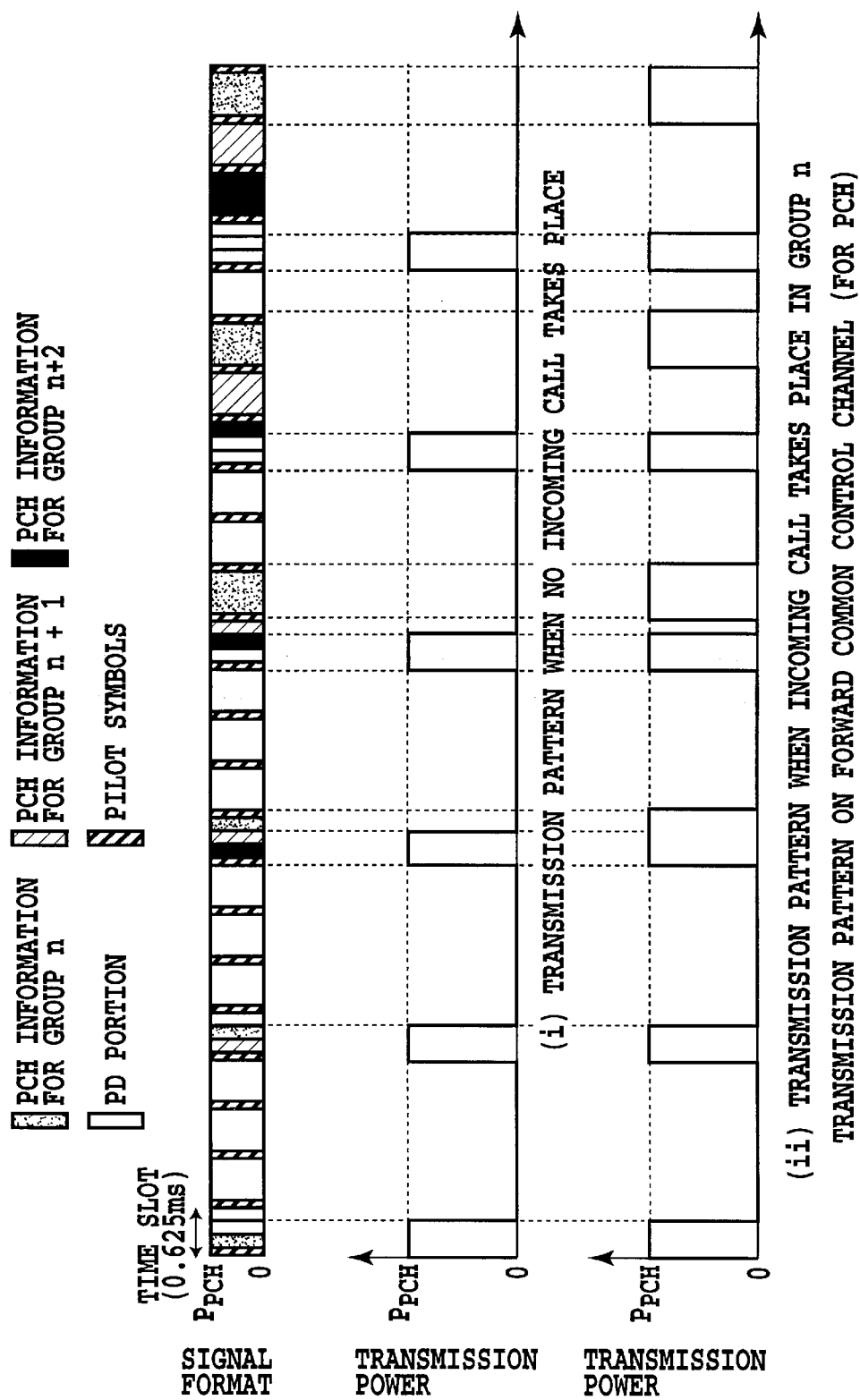
Figure 92:
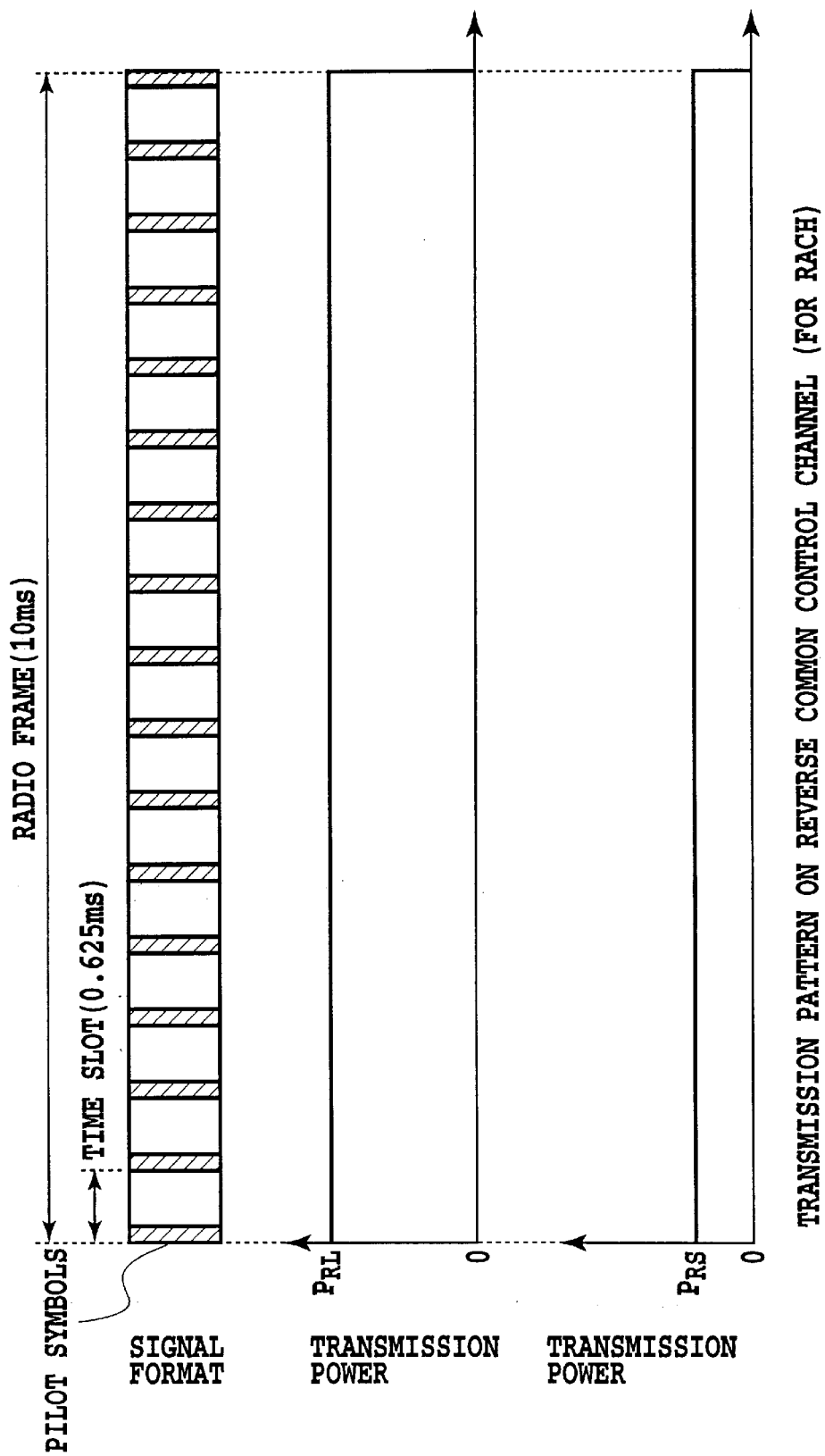
Figure 93:
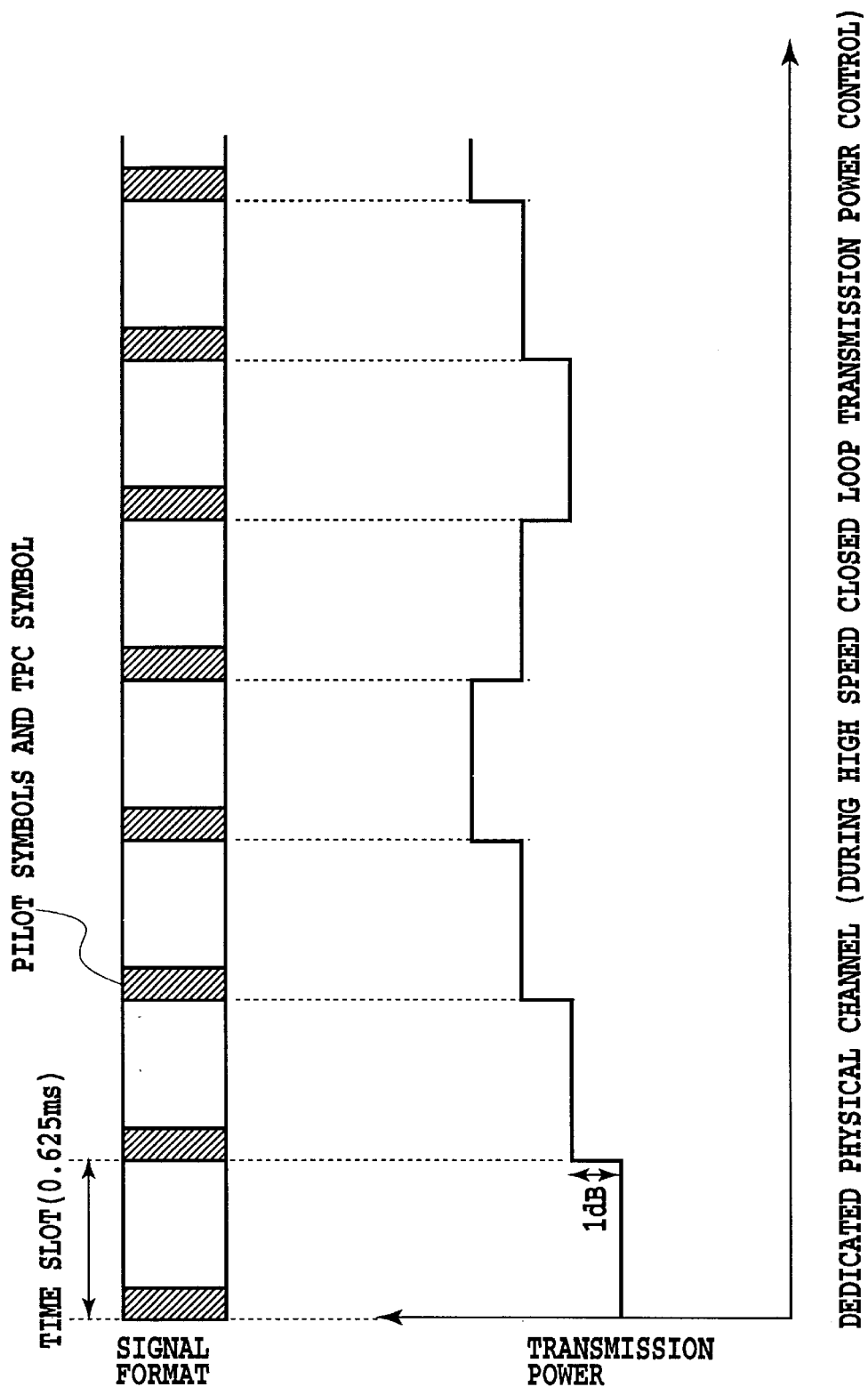
Figure 94:
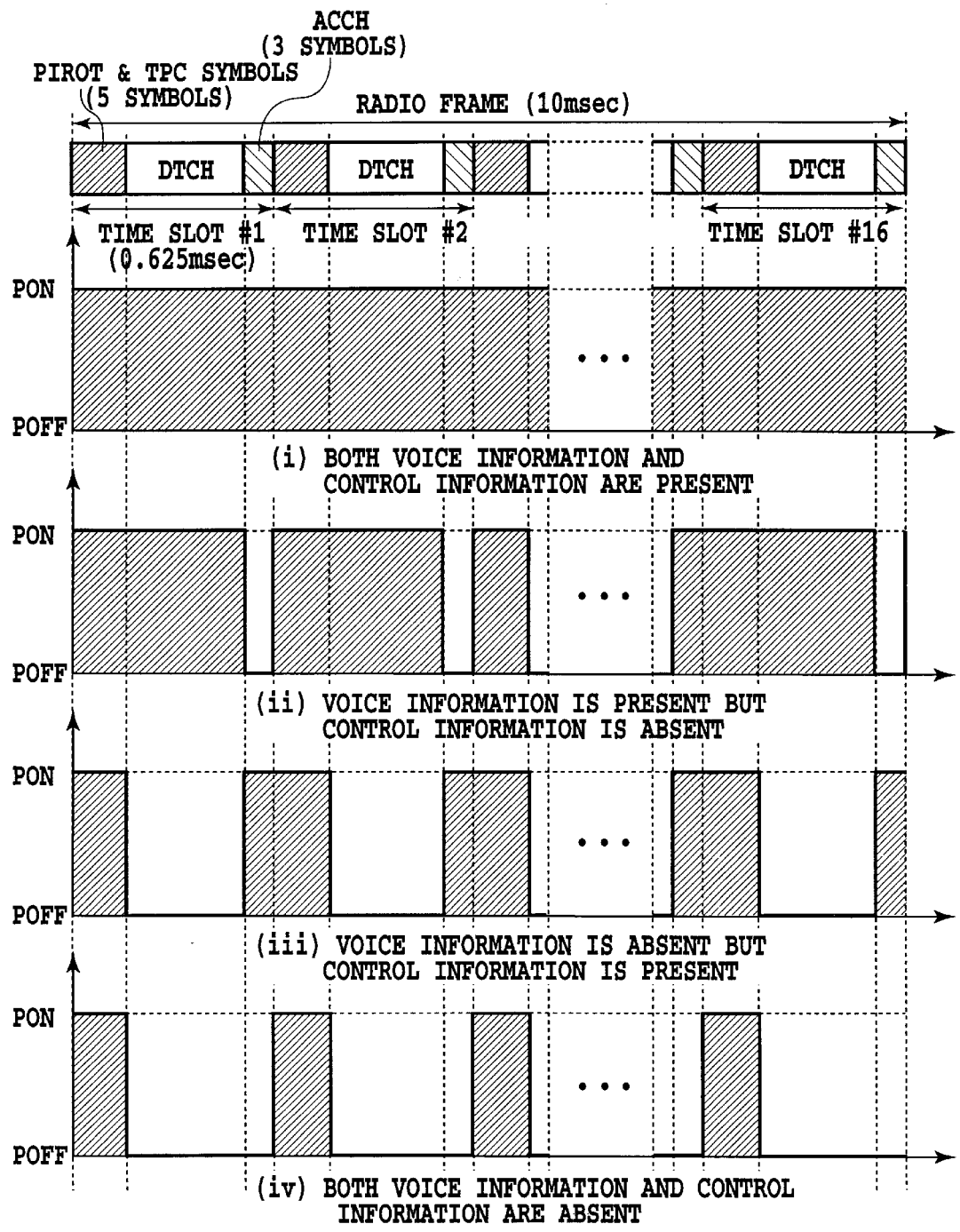
Figure 95B:
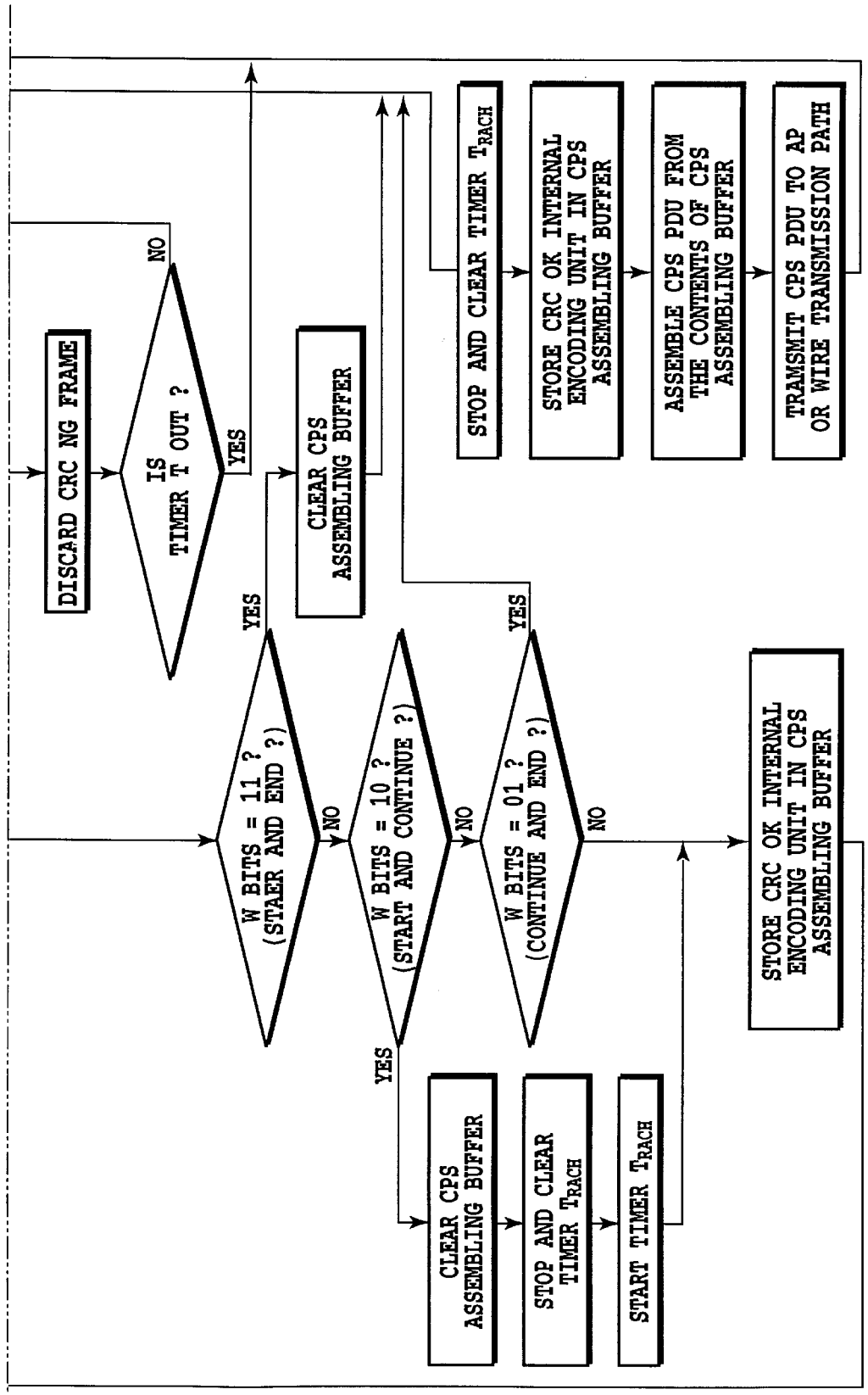
Figure 96B:
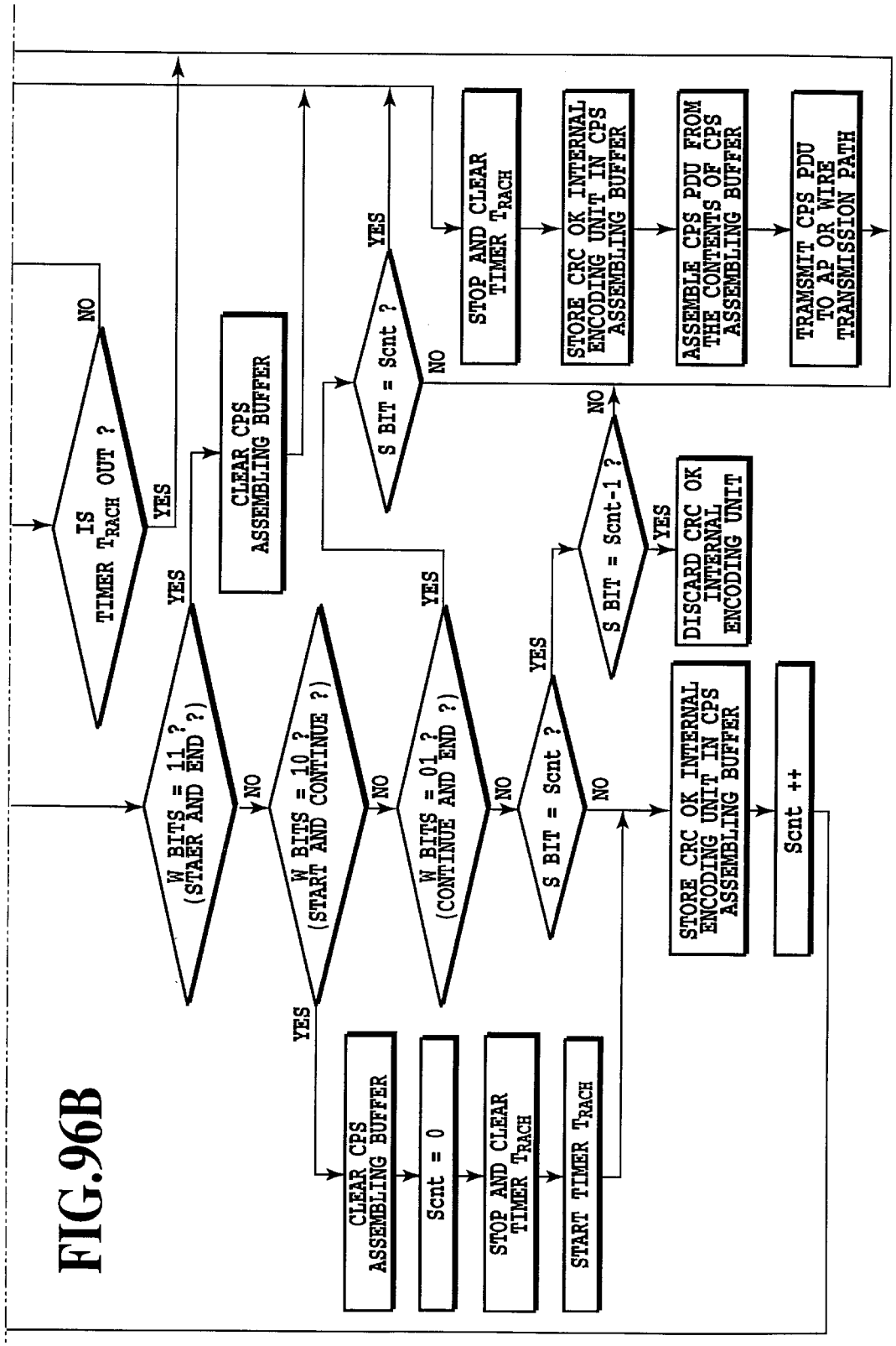

FIG. 84 is a diagram showing the relationship of FIGS. 84A and 84B;

FIG. 84A is a diagram illustrating a coding scheme of an UPCH (256 ksps) logical channel;

FIG. 84B is a diagram illustrating a coding scheme of an UPCH (256 ksps) logical channel;

FIG. 85 is a diagram illustrating transmission timings of a perch channel and common control physical channel;

FIG. 86 is a diagram illustrating transmission timings of a reverse common control physical channel (RACH);

FIG. 87 is a diagram showing the relationship of FIGS. 87A and 87B;

FIG. 87A is a diagram illustrating transmission and reception timings of a dedicated physical channel (during non-DHO);

FIG. 87B is a diagram illustrating transmission and reception timings of a dedicated physical channel (during non-DHO);

FIG. 88 is a diagram showing the relationship of FIGS. 88A and 88B;

FIG. 88A is a diagram illustrating transmission and reception timings of a dedicated physical channel (during DHO);

FIG. 88B is a diagram illustrating transmission and reception timings of a dedicated physical channel (during DHO);

FIG. 89 is a diagram illustrating a transmission pattern of perch channels;

FIG. 90 is a diagram showing the relationship of FIGS. 90A and 90B;

FIG. 90A is a diagram illustrating a transmission pattern of a forward common control channel (for FACH);

FIG. 90B is a diagram illustrating a transmission pattern of a forward common control channel (for FACH);

FIG. 91 is a diagram illustrating a transmission pattern of a forward common control channel (for PCH);

FIG. 92 is a diagram illustrating a transmission pattern of a reverse common control channel (for RACH);

FIG. 93 is a diagram illustrating a transmission pattern of a dedicated physical channel (during high speed closed loop transmission power control);

FIG. 94 is a diagram illustrating a transmission pattern of a 32 ksps dedicated physical channel (DTX control);

FIG. 95 is a diagram showing the relationship of FIGS. 95A and 95B;

FIG. 95A is a flowchart illustrating a CPS PDU (content provider system protocol data unit) assembling method (other than RACH);

FIG. 95B is a flowchart illustrating a CPS PDU (content provider system protocol data unit) assembling method (other than RACH);

FIG. 96 is a diagram showing the relationship of FIGS. 96A and 96B;

FIG. 96A is a flowchart illustrating a CPS PDU assembling method (RACH); and FIG. 96B is a flowchart illustrating a CPS PDU assembling method (RACH).

BEST MODE FOR CARRYING OUT THE INVENTION

1. Outline of a System
1.1 CDMA Base Station

A base transceiver station (BTS) in accordance with the present invention will now be described in detail, which carries out communications with mobile stations by CDMA (Code Division Multiple Access) and with a control/switching center by ATM (Asynchronous Transfer Mode).

1.2 Explanation of Abbreviations

Abbreviations used in the present specification are shown in Table 1.

TABLE 1

List of abbreviations

| No. | Abbreviations | Terms |
|---|---|---|
| 1 | BTS | base transceiver station |
| 2 | AMP | transmitting/receiving amplifier |
| 3 | MDE | base station modulator/demodulator |
| 4 | MS | radio mobile station |
| 5 | ANT | antenna |
| 6 | HW | wire transmission line |
| 7 | MCC | mobile control/switching center |
| 8 | HW-INT | wire transmission path interface |
| 9 | TRX | radio transceiver |

TABLE 1-continued

List of abbreviations

| No. | Abbreviations | Terms |
|---|---|---|
| 10 | BTS-CNT | base transceiver station controller |
| 11 | BB | base-band signal processor |
| 12 | MT | maintenance tool |

2. Structures
2.1. Functional Configuration

Figure 1:
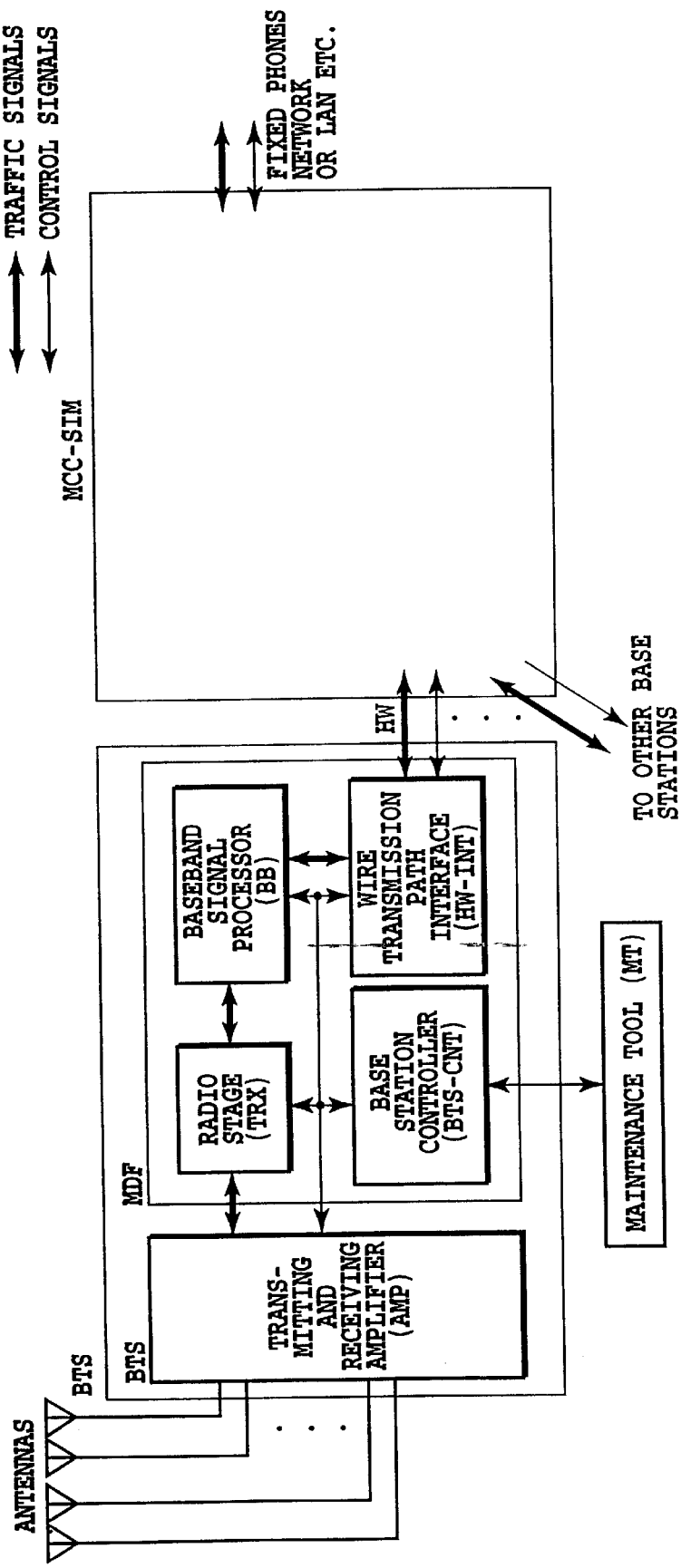
FIG. 1 is a block diagram showing a functional configuration of a base station in accordance with the present invention.

The base station has a configuration as shown in FIG. 1. The block designated by the reference symbol BTS in FIG. 1 shows a functional configuration of the base station in accordance with the present invention. The following contents explain the functional structure, though the present invention is not restricted by the hardware configuration. The reference symbol MCC in FIG. 1 designates control/switching equipment for controlling the base station.

2.2

Table 2 shows outlines of functions of various blocks.

TABLE 2

Outline of functions of blocks of BTS

| | | |
|---|---|---|
| 1 | Transmitting/receiving amplifier (AMP) | Being provided with a transmitting amplifier for amplifying a transmitted RF signal, and a low noise amplifier for amplifying a received RF signal, duplexing the RF transmitted signal and RF received signal, and connecting them to the ANT. |
| 2 | Radio stage (TRX) | D/A converting a transmitted signal that has been subject to baseband spreading, and converting it to an RF signal by quadrature modulation, and carrying out quasi-coherent detection of a received signal fed from a receiving amplifier, A/D converting it, and transferring it to a baseband block. |
| 3 | Baseband signal processor (BB) | Carrying out baseband processings such as error correcting encoding, framing, data modulation and spreading of transmitted data, and despreading of a received signal, chip synchronization, error correcting decoding, data demultiplexing, maximal ratio combining during inter-sector diversity handover, and the like. |
| 4 | Radio base station controller (BTS-CNT) | Exchanging a control signal with MCC to carry out management of radio channels, and establishment or release of radio channels. |
| 5 | Wire transmission path interface (HW-INT) | Having an ATM processing function, and AAL type 2 and AAL type 5 functions in an inter-office transmission path interface. Providing an SSCOP function to a control signal between MCC and BS. Generating an operation clock of a BTS from a transmission path. |
| 6 | Maintenance tool (MT) | Having a function of specifying parameters of devices, and a function of collecting data. |

3. Operation Conditions
3.1. Initial Processing

*The base station automatically resets itself when power is turned on.

*When resetting a CPU, the following processings are carried out in accordance with programs in a ROM.

(1) Internal checking of the CPU.
(2) Start up of APs (application programs).
4. Interface Conditions
4.1. Radio Interface
4.1.1 Major Specifics
Table 3 shows major specifics of the radio interface between mobile stations and the base station.

TABLE 3

Major specifics of radio interface

| Item | Specifics |
|---|---|
| Radio access scheme | DS-CDMA FDD |
| Frequency | 2 GHz band |
| Carrier frequency spacing | 5 MHz (expandable to 1.25/10/20 MHz) |
| Chip rate | 4.096 Mcps (expandable to 1.024/8.192/ 16.384 Mcps) |
| Short code length | 256-4 chip length |
| Long code length | Forward: 10 ms (Truncate $2^{16}$-1 chip long Gold sequences at 10 ms). Reverse: $2^{16} \times 10$ ms (Truncate $2^{41}$-1 chip long Gold sequences at $2^{16} \times 10$ ms). |
| Number of switched carriers | 2 (select two out of four carries) |
| Modulation/ demodulation scheme | Data: QPSK, pilot symbol coherent detection, and RAKE. Spread: QPSK. |
| Encoding/decoding scheme | Internal codes: Convolutional encoding (R = 1/3 or 1/2, K = 9) and Viterbi soft decision decoding. External codes: Reed-Solomon codes (for data transmission) |
| Symbol rate | 16–1024 ksps |
| Information transmission rate | Variable up to maximum 384 kbps |
| Diversity | RAKE + Antenna |
| Inter-base station sync | Asynchronous |

Figure 2:
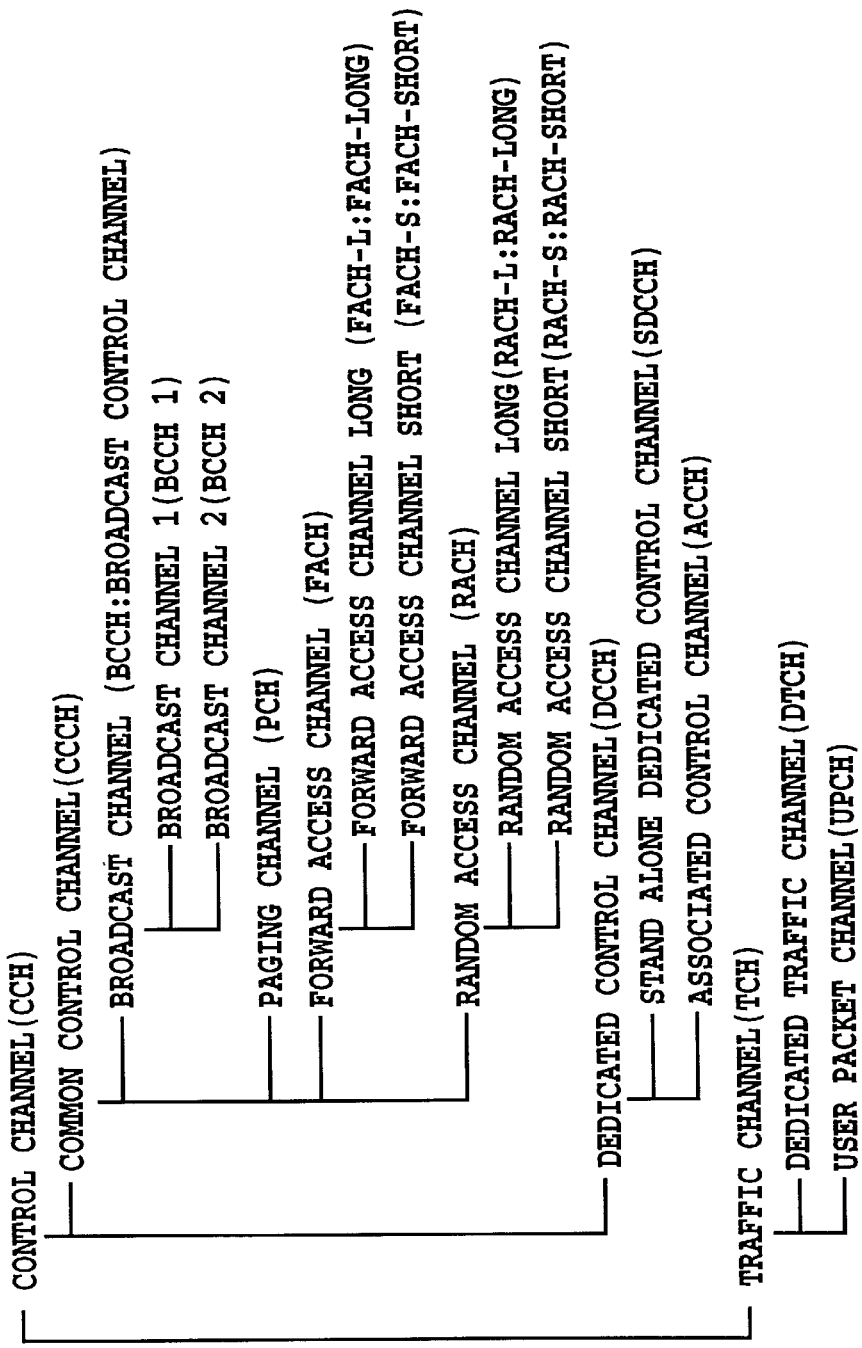
FIG. 2 is a diagram illustrating a structure of a logical channel.

4.1.2 Radio Channel Structure
4.1.2.1 Logical Channel Structure
Structures of logical channels are illustrated in FIG. 2.
4.1.2.1.1. Broadcast Control Channels 1 and 2 (BCCH1 and BCCH2)
Broadcast control channels (BCCHs) are a one-way channel for broadcasting from a base station to mobile stations system control information on each cell or sector. The broadcast control channel transmits time varying information such as SFNs (System Frame Numbers), reverse interference power values, etc.
4.1.2.1.2. Paging Channel (PCH)
A paging channel (PCH) is a one-way channel for transferring from the base station to mobile stations the same information all at once over a large area. This channel is used for paging.
4.1.2.1.3. Forward Access Channel-long (FACH-L)
A forward access channel-long is a one-way channel for transmitting from the base station to mobile stations control information or user packet data. This channel, which is used only when a network knows the location cell of a mobile station, is employed to transmit rather a large amount of information.
4.1.2.1.4. Forward Access Channel-short (FACH-S)
A forward access channel-short is a one-way channel for transmitting from the base station to mobile stations control information or user packet data. This channel, which is used only when a network knows the location cell of a mobile station, is employed to transmit rather a small amount of information.

Figure 3:
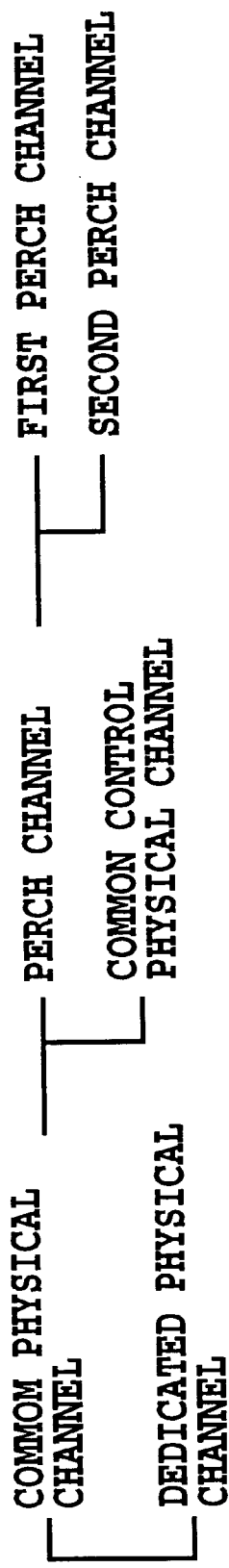
FIG. 3 is a diagram illustrating a structure of a physical channel.
Figure 4A:
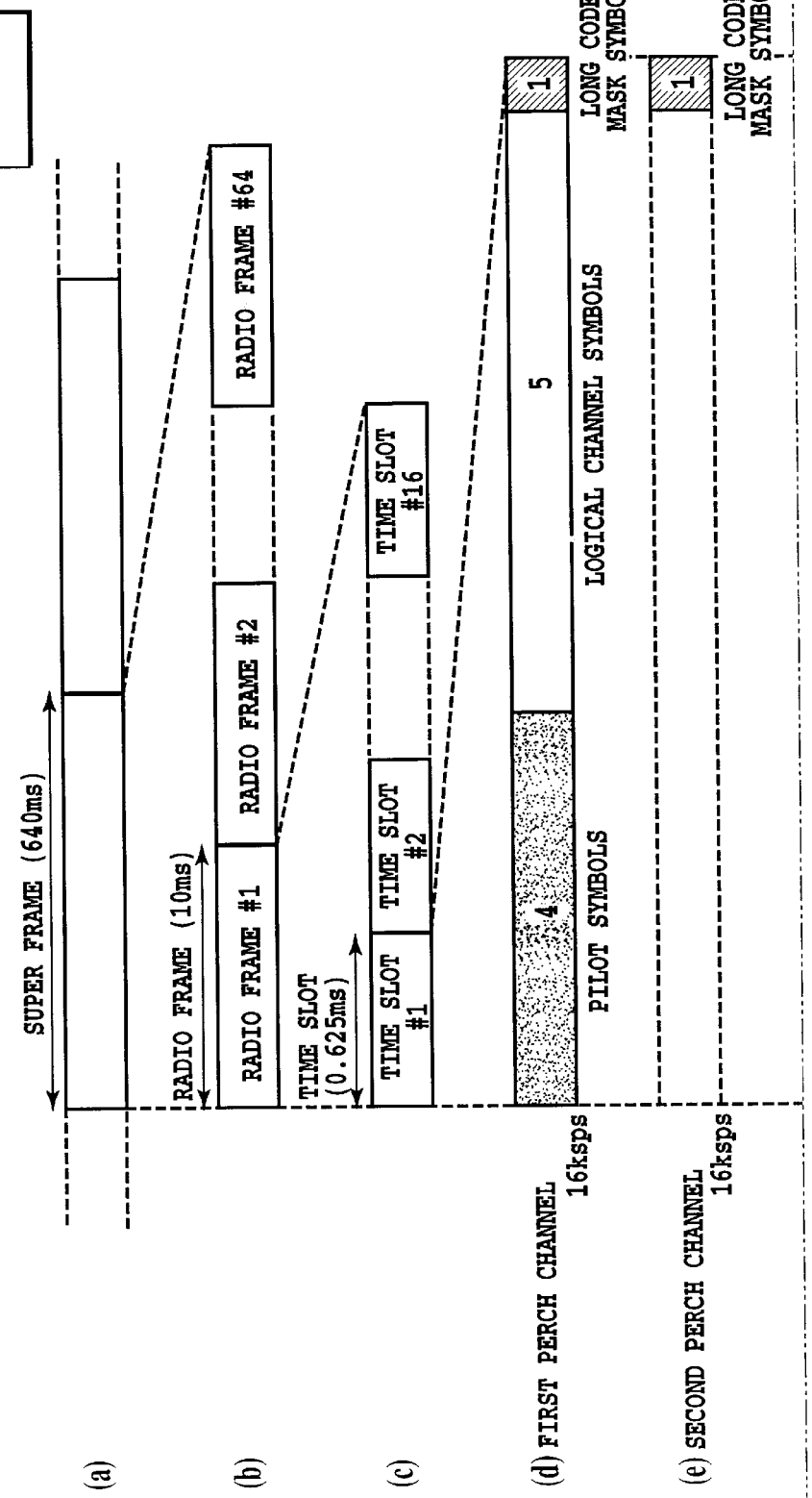
FIG. 4A is a diagram illustrating signal formats of the physical channel.
Figure 4B:
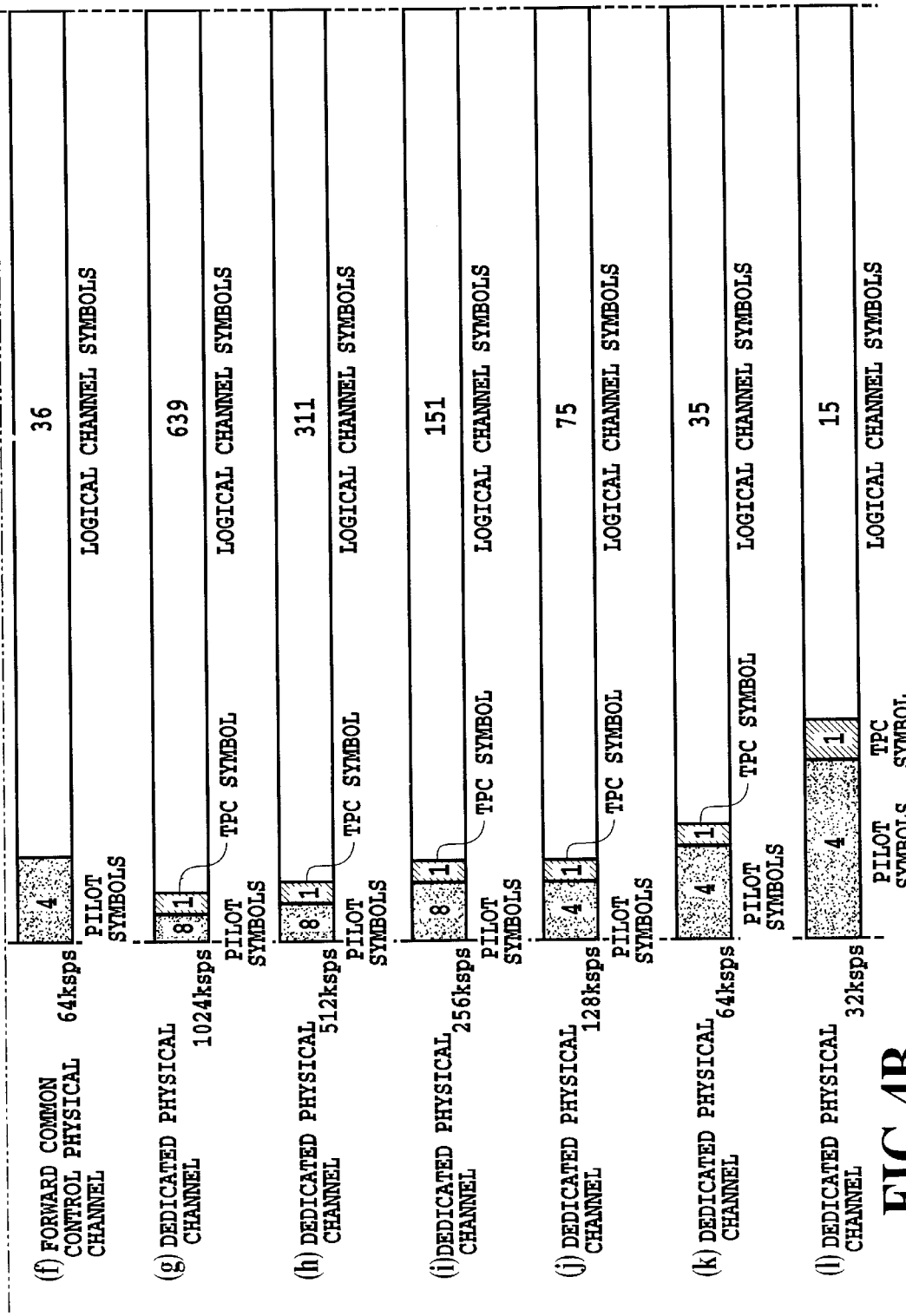
FIG. 4B is a diagram illustrating signal formats of the physical channel.

4.1.2.1.5. Random Access Channel-long (RACH-L)
A random access channel-long is a one-way channel for transmitting from mobile stations to the base station control information or user packet data. This channel, which is used only when a mobile station knows its location cell, is employed to transmit rather a large amount of information.
4.1.2.1.6. Random Access Channel-short (RACH-S)
A random access channel-short is a one-way channel for transmitting from mobile stations to the base station control information or user packet data. This channel, which is used only when a mobile station knows its location cell, is employed to transmit rather a small amount of information.
4.1.2.1.7. Stand Alone Dedicated Control Channel (SDCCH)
A stand alone dedicated control channel is a point-to-point two-way channel that transmits control information, and occupies one physical channel.
4.1.2.1.8. Associated Control Channel (ACCH)
An associated control channel is a point-to-point two-way channel that transmits control information. This channel is a control channel that is associated with a dedicated traffic channel (DTCH) which will be described below.
4.1.2.1.9. Dedicated Traffic Channel (DTCH)
A dedicated traffic channel is a point-to-point two-way channel that transmits user information.
4.1.2.1.10. User Packet Channel (UPCH)
A user packet channel is a point-to-point two-way channel that transmits user packet data.
4.1.2.2. Structure of Physical Channels
FIG. 3 illustrates structures of a physical channel, and FIGS. 4A and 4B illustrate characteristics of individual physical channels.

TABLE 4

Characteristics of physical channels

| | Perch channels | Common control physical channel | Dedicated physical channel |
|---|---|---|---|
| Symbol rate | 16 ksps | Reverse direction: 16/64 ksps Forward direction: 64 ksps | 32/64/128/ 256/512/1024 ksps |
| Characteristics | Transmission power control is not applied. Usually, there are a first perch channel through which transmission is always carried out, and a second perch channel through which only parts of symbols are transmitted. | *Only radio frames containing transmitted information are sent. No symbols including pilot symbols are sent of radio frames without containing transmitted information. (PD sections of PCH are always sent). *High speed closed loop transmission power control is not carried out. | High speed closed loop transmission power control can be carried out. |

4.1.2.2.1. Perch Channel
A perch channel is a physical channel whose receiving level is measured for selecting a cell of a mobile station. Besides, the channel is a physical channel which is initially captured when the mobile station is turned on. The perch channel includes a first perch channel and a second perch channel: The former is spread by a short code uniquely assigned to the system for accelerating the cell selection when the mobile station is turned on, and continues transmission all the time; whereas the latter is spread by a short code corresponding to a forward long code, and transmits only part of symbols. The perch channel is a one-way physical channel from the base station to mobile stations.

The short codes used by the second perch channel differ from the short code system employed by the other physical channels.

4.1.2.2.2. Common Control Physical Channel

The common control physical channel is used in common by multiple mobile stations located in the same sector. The reverse common control physical channel is a random access channel.

4.1.2.2.3. Dedicated Physical Channels

Dedicated physical channels are each established between a mobile station and the base station in a point-to-point fashion.

4.1.2.3. Signal Formats of the Physical Channels

All the physical channels assume a three layer structure of a super frame, radio frames and time slots. The structures of the radio frames and time slots vary (in terms of the number of pilot symbols) depending on the type of the physical channels and the symbol rate. FIGS. 4A and 4B illustrate the signal formats of channels other than the reverse common control physical channels.

Relationships between the symbol rate and the number of pilot symbols will be described with reference to FIGS. 5 and 6.

Figure 5:
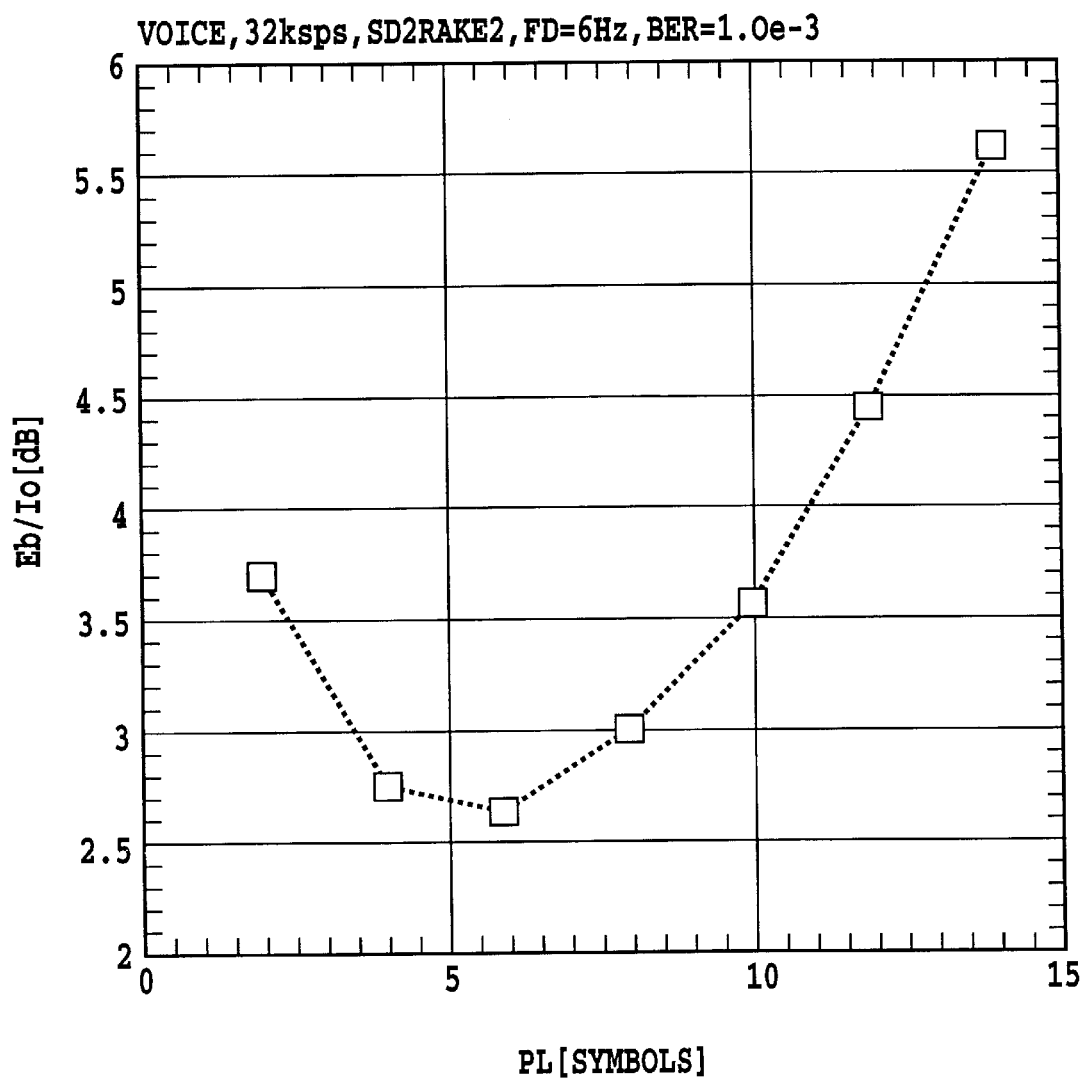
FIG. 5 is a graph illustrating simulation results of the dependence of the symbol rate of 32 ksps on the number of pilot symbols.
Figure 6:
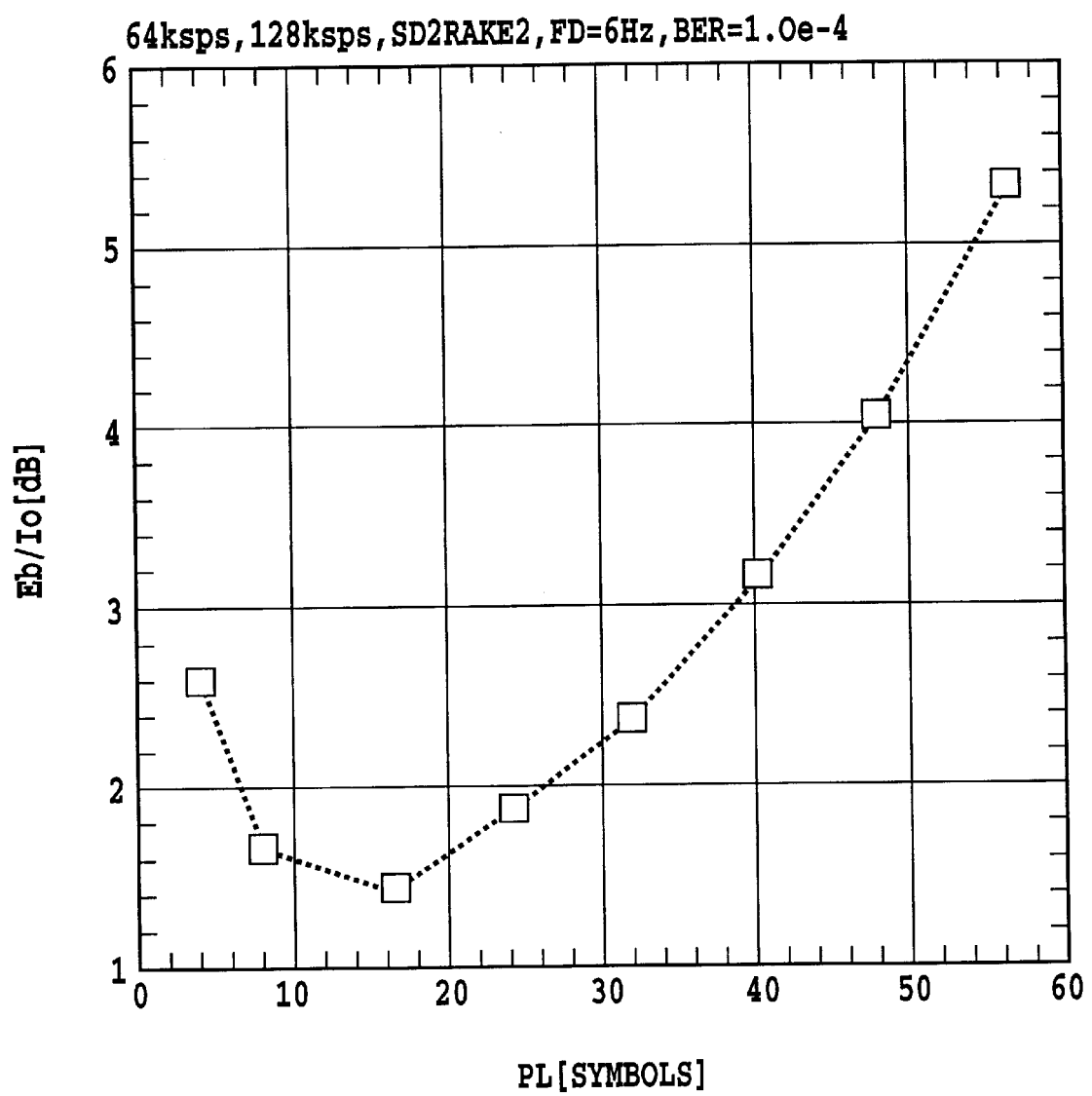
FIG. 6 is a graph illustrating simulation results of the dependence of the symbol rate of 128 ksps on the number of pilot symbols.

FIGS. 5 and 6 illustrate simulation results of the effect of varying the number of pilot symbols for respective symbol rates: simulation results with respect to the physical channels with different symbol rates of 32 ksps (symbols per second) and 128 ksps, respectively. In FIGS. 5 and 6, the horizontal axis represents the number of pilot symbols contained in each time slot (of 0.625 msec), and the vertical axis represents a necessary Eb/Io, that is, a ratio of the required received power (Eb) per bit after the error correction to the interference power (Io) per unit frequency band in a state that meets a quality required. The Eb is obtained by dividing the total amount of the received power by the number of bits after the error correction, in the case of which overheads such as the pilot symbols are counted as part of the received power. The smaller the Eb/Io, the lower received power can meet the required quality, which is more effective in terms of capacity. The required quality is set at BER (bit error rate)=$10^{-3}$ in 32 ksps physical channels considering that they are for voice transmission, whereas it is set at BER=$10^{-6}$ in 128 ksps physical channels considering that they are for data transmission. The radio wave propagation conditions are identical in two FIGS. 5 and 6.

In either symbol rate, an optimum value of the number of pilot symbols that can maximize the capacity is present because there is a trade-off between the degradation in the accuracy of the coherent detection due to the reduction in the number of pilot symbols, and the increase in the overhead due to the increase in the number of pilot symbols. The optimum number of the pilot symbols varies depending on the symbol rates, such as six for 32 ksps and 16 for 128 ksps. In addition, the ratio of the optimum number of the pilot symbols to the total number of symbols also vary depending on the symbol rate such as 30% for 32 ksps and 20% for 128 ksps.

Accordingly, fixedly assigning the number or ratio of the pilot symbols will reduce the capacity at some symbol rate.

In view of the fact that the optimum number and rate of the pilot symbols vary depending on the symbol rates, the present invention assumes the structures as shown in FIGS. 4A and 4B.

Figure 7A:
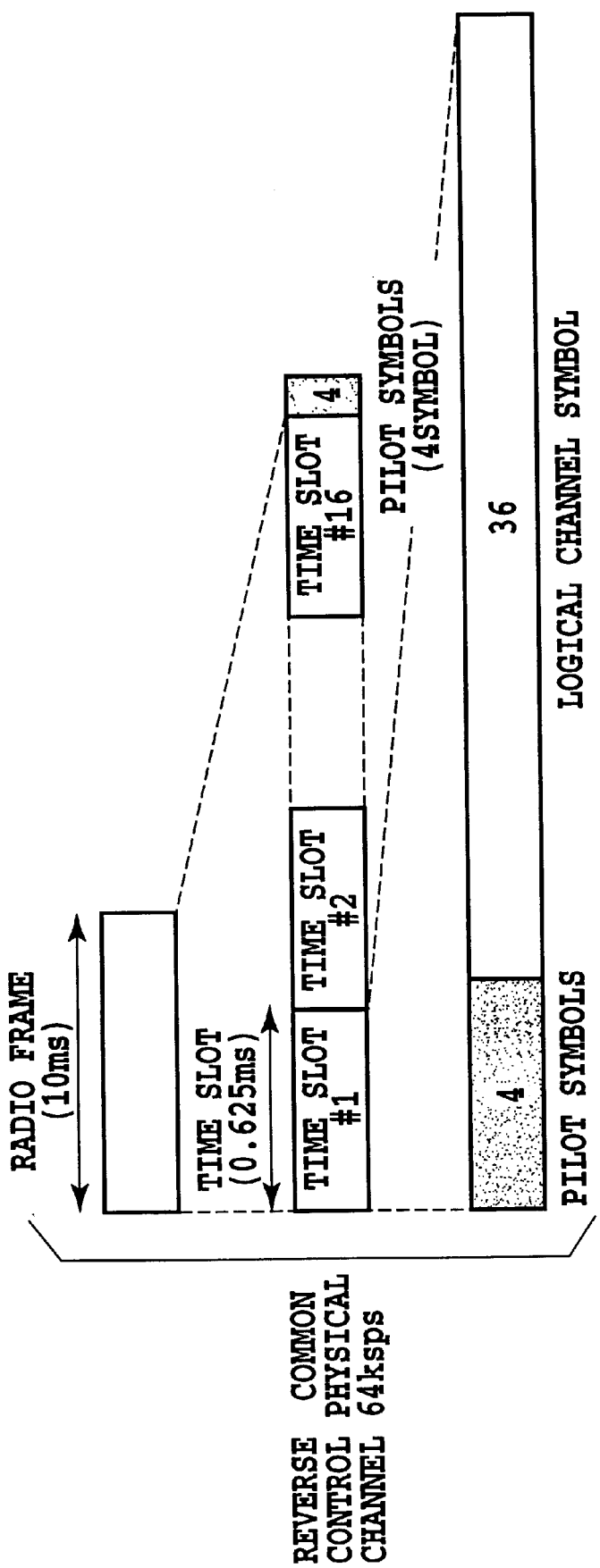
FIGS. 7A and 7B are diagrams illustrating formats of reverse common control physical channel signals.
Figure 7B:
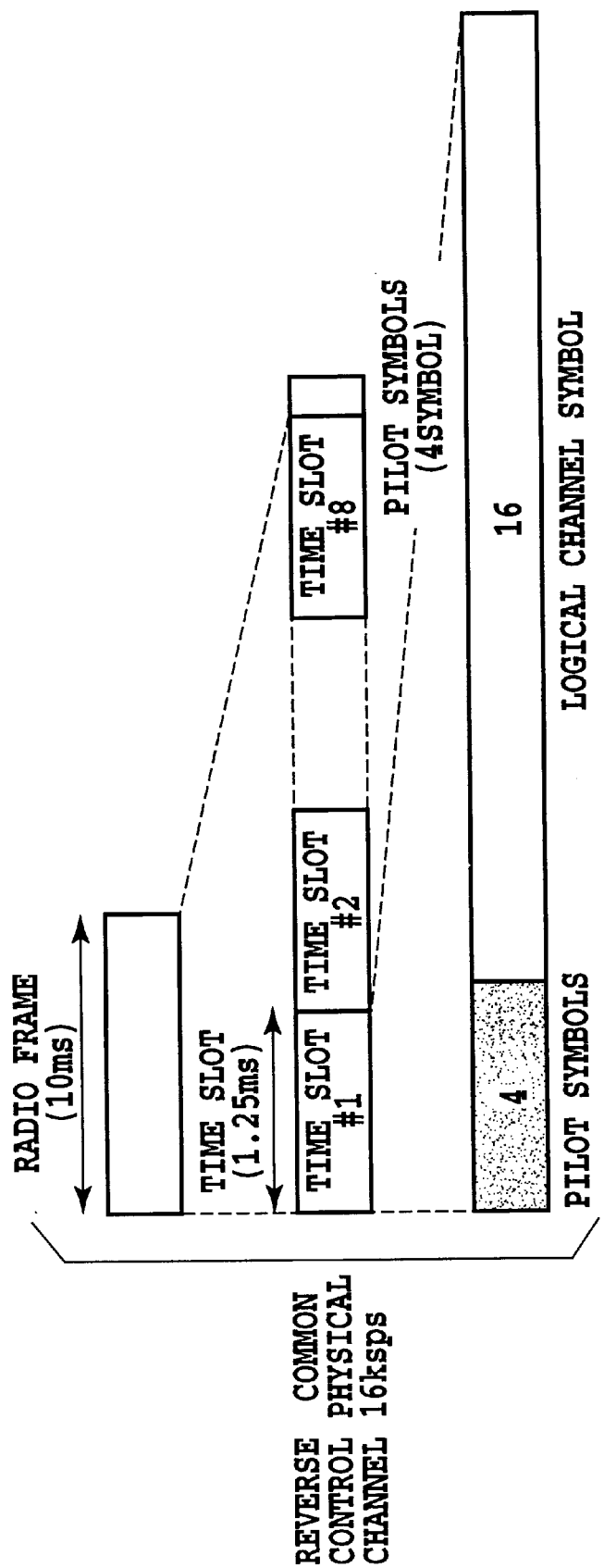

FIGS. 7A and 7B illustrate the signal formats of the radio frame and time slots of the reverse common control physical channel, in which the numerals designate the number of symbols.

4.1.2.3.1. Super Frame

The super frame consists of 64 radio frames, and is determined on the basis of SFN which will be described below.

The initial radio frame of the super frame: SFN mod 64=0.

The final radio frame of the super frame: SFN mod 64=63.

4.1.2.3.2. Pilot Symbols and Sync Word (SW)

*Pilot symbol patterns are shown in Table 5, in which halftone portions represent sync words (SW) for the frame alignment. The symbol pattern of the pilot symbols other than the sync words (SW) is "11".

*As shown in Table 5, the pilot symbols are transmitted together with the sync words. This makes it possible to reduce the overhead and increase the data transmission efficiency. In addition, once the frame alignment has been established, since the sync words can be considered as an integral part of a known fixed pattern, and are utilized as the part of the pilot symbols for the coherent detection, the accuracy of the coherent detection can be maintained without the slightest degradation.

*The processing on a receiving side will now be described when the sync words (SW) are transmitted with the pilot symbols.

1. First, chip synchronization is acquired by searching for a despreading timing that provides a maximum correlation value by carrying out despreading processings at multiple timings. Subsequently, despreading is carried out in accordance with the acquired timing.

2. An amount of phase rotation is estimated using pilot symbols (other than the sync word (SW)) with a fixed pattern, followed by the coherent detection using the estimated amount for demodulating the sync word (SW). The demodulation scheme involving the estimation of the phase rotation magnitude is disclosed in Japanese Patent Application Laid-open No. 6-140569 (1994), "Coherent detector", and is incorporated here by reference.

3. Frame alignment is established using the demodulated sync word (SW). More specifically, the extent is examined to which the bit sequence of the demodulated sync word (SW) matches the predetermined patterns, and the most likely bit sequence is decided considering the bit error rate.

4. Once the frame alignment has been established, the bit sequence of the sync word (SW) is obvious, and hence can be handled in the same manner as the fixed pattern of the pilot symbols. Thus, the sync word (SW) can be used as an integral part of the pilot symbols to estimate the phase rotation amount and demodulate the data portion by the coherent detection.

TABLE 5

Pilot symbol patterns

| Pilot symbol number | 256, 512, 1024 ksps dedicated physical channel | | | | | | | | 16 ksps common control physical channel | | | | Others | | | |
|---|---|---|---|---|---|---|---|---|---|---|---|---|---|---|---|---|
| | 0 | 1 | 2 | 3 | 4 | 5 | 6 | 7 | 0 | 1 | 2 | 3 | 0 | 1 | 2 | 3 |
| slot #1 | 11 | 11 | 11 | 11 | 11 | 11 | 11 | 10 | 11 | 11 | 11 | 11 | 11 | 11 | 11 | 11 |
| 2 | 11 | 10 | 11 | 10 | 11 | 10 | 11 | 01 | 11 | 10 | 11 | 01 | 11 | 11 | 11 | 01 |
| 3 | 11 | 10 | 11 | 01 | 11 | 11 | 11 | 01 | 11 | 10 | 11 | 10 | 11 | 01 | 11 | 01 |
| 4 | 11 | 11 | 11 | 01 | 11 | 00 | 11 | 10 | 11 | 01 | 11 | 00 | 11 | 10 | 11 | 01 |
| 5 | 11 | 11 | 11 | 00 | 11 | 01 | 11 | 10 | 11 | 00 | 11 | 10 | 11 | 10 | 11 | 11 |
| 6 | 11 | 11 | 11 | 11 | 11 | 01 | 11 | 10 | 11 | 10 | 11 | 11 | 11 | 10 | 11 | 11 |
| 7 | 11 | 10 | 11 | 11 | 11 | 01 | 11 | 10 | 11 | 10 | 11 | 11 | 11 | 01 | 11 | 00 |
| 8 | 11 | 01 | 11 | 00 | 11 | 10 | 11 | 00 | 11 | 00 | 11 | 00 | 11 | 10 | 11 | 01 |
| 9 | 11 | 11 | 11 | 10 | 11 | 00 | 11 | 01 | — | | | | 11 | 11 | 11 | 00 |
| 10 | 11 | 01 | 11 | 11 | 11 | 11 | 11 | 00 | — | | | | 11 | 01 | 11 | 01 |
| 11 | 11 | 10 | 11 | 10 | 11 | 11 | 11 | 10 | — | | | | 11 | 11 | 11 | 10 |
| 12 | 11 | 01 | 11 | 10 | 11 | 10 | 11 | 00 | — | | | | 11 | 01 | 11 | 01 |
| 13 | 11 | 10 | 11 | 01 | 11 | 11 | 11 | 10 | — | | | | 11 | 00 | 11 | 01 |
| 14 | 11 | 00 | 11 | 10 | 11 | 10 | 11 | 00 | — | | | | 11 | 10 | 11 | 00 |
| 15 | 11 | 01 | 11 | 10 | 11 | 00 | 11 | 00 | — | | | | 11 | 01 | 11 | 00 |
| 16 | 11 | 10 | 11 | 00 | 11 | 00 | 11 | 00 | — | | | | 11 | 00 | 11 | 00 |

*In Table 5, each bit is transmitted in the order of "I" and "Q" from the left-hand side to the right-hand side.
*In the forward common control physical channels, burst mode transmission of a radio frame length can take place, in which case, the pilot symbols are added at the final position of the bursts. The number of symbols and the symbol pattern to be added is the slot #1 pattern of Table 5.
*In the reverse common control physical channels, one radio frame forms one burst, and the pilot symbols are added at the final position of the radio frame. The number of symbols and the symbol pattern to be added is the slot #1 pattern of Table 5.

4.1.2.3.3. TPC Symbol

The relationships between transmission power control (TPC) symbol patterns and transmission power control amounts are shown in Table 6.

TABLE 6

TPC symbol patterns.

| TPC symbol | transmission power control amount |
|---|---|
| 11 | +1.0 dB |
| 00 | −1.0 dB |

4.1.2.3.4. Long Code Mask Symbol
*A long code mask symbol is spread by a short code only without using any long code.
*Although symbols of the perch channels other than the long code mask symbol use the short codes in layered orthogonal code sequences as shown in FIG. 20, the long code mask symbol is spread using the short code selected from the orthogonal Gold sequences with a code length of 256. Details concerning this will be described in 4.1.4.1.3.
*The long code mask symbol is contained one symbol per slot in the first and second perch channels, and the symbol pattern thereof is "11".
*The perch channels use two spreading codes to transmit their long code mask symbols individually. In particular, the second perch channel transmits only the long code mask symbol without transmitting any other symbol.

4.1.2.4. Mapping of the Logical Channels onto the Physical Channels

Figure 8:
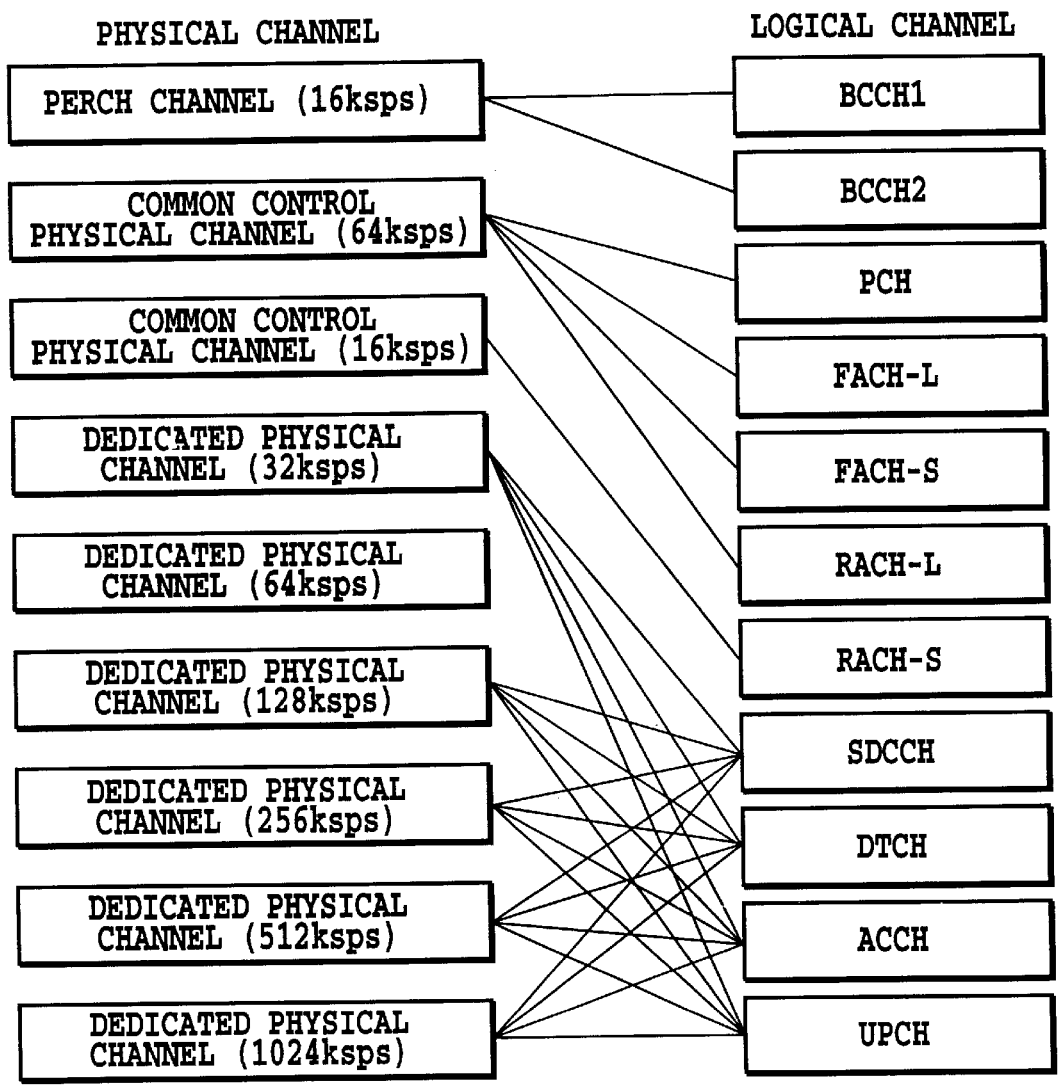
FIG. 8 is a diagram illustrating correspondence between physical channels and logical channels.

FIG. 8 illustrates the relationships between the physical channels and the logical channels that are mapped onto the physical channels.

4.1.2.4.1. Perch Channels

Figure 9:
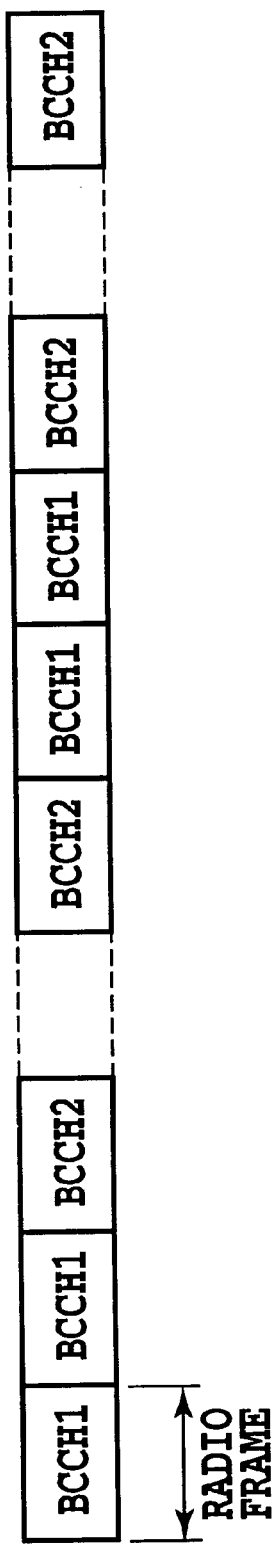
FIG. 9 is a diagram illustrating a mapping example of a logical channel onto a perch channel.

FIG. 9 illustrates a mapping example of the logical channel onto the perch channel.
*Only BCCH1 and BCCH2 are mapped.
*Onto the initial position of the super frame, BCCH1 is mapped without exception.
*With respect to the mapping other than the mapping of the BCCH1 into the initial position of the super frame, either BCCH1 or BCCH2 is mapped in accordance with structure information designated.
*The BCCH1 and BCCH2 are each transmitted in every 2×N consecutive radio frames so that two radio frames constitute one radio unit, and transmit one layer 3 message. The layer 3 message transmitted through the BCCH1 and BCCH2 do not overlay two or more super frames.
*The BCCH1 and BCCH2 each transmit in each radio unit the following information, for example, which is generated by the BTS.
*SFN (System Frame Number).
*Reverse interfering power amount.
The reverse interfering power amount is a time-varying latest result measured by the BTS.
*The information BCCH1 and BCCH2 transmit can have different characteristics. For example, BCCH1 can transmit time-fixed information, whereas BCCH2 can transmit time-varying information. In this case, the time-varying information can be transmitted efficiently by reducing the occurrence frequency of the BCCH1 and increasing that of the BCCH2. The occurrence frequencies of the BCCH1 and BCCH2 can be determined considering the frequency of changes in the information. It is also possible to dispose the BCCH1 at fixed positions of the super frame, such as the initial and central positions, for example, and places BCCH2 at the remaining positions. As an example of time-fixed information, there are code numbers of control channels of contiguous cells or the present cell. The above-mentioned reverse interfering power amount is time-varying information.

*Although the foregoing description is provided in an example including two broadcast control channels (BCCH1 and BCCH2), three or more broadcast control channels can be provided. These multiple broadcast control channels can be transmitted with varying their occurrence frequencies.

4.1.2.4.2. Common Control Physical Channel

*Only PCH and FACHs are mapped into the forward common control physical channel. RACHs are mapped into the reverse common control physical channel.
*Either FACHs or PCHs are mapped into a single forward common control physical channel.
*Whether the logical channel to be mapped into the single forward common control physical channel is PCH or FACH is determined for each common control physical channel established.
*One forward common control physical channel into which the FACHs are mapped is paired with one reverse common control physical channel. The pair is designated by a pair of spreading codes. The designation of the pair is in terms of the physical channel, in which the sizes (S/L) of the FACH and RACH are not defined. As the FACH a mobile station receives and the RACH it transmits, a pair of the FACH and RACH is used on the pair of the forward common control physical channel and reverse common control physical channel, respectively. In addition, in an Ack transmission processing by the BTS for the received RACH, which will be described later, the Ack is transmitted through the FACH-S on the forward common control physical channel which is paired with the reverse common control physical channel through which the received RACH is transmitted.

4.1.2.4.2.1. A Mapping Method of PCHs into the Common Control Physical Channel

Figure 10:
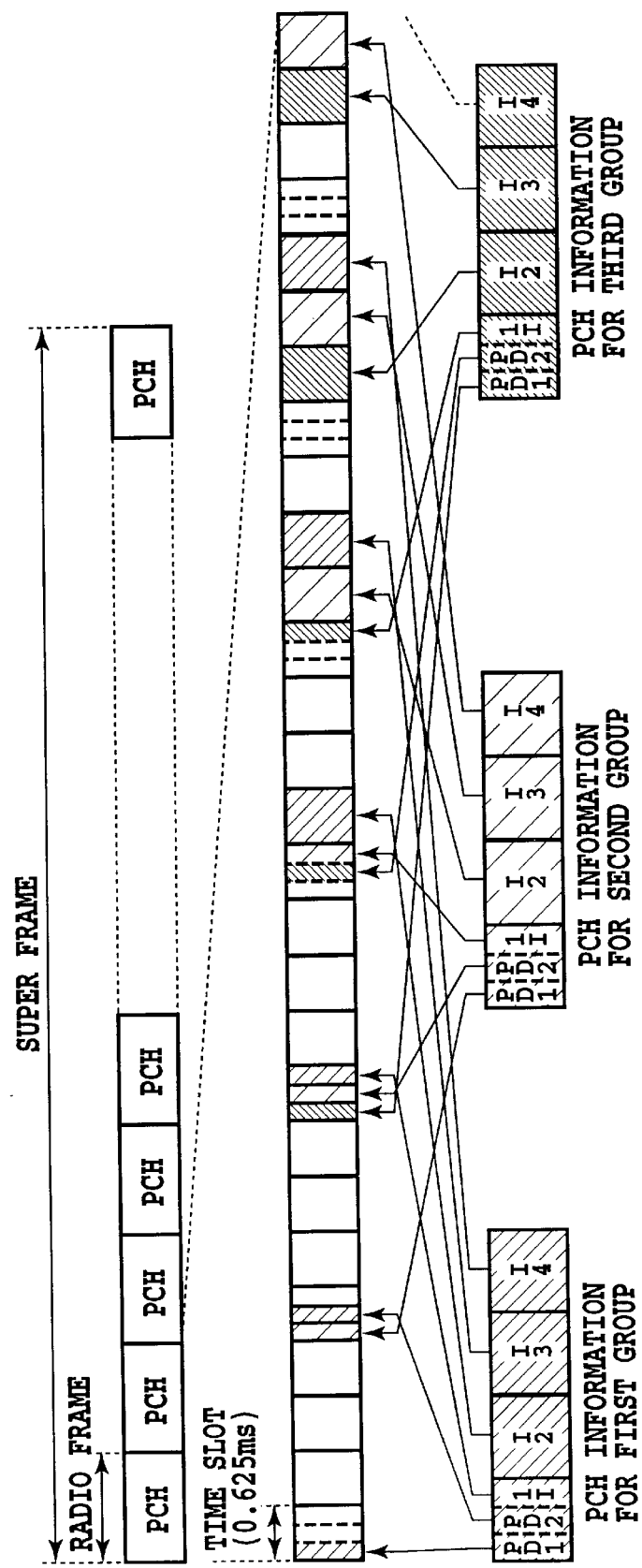
FIG. 10 is a diagram illustrating a PCH mapping scheme.

FIG. 10 illustrates a mapping method of the PCHs.
*The PCHs are each divided into a plurality of groups in a super frame, and each group transmits the layer 3 information.
*The number of groups per common control physical channel is 256.
*Each group of the PCHs contains information of an amount of four time slots, and consists of six information portions: two portions are for incoming call presence and absence indicators (PD portions), and the remaining four portions are for called user identification number portions (I portions).
*The PD portions are transmitted prior to the I portions in each group.
*The six information portions are assigned to over 24 time slots in a predetermined pattern in all the groups. The pattern over the 24 time slots are shifted every four slot interval so as to dispose the plurality of groups onto the single common control physical channel.
*The first PCH is disposed such that the initial symbols of the PD portion of the first PCH becomes the initial symbols of the super frame. The sections of PCHs in each group are disposed in the PCH radio frames such that they are shifted every four time slot interval in the order of the second group, third group, etc.
*The final one of the groups overlays the two super frames.

Figure 11:
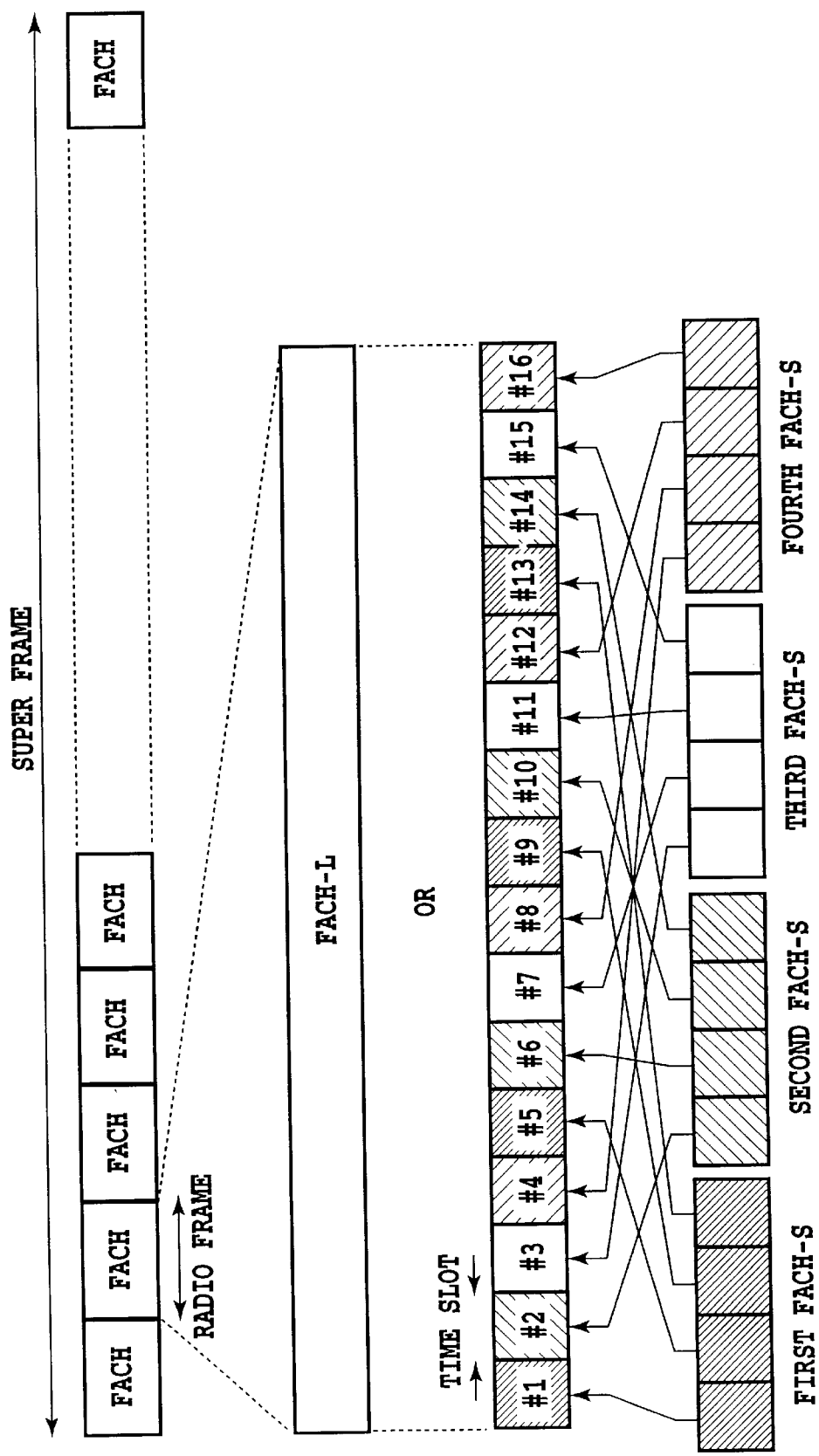
FIG. 11 is a diagram illustrating a FACH mapping scheme.

4.1.2.4.2.2. Mapping Method of the FACH onto the Common Control Physical Channel FIG. 11 shows a mapping example of the FACH.
*Any FACH radio frame on a common control physical channel can be used as either a logical channel FACH-L or FACH-S. The logical channel that receives a transmission request first is transmitted by the FACH radio frame.
*If the length of the information to be transmitted by the FACH is longer than a predetermined value, FACH-L is used, and otherwise FACH-S is used.
*With respect to FACH-S, four FACH-S'es are time multiplexed into one FACH radio frame to be transmitted.
*Each of the four FACH-S'es consists of four time slots, and is disposed in one radio frame at every four time slot interval, with shifting one slot for each FACH-S. Thus, the time slots assigned to the four FACH-S'es are as follows.
  First FACH-S: First, fifth, ninth and 13th time slots.
  Second FACH-S: Second, sixth, 10th and 14th time slots.
  Third FACH-S: Third, seventh, 11th and 15th time slots.
  Four FACH-S: Fourth, eighth, 12th and 16th time slots.
*If the first logical channel that receives the transmission request is a FACH-S, other FACH-S'es that are stored in a buffer at that time can be transmitted up to four with time multiplexing them into one FACH radio frame. In this case, even if a FACH-L has been stored by that time, FACH-S'es that receive a transmission request later than that FACH-L can be multiplexed and transmitted.
*A mobile station can simultaneously receive the entire FACH-S'es and FACH-L on each common control physical channel. It is sufficient for a mobile station to receive one common control physical channel even in the case where a base station transmits a plurality of common control physical channels for transmitting FACHs. Which one of them is to be received by the mobile station is determined between the mobile station and the BTS.
*The FACH-S has two modes of transmission format. One is a format (layer 3 transmission mode) for transmitting information of layer 3 and higher order which is designated. The other one is a format (ACK mode) for transmitting an ACK of receiving a RACH.
*An ACK mode FACH-S can contain ACKs to up to seven mobile stations at the maximum.
*An ACK mode FACH-S is always transmitted as the first FACH-S.
*An ACK mode FACH-S is transmitted at first, even if the transmission request is received after other FACH's.
*If an information volume of a higher rank information form (CPS: content provider system) that is transmitted by FACH radio units amounts to a plurality of FACH radio units, a continuous transmission is guaranteed. No other CPS is allowed to intrude into the transmission. Even the ACK mode FACH-S, which is given top priority as described above, is not allowed to intrude to be transmitted.
*When one CPS is transmitted with a plurality of FACH radio units, either FACH-L's or FACH-S'es are used, without being used in a mixed manner.
*When one CPS is transmitted continuously with a plurality of FACH-S radio units, the (n+1)-th FACH-S radio unit follows the n-th FACH-S radio unit, except that it is the first FACH-S radio unit that follows the fourth FACH-S radio unit.

4.1.2.4.2.3. A Mapping Method of a RACH onto a Common Control Physical Channel

*A RACH-S is mapped onto a 16 ksps reverse common control physical channel, and a RACH-L is mapped onto a 64 ksps reverse common control physical channel. Both the RACH-S and RACH-L consist of one radio frame of 10 ms long. When they are transmitted through wireless sections, four pilot symbols are added to the final position of the radio frame.
*When transmitting the RACH, a mobile station uses the RACH-L or RACH-S freely in accordance with a transmission information volume.
*Receiving the RACH-L or RACH-S normally, a base station transmits Ack to the mobile station through a FACH. The RACH and its associated FACH that transmits the Ack are designated by assigning the same RL-ID to both the channels.

*The frame timing for transmitting the RACH from the mobile station is delayed by a predetermined offset from the frame timing of the common control physical channel onto which the FACH for transmitting the Ack is mapped. The offset can take 16 values, one of which the mobile station randomly selects to send the RACH.

*The base station must have the function of receiving the RACH-L and RACH-S at all the offset timings.

4.1.2.4.3. Dedicated Physical Channel

*The SDCCH and UPCH each occupy one dedicated physical channel.

*With regard to 32–256 ksps dedicated physical channels, a DTCH and an ACCH are time multiplexed to share the same dedicated physical channel.

*With regard to 512 ksps and 1024 ksps dedicated physical channels, only a DTCH occupies the dedicated physical channel without multiplexing an ACCH.

Figure 12:
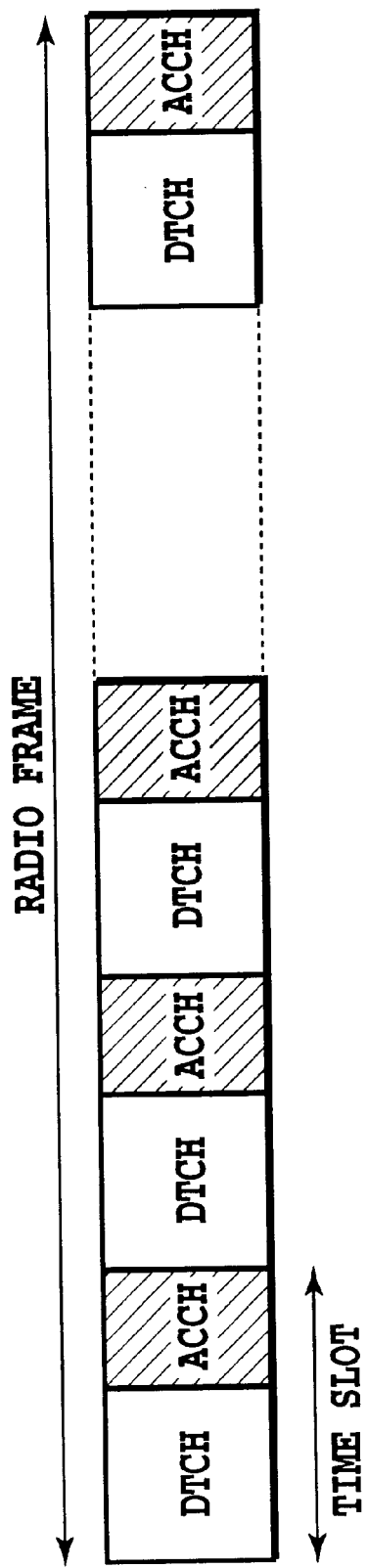
FIG. 12 is a diagram illustrating a mapping of DTCH and ACCH onto a dedicated physical channel.

*The time multiplexing of the DTCH and ACCH is carried out for each time slot by dividing logical channel symbols in the time slot and assigning them to the two channels. The ratio of the division varies depending on the symbol rate of the dedicated physical channel. FIG. 12 illustrates a mapping method of the DTCH and ACCH onto the dedicated physical channel.

Figure 13A:
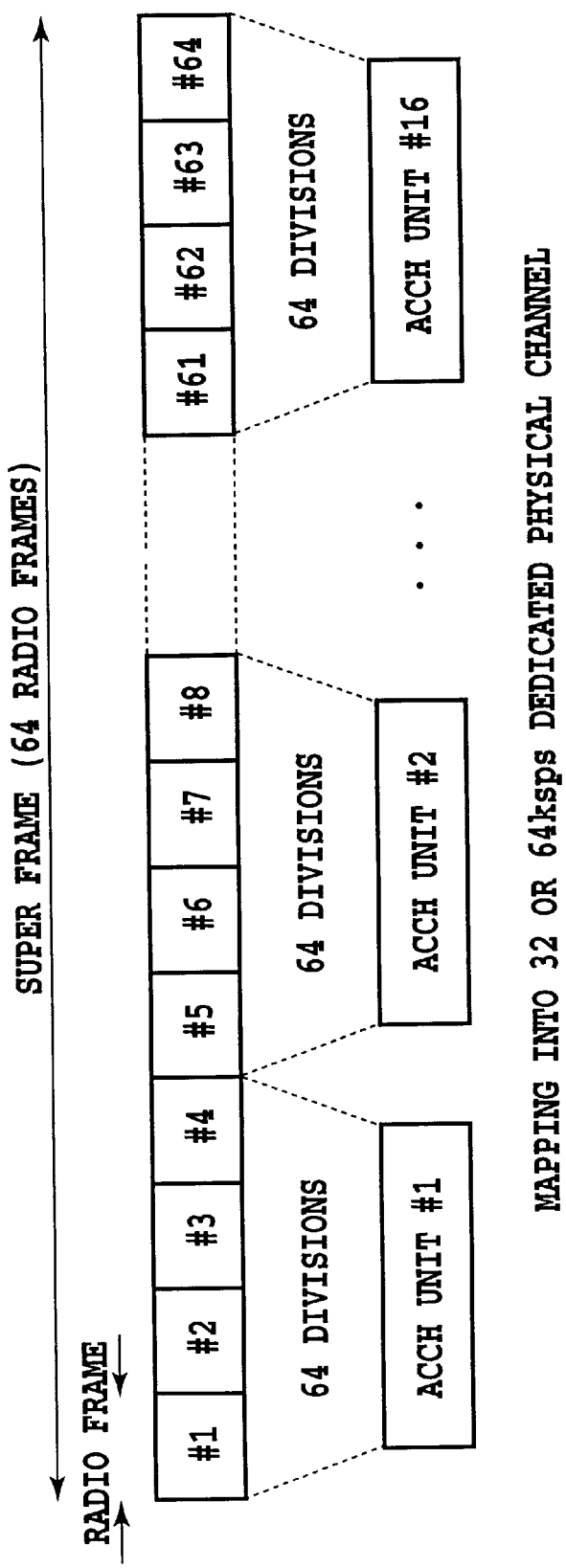
FIGS. 13A–13C are diagrams illustrating ACCH mapping schemes.
Figure 13B:
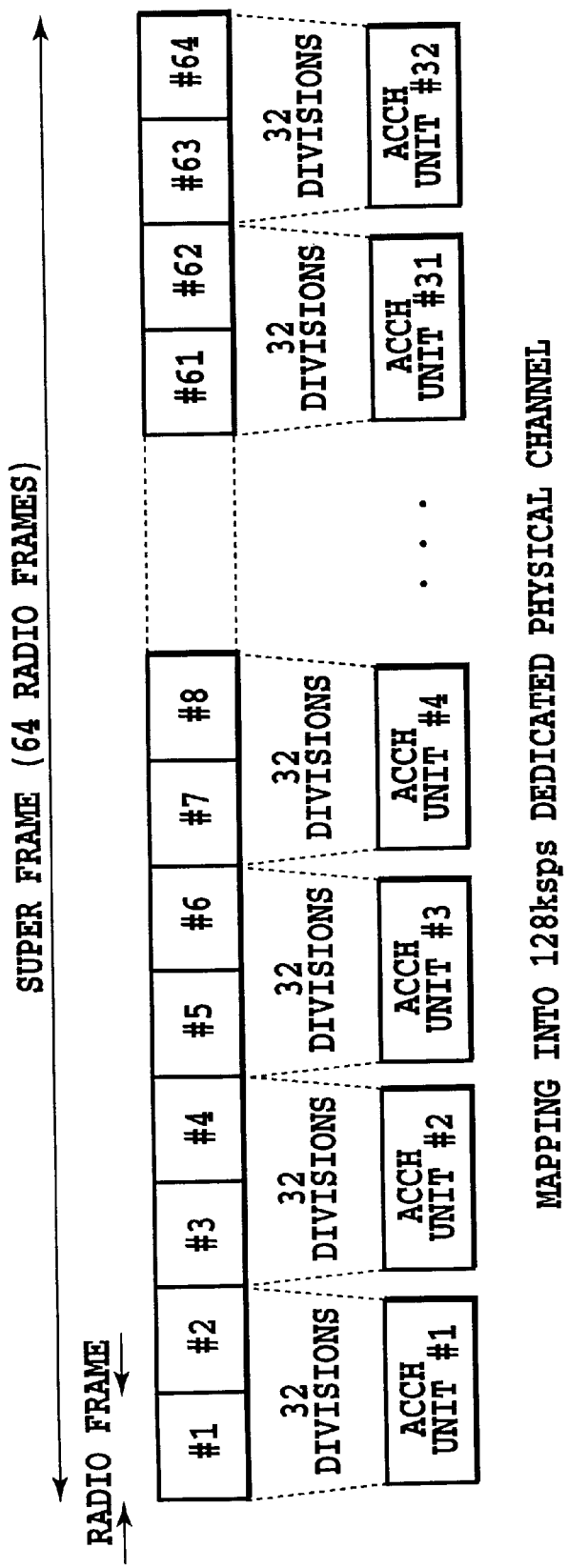
Figure 13C:
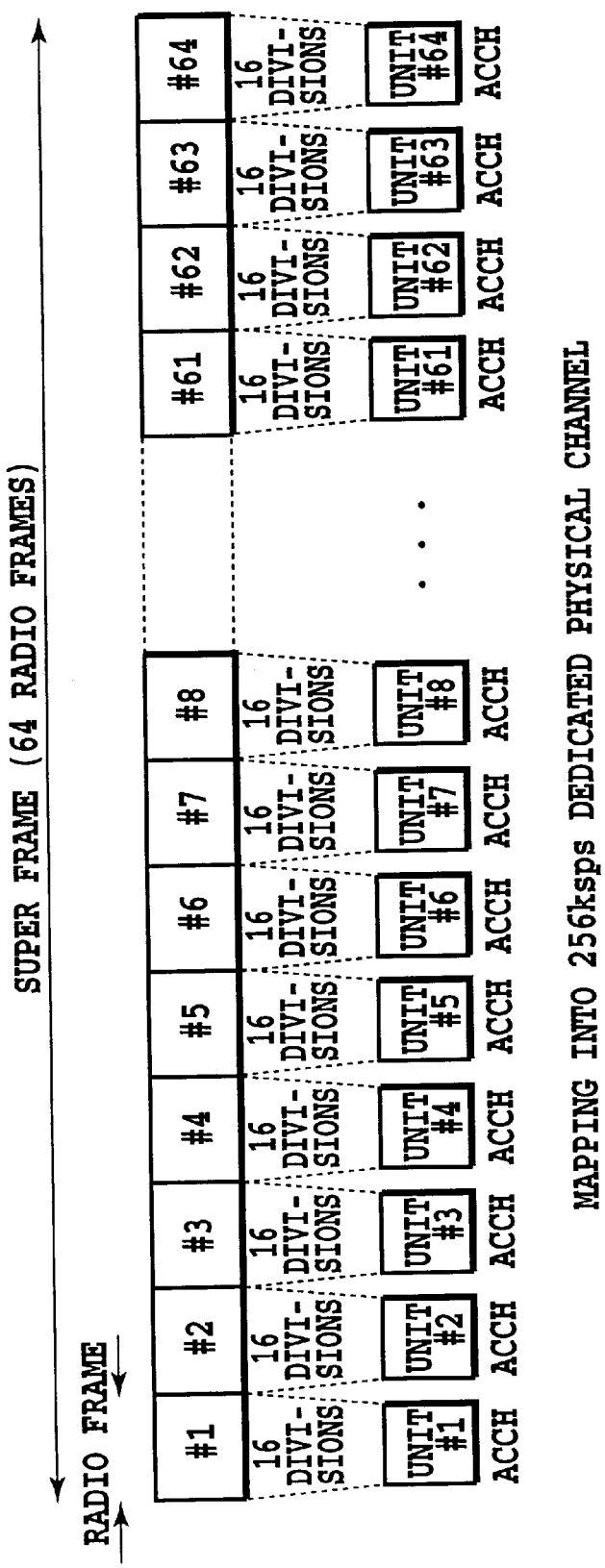

*The number of radio frames constituting a radio unit of the ACCH varies depending on the symbol rate of a dedicated physical channel. The radio unit of the ACCH is allocated in synchronism with a super frame such that it is divided in accordance with the number of the time slots and its divisions are allocated to the entire time slots over one or more radio frames. FIGS. 13A–13C each illustrate a mapping method of the ACCH onto a super frame of the dedicated physical channel for each symbol rate.

Figure 72B:
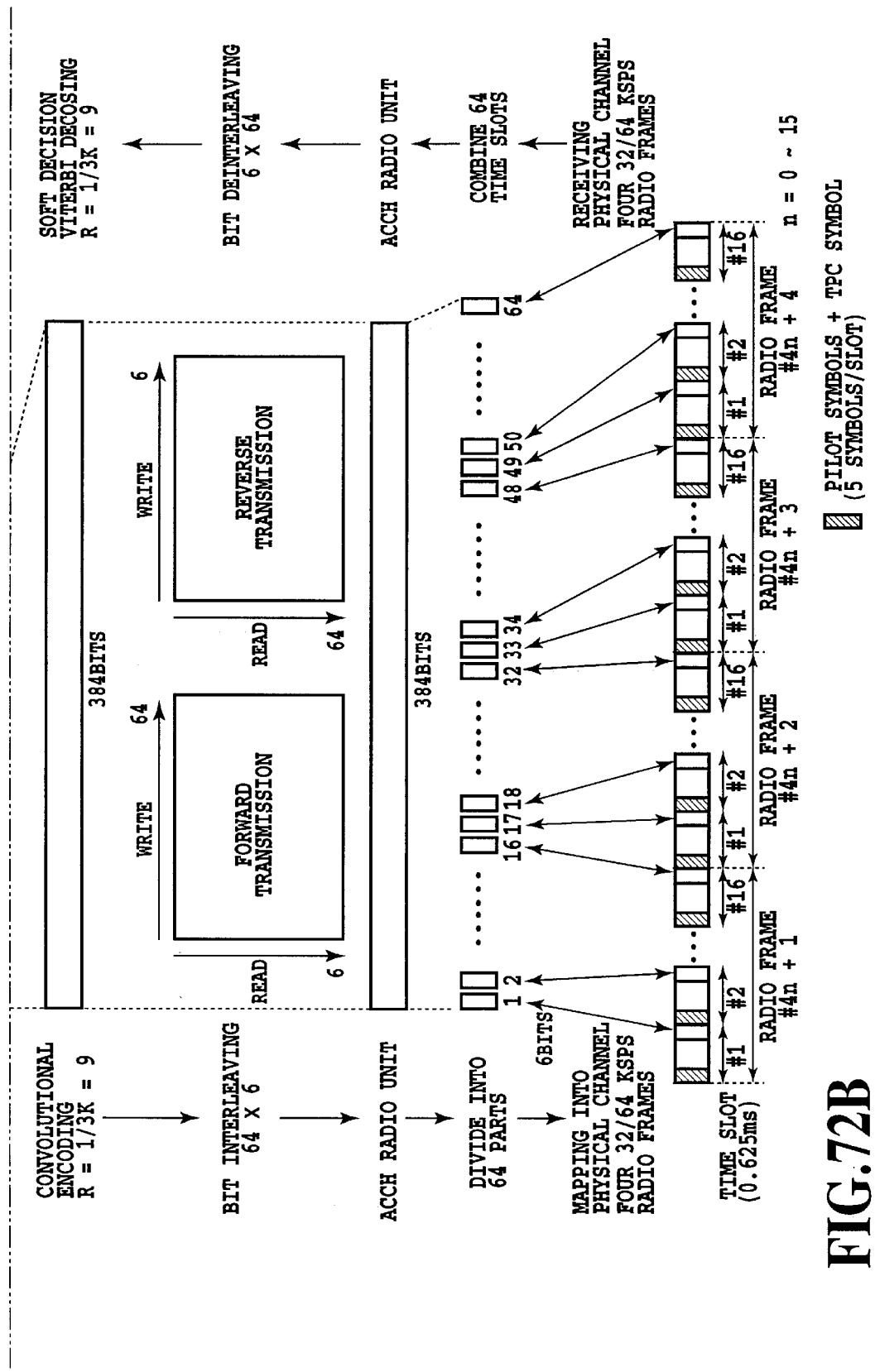
FIG. 72B is a diagram illustrating a coding scheme of an ACCH (32/64 ksps) logical channel.
Figure 73B:
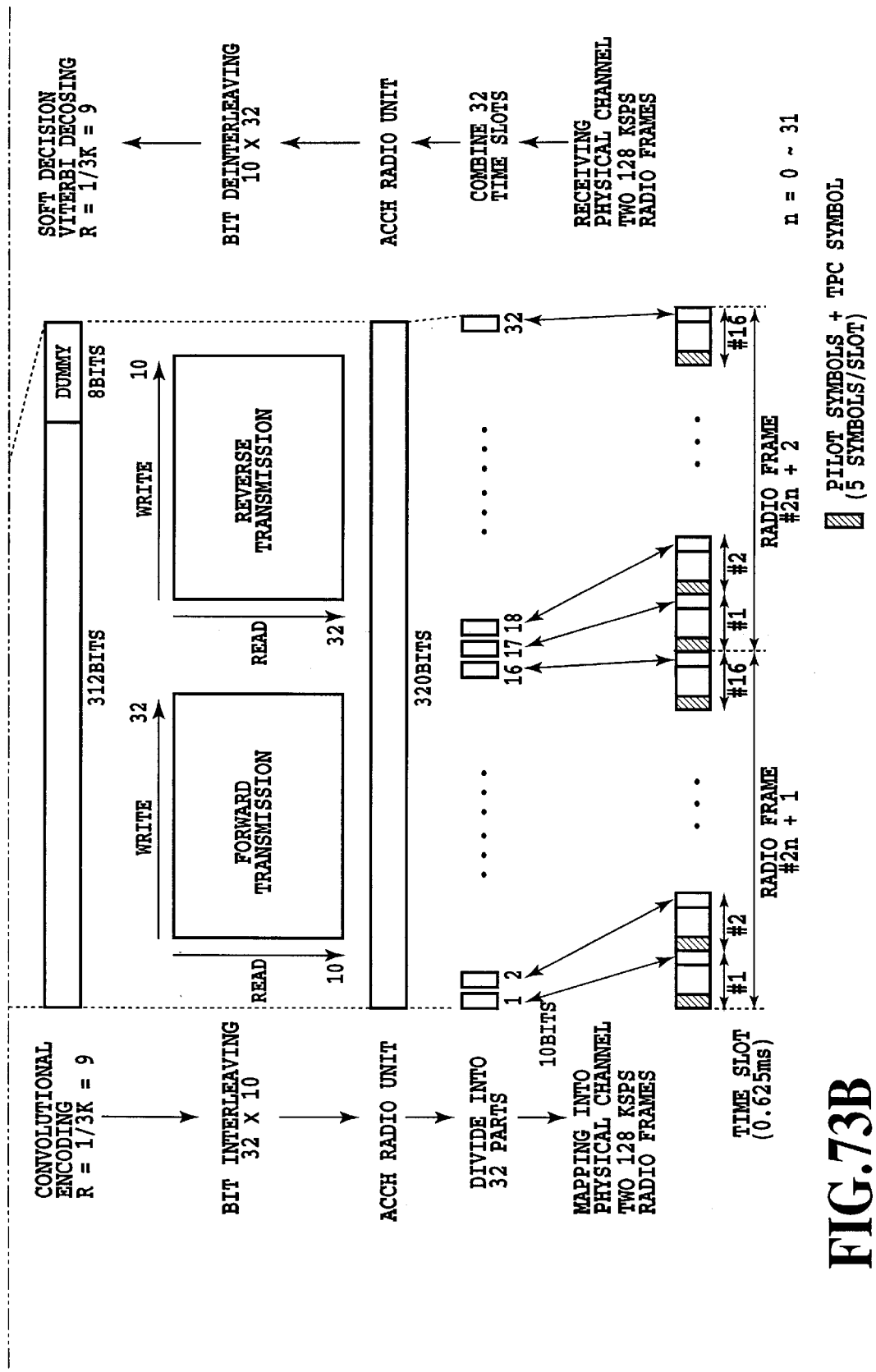
FIG. 73B is a diagram illustrating a coding scheme of an ACCH (128 ksps) logical channel.
Figure 74B:
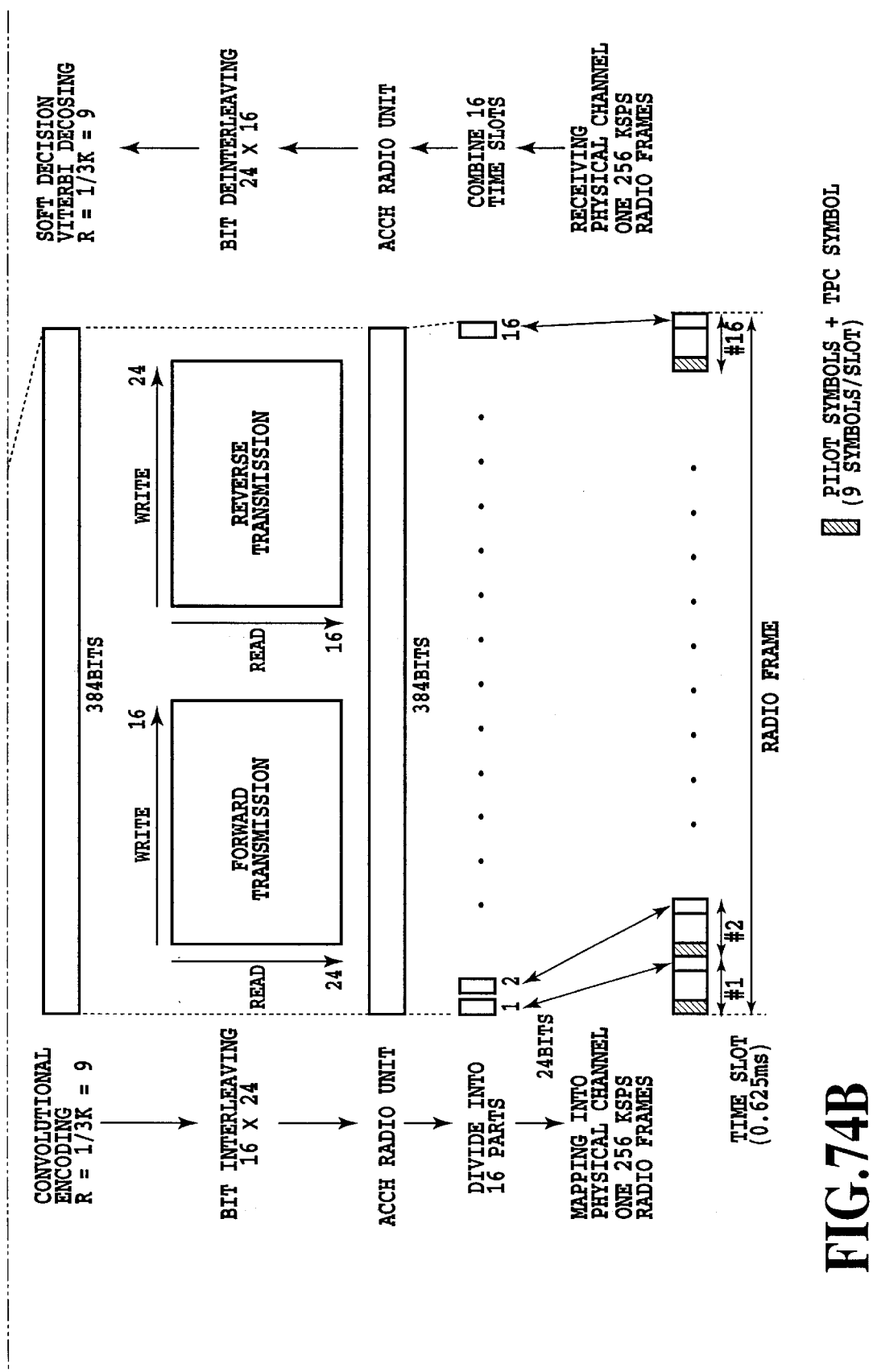
FIG. 74B is a diagram illustrating a coding scheme of an ACCH (256 ksps) logical channel.
Figure 75B:
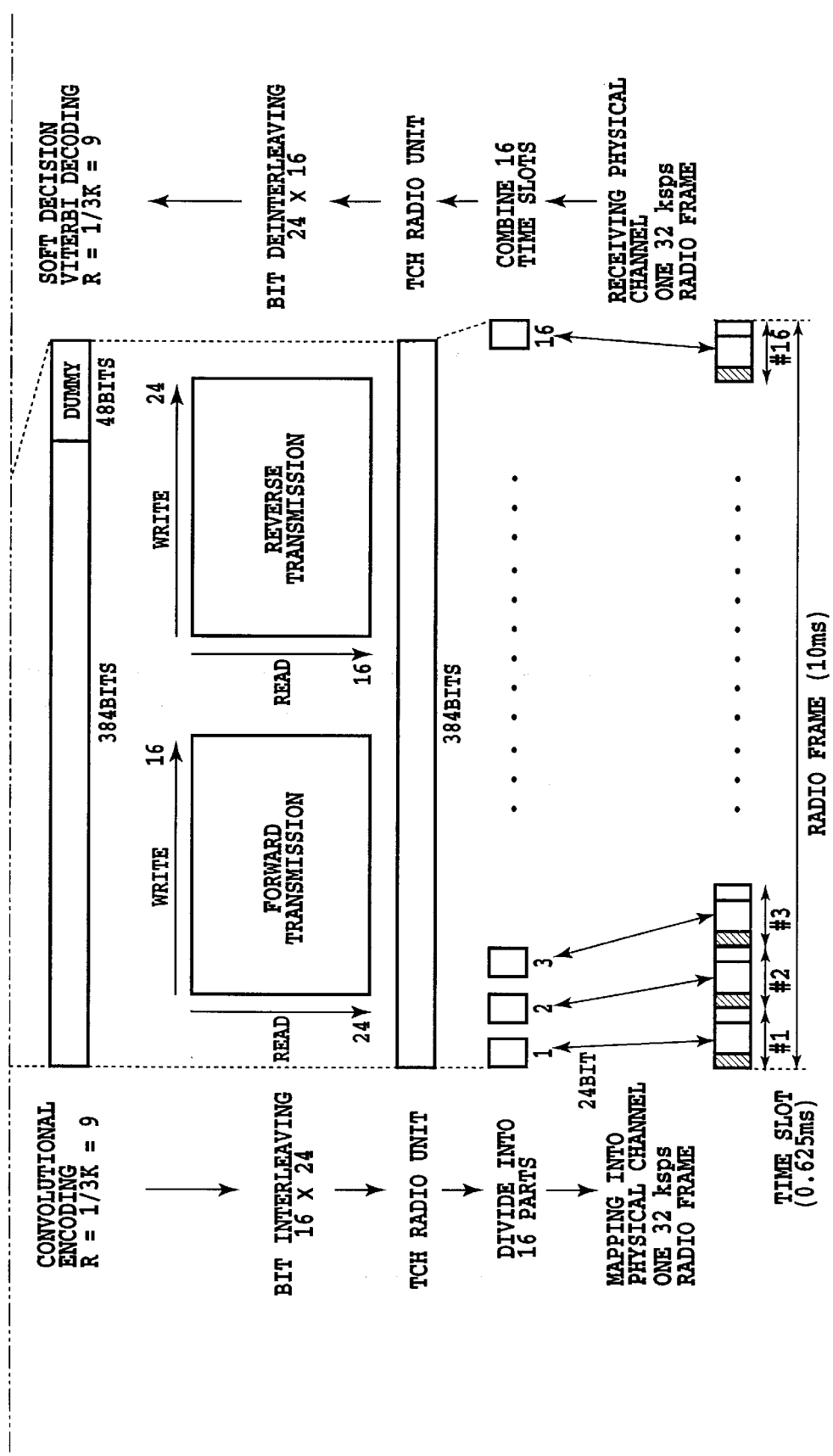
FIG. 75B is a diagram illustrating a coding scheme of a DTCH (32 ksps) logical channel.
Figure 76B:
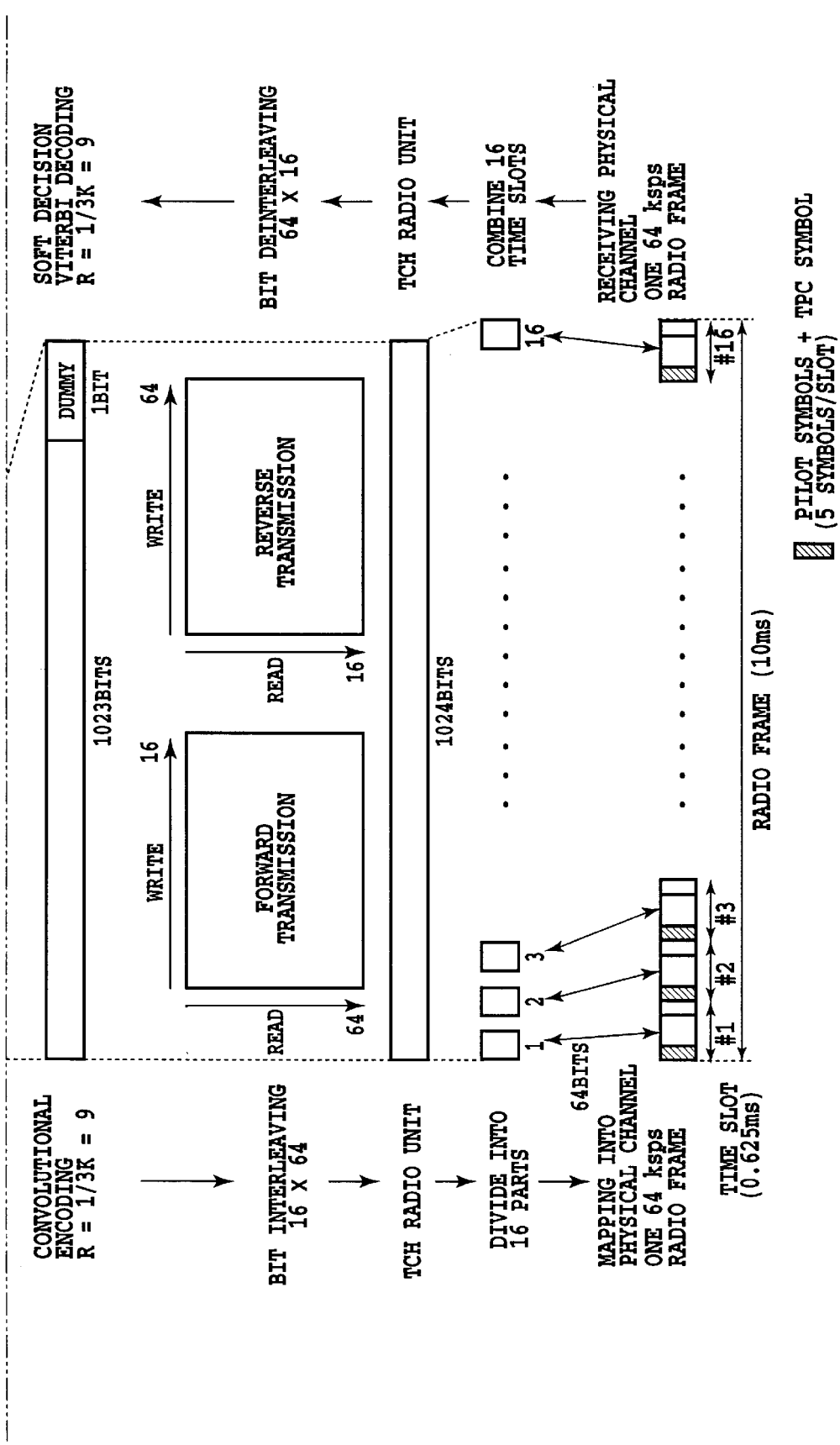
FIG. 76B is a diagram illustrating a coding scheme of a DTCH (64 ksps) logical channel.
Figure 77B:
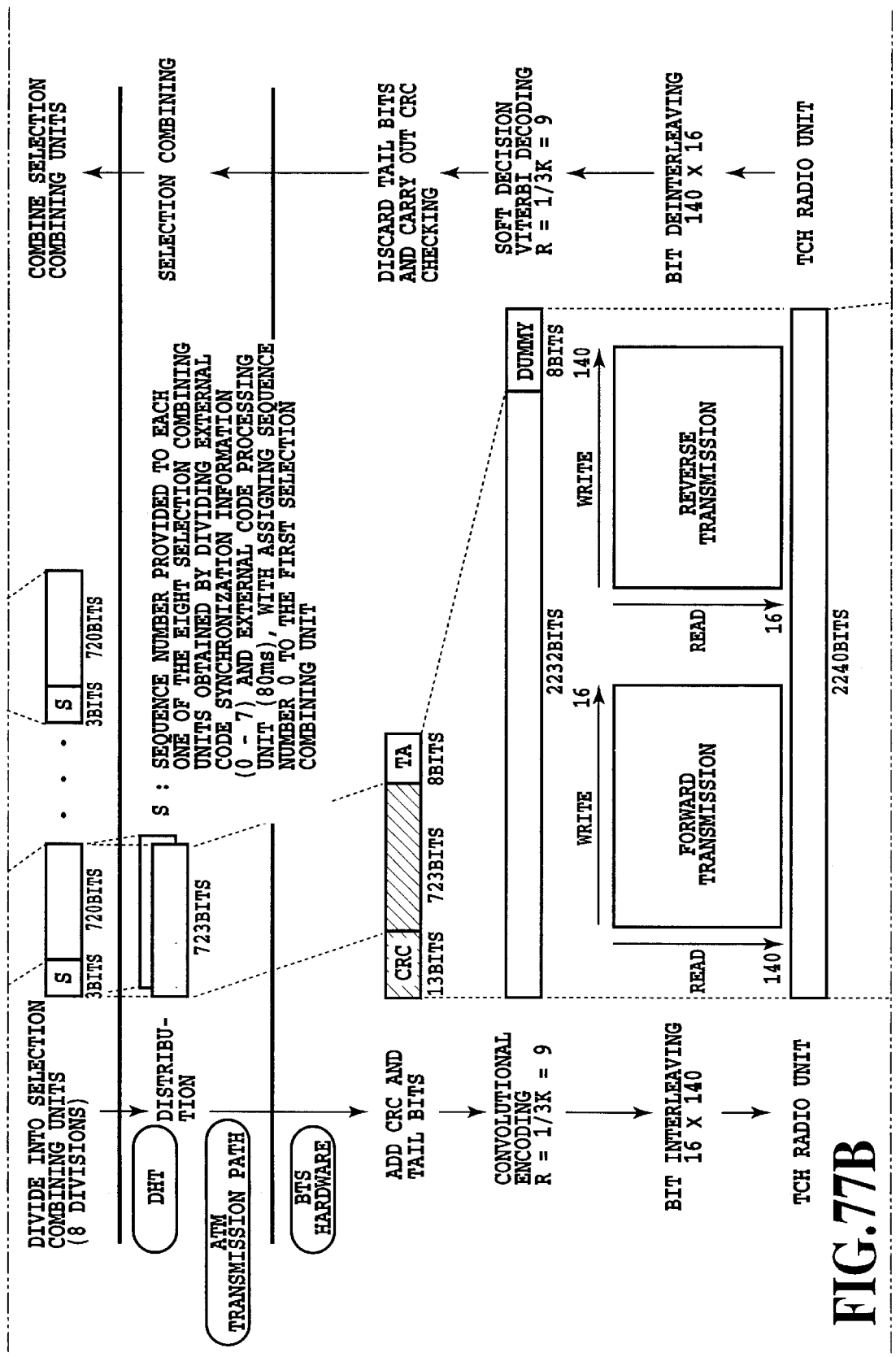
FIG. 77B is a diagram illustrating a coding scheme of a DTCH (128 ksps) logical channel.
Figure 77C:
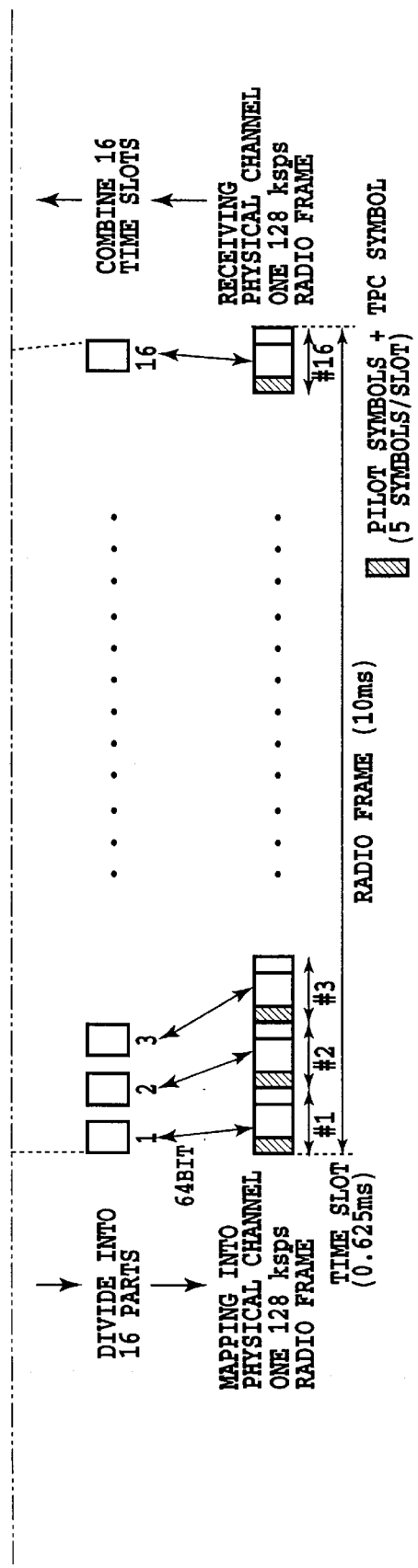
FIG. 77C is a diagram illustrating a coding scheme of a DTCH (128 ksps) logical channel.
Figure 78B:
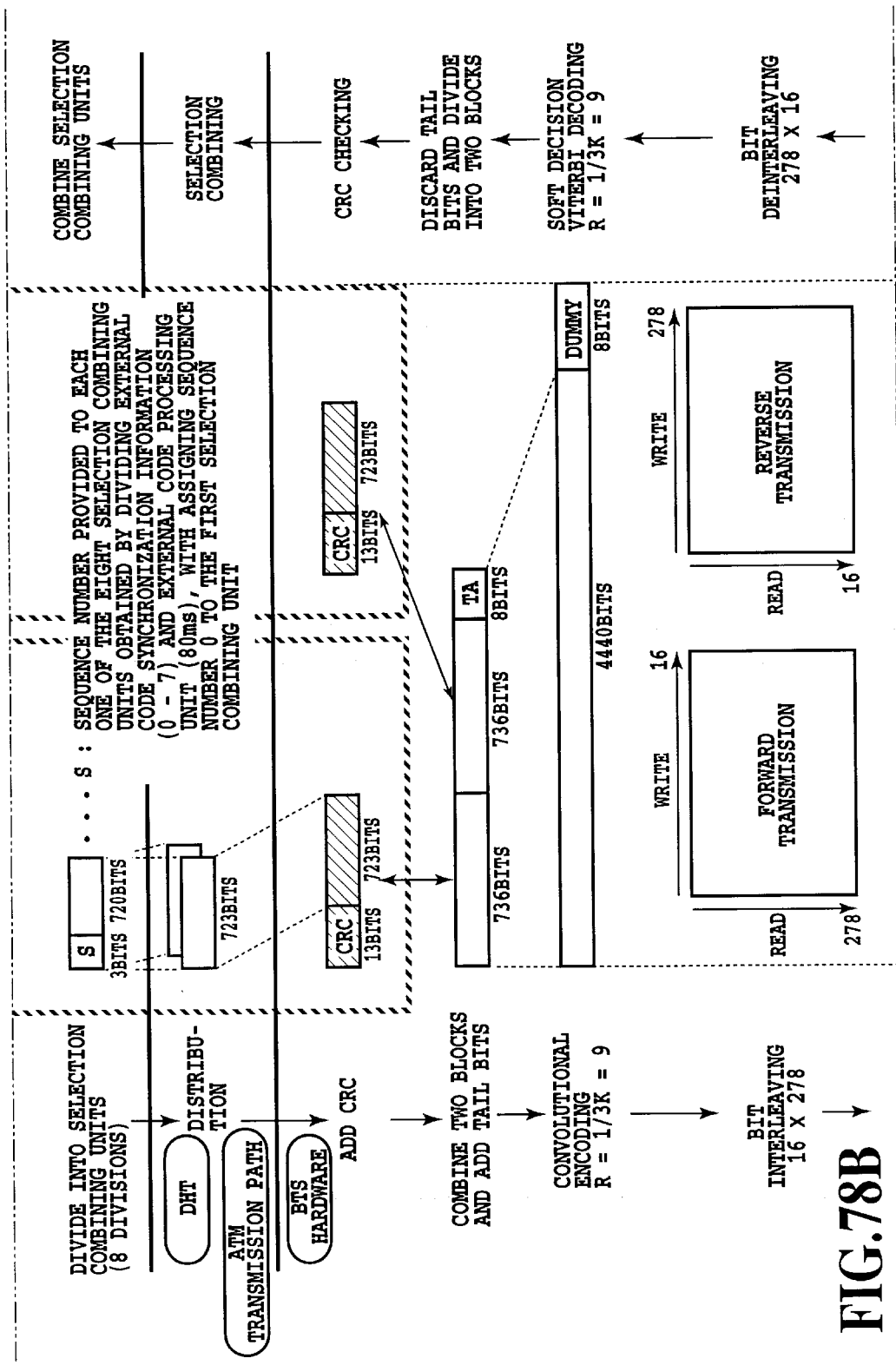
FIG. 78B is a diagram illustrating a coding scheme of a DTCH (256 ksps) logical channel.
Figure 78C:
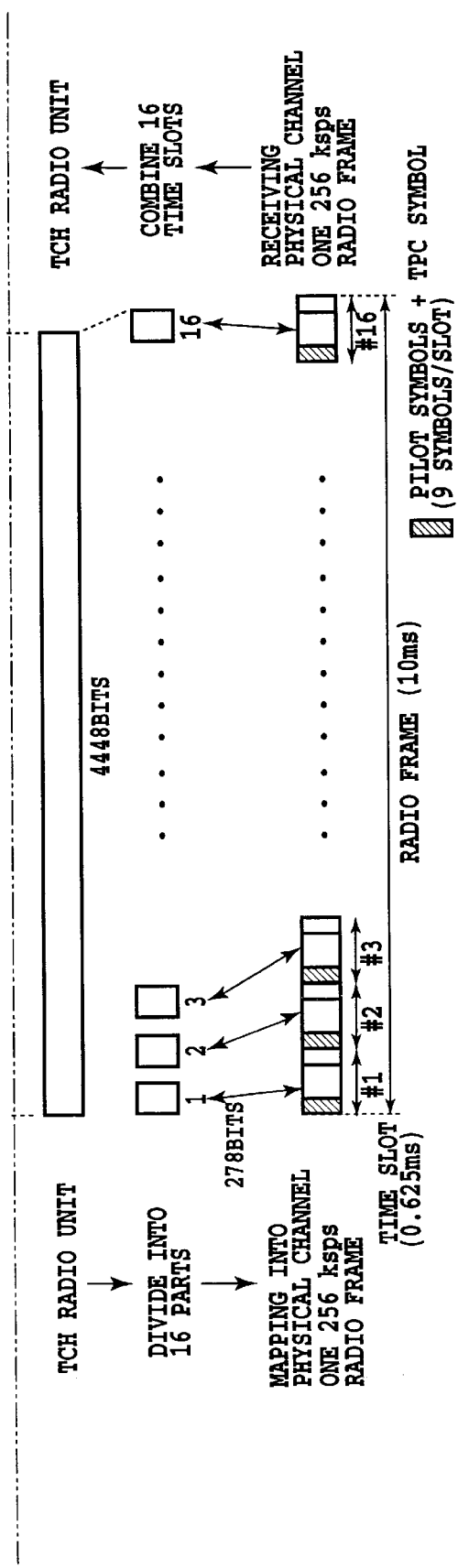
FIG. 78C is a diagram illustrating a coding scheme of a DTCH (256 ksps) logical channel.
Figure 79A:
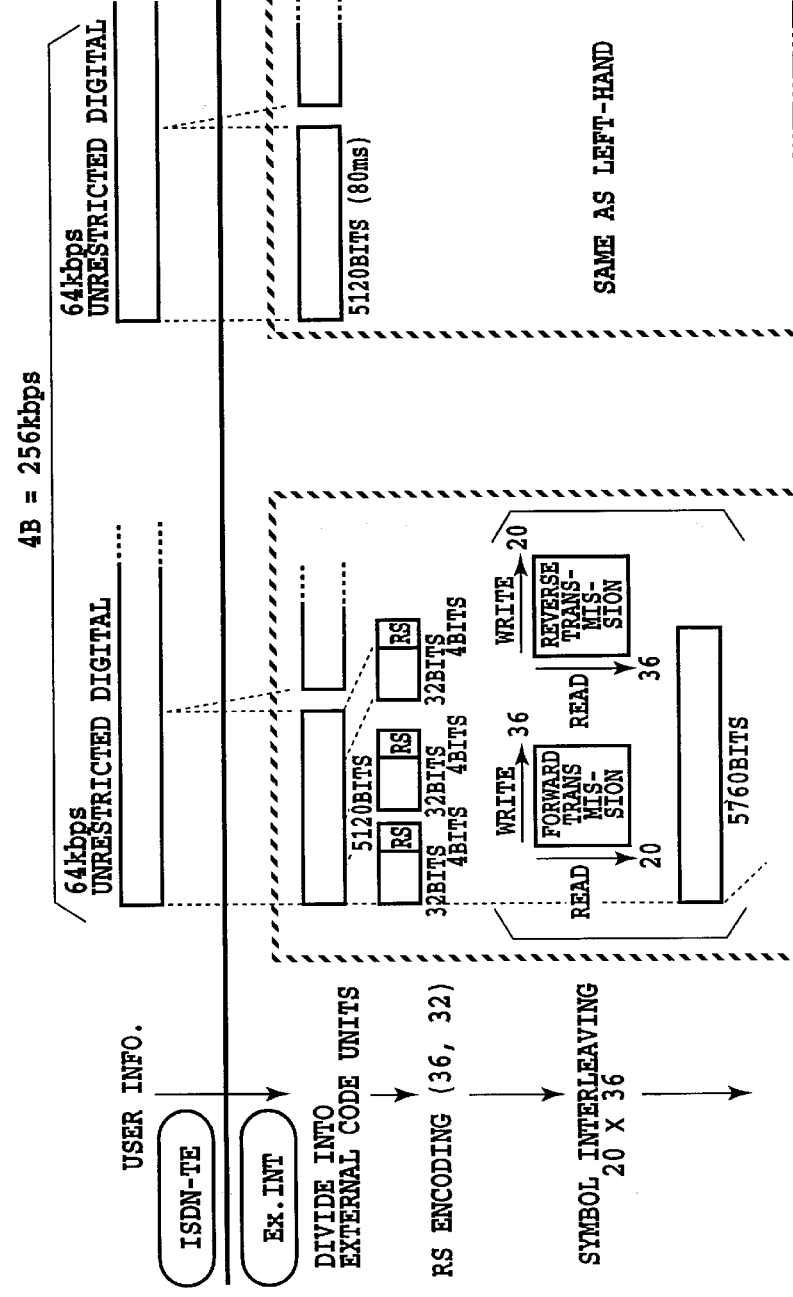
FIG. 79A is a diagram illustrating a coding scheme of a DTCH (512 ksps) logical channel.
Figure 79B:
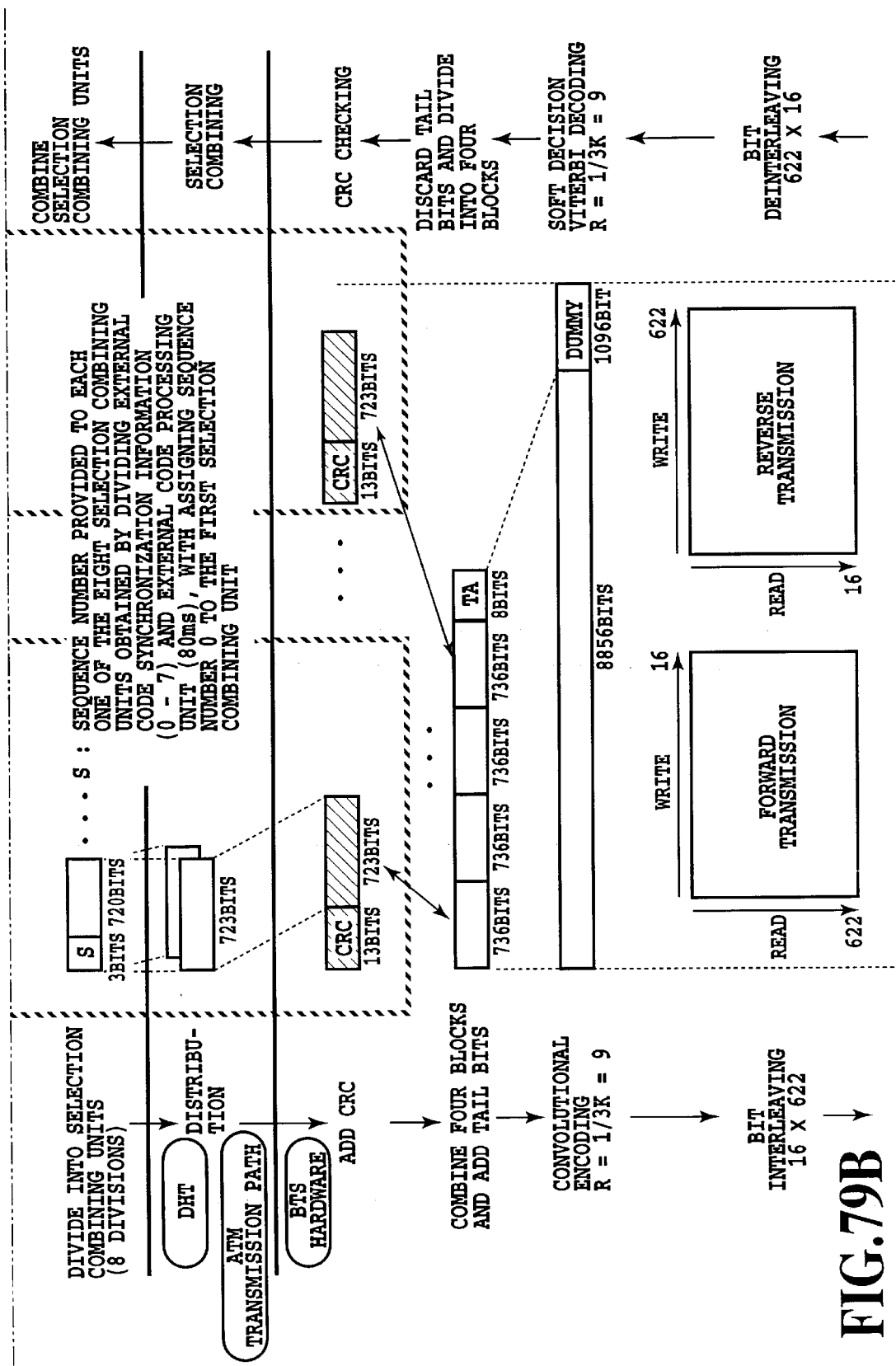
FIG. 79B is a diagram illustrating a coding scheme of a DTCH (512 ksps) logical channel.
Figure 79C:
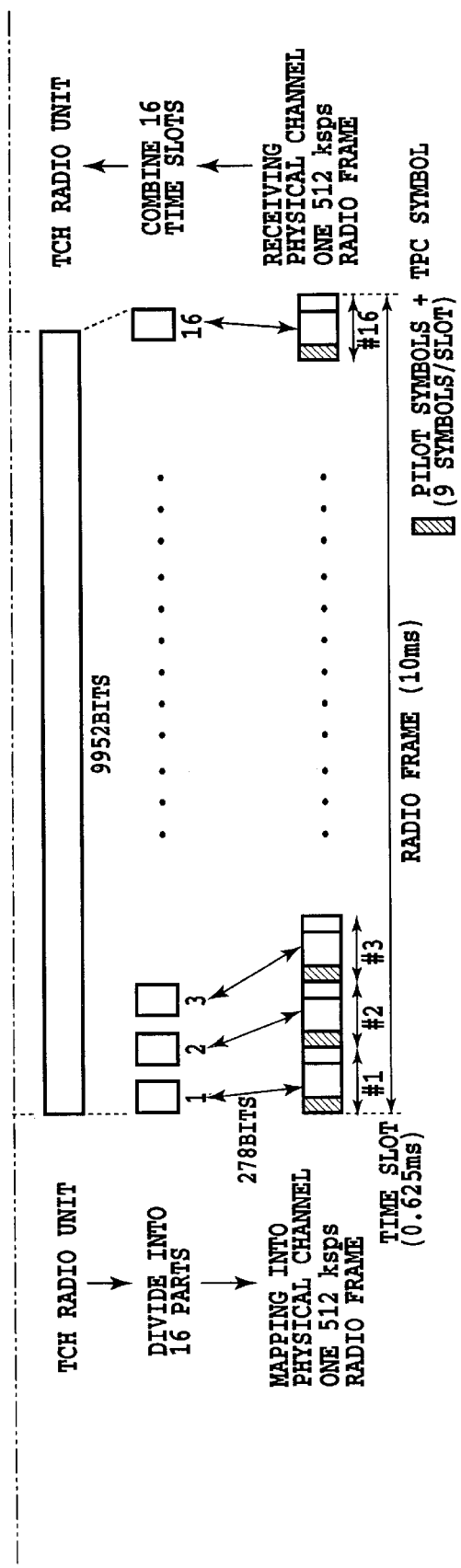
FIG. 79C is a diagram illustrating a coding scheme of a DTCH (512 ksps) logical channel.
Figure 80B:
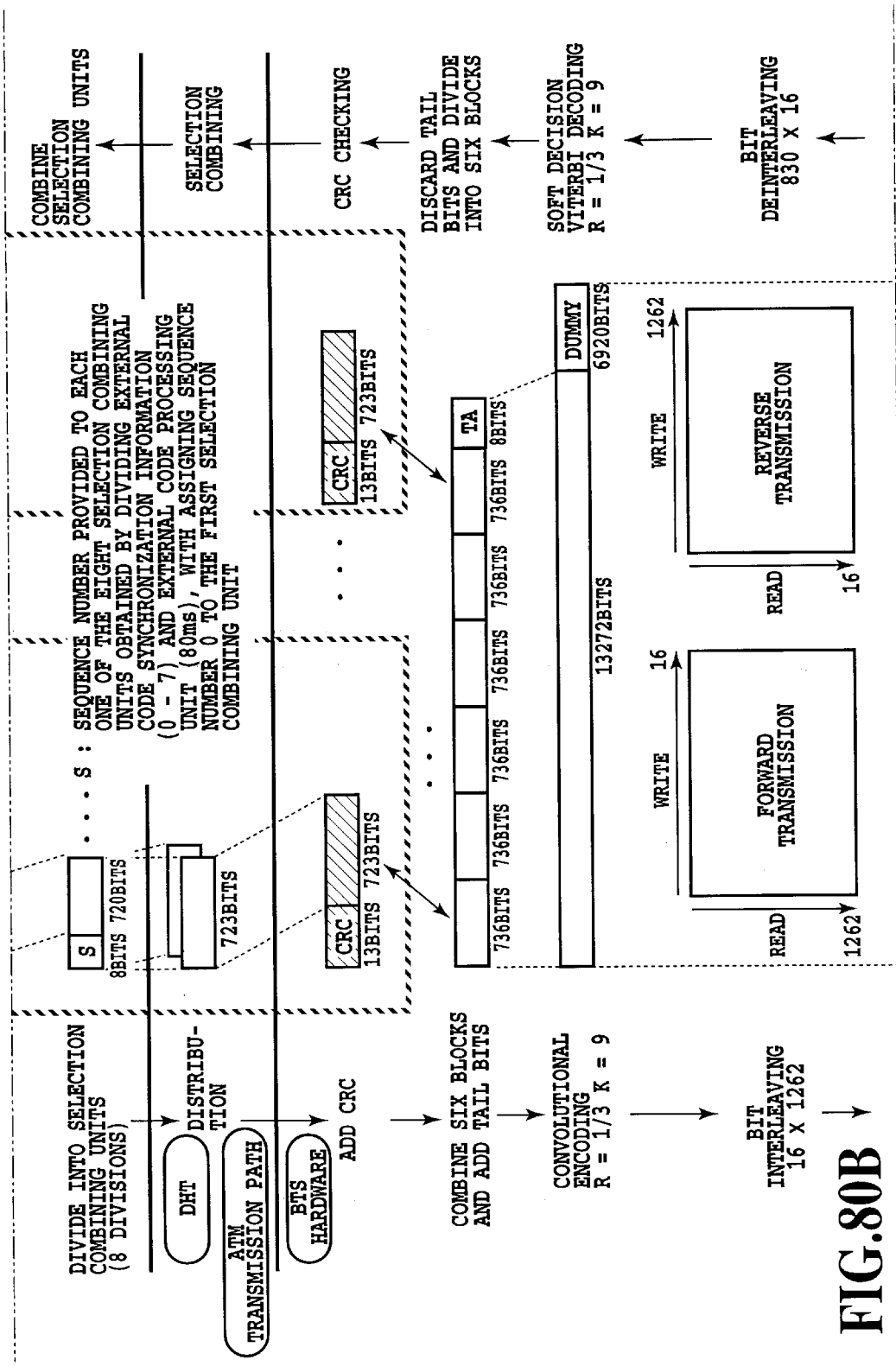
FIG. 80 is a diagram showing the relationship of FIGS. 80A, 80B and 80C.
Figure 80C:
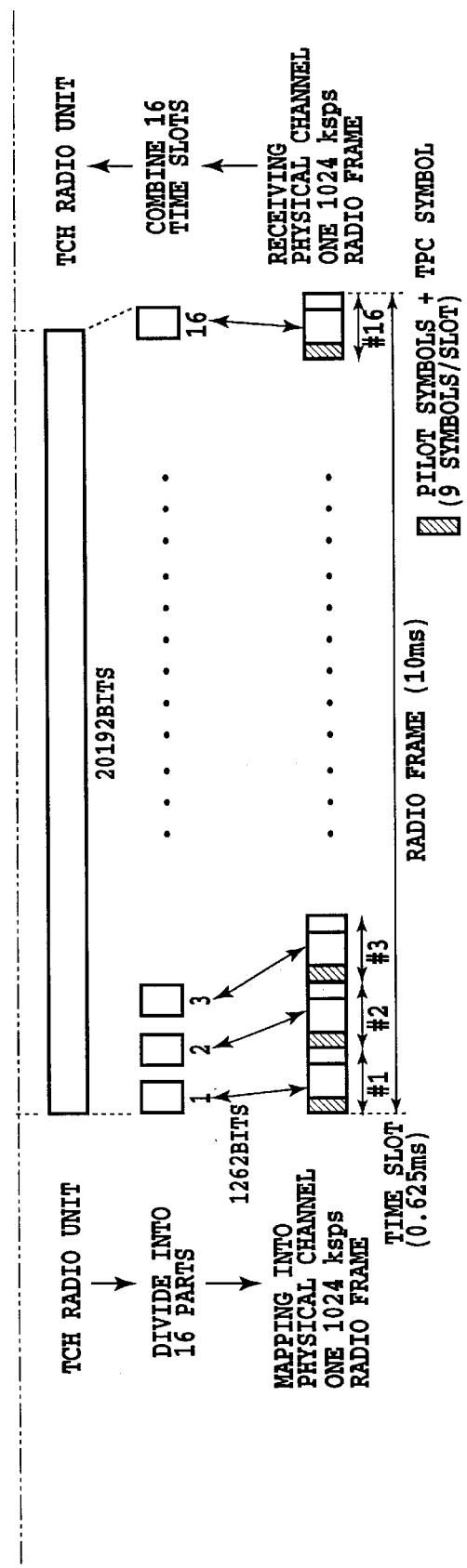

*One reason why the number of the radio frames constituting the radio unit varies depending on the symbol rates is that an error correcting code (CRC) is added to each radio unit to detect and correct errors in each unit, and hence increasing the number of the radio unit will lead to increase the overhead of the error correcting processing (concerning the coding processing of the ACCH, refer to FIGS. 72–74). Another reason is that if the number of the radio units per super frame is increased in the case where the symbol rate is low, the ratio of the error correcting code increases, reducing the volume of the substantially transmitted information.

*In multicode transmission, the ACCH radio unit does not overlay two or more physical channels, but is transmitted using a particular one code (physical channel). The particular one code is predetermined.

4.1.2.5. Logical Channel Coding

FIGS. 64–84 illustrate coding processings of logical channels, which are carried out in a base station (BTS).

4.1.2.5.1. Error Detecting Code (CRC)

An error detecting code (CRC) is added to each CPSPDU (common part sublayer protocol data unit), each internal encoding unit, or each selection combining unit.

4.1.2.5.1.1. Generator Polynomials (1) 16-bit CRC
*Application: CPSPDU of the entire logical channels except for the DTCH and PCH; internal encoding unit of UPCHs at all the symbol rates; selection combining unit of the 32 ksps DTCH; and an internal encoding unit of the SDCCH, FACH-S/L or RACH-S/L.

*Generator polynomial:

$$GCRC16\ (X) = X^{16} + X^{12} + X^5 + 1$$

(2) 14-bit CRC
*Application: ACCHs at all the symbol rates.
*Generator polynomial:

$$GCRC14\ (X) = X^{14} + X^{13} + X^5 + X^3 + X^2 + 1$$

(3) 13-bit CRC
*Application: Selection combining units of 64/128/256 ksps DTCHs.
*Generator polynomial:

$$GCRC13\ (X) = X^{13} + X^{12} + X^7 + X^6 + X^5 + X^4 + X^2 + 1$$

(4) 8-bit CRC
*Application: CPSPDU of PCH.
*Generator polynomial: $GCRC8\ (X) = X^8 + X^7 + X^2 + 1$ 4.1.2.5.1.2. CRC Calculation Application Range

*CRC for each CPSPDU: Entire CPSPDU.
*CRC for each ACCH/DTCH selection combining unit: Entire unit except for tail bits.
*CRC for each SDCCH/FACH/RACH/UPCH internal encoding unit: Entire unit except for tail bits.
*FIGS. 64–84 illustrate by shaded portions the CRC calculation application range and CRC bits.

4.1.2.5.1.3. Uses of CRC Check Results

*CRC for each CPSPDU: Making a decision as to whether to carry out retransmission according to a retransmission protocol of a higher layer (SSCOP, layer 3 retransmission)
*CRC for each ACCH/DTCH selection combining unit: (i) outer-loop transmission power control; (ii) selection combining reliability information.
*CRC for each UPCH internal encoding unit: outer-loop transmission power control.
*CRC for each RACH internal encoding unit: layer 1 retransmission.
*CRC for each SDCCH internal encoding unit: (i) outer-loop transmission power control; (ii) making a decision on the necessity for wire transmission.

4.1.2.5.1.4. Initialization of CRC

*The initial value of a CRC calculator is "all 0s".

4.1.2.5.2. PAD

*Application: The CPSPDU of the logical channels except for DTCHs.
*A PAD is used for aligning the length of the CPSPDU with the integer multiple of the internal encoding unit length or selection combining unit length.
*The PAD is contained in the CPSPDU by 1 oct. unit.
*The bits of the PAD is "all 0s".

4.1.2.5.3. Length

*Application: The CPSPDU of logical channels except for DTCHs.
*Length shows an information volume (the number of octets) of the padding in the CPSPDU.

4.1.2.5.4. W Bits

Figure 14:
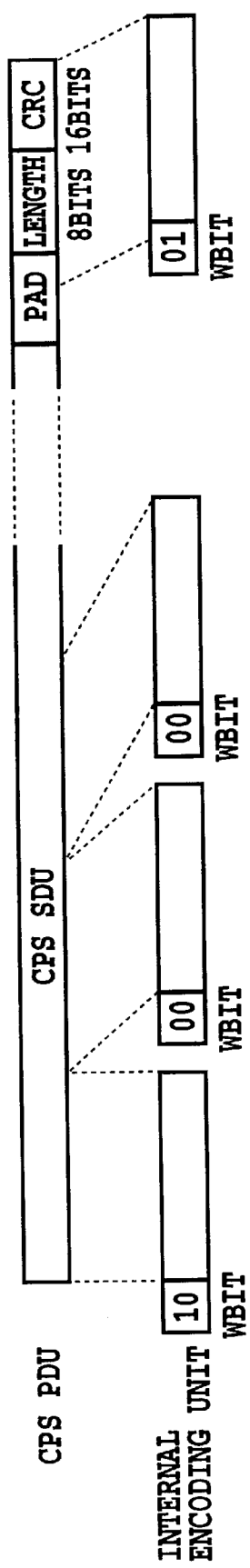
FIG. 14 is a diagram illustrating a method of using W bits.

*W bits indicates the initial, continuous, or final position of the CPSPDU for each internal encoding unit (for each selection combining unit in the case of an ACCH). The relationships between the bit patterns of the W bits and their indications are shown in Table 7, and the uses thereof is shown in FIG. 14.
*A flowchart illustrating an assembling process of the CPSPDU using the W bits is shown in FIGS. 95A to 96B.

TABLE 7

W bit pattern

| W bits | designated contents |
|---|---|
| 00 | continue & continue |
| 01 | continue & end |
| 10 | start & continue |
| 11 | start & end |

Figure 15A:
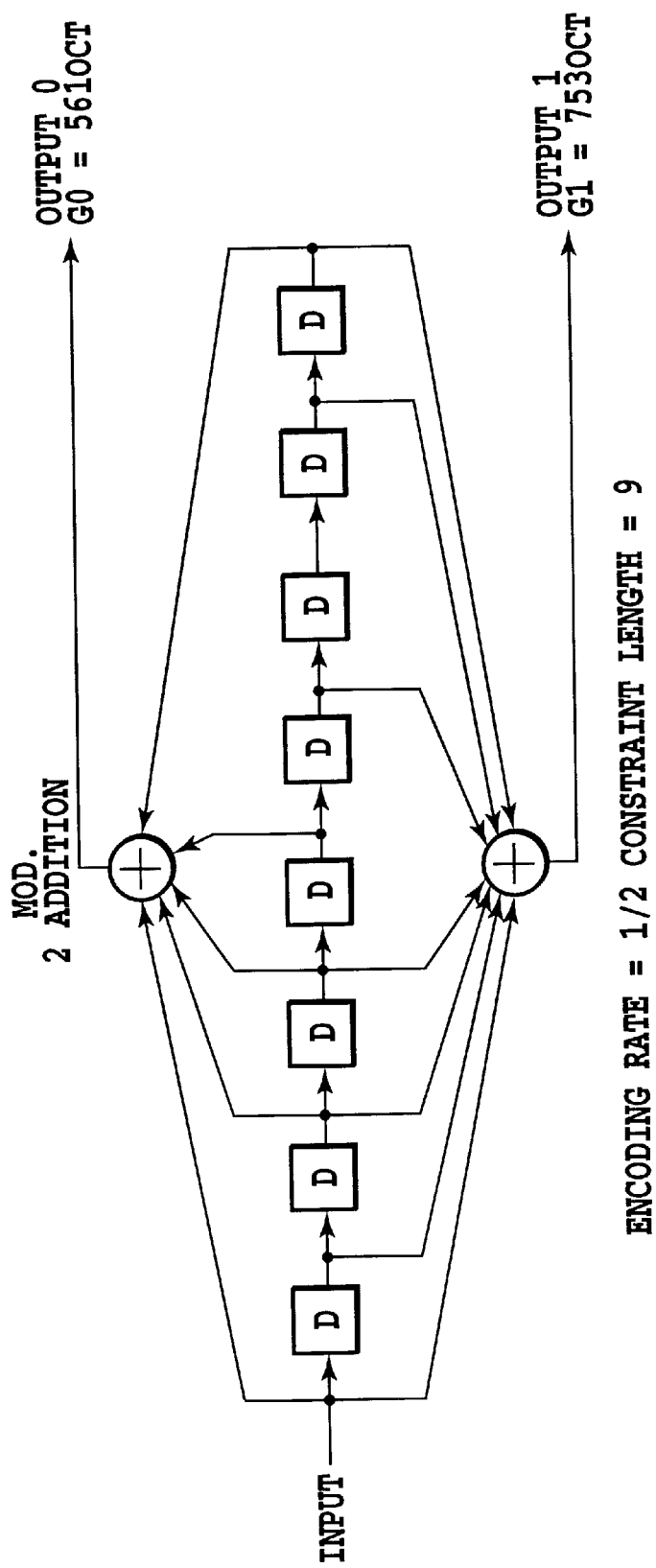
FIGS. 15A and 15B are block diagrams each showing a configuration of a convolutional encoder.
Figure 15B:
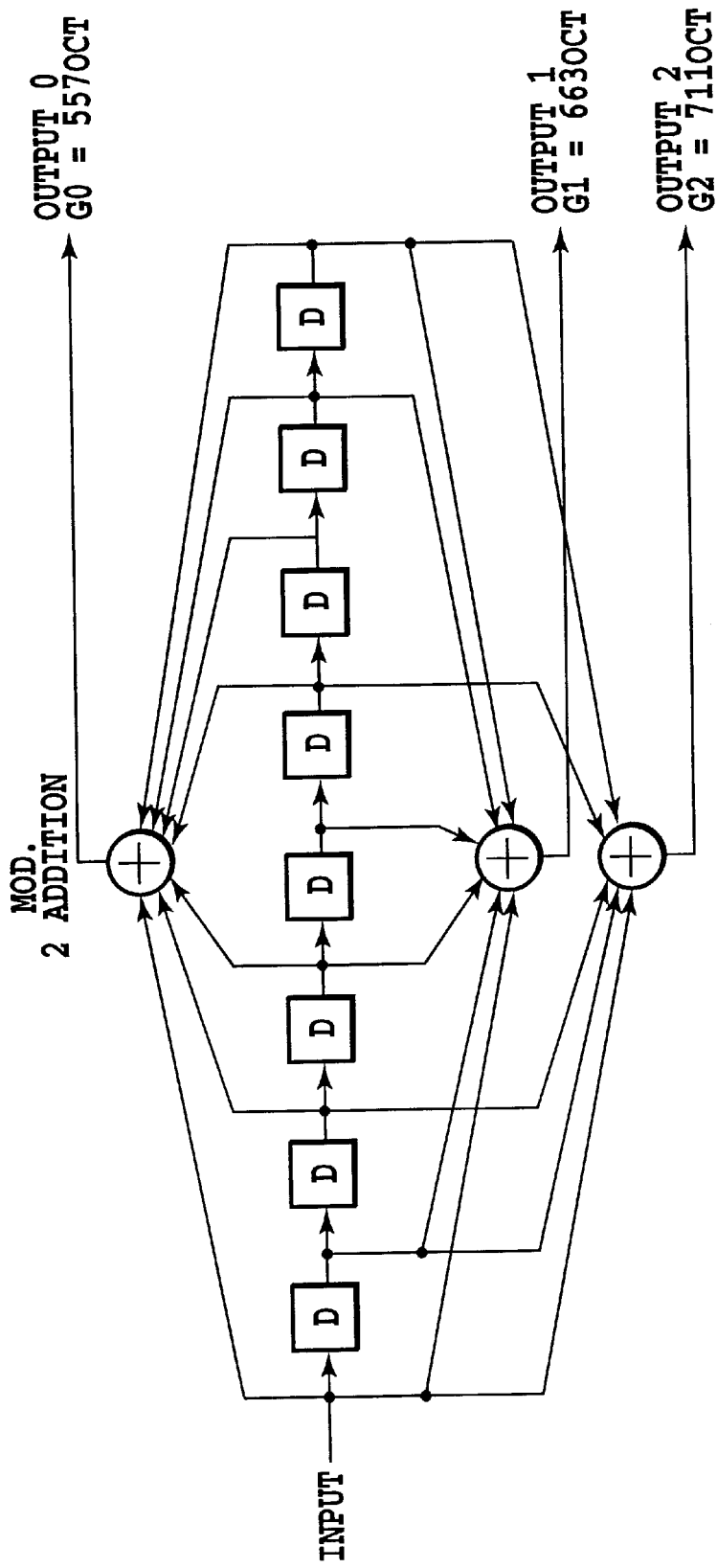

4.1.2.5.5. Internal Code
*An internal code is one of the convolutional coding. FIGS. 15A and 15B each shows a convolutional encoder.
*Features of internal encoding for respective logical channels are shown in Table 8.
*The output of the convolutional encoder is produced in the order of output 0, output 1 and output 2 (coding rate of ½ is applied to up to output 1).
*The initial value of the shift register of the encoder is "all 0s".

TABLE 8

Features of internal encoding.

| Types of logical channels | Constraint length | Encoding rate | Depth of interleaving | Number of slots/radio unit |
|---|---|---|---|---|
| BCCH 1 | 9 | 1/2 | 10 | 32 |
| BCCH 2 | | | 10 | 32 |
| PCH | | | 16 | 4 |
| FACH-L | | | 72 | 16 |
| FACH-S | | | 72 | 4 (4 slot interval) |
| FACH-L | | | 72 | 16 |
| FACH-S | | | 32 | 8 |
| SDCCH | | | 30 | 16 |
| ACCH (32/64 ksps) | | 1/3 | 6 | 64 |
| ACCH (128 ksps) | | | 10 | 32 |
| ACCH (256 ksps) | | | 24 | 16 |
| DTCH (32 ksps) | | | 24 | 16 |
| DTCH (64 ksps) | | | 64 | 16 |
| DTCH (128 ksps) | | | 140 | 16 |
| DTCH (256 ksps) | | | 278 | 16 |
| DTCH (512 ksps) | | | 622 | 16 |
| DTCH (1024 ksps) | | | 1262 | 16 |
| UPCH (32 ksps) | | 1/3 | 30 | 16 |
| UPCH (64 sps) | | | 70 | 16 |
| UPCH (128 ksps) | | | 150 | 16 |
| UPCH (256 ksps) | | | 302 | 16 |

4.1.2.5.6. External Encoding
(1) Reed-Solomon encoding/decoding.
*Code form: An abbreviated code RS(36,32) derived from a primitive code RS(255, 251) defined over a Galois field GF(28).
*Primitive polynomial: $p=X^8+X^7+X^2+X+1$.
*Code generator polynomial:

$$G(x)=(X+\alpha^{120})(X+\alpha^{121})(X+\alpha^{122})(X+\alpha^{123})$$

*An external encoding is applied only when unrestricted digital transmission in a circuit switching mode is carried out. The external encoding is carried out every 64 kbps (1B) interval independently of the transmission rate.
(2) Symbol interleaving.
*Interleaving is carried out on an 8-bit symbol unit basis.
*The depth of the interleaving is 36 symbols independently of the symbol rate of the DTCH.
(3) External code handling alignment.
*Each external code handling unit consists of 80 ms long data.

*The external code handling is processed in synchronism with radio frames. The radio frames in the external code handling unit are provided with sequence numbers 0–7 in the order of transmission. The external code handling alignment is established in accordance with the sequence numbers. The number of alignment guard stages are as follows (default=2).
The number of forward guard stages: NF (default=2)
The number of backward guard stages: NR (default=2)
4.1.2.5.7. Reverse Link Interfering Amount
*It is reported through the BCCH1 and BCCH2.
*It is the latest measured value of the reverse interfering amount (total received power including thermal noise) for each sector.
*A measuring method is defined by measurement parameters.
*Table 9 shows an example of correspondence between bit values and reverse interfering amounts. The bits are transmitted from the leftmost bit in the table.
*The bits takes an idle pattern (see, 4.1.10) when the start of the measurement is not designated.

TABLE 9

Correspondence of the bit values to the reverse interfering amounts.

| Bit values | Reverse interfering amounts |
|---|---|
| 1 1  1 1 1 1 | equal to or greater than −143.0 dBm/Hz |
| 1 1  1 1 1 0 | equal to or greater than −143.5 dBm/Hz less than −143.0 dBm/Hz |
| . | . |
| . | . |
| . | . |
| 0 0  0 0 0 1 | equal to or greater than −174.0 dBm/Hz less than −173.5 dBm/Hz |
| 0 0  0 0 0 0 | less than −174.0 dBm/Hz |

Figure 16:
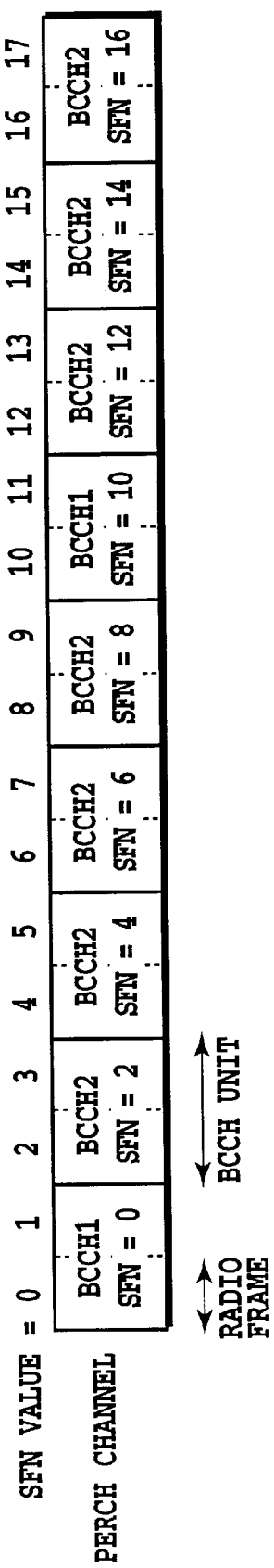
FIG. 16 is a diagram illustrating an SFN (system frame number) transmission example.
Figure 17:
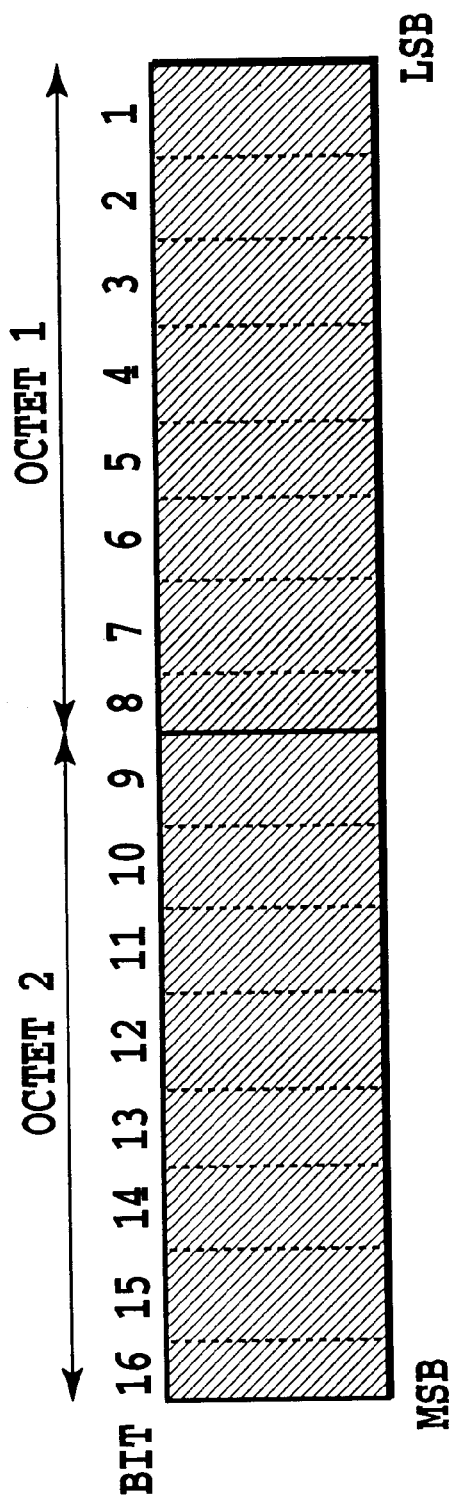
FIG. 17 is a diagram illustrating a structure of SFN bits.

4.1.2.5.8. SFN (System Frame Number)
*System frame number (SFN) is reported through the BCCH1 and BCCH2.
*The SFN has a one-to-one correspondence with the radio frame, and is incremented by one for each 10 msec long radio frame.
*The SFN of the first one of the two radio frames at each transmission timing of the BCCH1 or BCCH2 is transmitted over the BCCH1 or BCCH2. FIG. 16 illustrates a transmission example of the SFN.
*The base station generates counter values based on the timings designated by transmission paths.
*The range of the SFN: $0-2^{16}-1$. The radio frame with $SFN=2^{16}-1$ is followed by the radio frame with $SFN=0$.
*Bit arrangement: FIG. 17 shows the bit arrangement of the SFN. The bits are transmitted from the MSB of this figure.
*Uses of the SFN.
(1) For calculating the phase of a reverse link long code: The reverse link long code phase at the originating/terminating connection and at the diversity handover is calculated as will be described in 4.1.3 and illustrated in FIGS. 85–88 to generate a long code.
(2) For establishing super frame alignment: The radio frame with the SFN of mod 64=0 is the initial frame in a super frame, and the radio frame with the SFN of mod 64=63 is the final frame in the super frame.

4.1.2.5.9. Transmission Power
*Transmission power is broadcasted over the BCCH1 and BCCH2.
*Transmission power of the perch channel is notified.
*Range of the value: 6 dBm–43 dBm.
*Bit arrangement: 6-bit binary notation of a value expressed in dBm unit (for example, 6 dBm is represented as "000110"). The bits are transmitted from the MSB.

4.1.2.5.10. PID (Packet ID)
*Application: RACH-S/L; FACH-S/L.
*A PID is an identifier for identifying, on a common control physical channel, a call or a mobile station, which is associated with transmitted information.
*Information length: 16 bits.
*The PID value on a FACH is designated together with its transmitted information. The PID value transmitted over the RACH is notified along with the transmitted information.
*Uses: The major uses of the PID are as follows.
(i) For sending a request for establishing the SDCCH, and for sending an establishment response.

The PID is used for sending from a mobile station to the BTS through the RACH a request for establishing the SDCCH, and from the BTS to the mobile station through the FACH an establishment response. The PID on the FACH that transmits the establishment response is identical to the PID on the RACH that sends the establishment request. The PID value for this purpose is randomly selected by the mobile station.
(ii) For carrying out packet transmission.

The PID is used for the packet data transmission on the RACH and FACH. The PID value for this purpose is determined by the base station that selects a unique value for each sector.
*A range of the PID value: A range over 16 bits is divided into two parts which are used for the foregoing purposes. Table 10 shows an example of the ranges for the uses.
*Bit structure: PID values (0–65535) are represented by the 16-bit binary notation. The bits are transmitted from the MSB.

TABLE 10

Range of PID values.

| Uses | Range of values |
| --- | --- |
| SDCCH establishment request immediately before SDCCH establishment and establishment response | 0~63 |
| Packet transmission | 64~65535 |

4.1.2.5.11. Mo
*Mo is a bit for identifying the mode of the FACH-S.
*An example of its bit structure is shown in Table 11.

TABLE 11

Bit structure of Mo.

| Bit | Identification content |
| --- | --- |
| 0 | Normal mode |
| 1 | Ack mode |

4.1.2.5.1.2. U/C
*Application: RACH-S/L, FACH-S/L and UPCHs of all the symbol rates.
*The U/C bit is an identifier for identifying whether the information conveyed by the CPSSDU (content provider system service data unit) is user information or control information.
*An example of its bit structure is shown in Table 12.

TABLE 12

Structure of U/C bit

| Bit | Identification content |
| --- | --- |
| 0 | User information |
| 1 | Control information |

4.1.2.5.13. TN (Terminal Node Information)
*Application: RACH-S/L, FACH-S/L and UPCHs of all the symbol rates.
*The TN bit is an identifier for identifying a base station side terminal node of the information conveyed by the CPSSDU.
*An example of its bit structure is shown in Table 13.

TABLE 13

Structure of TN bit

| | Identification content | |
| --- | --- | --- |
| Bit | RACH, Reverse UPCH | FACH, Forward UPCH |
| 0 | MCC termination | Transmission from MCC |
| 1 | BTS termination | Transmission from BTS |

4.1.2.5.14. Sequence Number (S Bits)
*Application: RACH
*The sequence number is for achieving highly efficient assembling of CPS considering retransmission (layer 1 retransmission) over the RACH between the MS and BTS.
*A range of the sequence number: 0–15.
*A CPS is assembled on the basis of the Sequence number and the CRC check result.
*The sequence number is "0" in the first radio unit of the CPSPDU.
*FIGS. 96A and 96B illustrate a flowchart of an assembling method of CPSPDU of a RACH using the W bits and S bits.

4.1.2.5.15. PD Portion
*Application: PCH.
*The PD portion includes PD1 and PD2, both of which can be used in the same manner.
*The PD portion is an identifier for instructing a mobile station about the presence and absence of incoming call information, and the necessity of receiving the BCCH. Transmitting the PD1 and PD2 at different timings enables the mobile station to improve the reception quality owing to the time diversity effect.
*An example of the bit arrangement is shown in Table 14.

TABLE 14

Bit structure of PD portion.

| Bits | Identification contents |
| --- | --- |
| all 0s | Incoming call information is absent and BCCH reception is unnecessary. |
| all 1s | Incoming call information is present or BCCH reception is necessary. |

4.1.2.5.16. Maximum Length of CPSSDU
*The maximum length of the CPSSDU is LCPS regardless of the types of the logical channels. The LCPS is set as one of the system parameters.

4.1.3. Transmitting and Receiving Timings of the Base Station

*FIGS. 85–88 illustrate concrete examples of the transmitting and receiving timings of radio frames along with long code phases for each physical channel, when the chip rate is 4.096 Mcps.

*The BTS generates a reference frame timing (BTS reference SFN) from a transmission path.

*The transmitting and receiving timings of various physical channels are established as timings that are offset from the BTS reference SFN. Table 15 shows the offset values of the radio frame transmitting and receiving timings of the physical channels.

*The BTS reference long code phase is determined such that the long code phase becomes zero at the first chip of the frame whose timing corresponds to BTS reference SFN=0.

*The long code phase of various physical channels are established at phases that are offset with respect to the BTS reference long code phase. The offset values of the long code phases of the physical channels are also shown in Table 15.

SFN of the perch channel. The correspondence between the SFN and FN are also shown in FIGS. 85–88.

*The offset values $T_{SECT}$, $T_{DHO}$, $T_{CCCH}$, $T_{FRAME}$ and $T_{SLOT}$ will be described here.

$T_{SECT}$

*Offset values $T_{SECT}$s vary from sector to sector. (Although they are synchronized between sectors within the base station, they are asynchronous between base stations).

*Each $T_{SECT}$ is applied to all the physical channels in the sector.

*The range of their values, which are represented in terms of chips, is within a slot interval.

*The long code phases of the forward dedicated physical channels are all aligned with the offset values $T_{SECT}$s in order to reduce the interfering amount due to forward link orthogonalization.

*A mobile station can recognize, if it receives the long code mask symbol, the long code phase (corresponding to $T_{SECT}$), and hence can carry out transmission and reception using it.

*Varying the offset values $T_{SECT}$s between the sectors makes it possible to prevent the long code mask symbols from

TABLE 15

Offset values (in terms of chips) of
Transmitting and receiving timings of physical channels.

| Physical channels | Transmitting and receiving timings of radio frames | Long code phases |
|---|---|---|
| Perch channel | $T_{SECT}$ | $T_{SECT}$ |
| Forward common control physical | $T_{SECT} + T_{CCCH}$ | $T_{SECT}$ |
| Forward dedicated physical channel (during non-DHO) | $T_{SECT} + T_{FRAME} + T_{SLOT}$ | $T_{SECT}$ |
| Forward dedicated physical channel (during DHO) | $T_{SECT} + <T_{DHO}>^{*1} - 320 \times C^{*2}$ | $T_{SECT}$ |
| Reverse common control physical channel (RACH) | (1) $T_{SECT} + T_{CCCH}$<br>(2) $T_{SECT} + T_{CCCH} + 2560 \times C$<br>(3) $T_{SECT} + T_{CCCH} + 5120 \times C$<br>.<br>.<br>.<br>(16) $T_{SECT} + T_{CCCH} + 7680 \times C$ | (1) $T_{SECT} + T_{CCCH}$<br>(2) $T_{SECT} + T_{CCCH} + 2560 \times C$<br>(3) $T_{SECT} + T_{CCCH} + 5120 \times C$<br>.<br>.<br>.<br>(16) $T_{SECT} + T_{CCCH} + 7680 \times C$ |
| Reverse dedicated physical channel (during non-DHO) | $T_{SECT} + T_{FRAME} + T_{SLOT} + 320 \times C$ | $T_{SECT}$ |
| Reverse dedicated physical channel (during DHO) | $T_{SECT} + T_{DHO}$ | $T_{SECT} + T_{DHO} - T_{FRAME} - T_{SLOT} - 320 \times C$ |

*1< > denotes that $T_{DHO}$ which is represented in terms of chips is round down into a symbol based representation.
*2 340 × C equals the number of chips corresponding to 1/2 slot. Thus, C has different values depending on chip rates: C = 1, 4, 8, 16 for chip rates = 1.024, 4.096, 8.192 and 16.384 Mcps, respectively.

*Although the physical channels other than the perch channel are not provided with the SFN, all the physical channels consider the frame number (FN) corresponding to the SFN of the perch channel. The FN, which is not present physically in a transmitted signal, is generated in a mobile station and the base station for respective physical channels in accordance with the predetermined correspondence with the SFN of the perch channel. The correspondence between the SFN and FN are also shown in FIGS. 85–88.

taking place at the same timing, thereby enabling each mobile station to select its cell appropriately.

$T_{CCCH}$

*Each $T_{CCCH}$ is an offset value for a radio frame timing of the common control physical channel.

*It can be set for each common control physical channel.

*This serves to reduce the occurrence frequency of the matching of transmission patterns between a plurality of common control physical channels in the same sector, thereby making uniform the forward direction interfering amount.

*The range of its value, which is represented in terms of symbols, is within the slot interval. Although its value is designated in terms of chips, the value is round down to a symbol unit of the common control physical channel to be used for the offset.

$T_{FRAME}$

*The $T_{FRAME}$ is an offset value for the radio frame timing of the dedicated physical channel.
*It can be set separately for each dedicated physical channel.
*The base station determines the $T_{FRAME}$ at a call setup, and notifies the mobile station of it. The reverse link transmission is also carried out using this offset value.
*Because all the processings in the base station is carried out in synchronism with the offset value, there occurs no delay in the processings.
*It serves for the purpose of making uniform (random) the transmission traffic, thereby improving the efficiency of wire ATM transmission.
*Its value is represented in terms of slots (0.625 ms), and its range is within one radio frame.

$T_{SLOT}$

*The $T_{SLOT}$ is an offset value for the radio frame timing of the dedicated physical channel.
*It can be set separately for each dedicated physical channel.
*It serves to prevent the transmission pattern matching, and thereby making the interference uniform.
*The range of its value which is represented in terms of symbols is within the slot interval. Although its value is designated in terms of chips, the value is round down to a symbol unit of the common control physical channel, and the rounded down value is used for the offset.

$T_{DHO}$

*The $T_{DHO}$ is an offset value for the radio frame timing of the dedicated physical channel and for the reverse link long code phase.
*It corresponds to a measured value by a mobile station of the timing difference between the reverse direction transmitting timing of the mobile station and the received timing by the mobile station of the perch channel of the DHO destination station.
*The range of its value which is represented in terms of chips is within the reverse long code phase range ($0-2^{16}-1$).
*Although in the base station (BTS) the received timings of the reverse physical channels approximately agree with those of Table 15, they actually fluctuate owing to propagation delay between the mobile stations and the base station and to the variations of the propagation delays. The base station (BTS) receives with canceling these fluctuations by means of buffers or the like.
*The radio frame timing of the dedicated physical channel of a reverse link is delayed by half a slot interval as compared with that of a forward link. Thus, the delay of the transmission power control becomes one slot interval, thereby reducing control errors. More specific setting scheme of the timing differences are illustrated in FIGS. 85–88.
*With regard to the reverse common control physical channel (RACH).
*The radio frame timing of the RACH is offset from that of the corresponding forward common control physical channel. The offset value has four steps at time slot intervals.
*The initial position of a radio frame is aligned with the initial value of the long code phase. Thus, the long code phase has four offset values, as well.

*A mobile station can transmit by selecting any one of the four offset timings. The BTS can always receive the RACHs simultaneously which are transmitted at all the offset timings.

4.1.4. Spreading Code
4.1.4.1. Generating Method
4.1.4.1.1. Forward Long Code

*A forward long code consists of the Gold codes using M sequences obtained from the following generator polynomials.

(Shift register 1) $X^{18}+X^{7}+1$ (Shift register 2) $X^{18}+X^{10}+X^{7}+X^{5}+1$

Figure 18:
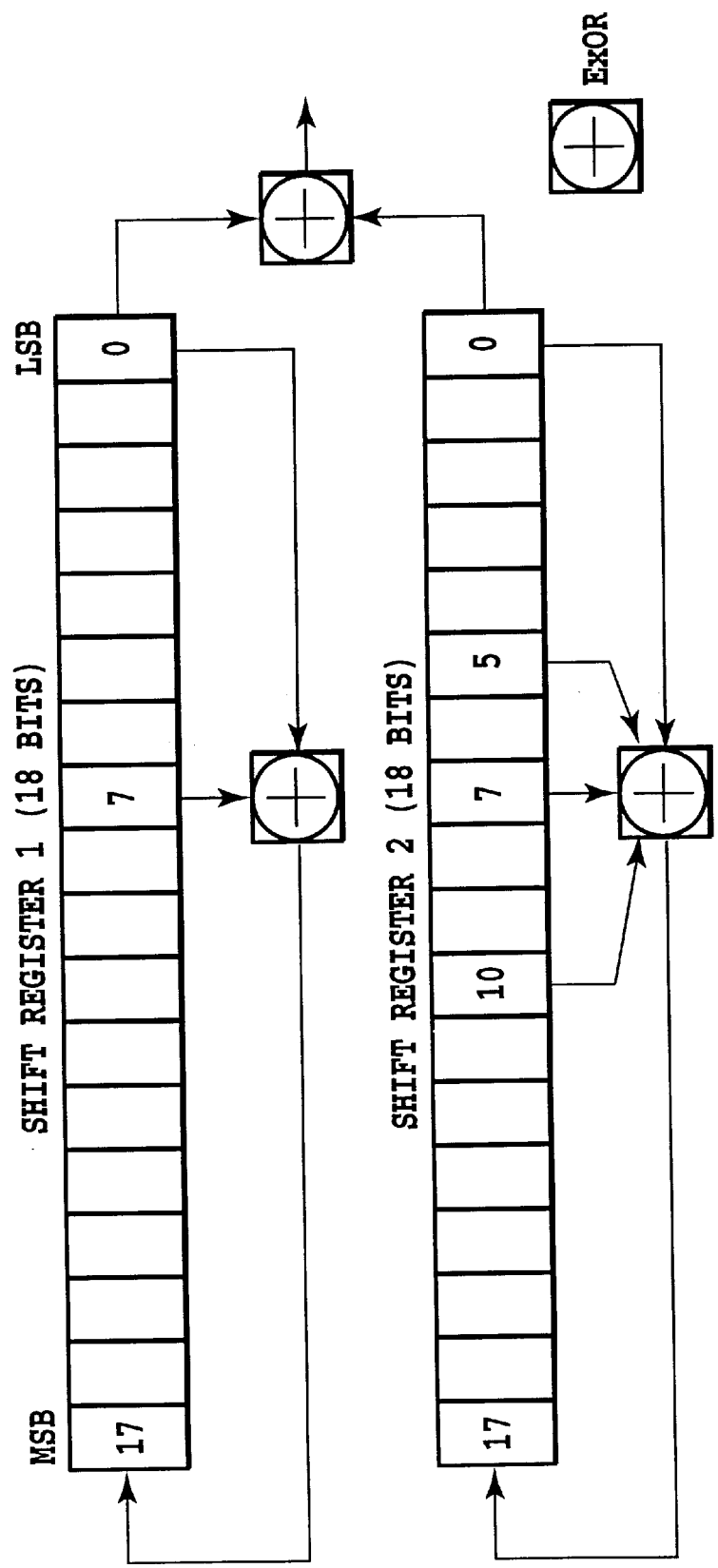
FIG. 18 is a block diagram showing a configuration of a forward long code generator.

*A configuration of a forward long code generator is shown in FIG. 18.
*The initial state of a long code number value is defined as a state in which the value of the shift register 1 represents that long code number, and the value of the shift register 2 is set at "all 1s". Thus, the range of the long code number is 00000h–3FFFFh. The MSB of the long code number is first input to the leftmost bit of the shift register 1 of the generator of FIG. 18.
*The forward long code has a period of one radio frame interval. Accordingly, the output of the long code generator is truncated at 10 ms so that it repeats the pattern from phase 0 to the phase corresponding to 10 ms. Thus, the range of the phase varies as shown in Table 16 in accordance with the chip rate. In addition, as will be described later in 4.1.5.3., the phase of the inphase component of the long code is shifted from that of the quadrature component by an amount of "shift", which makes it possible to differentiate the inphase component from the quadrature component. Table 16 shows the phases of the two components when the "shift" is set at 1024.
*The long code generator can implement a state in which its phase is shifted from the initial state by an amount of any integer multiple of a clock period.

TABLE 16

Correspondence between chip rates and ranges of the phase of a forward long code.

| Chip rates (Mcps) | Ranges of the phase (chips) | |
|---|---|---|
| | Inphase component | Quadrature |
| 1.024 | 0~10239 | 1024~11263 |
| 4.096 | 0~40959 | 1024~41983 |
| 8.192 | 0~81919 | 1024~82943 |
| 16.384 | 0~163839 | 1024~164863 |

4.1.4.1.2. Reverse Long Code

*A reverse long code is one of the Gold codes using M sequences obtained from the following generator polynomials.

(Shift register 1) $X^{41}+X^{3}+1$ (Shift register 2) $X^{41}+X^{20}+1$

Figure 19:
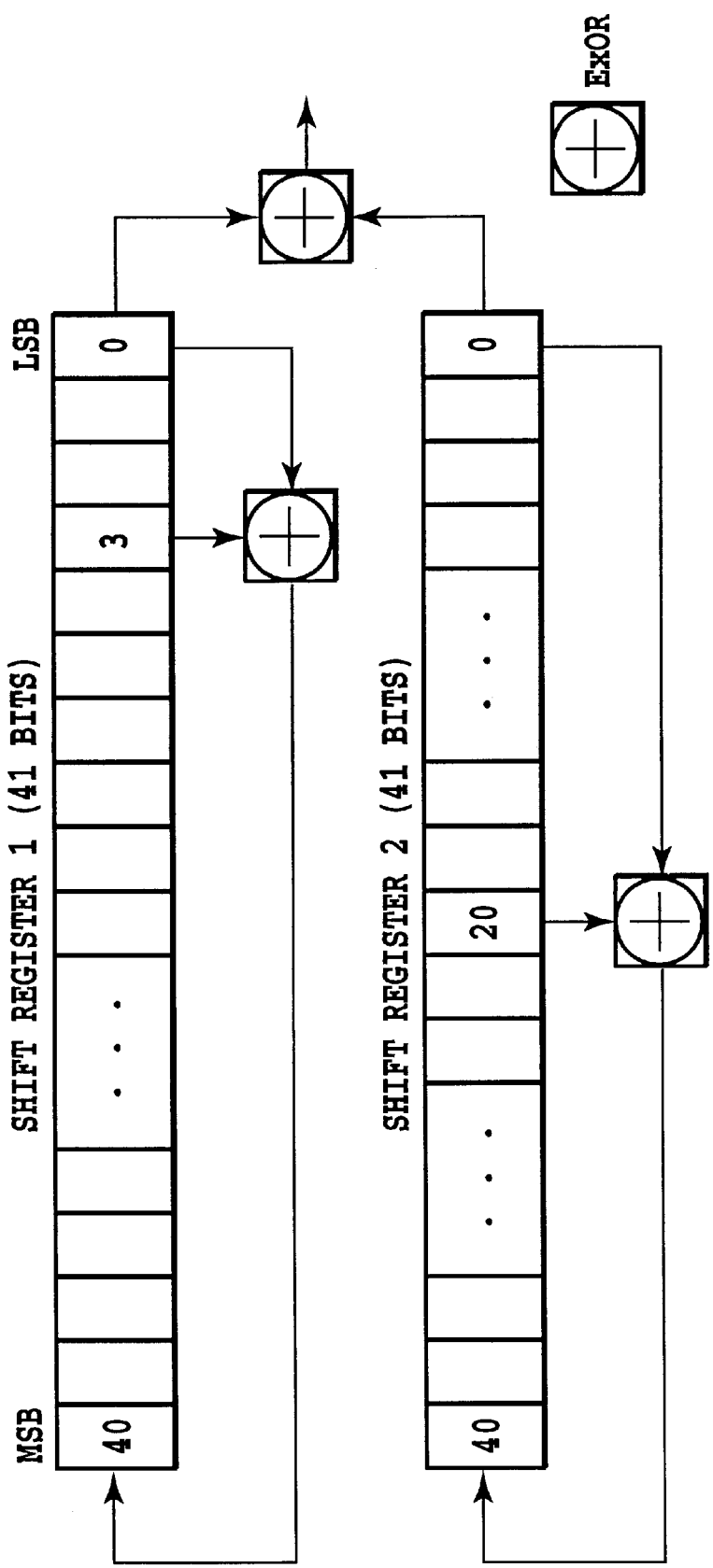
FIG. 19 is a block diagram showing a configuration of a reverse long code generator.

*A configuration of a reverse long code generator is shown in FIG. 19.
*The initial state of a long code number is defined as a state in which the value of the shift register 1 equals that long code number, and the value of the shift register 2 is set at "all 1s". Thus, the range of the long code number is 00000000000h–1FFFFFFFFFFh. The MSB of the long code number is first input to the leftmost bit of the shift register 1 of the generator of FIG. 19.

*The reverse long code has a period of $2^{16}$ radio frame intervals (that is, $2^{10}$ super frame intervals). Accordingly, the output of the long code generator is truncated at $2^{16}$ radio frame intervals so that it repeats the pattern from phase 0 to the phase corresponding to $2^{16}$ radio frame intervals. Thus, the range of the phase varies as shown in Table 17 in accordance with the chip rate. In addition, as will be described later in 4.1.5.3., the phase of the inphase component of the long code is shifted from that of the quadrature component by an amount of "shift". Table 17 shows the phases of the two components when the "shift" is set at 1024.

*The long code generator can implement a state in which its phase is shifted from the initial state by an amount of any integer multiple of the clock period.

TABLE 17

Correspondence between chip rate and ranges of the phase of a reverse link long code.

| Chip rates (Mcps) | Ranges of the phase (chips) | |
|---|---|---|
| | Inphase component | Quadrature component |
| 1.024 | 0~$2^{16}$ × 10240 − 1 | 1024~$2^{16}$ × 10240 + 1023 |
| 4.096 | 0~$2^{16}$ × 40960 − 1 | 1024~$2^{16}$ × 40960 + 1023 |
| 8.192 | 0~$2^{16}$ × 81920 − 1 | 1024~$2^{16}$ × 81920 + 1023 |
| 16.384 | 0~$2^{16}$ × 163840 − 1 | 1024~$2^{16}$ × 163840 + 1023 |

4.1.4.1.3. Short Code
4.1.4.1.3.1. Short Code for Symbols Other Than the Long Code Mask Symbols

*The following layered orthogonal code sequences are used for the symbols of all the physical channels except for the perch channels, and for the symbols other than the long code mask symbols of the perch channels.

*A short code consisting of the layered orthogonal code sequences is designated by a code class number (Class) and a code number (Number). The period of the short code varies for each short code class number.

*FIG. 20 illustrates a generating method of the short codes which are each represented as $C_{Class}$ (Number).

*The period of the short codes equals the period of a symbol. Therefore, if the chip rate (spread spectrum bandwidth) is the same, the short code period varies in accordance with the symbol rate, and the number of usable short codes also varies in accordance with the symbol rate. The relationships of the symbol rate with the short code class, short code period and short code number are shown in Table 18.

*The short code numbering system is composed of the code class and code number, which are represented by 4 bits and 12 bits in the binary notation, respectively.

*The short code phase is synchronized with the modulation and demodulation symbols. In other words, the first chip of each symbol corresponds to the short code phase =0.

TABLE 18

| Symbol Rate (ksps) | | | | Short code | | |
|---|---|---|---|---|---|---|
| chip rate = 1.024 Mcps | 4.096 Mcps | 8.192 Mcps | 16.384 Mcps | Short code class | period (chips) | Number of short codes |
| 256 | 1024 | | | 2 | 4 | 4 |
| 128 | 512 | 1024 | | 3 | 8 | 8 |
| 64 | 256 | 512 | 1024 | 4 | 16 | 16 |
| 32 | 128 | 256 | 512 | 5 | 32 | 32 |
| 16 | 64 | 128 | 256 | 6 | 64 | 64 |
| — | 32 | 64 | 128 | 7 | 128 | 128 |
| — | 16 | 32 | 64 | 8 | 256 | 256 |
| — | — | 16 | 32 | 9 | 512 | 512 |
| — | — | — | 16 | 10 | 1024 | 1024 |

4.1.4.1.3.2. Short Codes for Long Code Mask Symbols

*Apart from the other symbols, the long code mask symbols of the perch channels use as their short codes the orthogonal Gold codes using M sequences which are obtained from the following generator polynomials.

(Shift register 1) $X^6+X^4+X^3+X^2+1$ (Shift register 2) $X^6+X^6+X^5+X^3+1$

Figure 21:
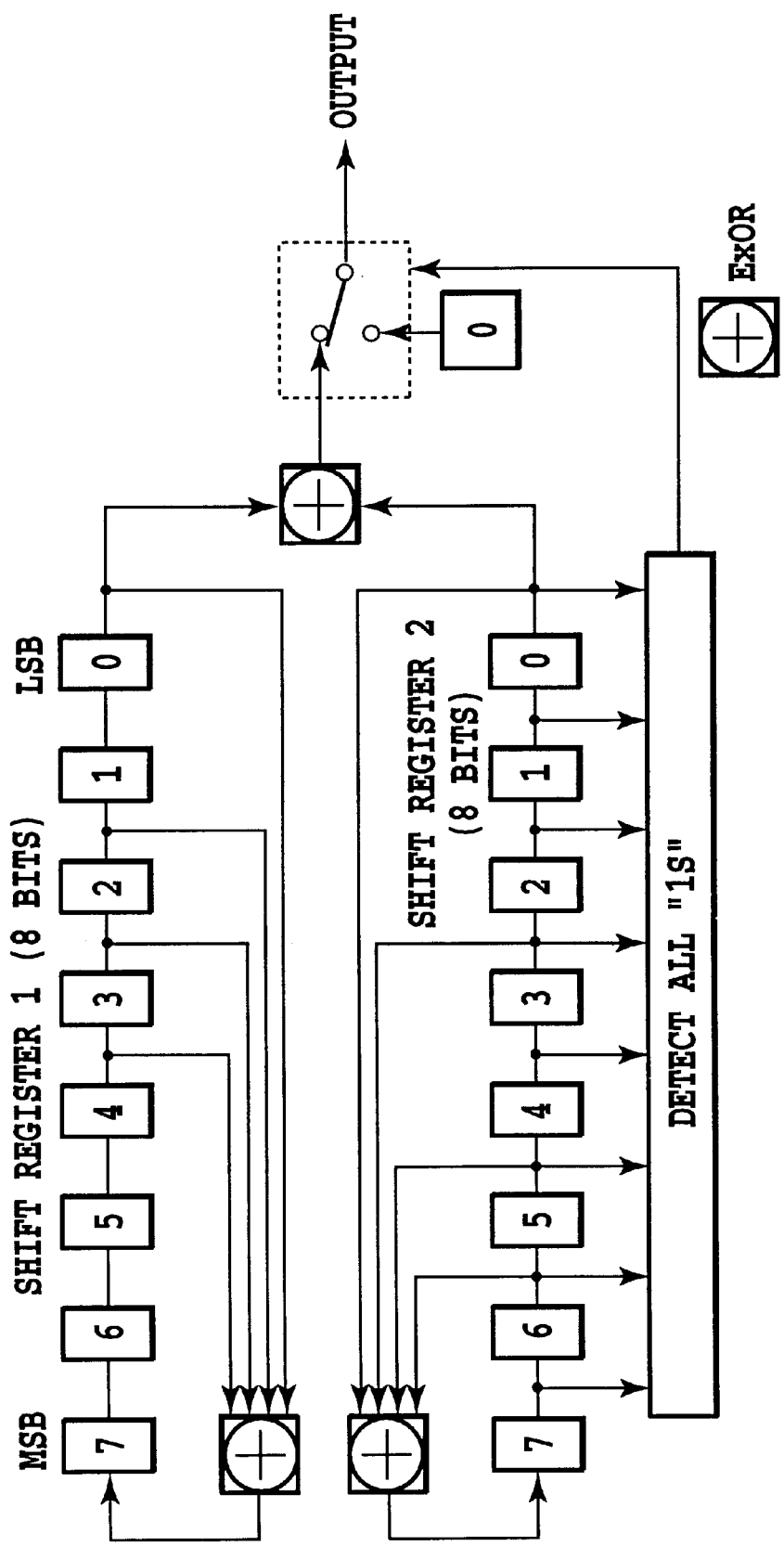
FIG. 21 is a block diagram showing a configuration of a short code generator for a long code mask symbol.

*FIG. 21 shows a configuration of a short code generator for the long code mask symbols.

*The initial value of the shift register 1 is a short code number $N_{LMS}$ (value range: 0–255) for the long code mask symbol. The MSB of the number $N_{LMS}$ is first input in the leftmost bit of the shift register 1.

*The initial value of the shift register 2 is "all 1s".

*If "all 1s" of the shift register 2 is detected, the shift operation is halted and "0" is inserted.

*The first chip of the short code output becomes 0.

*The period of the short code is one symbol interval (256 chips) of the perch channel.

4.1.4.2. Allocation Method of Spreading Codes
4.1.4.2.1. Forward Long Code

*In the system operation, all the sectors in a cell share a common single long code number allocated thereto. In the system configuration, different long code numbers can be allocated to respective sectors. The long code number is designated.

*With respect to the forward long codes used in the various forward physical channels which are transmitted in the sector, the same long code number is used by the entire physical channels.

*Concerning the long code phase, see 4.1.3.

4.1.4.2.2. Reverse Long Code

*A long code number is allocated to each reverse link physical channel. The long code number is designated.

*Dedicated physical channels into which the TCH, ACCH and UPCH are mapped use the reverse link long code allocated to each mobile station. Dedicated physical channels, into which the other logical channels are mapped, and a common physical channel use the reverse link long code allocated to each base station.

*About the long code phases, see 4.1.3.

4.1.4.2.3. Short Codes

4.1.4.2.3.1. Short Codes for Physical Channels Other Than the Perch Channels

*These short codes are allocated to each forward/reverse link physical channel. The short code numbers are designated. In terms of the system configuration, the same short code number is simultaneously usable in the same sector.

4.1.4.2.3.2. A Short Code for the Perch Channel

*A short code number for symbols on the first perch channel other than the long code mask symbols is common to all the cells, which is $C_8(0)$. (However, any short code designated is usable for the first perch channel).

*A short code number for the long code mask symbols of the first perch channel is common to all the cells, which is $N_{LMS}=1$. (However, any short code number $N_{LMS}$ designated for the long code mask symbol is usable for the long code mask symbol of the first perch channel).

*As a short code number for long code mask symbol of the second perch channel, one of the short codes that are assigned to the system in advance is used for each sector. The short code numbers of these short codes are stored in the BSC (base station control center) and mobile stations. (However, any short code for the long code mask symbol designated is usable for the second perch channel).

*The short code number for the long code mask symbol of the second perch channel has one to many correspondence with the forward long codes used in the same sector. Examples of the correspondence are shown in Table 19. The correspondence is stored in the BSC and mobile stations. (However, any short code for the long code mask symbol and any forward long codes which are designated for the second perch channel are usable in the same sector).

TABLE 19

Examples of the correspondence of the short codes for the second perch channel with the forward link long codes.

| Short code numbers $N_{TPC}$ for long code mask symbols on the second perch channel | Forward long codes |
| --- | --- |
| 2 | 0 0 0 0 1 h~0 0 0 2 0 h |
| 3 | 0 0 0 2 1 h~0 0 0 4 0 h |
| 4 | 0 0 0 4 1 h~0 0 0 6 0 h |
| 5 | 0 0 0 6 1 h~0 0 0 8 0 h |

4.1.5. A Generating Method of a Spread Spectrum Modulation Signal

4.1.5.1. Spread Spectrum Modulation Scheme

Forward/reverse link: QPSK (BPSK is applicable, as well).

4.1.5.2. Allocation Method of Short Codes

*In accordance with the designated short code numbering system (code class number, Class; and code number, Number), the same short code is assigned as the inphase short code SCi and the quadrature short code SCq. In other words, $SCi=SCq=C_{class}$ (Number).

*Different short code numbering systems are assigned to the forward and reverse links, respectively. Accordingly, the forward and reverse links can use different short codes.

4.1.5.3. An Allocation Method of the Long Codes

*A long code number LN: Assuming that the output value of the long code generator is $G_{LN}$(Clock) at the time when the shift registers 1 and 2 of the long code generator are shifted by the clock shift number Clock from the initial value 0 (in which the long code number is set in the shift register 1, and all 1s are set in the shift register 2), the inphase output value LCi(PH) and the quadrature output value LCq(PH) of the long code generator at the long code phase PH shown in FIGS. 85–88 are as follows for both the forward and reverse links.

$LCi(PH)=G_{LN}(PH)$ $LCq(PH)=G_{LN}(PH+\text{Shift})$ (=0, in $BPSK$)

*About the ranges of the inphase and quadrature long code phases, see 4.1.4.1.

4.1.5.4. A Generating Method of a Long Code+Short Code

Figure 22:
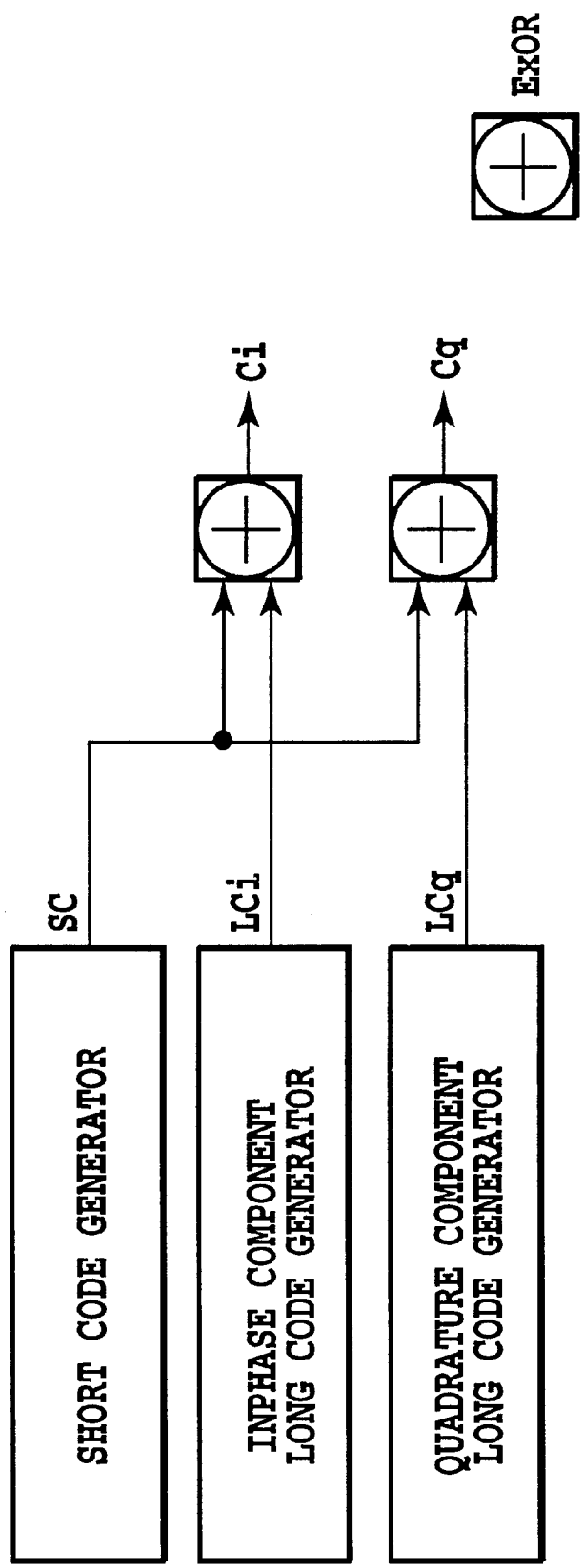
FIG. 22 is a block diagram showing a spreading code generating method using a long code and short code.

FIG. 22 illustrates a generating method of an inphase spreading code Ci and a quadrature spreading code Cq using a long code and short code.

4.1.5.5. A Configuration of a Spreader

Figure 23:
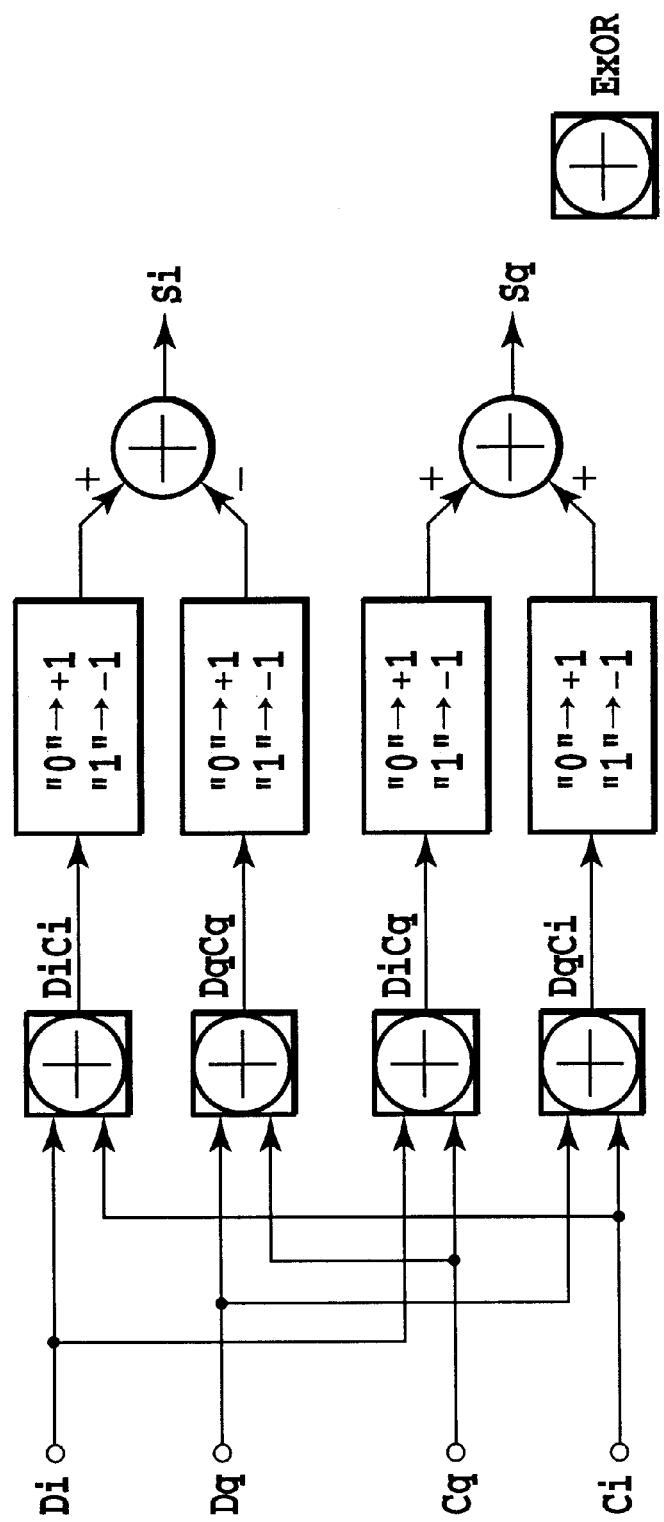
FIG. 23 is a block diagram showing a configuration of a spreader.

FIG. 23 shows a configuration of a spreader for generating the inphase component Si and quadrature component Sq of a spread signal by spreading the inphase component Di and quadrature component Dq of the transmitted data with the spreading codes Ci and Cq.

4.1.6. Random Access Control

Figure 24:
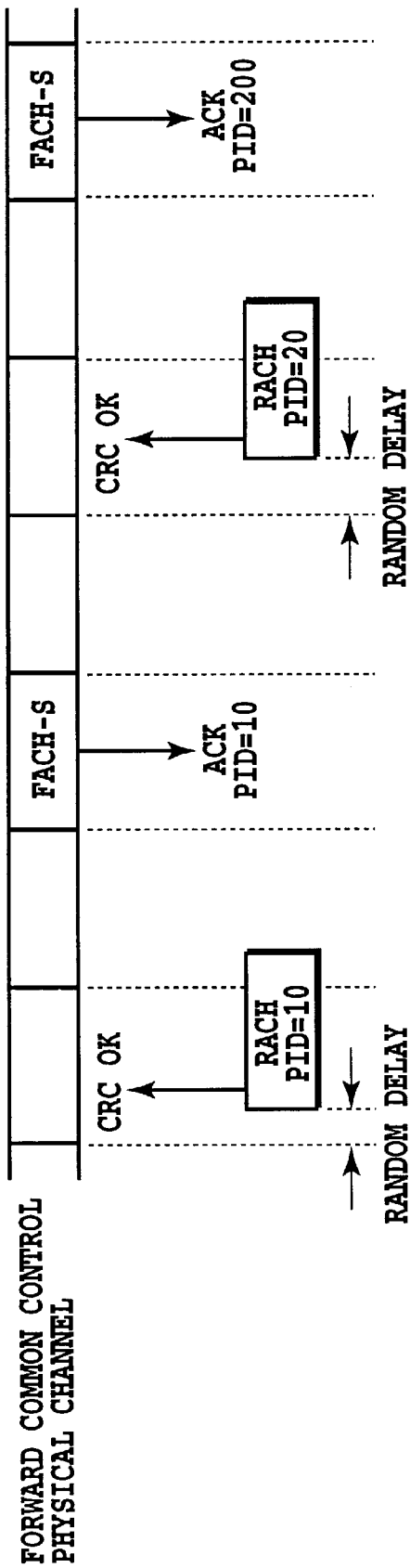
FIG. 24 is a diagram illustrating a random access transmission scheme.

*FIG. 24 illustrates a random access transmission scheme.

*A mobile station transmits a RACH at a timing which are randomly delayed from the received frame timing of the forward common control channel. The random delay amount is one of the 16 offset timings as shown in FIGS. 85–88. The mobile station randomly selects one of the offset timings each time it sends the RACH.

*One radio frame is transmitted for each transmission of the RACH.

*Detecting the RACH with which the CRC result for each internal encoding unit is correct, the base station transmits, using the ACK mode of the FACH-S, the PID of that RACH in the FACH radio frame following the FACH radio frame that is being transmitted at the detection timing of the RACH.

*The mobile station transmits, after receiving the ACK for the current radio frame over the ACK mode FACH-S, the next radio frame, in the case where multiple RACH radio frames to be transmitted are present.

*The mobile station uses, when one piece of CPS information to be transmitted consists of a plurality of RACH radio units, the same PID value for all these RACH radio units. In addition, it uses one of the RACH-L and RACH-S, inhibiting mixed use of them for the transmission of the one piece of the CPS information.

*The mobile station retransmits the RACH in a case where it cannot receive over the ACK mode FACH-S the PID value of the RACH it transmitted even if TRA msec has passed after the transmission of the RACH. In this case, it uses the same PID value. The maximum number of retransmissions is NRA (Thus, the same RACH radio unit can be transmitted NRA+1 times at the maximum including the first transmission).

*The ACK mode of the FACH-S can contain up to seven PIDs of the RACHs with which the detection result of the CRC is correct.

*If any RACH is present with which the base station detects that the CRC is correct and to which it has not yet sent back the ACK by the time immediately before the transmission of the FACH radio frame, the base station transmits the ACK mode FACH-S over the first FACH in the order of received timings of the RACHs with which the CRC is correct. However, those RACHs with which TACK msec has elapsed after detecting the correct CRC are excluded from those to be transmitted over the ACK mode FACH-S.

4.1.7. Multicode Transmission

*The multicode transmission is carried out as follows when a designated single RL-ID consists of a plurality of dedicated physical channels (spreading codes), so that the pilot coherent detection and transmission power control are carried out in common to all the dedicated physical channels in the single RL-ID. When a plurality of RL-IDs are assigned to a single mobile station, the pilot coherent detection and transmission power control are carried out for each RL-ID.

*The frame timings and long code phases are aligned in all the physical channels in the single RL-ID.

*One or both of the following two transmission methods of the pilot symbols and TPC symbols are used so as to improve the coherent detection characteristics and to reduce the error rate of the TPC symbols.

EXAMPLE 1

Figure 25:
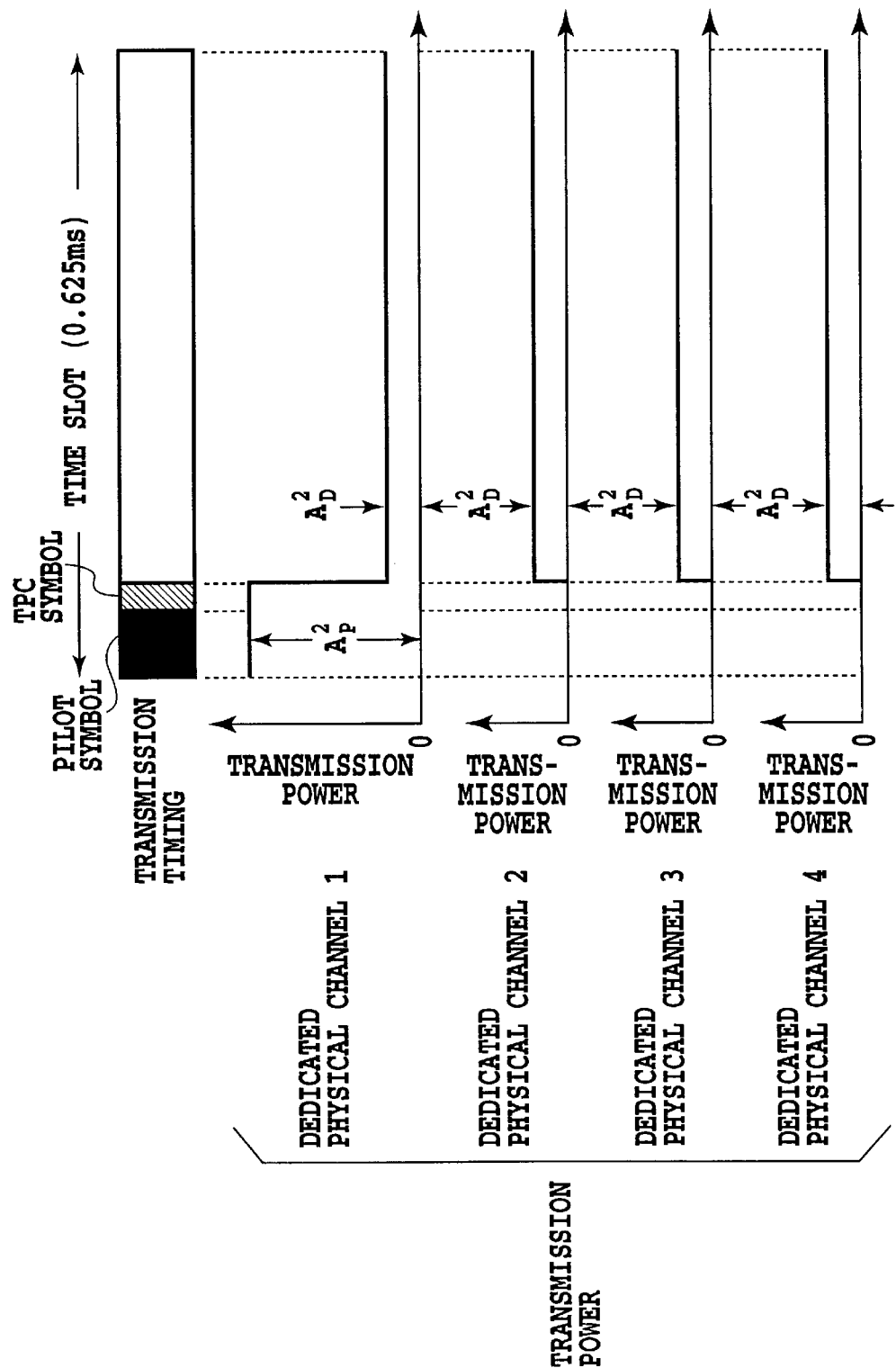
FIG. 25 is a diagram illustrating an example of a multi-code transmission method.

(See, FIG. 25)

*The pilot symbols and TPC symbol are transmitted through one of the plurality of dedicated physical channels in the single RL-ID.

*The pilot symbols and TPC symbol are not transmitted through the other dedicated physical channels.

*The pilot symbols and TPC symbol are transmitted through that one dedicated physical channel at the transmission power a few times greater than the transmission power at which symbols other than the pilot symbols and TPC symbol are transmitted through the dedicated physical channels in the RL-ID.

*The amplitude ratio of the transmission power of the pilot symbols and TPC symbol (pilot portion) to that of the data symbol section (data portion) has an optimum value in terms of capacity that minimizes Eb/Io. This is because there is a tradeoff between the fact that the channel estimation accuracy is degraded when the amplitude of the pilot portion is reduced, and the fact that the overhead is increased when the amplitude of the pilot portion is increased.

Figure 26:
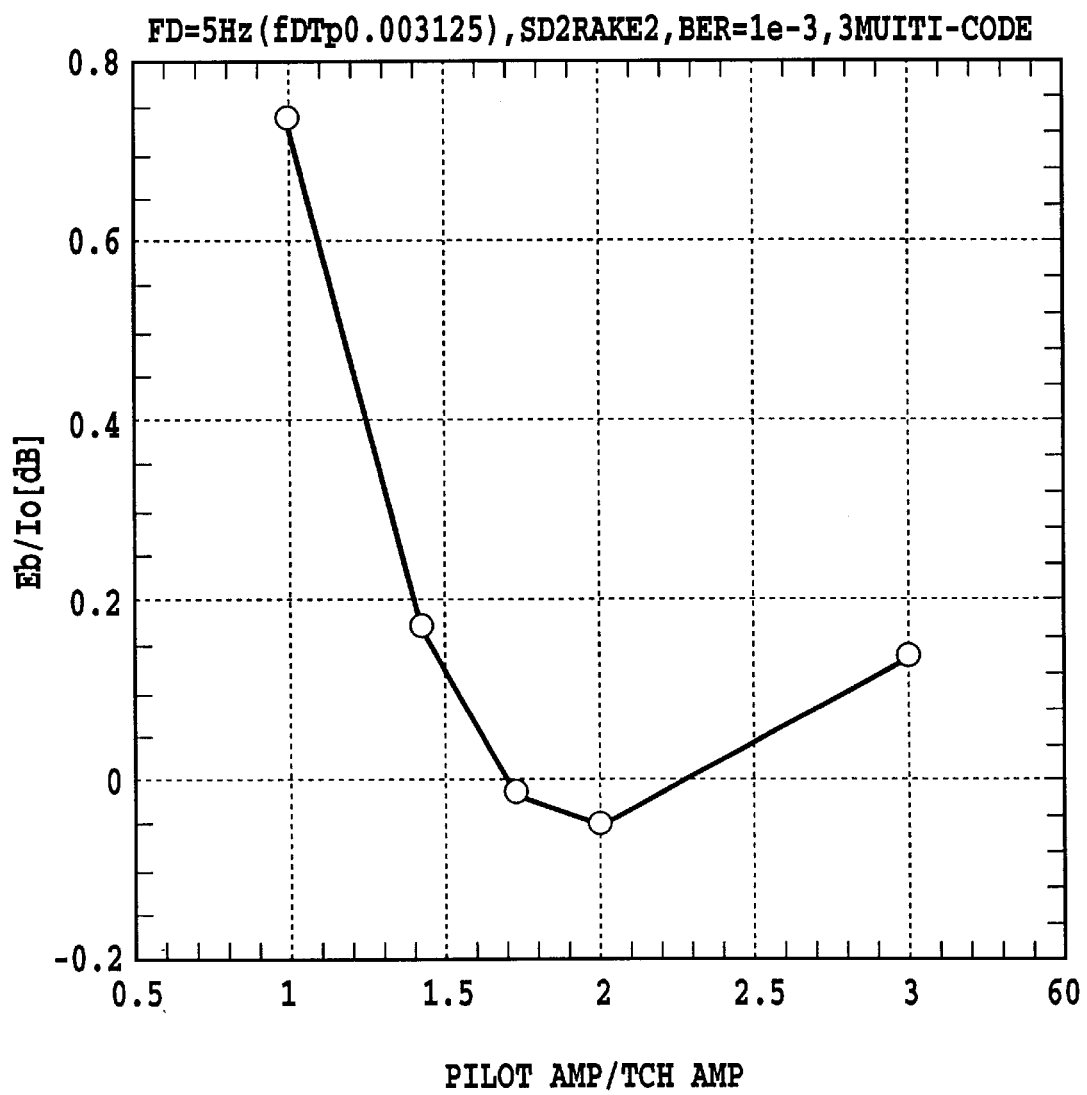
FIG. 26 is a graph illustrating simulation results of multicode transmission.

FIG. 26 illustrates a simulation result of the optimum value estimation of the amplitude ratio of the two transmission powers.

In FIG. 26, the horizontal axis represents the ratio of the amplitude (AP) of the transmitted wave of the pilot portion to the amplitude (AD) of the transmitted wave of the data portion, which are designated in FIG. 25 by AP and AD, respectively (in FIG. 25, they are represented as the squares $AP^2$ and $AD^2$ of the amplitudes because the vertical axis of FIG. 25 represents the transmission power). The vertical axis of FIG. 26 represents the required Eb/Io as in FIGS. 5 and 6. The required quality is $BER=10^{-3}$, and the multicode number is three.

The simulation result in FIG. 26 shows that the optimum value in terms of capacity is obtained when the amplitude AP is twice the amplitude AD. Considering this from the viewpoint of the transmission power ratio, the total transmission power of the data portions of all the physical channels becomes $3AD^2$ in the case of the three multicode transmission, and the transmission power of the pilot portion becomes $AP^2=(2AD)^2=4AD^2$. Thus, the optimum transmission power ratio is obtained when the transmission power of the pilot portion is 4/3 times that of the data portion.

As described above, there is an optimum value of the transmission power ratio between the pilot portion and the data portion, and the optimum value varies depending on the number of the multicodes. Accordingly, the transmission power ratio between the pilot portion and the data portion is made variable.

*The dedicated physical channel for transmitting the pilot symbols and TPC symbol are designated.

EXAMPLE 2

Figure 27:
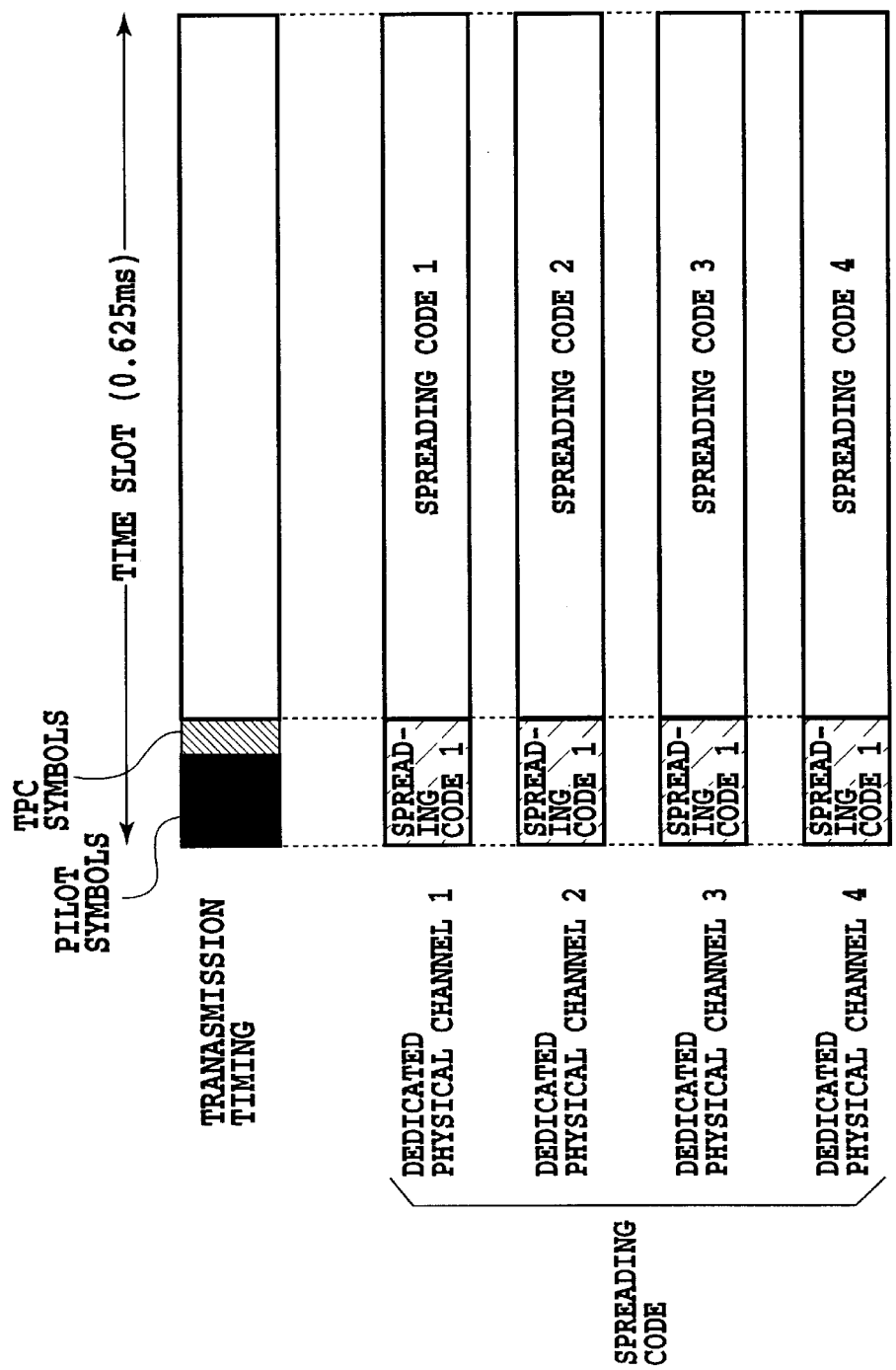
FIG. 27 is a diagram illustrating an example of the multicode transmission method.

(See, FIG. 27)

*In all the dedicated physical channels in the single RL-ID, only the pilot symbol and TPC symbol section uses a short code a particular dedicated physical channel uses.

*The particular dedicated physical channel is designated.

*The pilot portions are added in the same phase when they are spread by the same short code, achieving the same effect as when the transmission is carried out with increased transmission power.

4.1.8. Transmission Power Control

FIGS. 89–94 show transmission patterns of the respective physical channels.

4.1.8.1. Perch Channels

*The first perch channel is transmitted continuously at designated transmission power PP1 except for the long code mask symbol contained in each time slot.

*Through the first perch channel, the long code mask symbol contained in each time slot is transmitted at the transmission power lower than PP1 by a designated value Pdown.

*The first perch channel is always transmitted in the above-mentioned method regardless of the presence or absence of the transmission information of the BCCH1 and BCCH2 which are mapped into the first perch channel. If the transmission information is not present, an idle pattern (PN pattern) is transmitted.

*Through the second perch channel, only the long code mask symbol contained in each time slot is transmitted without transmitting the other symbols.

*The long code mask symbol of the second perch channel is transmitted at the same time as the long code mask symbol of the first perch channel. The transmission power is a designated value PP2, which is invariable.

*The values PP1, Pdown and PP2 are determined such that mobile stations located in contiguous sectors can make a sector identification.

4.1.8.2. Forward Common Control Physical Channels (FACHs)

*In a radio frame of both the FACH-L and FACH-S, in which no transmission information is present, the transmission is made OFF over the entire period of the radio frame including the pilot symbols.

*A radio frame of the FACH-L, which contains transmission information, is transmitted at a designated transmission power value PFL over the entire period of the radio frame. The transmission power level can be designated for each transmission information, which means that the transmission power level is variable from radio frame to radio frame, although it is fixed at the transmission power value PFL within each radio frame.

*If one or more of the four FACH-S'es in a radio frame bear transmission information, only the time slots of the FACH-S'es including the transmission information are transmitted at a designated transmission power level. The transmission power value is designated for each transmission information in "Normal mode" FACHs, which means that transmission power levels PFS1–PFS4 are variable from FACH-S to FACH-S in the radio frame.

*If all of the four FACH-S'es in a radio frame bear transmission information, the radio frame is transmitted over its entire period. The transmission power, however, is variable for each FACH-S.

*The transmission power of the "Ack mode" FACH-S is fixed at a designated transmission power PACK.

*In the time slots of the FACH-L or FACH-S that bears transmission information, those at both sides of a symbol section for a logical channel are designed such that they transmit pilot symbols without exception. Accordingly, if a time slot of a FACH that bears transmission information is followed by a time slot of a FACH that does not bear any transmission information, the latter time slot must send pilot symbols that are adjacent to the former time slot. The transmission power level of the pilot symbols is made equal to that of the former time slot.

*If two time slots of FACHs that bear transmission information are adjacent, the transmission power of the pilot symbols in the second time slot (that is, the pilot symbols adjacent to the first time slot) is placed at the level equal to the higher transmission power of the two time slots.

*The values PFL, PFS1–PFS4 are determined in accordance with the received SIR of the perch channel in a mobile station, which is included in the RACH.

4.1.8.3. Forward Common Control Physical Channel (for PCH)

*The two PD portions included in each group are always transmitted in all the groups. The transmission power is designated at a transmission power level PPCH.

*When transmitting the PD portion, pilot symbols are transmitted together with the PD portion of the time slot into which the PD portion is mapped, although the pilot symbols in the subsequent time slot are not transmitted.

*The I portion of each group is divided into four time slots (I1–I4), and only I portion of a group that contains incoming call information is transmitted. The I portions of the remaining groups without any incoming call information are not transmitted. The transmission power is designated at a transmission power level PPCH.

*The time slot, into which the I portion of the group including the incoming call information is mapped, is handled such that the pilot symbols are transmitted at both sides of the symbols for the logical channel without exception. Accordingly, if a time slot associated with the I portion of a group including incoming call information is followed by a time slot associated with the I portion of a group that does not bear any incoming call information, the latter time slot must send pilot symbols.

*The PPCH value is determined such that almost all the mobile stations in the sector can receive.

4.1.8.4. Reverse Common Control Physical Channels (RACHS)

*A reverse common control physical channel is transmitted from a mobile station only when transmission information takes place. It is transmitted on each radio frame unit basis.

*The transmission powers PRL and PRS of the RACH-L and RACH-S are determined by the mobile station in an open-loop system, and are fixed within a radio frame.

*To the final position of the radio frame, pilot symbols are added to be transmitted. The transmission power of the pilot symbols is the same as that of the preceding radio frame.

4.1.8.5. Forward Dedicated Physical Channel

*The transmission power control of the forward dedicated physical channel is carried out, regardless of the originating or terminating call connection or of the diversity handover, such that the transmission is started at a designated transmission power value PD during the initial set of the forward dedicated physical channel, and the transmission power is incremented at fixed intervals until the communication power level reaches a value PD. After that, the transmission power is further incremented at fixed intervals until the receiving synchronization of the reverse dedicated physical channel is established (see 5.2.1.2.2., for details). Until the receiving synchronization of the reverse dedicated physical channel has been established, and the decoding of the reverse TPC symbols becomes possible, the transmission is carried out continuously at the fixed transmission power PD.

*The value PD is determined in the same method as that of the FACH.

*When the receiving synchronization of the reverse dedicated physical channel has been established, and the decoding of the reverse TPC symbol becomes possible, high speed closed loop transmission power control is started in accordance with the decoded result of the TPC symbols.

*In the high speed closed loop transmission power control, the transmission power is controlled at a control step of 1 dB at every time slot interval in accordance with the decoded result of the TPC symbols. For details of the transmission power control method of the forward dedicated physical channel, see 5.2.1.1.

4.1.8.6. Reverse Dedicated Physical Channels

*In an originating or terminating call connection, a mobile station starts transmission of a reverse dedicated physical channel, after a receiving synchronization establishing process of the forward dedicated physical channel meets predetermined conditions. The transmission power level of the first time slot at the beginning of the transmission is determined in the open loop system as in the RACH, and the subsequent transmission power level of the time slots is determined by the high speed closed loop transmission power control in accordance with the decoded result of the TPC symbols in the forward dedicated physical channel. For more detailed information, see 5.2.1.1.

*In the diversity handoff, it is not necessary to establish any new reverse dedicated physical channel. The transmission power is controlled from time slot to time slot by the high speed closed loop transmission power control during the diversity handover. For more detailed information about the transmission power control method of the reverse dedicated physical channel, see 5.2.1.1.

4.1.9. DTX (Data Transmission Equipment) Control

The DTX control is applied only to the dedicated physical channels.

4.1.9.1. Dedicated Physical Channels for DTCH and ACCH 4.1.9.1.1. Transmission

*Only in the dedicated physical channels (32 ksps) for voice service, the transmission of symbols for a DTCH is made ON when voice information is present, and made OFF when no voice information is present. Examples of the transmission patterns are shown in FIG. 94.

*The pilot symbols and TPC symbol are always transmitted regardless of the presence and absence of the voice information and control information.

*The power ratio of the transmission power (Pon) while the transmission is ON to the transmission power (Poff) while the transmission is OFF meets the transmission ON/OFF ratio of the transmission characteristics of 5.1.1.

*The transmission ON/OFF patterns are identical in all the 16 time slots in a radio frame.

*The DTX control is carried out on a radio frame (10 msec) basis.

*The DTX is not carried out in the dedicated physical channels (equal to or greater than 64 ksps) for data transmission. They are always in a transmission ON state.

*The information for notifying of the presence and absence of the voice information and control information is not transmitted.

4.1.9.1.2. Reception

Table 20 shows methods of making decisions as to whether or not the voice information and the control information are present.

TABLE 20

Methods of deciding the presence and absence of voice information and control information

| Information type | Information is present | Information is absent |
|---|---|---|
| Voice information | CRC on a DTCH selection combining unit basis is correct; or a power ratio of the average received power of the pilot and TPC symbols to the average received power of the DTCH symbols is equal to or more than $P_{DTX}$ dB. | CRC on a DTCH selection combining unit basis is incorrect; and a power ratio of the average received power of the pilot and TPC symbols to the average received power of the DTCH symbols is equal to or less than $P_{DTX}$ dB. |
| Control information | CRC on an ACCH selection combining unit basis is correct. | CRC on an ACCH selection combining unit basis is incorrect. |

\*The average received power of the symbols in Table 20 is the average value of the received power of all the associated symbols in the radio frame.
\*The value $P_{DTX}$ (dB) is one of the system parameters.

4.1.9.2. Dedicated Physical Channels for SDCCHs

\*The transmission of symbols for the SDCCH is made ON when control information to be transmitted is present, and made OFF when no control information is present.
\*The pilot symbols and TPC symbol are always transmitted regardless of the presence and absence of the control information.
\*The power ratio of the transmission power (Pon) while the transmission is ON to the transmission power (Poff) while the transmission is OFF meets the transmission ON/OFF ratio of the transmission characteristics defined in 5.1.1.
\*The transmission ON/OFF patterns are identical in all the 16 time slots in a radio frame.
\*The DTX control is carried out on a radio frame (10 msec) basis.
\*A receiving side carries out the processing in accordance with the CPS-PDU assembling method as illustrated in FIGS. 95A and 95B. It is not necessary to make a decision as to whether the control information is present or not.

4.1.9.3. Dedicated Physical Channels for UPCHs

\*The transmission of symbols for a UPCH is made ON when control information or user information to be transmitted is present, and made OFF when neither of them is present.
\*The BTS has three modes about the pilot symbols and TPC symbol. The modes are designated.

Mode 1

\*The need for transmission is decided for each radio frame. The transmission of the entire pilot symbols and TPC symbol in a radio frame is halted if both the following conditions 1 and 2 are satisfied. The transmission of the entire pilot symbols and TPC symbol in the radio frame is restarted if the following condition 3 or 4 is detected.

Condition 1: FNDATA or more radio frames have passed after the control information or user information to be transmitted is completed.

Condition 2: Incorrect CRC results of received radio frames are continuously detected for FCRC or more radio frames.

Condition 3: Control information or user information to be transmitted takes place.

Condition 4: A correct CRC result of a received radio frame is detected.

\*A mobile station decides the transmission ON/OFF of the pilot symbols and TPC symbol using the presence and absence of the control information or user information to be transmitted in connection with the detection result of an out-of-sync.

\*When the control information or user information to be transmitted takes place after halting the transmission of the pilot symbols and TPC symbol, radio frames into which an idle pattern is inserted in advance are sent by FIDL frames, followed by the transmission of a radio frame into which the control information or user information to be transmitted is inserted. In this case, the pilot symbols and TPC symbol are also transmitted in the radio frames into which the idle pattern is inserted.

Mode 2

\*In a radio frame without the control information or user information, the pilot symbols and TPC symbol are transmitted in part of the slots.

\*One or more slots, which transmit the pilot symbols and TPC symbol in the radio frame without the control information or user information, are designated by a parameter $P_{freq}$ indicating the occurrence frequency of transmission. Table 21 shows the relationships between the parameter $P_{freq}$ and the slots that transmit the pilot symbols and TPC symbol.

TABLE 21

Relationships between $P_{freq}$ and slots that transmit pilot symbols and TPC symbol.

| $P_{freq}$ | Slot Nos. that transmit pilot and TPC symbols |
|---|---|
| 0 | All slots (slots Nos. 1–16) |
| 1 | 1,3,5,7,9,11,13 and 15 |
| 2 | 1,5,9 and 13 |
| 3 | 1 and 9 |
| 4 | 1 |
| 5 | No symbols are sent. |

\*The high speed closed loop transmission power control follows only the TPC symbols from the mobile station which are determined in accordance with the pilot symbols and TPC symbols the BTS transmits, and ignores the TPC symbols from the mobile station which are determined in accordance with the pilot symbols and TPC symbols the BTS does not transmit. Therefore, the transmission power control intervals vary depending on the $P_{freq}$ values.

Mode 3

\*The pilot symbols and TPC symbol are always transmitted regardless of the presence and absence of the control information and user information.

\*With regard to the pilot symbols and TPC symbol in the UPCH symbols and in the mode 1, the power ratio of the transmission power (Pon) while the transmission is ON to the transmission power (Poff) while the transmission is OFF meets the transmission ON/OFF ratio of the transmission characteristics defined in 5.1.1.

* The transmission ON/OFF patterns are identical in all the 16 time slots in a radio frame.
* The DTX control is carried out on a radio frame (10 msec) basis.
* A receiving side always carries out the processing in accordance with the CPS-PDU assembling method as illustrated in FIGS. 96A and 96B. It is not necessary to make a decision as to whether the control information or user information is present or not.

4.1.10. A Bit Transmission Method
* CRC bits are sent from the higher to lower order bits.
* The TCH is transmitted in the input order.
* The tail bits transmitted are all "0s".
* Dummy bits consist of "1s".
* The dummy bits are included in the CRC encoding.
* An idle pattern is inserted into the entire CRC encoded fields (shadowed portions in FIGS. 64A, 64B, 84A and 84B) on a selection combining unit or internal encoding unit basis. These fields include the CRC checking bits, as well. The idle pattern consists of any PN pattern, and the same pattern is used in common to all the internal encoding units or selection combining units of each logical channel. In addition, the idle pattern is arranged such that it causes an incorrect CRC result when no error takes place in the received side.

4.1.11. Paging Control 4.1.11.1. The Operation of a Base Station (BTS)
* Mobile stations are divided into groups in a predetermined manner, and are subject to paging on a group by group basis.
* The BTS carries out the grouping, and designates the corresponding group number using the paging information containing the identification number of a called mobile station. The BTS transmits the paging information using the I portions (I1–I4) of the PCH of the designated group number.
* The BTS places "all 0s" in the two PD portions (PD1 and PD2) in the PCHs of the groups having no paging information, and transmits them without transmitting the I portion.
* Being designated to transmit the paging information, the BTS places "all 1s" in the PD1 and PD2 of the PCH associated with the designated group number, and transmits the designated paging information using the I portion of the same PCH.

4.1.11.2. The Operation of a Mobile Station
* A mobile station usually receives only the 8-bit PD1. It carries out coherent detection using the pilot symbols (four symbols) immediately previous to the PD1.
* The mobile station carries out a majority decision processing (soft decision). It is assumed that a value computed by the processing takes "0" when the PD portion is all 0s in a state without degradation in the receiving quality, and takes a positive maximum value when it is all 1s. The following operations are performed in accordance with the processing result and decided threshold values (M1 and M2, where M1>M2).

(1) If the processing result is equal to or greater than the decision threshold M1, the mobile station makes a decision that paging takes place to any one of the mobile stations of its own group, and receives the I portion of the same PCH.

(2) If the processing result is less than the decision threshold M2, the mobile station makes a decision that no paging takes place to its own group, and makes the reception OFF until the receiving timing of the PD1 of its own group one super frame later.

(3) If the processing result is equal to or greater than M2 and less than M1, the mobile station receives the PD2 in the same PCH, and carries out the foregoing (1) and (2). If the processing result of the PD2 is also equal to or greater than M2 and less than M1, the mobile station receives the I portion of the same PCH.

(4) Receiving the I portion in the foregoing processing (2) or (3), the mobile station makes a decision from the paging information contained in the I portion as to whether the paging to itself takes place or not.

4.2. Transmission Path Interface 4.2.1. Major Characteristics 4.2.1.1. 1.5 Mbps

FIGS. 28A and 28B illustrate the mapping into an ATM cell.

4.2.1.2. 6.3 Mbps

Figures 29A, 29B:
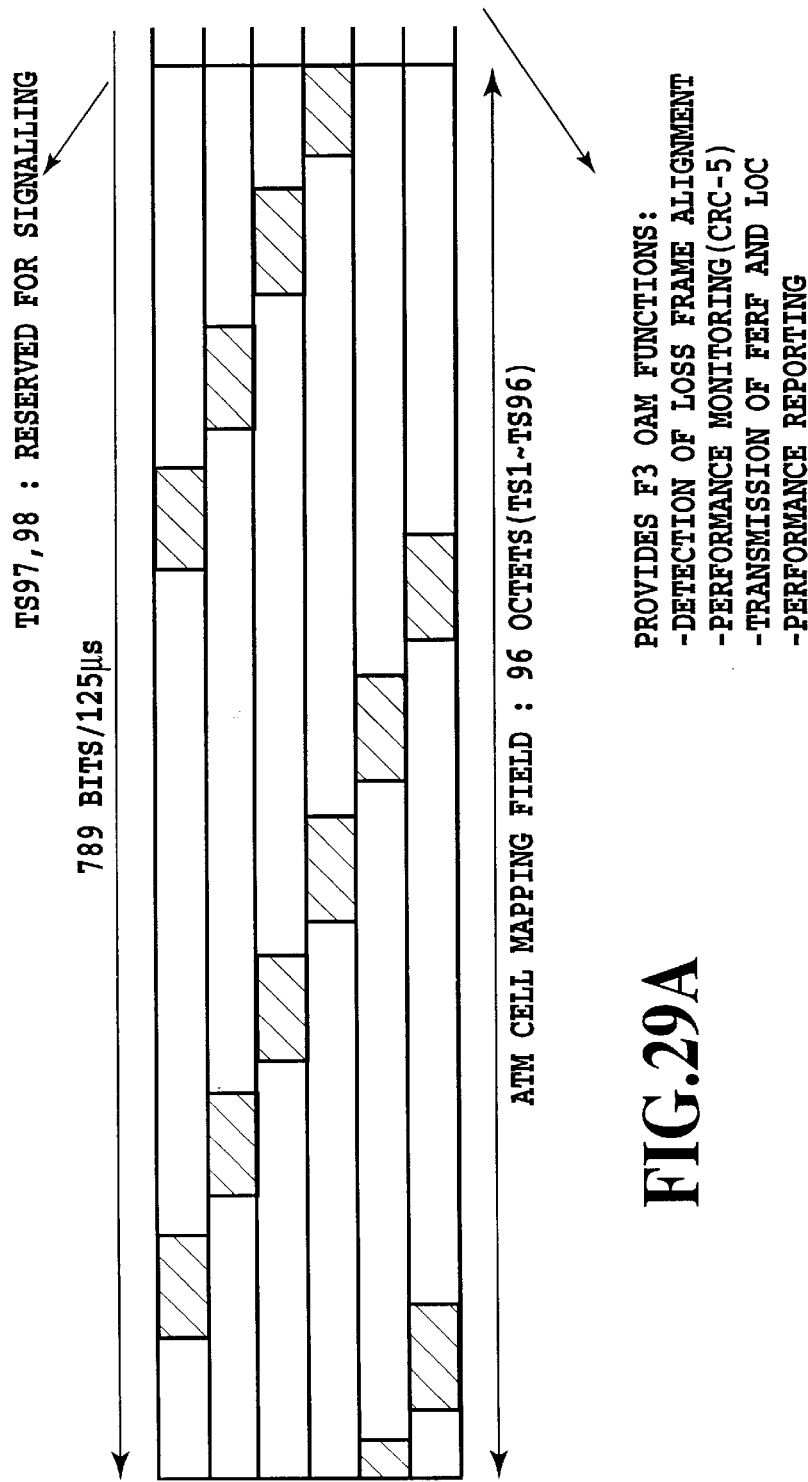
FIGS. 29A and 29B are diagrams illustrating a frame structure for 6312 kbits/s used for transmitting ATM cells.
Figure 30:
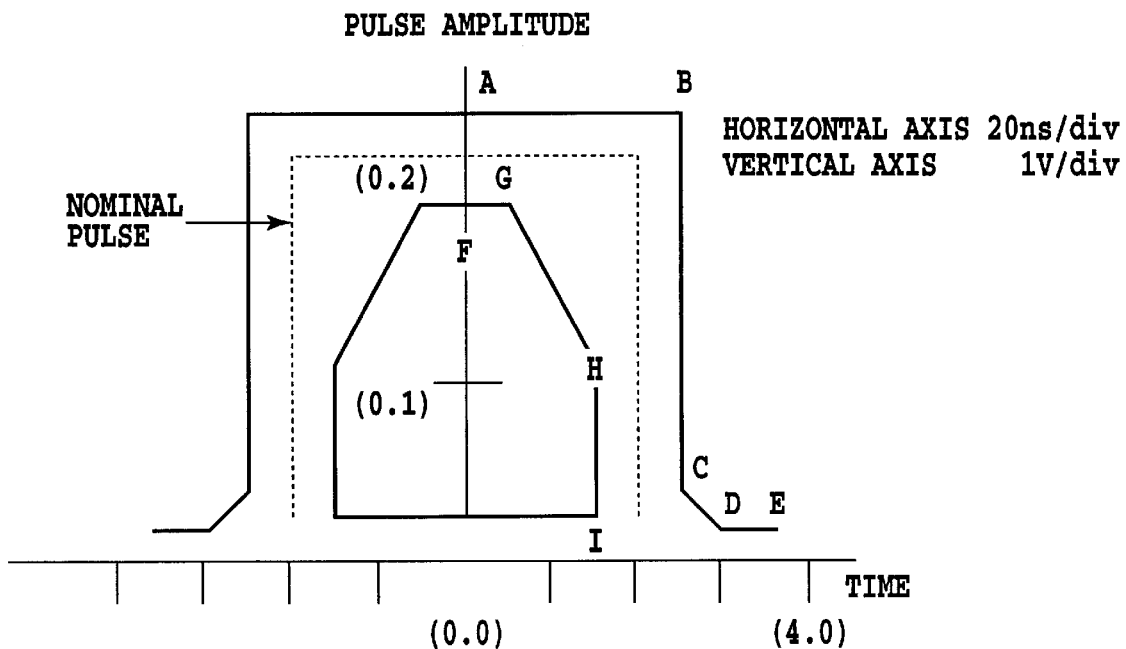
FIG. 30 is a diagram illustrating a pulse mask at an output terminal of a 6312 kbits/s system.

FIGS. 29A and 29B illustrate the mapping into an ATM cell, and FIG. 30 shows a pulse mask.

4.2.2. Protocol 4.2.2.1. ATM Layer

Figure 31:
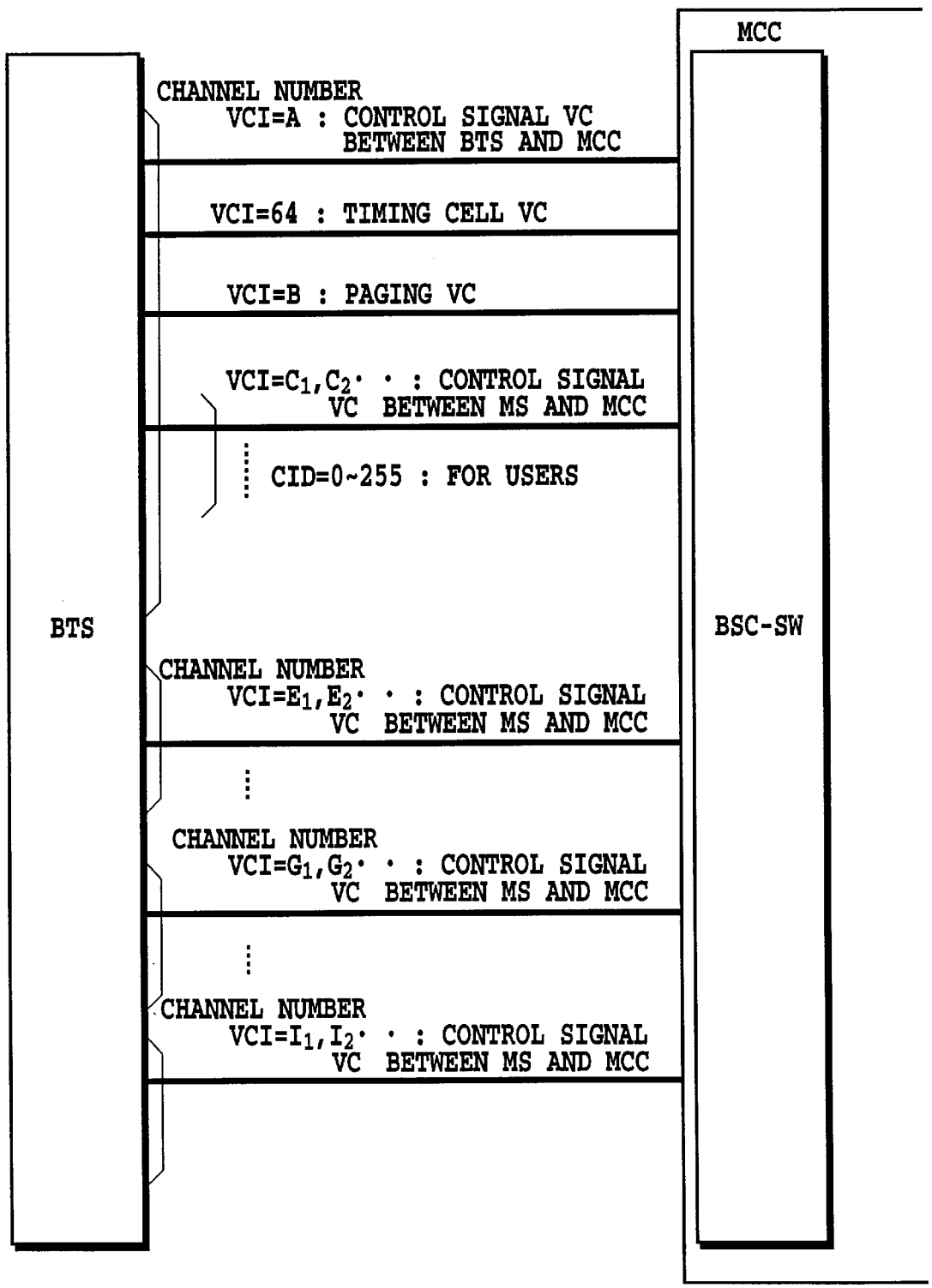
FIG. 31 is a diagram illustrating an example of a link structure (ATM connection) between a BTS and MCC.

Codings of the VPI (virtual path identifier), VCI (virtual channel identifier) and CID (channel identifier) in the ATM layer in the interface between the base station (BS) and the switching center will now be described. FIG. 31 shows the link structure between the BTS and MCC.

(1) Interface specifications.

Channel numbers: Channel numbers are assigned to individual HWYs between the base station and the switching center. The correspondence between the physical HWY interface mounted positions and the channel numbers are fixedly set in advance. The range of the channel numbers is 0–3 for the 1.5M-HWY, and only 0 for 6.3M-HWY.

VPI: The VPI value is only "0", and the VPI is not used substantially.

VCI: 256/VPI.

CID: 256/VCI.

(2) ATM connection.

VCI=64: Used for timing cell. A minimum channel number for each BTS is used. The following VCIs can be set as the VCIs other than those used for super frame phase correction. In connection with this, the AAL types used in the respective VCIs are also shown.

* VCIs for control signals between BTS and MCC: AAL-Type 5.
* VCIs for paging: AAL-Type 5.
* VCIs for transmitted signals between MS and MCC: AAL-Type 2.

When a plurality of channel numbers are set in the BTS, the VCIs other than those used for the super frame phase correction are assignable to any channel numbers by any number. The correspondence is established between the VCIs other than those used for the super frame phase correction, and the channel numbers and VCI values.

(3) Short cell connection.

A method of using the CID value is set.

(4) AAL-Type designation method.

The AAL-Type is designated at the time when a wire channel is established. Table 22 shows an example of the correspondence between the used transmission information types and the AAL-Types, although the correspondence between them can be set freely.

TABLE 22

Example of correspondence between wire channel transmission information types and AAL-Types.

| Transmission information types | AAL-Type | VCI types |
|---|---|---|
| DTCH transmission information | 2 | For transmission signals between MS and MCC |
| ACCH transmission information | 2 | |
| SDCCH transmission information | 2 | |
| BCCH1, 2 transmission information | 5 | For control signals between BTS and MCC |
| PCH transmission information | 5 | For paging |
| FACH transmission information (for packet transmission) | 2 | For transmission signals between MS and MCC |
| RACH transmission information (for packet transmission) | | |
| UPCH transmission information | | |
| Control signal between BTS and MCC VCI types | 5 | For control signals between BTS and MCC |

(5) Idle cells.

Figure 32:
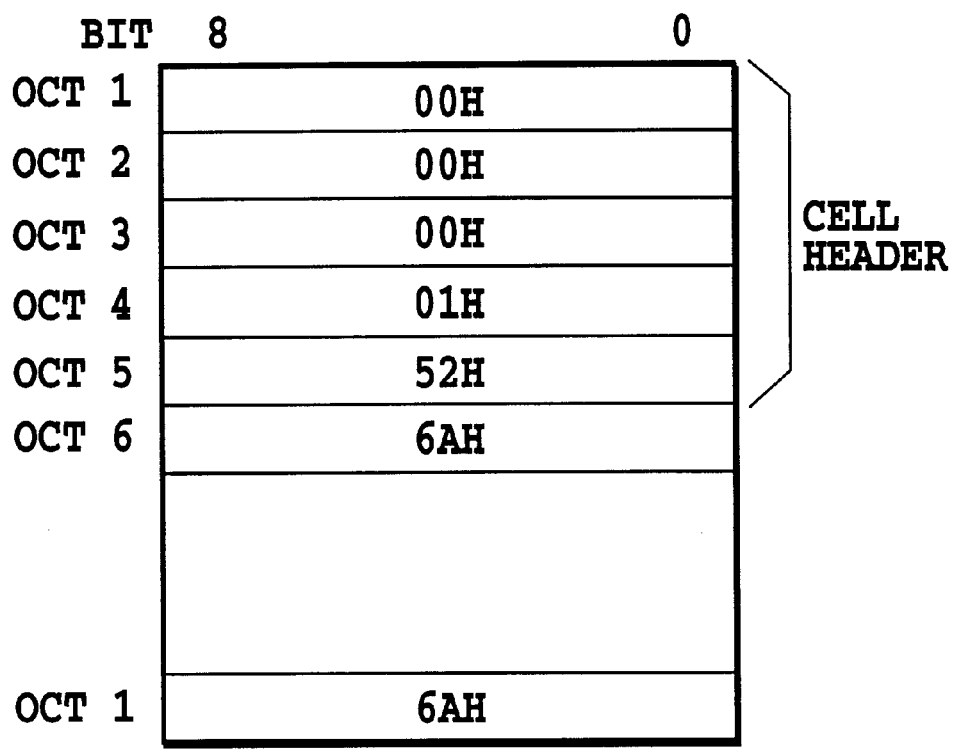
FIG. 32 is a diagram illustrating a structure of an idle cell.

FIG. 32 shows an idle cell on an ATM channel. An idle cell according to ITU-T standard is used.

4.2.2.2. AAL-Type 2

AAL-Type 2 is a protocol of an ATM adaptation layer of a composite cell (AAL type 2) which is transmitted over an interface (Super A interface) section between the base station and switching center.

(1) AAL-Type 2 processor.

Figure 33A:
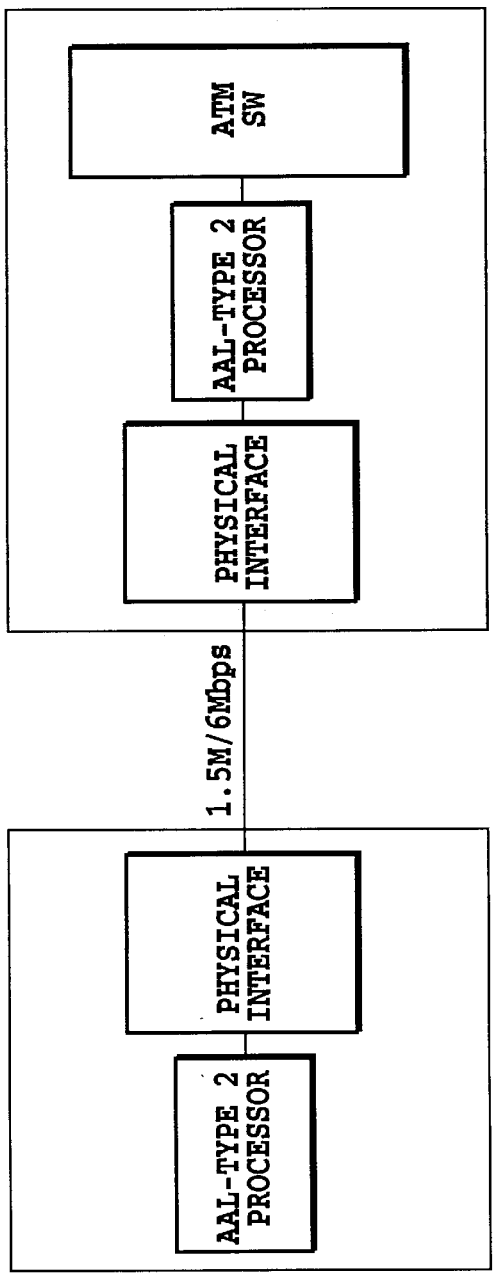
FIGS. 33A and 33B are diagrams illustrating an AAL-2 connection configuration.
Figure 33B:
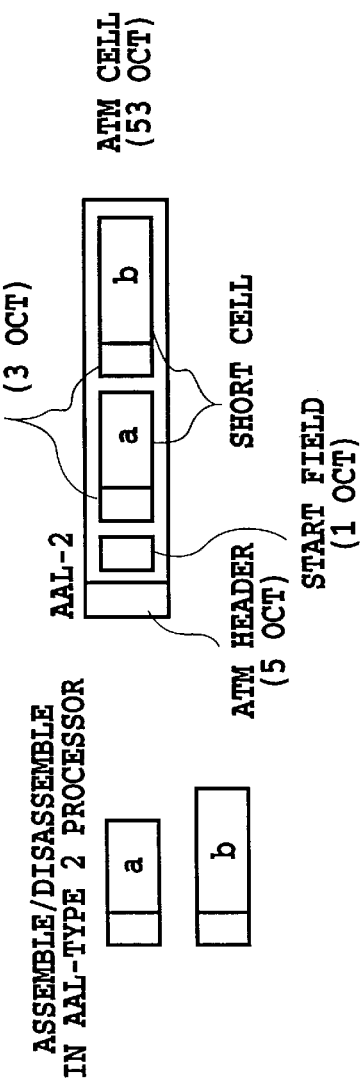

FIGS. 33A and 33B show connecting configuration of AAL-Type 2.

(2) Band assurance control.

In the Super-A section, control for assuring a minimum bandwidth for each quality class is needed to meet the quality of service parameters such as a delay and a cell loss ratio.

*In AAL-Type 2, the band assurance is carried out which is assigned to each quality class at a short cell level.

*The short cell quality class falls into the following four classes depending on (a maximum allowable delay time; and a maximum cell loss ratio).

Quality class 1 (5 ms; $10^{-4}$)

Quality class 2 (5 ms; $10^{-7}$)

Quality class 3 (50 ms; $10^{-4}$)

Quality class 4 (50 ms; $10^{-7}$)

*The quality class which corresponds to the service offered is designated when a wire channel is established.

*The transmission order of short cells are determined in accordance with the quality classes, and the required bandwidth is ensured for each quality class. A concrete method for ensuring the bandwidth will be described in 5.3.5.

*When one unit of transmission information is longer than the maximum length of the short cell, the transmission information is divided into a plurality of short cells to be transmitted. In this case, the plurality of short cells are transmitted continuously using the same VCI. The continuity is ensured only within the same VCI, but not ensured between different VCIs. In other words, a standard cell with another VCI can intervene between the short cells to be transmitted.

4.2.2.3. AAL-Type 5

AAL-Type 5 as well as AAL-Type 2 is used as the AAL of ATM cells transmitted on the Super A interface between the base station and switching center. In AAL-Type 5, the SSCOP (Service Specific Connection Oriented Protocol) is supported between the base station and switching center.

(1) AAL-Type 5 processor.

Figure 34A:
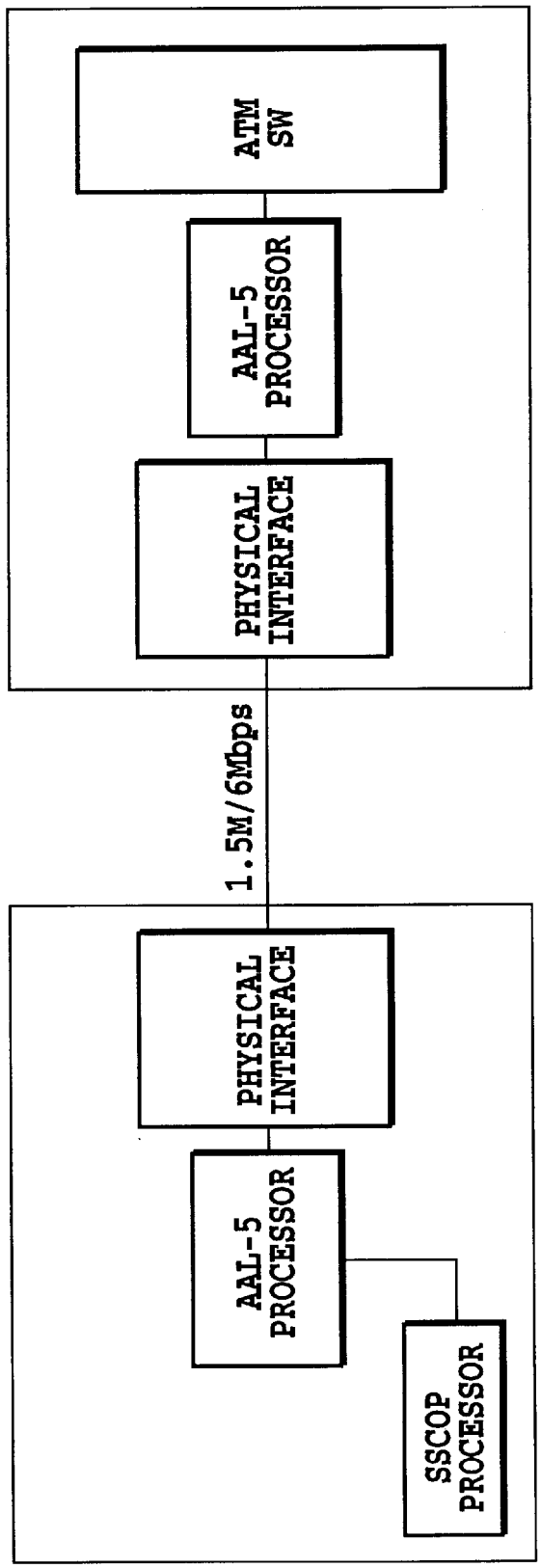
FIGS. 34A and 34B are diagrams illustrating AAL-5 connection configuration.
Figure 34B:
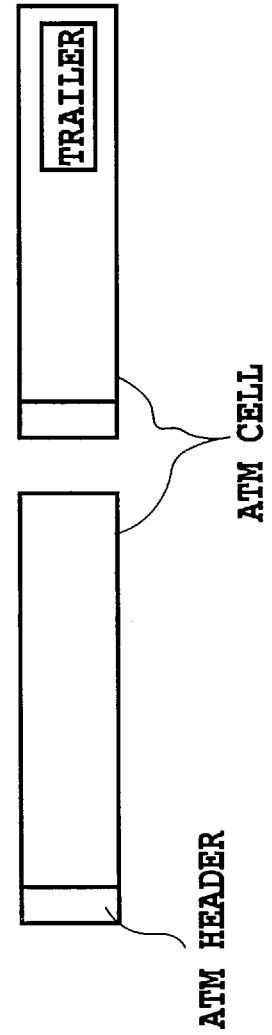

FIGS. 34A and 34B show connecting configuration of AAL-Type 2.

(2) Band assurance control.

In the Super-A section, control for assuring a minimum bandwidth for each quality class is needed to meet the quality of service parameters such as a delay and a cell loss ratio. The quality classes are shown below.

*In AAL-Type 5, the band assurance is carried out which is assigned to each quality class at a VCI level.

*The quality class falls into the following five classes in accordance with (a maximum allowable delay time; and a maximum cell loss ratio).

Interrupt (0; 0) Highest priority cell.

Quality class 1 (5 ms; $10^{-4}$)

Quality class 2 (5 ms; $10^{-7}$)

Quality class 3 (50 ms; $10^{-4}$)

Quality class 4 (50 ms; $10^{-7}$)

*The quality class which corresponds to the service offered is designated when a wire channel is established.

*The transmission order of standard cells are determined in accordance with the quality classes, and the required bandwidth is ensured for each quality class. A concrete method for ensuring the bandwidth will be described in 5.3.5.

*The interrupt buffer cell is given the highest priority (with a minimum delay, inhibiting discarding) to be output.

4.2.3. Signal Format 4.2.3.1. The Format of AAL-2

Figure 35:
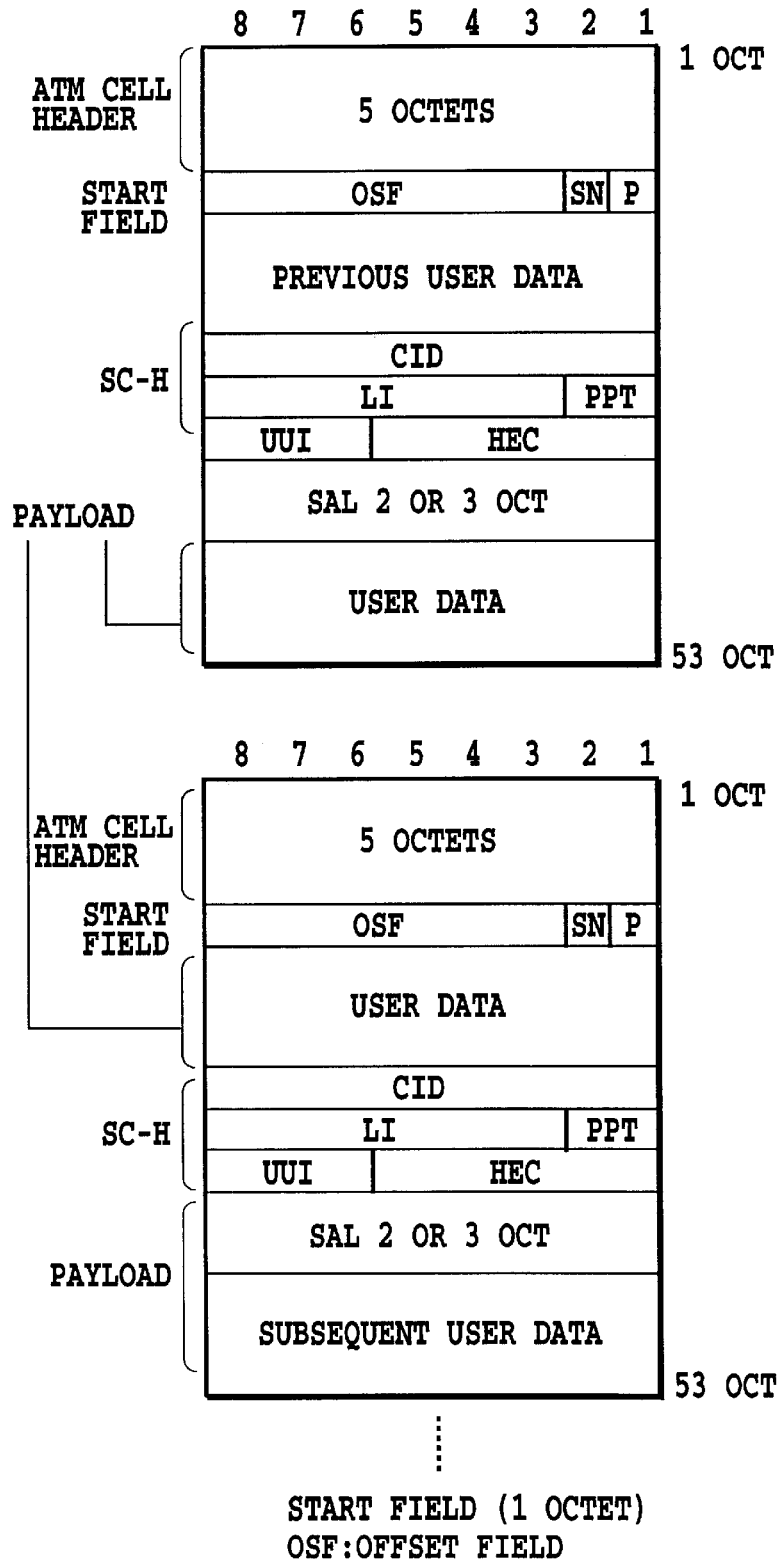
FIG. 35 is a diagram illustrating an AAL-2 format.

FIG. 35 illustrates the format of AAL-2.

*A start field (one octet).

OSF: Offset field.

SN: Sequence number.

P: Parity.

*SC-H (Short cell header: three octets).

CID: Channel identifier: 0/PADDING; 1/ANP; 2–7/RESERVED

LI: Payload length.

PPT: CPS-Packet Payload Type: It includes start/continue and end information of the payload.

UUI: CPS-User to User indication.

When one unit of transmission information is divided in a plurality of short cells to be transmitted, the UUI and the plurality of short cells bearing the divided transmission information to be transmitted are continuously transmitted using the same VCI, for the receiving side to be able to assemble the transmission information.

000/single short cell.

001/top and continued.

010/continued and end.

011/continued and continued.

HEC: Header Error Check (generator polynomial=$X^5 + X^2 + 1$).

*SAL (two or three octets).

Figure 36:
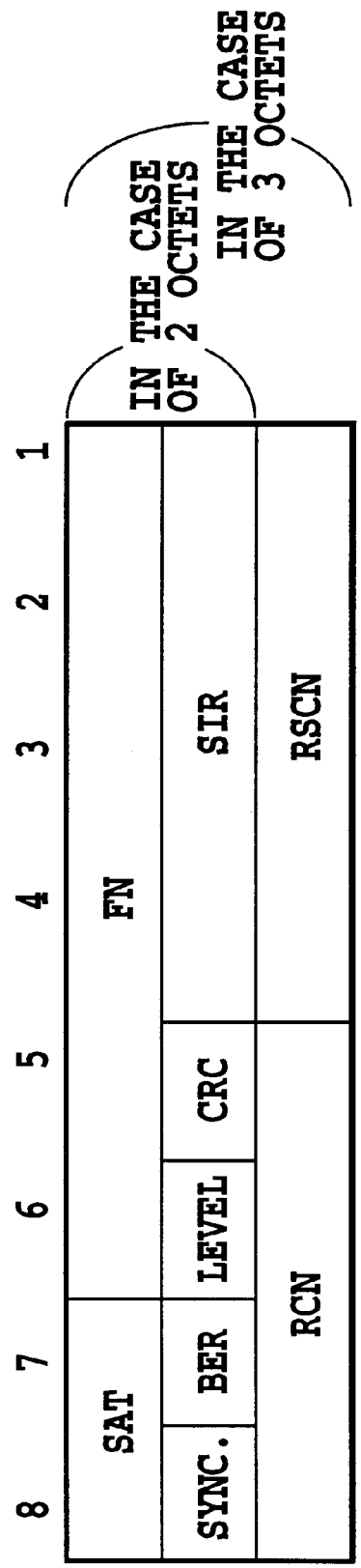
FIG. 36 is a diagram illustrating a SAL format.

FIG. 36 shows the format of the SAL.

Table 23 shows a specifying method of SAL fields.

Table 24 shows the presence and absence of the uses of the SAL third octet.

Table 25 shows a specifying conditions of the SAL fields.

TABLE 23

| Field | Uses | Set values |
|---|---|---|
| SAT(SAL type) | SAL field type SAT = 1x: Loop Back cell. (LB) SAT = 0x: Other than that mentioned above | 00: Wire forward sync state is OK. 01: Wire forward sync state is NG. 10: Return indication (forward) 11: Return indication (reverse) |
| FN (frame number) | DHO frame alignment SAT = 00 | 0-63: Frame number |
|  | Frame number SAT = 01 | 1-63: Forward FN sliding number |
| Sync | Radio out-of-sync detection | 1: Out-of-sync state. 0: Sync state. |
| BER | BER degradation detection | 1: Detect degradation. 0: Normal. |
| Level | Level degradation detection | 1: Detect degradation 0: Normal. |

TABLE 23-continued

| Field | Uses | Set values |
|---|---|---|
| CRC | CRC checking results | 1: NG. 0: OK. |
| SIR | Received SIR | 0-15: Received SIR increases with the value |
| RCN (radio channel number) | Radio channel number | 0-15: Radio channel sequence number |
| RSCN (radio subchannel number) | Radio subchannel number | 0-15: Radio subchannel sequence number |

TABLE 24

The used state of the SAL third octet.

| | During single code communications | During multicode communications | Remarks |
|---|---|---|---|
| Frame in radio channel is not divided. | Both RCN (radio channel number) and RSCN (radio subchannel number) are unused. | Only RCN is used. | |
| Frame in radio channel is divided. | Only RSCN is used. | Both RCN and RSCN are used. | |

*The division of the radio channel frame is carried out when 128 kbps or more unrestricted digital service is provided, and 256 ksps or more dedicated physical channel is used. The unit of division is the unit, on the basis of which the external encoding at a user information rate of 64 kbps (1B) is carried out. See, FIGS. 78A–80C.

*All "0s" is filled when unused.

*The multicode transmission is applied only to the DTCH and UPCH. Accordingly, RCN is applied only to the DTCH and UPCH.

TABLE 25

SAL field specified values

| | DTCH | | ACCH | | SDCCH | | RACH | | FACH | | UPCH | |
|---|---|---|---|---|---|---|---|---|---|---|---|---|
| | R | F | R | F | R | F | R | F | R | F | R | F |
| SAT*[1] | o | o | o | o | o | o | o | o | o | o | o | o |
| FN | o | o | o | o | o | all 0 | o | all 0 | o | all 0 | o | all 0 |
| Sync | o | all 0 | o | all 0 | all 0 | all 0 | all 0 | all 0 | all 0 | all 0 | all 0 | all 0 |
| BER | o | all 0 | o | all 0 | o | all 0 | o | all 0 | o | all 0 | o | all 0 |
| Level | o | all 0 | o | all 0 | o | all 0 | o | all 0 | o | all 0 | o | all 0 |
| CRC | o | all 0 | all 0 | all 0 | all 0 | all 0 | all 0 | all 0 | all 0 | all 0 | all 0 | all 0 |
| SIR | o | all 1 | o | all 1 | o | all 1 | o | all 1 | o | all 1 | o | all 1 |
| RCN*[2] | o | o | Reserved | Reserved | Reserved | Reserved | Reserved | Reserved | Reserved | Reserved | Reserved | Reserved |
| RCSN*[2] | o | o | Reserved | Reserved | Reserved | Reserved | Reserved | Reserved | Reserved | Reserved | Reserved | Reserved |

R Reverse/F: Forward
o Specify values. See 5.4.3 about a method of specifying concrete values in reverse direction.
*[1]Only "00" is used.
*[2]When specifying a value, it is carried out in accordance with Table 23.

4.2.3.2. Format of AAL-5

Figure 37:
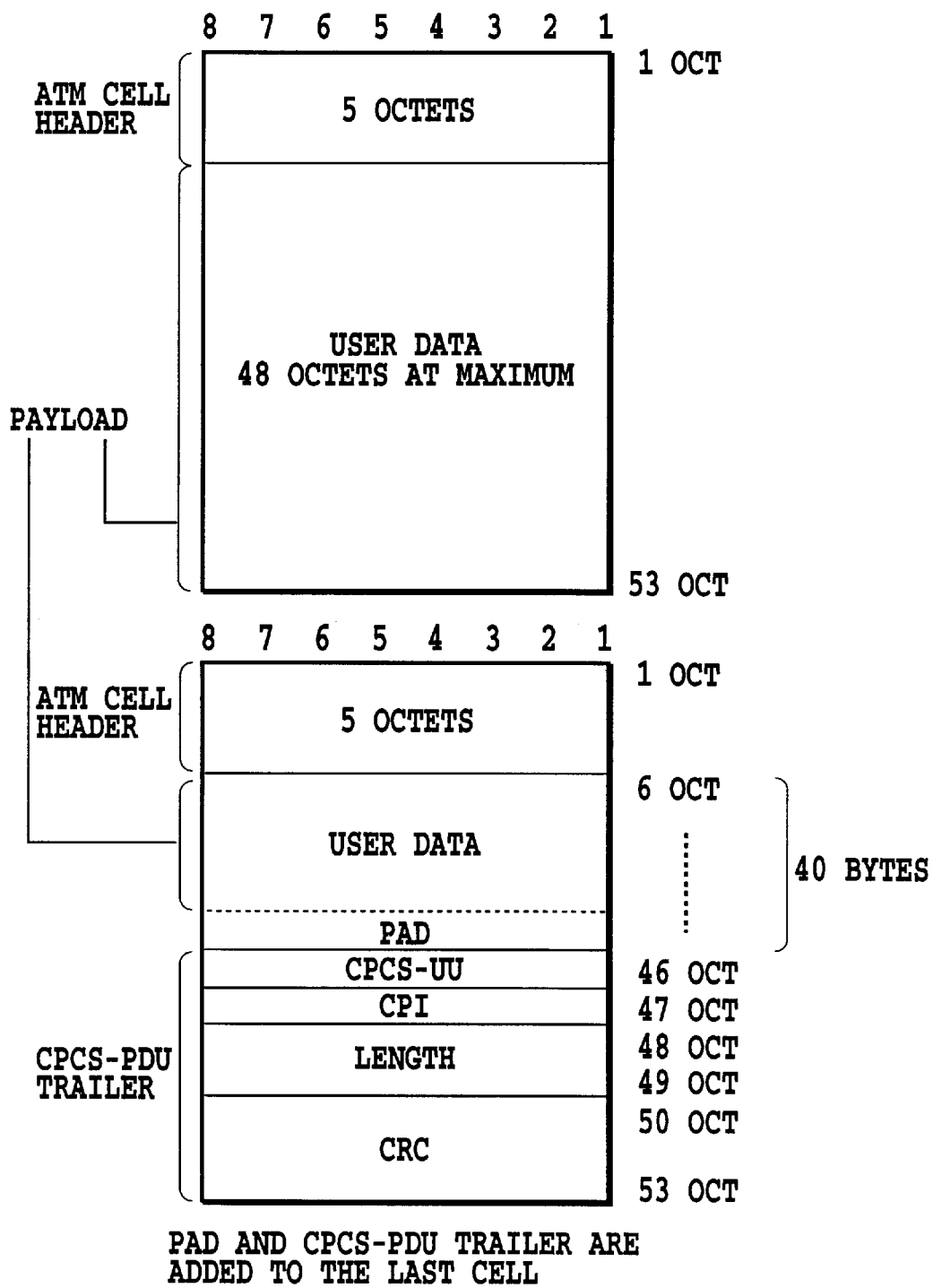
FIG. 37 is a diagram illustrating an AAL-5 format.

FIG. 37 shows a format of an AAL-5 cell. To the LAST cell, a PAD and CPCS-PDU trailer are added.

*PAD (CPCS padding)

It is used for adjusting the frame length to become 48 octets (all "0s")

*CPCS-PDU trailer.

CPCS-UU: CPCS user to user indicator. It is used for transparently transferring information used in a higher layer.

CPI: Common part type indicator. Uses are not yet defined. All "0s" are set at the present.

LENGTH: CPCS-PDU payload length. It indicates a user information length in byte.

CRC: Cyclic redundancy code. It is used for detecting errors of the entire CPCS frame. The generator polynomial= $X^{32}+X^{26}+X^{23}+X^{22}+X^{16}+X^{12}+X^{11}+X^{10}+X^{8}+X^{7}+X^{5}+X^{4}+X^{2}+X+1$.

4.2.3.3. Timing Cell

FIGS. 38A and 38B illustrate a signal format of a timing cell that is used for a SFN (System Frame Number) synchronization establishing processing when starting the BTS. Table 26 shows a method of specifying information elements in the signal format.

See 5.3.8 for the SFN synchronization establishing method of the BTS using the timing cell.

TABLE 26

Method of specifying timing cell information elements

Figure 39:
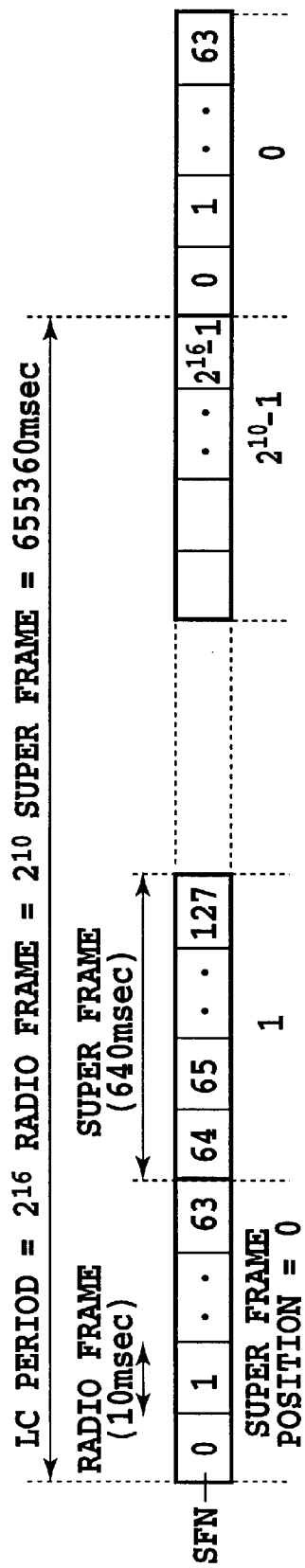
FIG. 39 is a diagram illustrating super frame positions.

| Information elements | Specified contents | Specified values |
|---|---|---|
| Channel number | | 0 |
| VPI | | 0 |
| VCI | VCI for timing cell | 64 |
| Message ID | 02h: Timing Report (MCC→BTS) 03h: Timing Report (BTS→MCC) Other values: reserved | |
| Correction number | All "0s" | |
| Correction range | All "0s" | |
| Transmission delay | All "0s" | |
| SF time information (received, MCC-SIM side) | Timing cell received time in MCC. It indicates the time in a super frame. Resolution in 125 μsec. | Table 27 shows the correspondence between bits and times. |
| SF time information (transmitted, MCC-SIM side) | Timing cell transmitted time in MCC. It indicates the time in a super frame. Resolution is 125 μsec. | |
| SF time information (received, BTS side) | All "0s" (this information element is not used in the present system). | |
| SF time information (transmitted, BTS side) | Timing cell transmitted time in BTS. It indicates the time in a super frame. Resolution is 125 μsec. | Table 27 shows the correspondence between bits and times. |
| SF phase shift value | All "0s" (this information element is not used in the present system). | |
| LC counter information (received, MCC side) | The position of a super frame in a long code period when the timing cell is received in the MCC (See, FIG. 39). | The value ranges over $0\text{-}2^{10}\text{-}1$, and is represented in binary coding. |
| LC counter information (transmitted, MCC side) | The position of a super frame in a long code period when the timing cell is transmitted from the MCC (See, FIG. 39). | |
| LC counter information (received, BTS side) | All "0s" (this information element is not used in the present system). | |
| LC counter information (transmitted, BTS side) | The position of a super frame in a long code period when the timing cell is received in the BTS (See, FIG. 39) | The value ranges over $0\text{-}2^{10}\text{-}1$, and is represented in binary coding. |
| LC counter shift value | All "0s" (this information element is not used in the present system). | |
| CRC-10 | The value of CRC-10 for ATM cell payload. Generator polynomial: $X^{10} + X^9 + X^5 + X^4 + X + 1$. | |

TABLE 27

Correspondence between SF time information bits and times

| Bits | Times (msec) |
|---|---|
| 0h | 0 |
| 1h | 0.125 |
| 2h | 0.250 |
| 13FFh | 639.875 |

4.2.4. Clock Generation

Generated clocks (examples)
(1) Radio synthesizer reference clock.
(2) 4.096 Mcps (chip rate).
(3) 1/0.625 msec. (radio time slot).
(4) 1/10 msec. (radio frame).
(5) 1/640 msec. (radio super frame; phase 0–63).
(6) 1.544 Mbps, 6.312 Mbps (transmission line clock).

5. Functional Configuration

5.1. Radio Stage, and Transmitting and Receiving Amplifier

5.1.1. Pilot Coherent Detection RAKE

5.1.1.1. Pilot Coherent Detection RAKE Configuration (1) RAKE combiner.

Allocate fingers so that sufficient receiving characteristics can be obtained for respective diversity branches (space and inter-sector diversities). The algorithm for assigning the fingers to the branches is not specified. The diversity combining method is a maximal ratio combining.

(2) Searcher.

A searcher selects paths for RAKE combining from among received branches to achieve optimum receiving characteristics.

(3) A pilot coherent detection channel estimation method.

The coherent detection is carried out using pilot blocks (consisting of four pilot symbols each) which are received at every 0.625 ms interval.

5.1.1.2. Channel Estimation Using Multi-pilot Blocks

Figure 40:
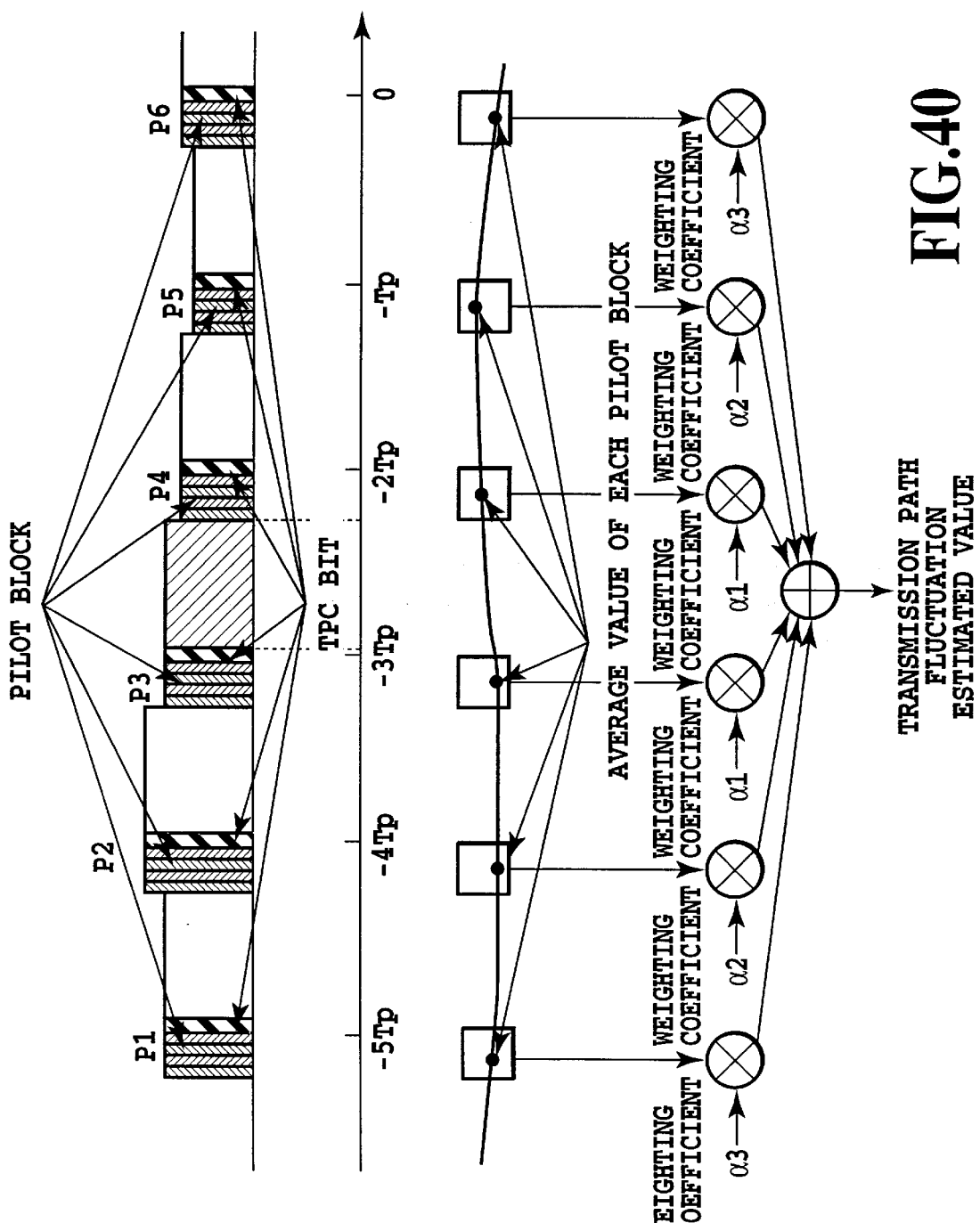
FIG. 40 is a diagram illustrating transmission line estimation using multiple pilot blocks.

A channel estimation method using multiple pilot blocks sandwiching an information symbol section will be described below with reference to FIG. 40.

EXAMPLE

*The following is a description of a channel estimation processing of an information section between time $-3Tp<t<-2Tp$, which is carried out at time t=0 by averaging three pilot blocks each before and after that information section.

(a) Carrying out QPSK demodulation of pilot blocks P1–P6.
(b) Obtaining average values of inphase and quadrature components of the four pilot symbols in each of the pilot blocks P1–P6.
(c) Multiplying the average values by weighting coefficients α1–α3, and summing them up.
(d) Adopting the obtained result as the channel estimate of the information symbol section (shadowed) between pilot blocks P3 and P4.

5.2. Baseband Signal Processor

5.2.1. Transmission Power Control

5.2.1.1. Outline of the Transmission Power Control (1) RACH transmission power control.

The BTS broadcasts over the BCCH the transmission power of the perch channels and the reverse interfering power. A mobile station decides the transmission power of the RACH in accordance with the information.

(2) FACH transmission power control.

The RACH includes information about the received SIR of the perch channel, which is measured by the mobile station. The BTS decides in accordance with the information the transmission power of the FACH associated with the RACH received, and designates the transmission power level together with the transmission information. The transmission power level is variable at each transmission of the information.

(3) Forward and reverse transmission power control of the dedicated physical channel.

Its initial transmission power is decided in the same manner as the transmission power of the RACH and FACH. After that, the BTS and mobile station proceed to a high speed closed loop control based on the SIR. In the closed loop control, a receiving side periodically compares the measured value of the received SIR with a reference SIR, and transmits to the transmitting side the compared result using the TPC bit. The receiving side carries out relative control of the transmission power in accordance with the TPC bit. To meet required receive quality, an outer loop function is provided which updates the reference SIR in response to the receive quality. With respect to the forward link, range control is carried out which sets the upper and lower limits of the transmission power level.

(4) Transmission power control during packet transmission.

The transmission power control of the UPCH is carried out in the same manner as (3) above. That of the RACH during the packet transmission is performed as (1) above. With regard to the FACH during the packet transmission, the transmission is always carried out at a transmission level specified by the transmission power range designation. Unlike the (2) above, the transmission power level is not varied every time the information is transmitted.

5.2.1.2. SIR Based High Speed Closed Loop Transmission Power Control (1) Basic operation.

Figure 41A:
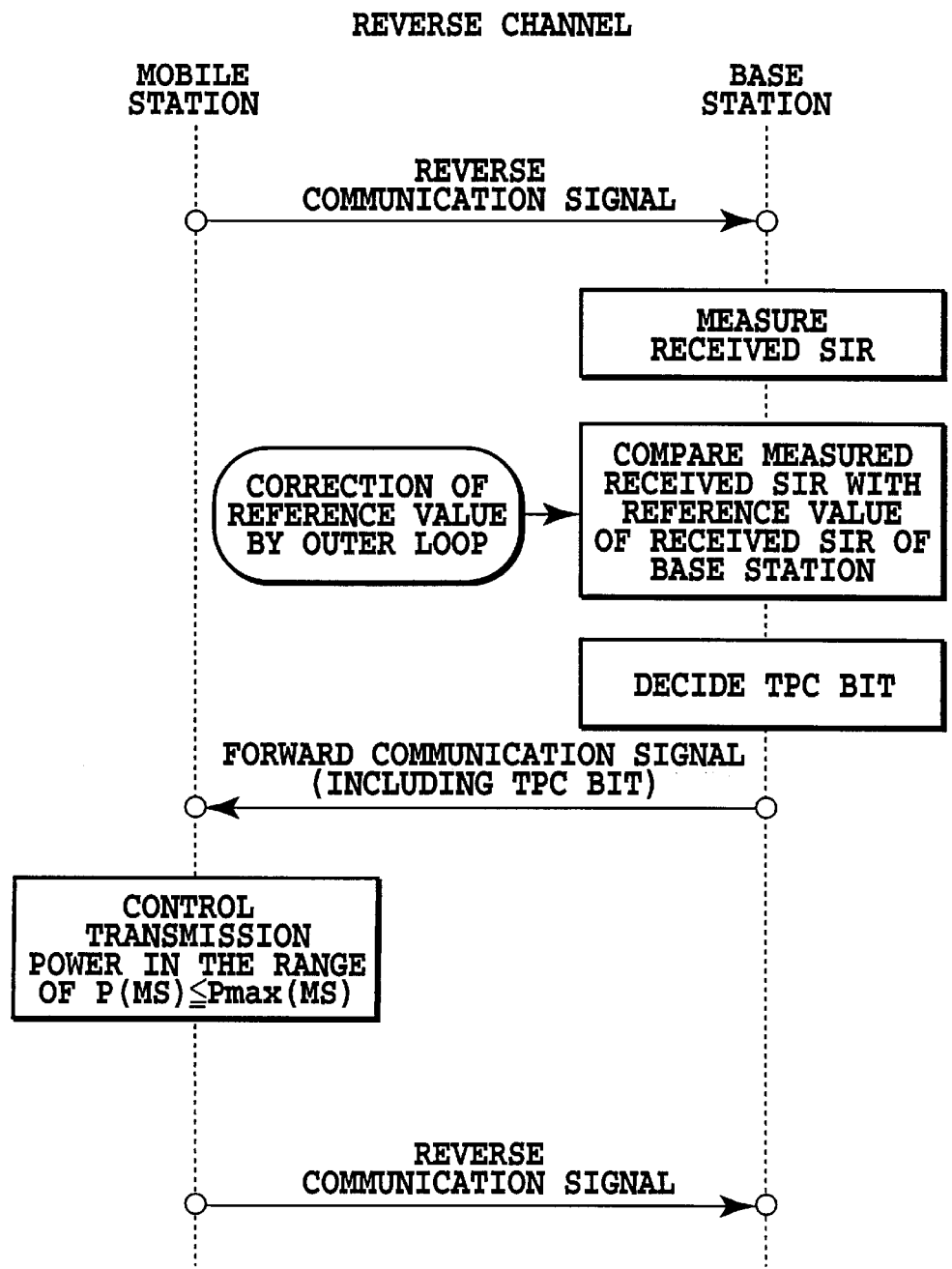
FIGS. 41A and 41B are diagrams illustrating SIR based closed loop transmission power control.
Figure 41B:
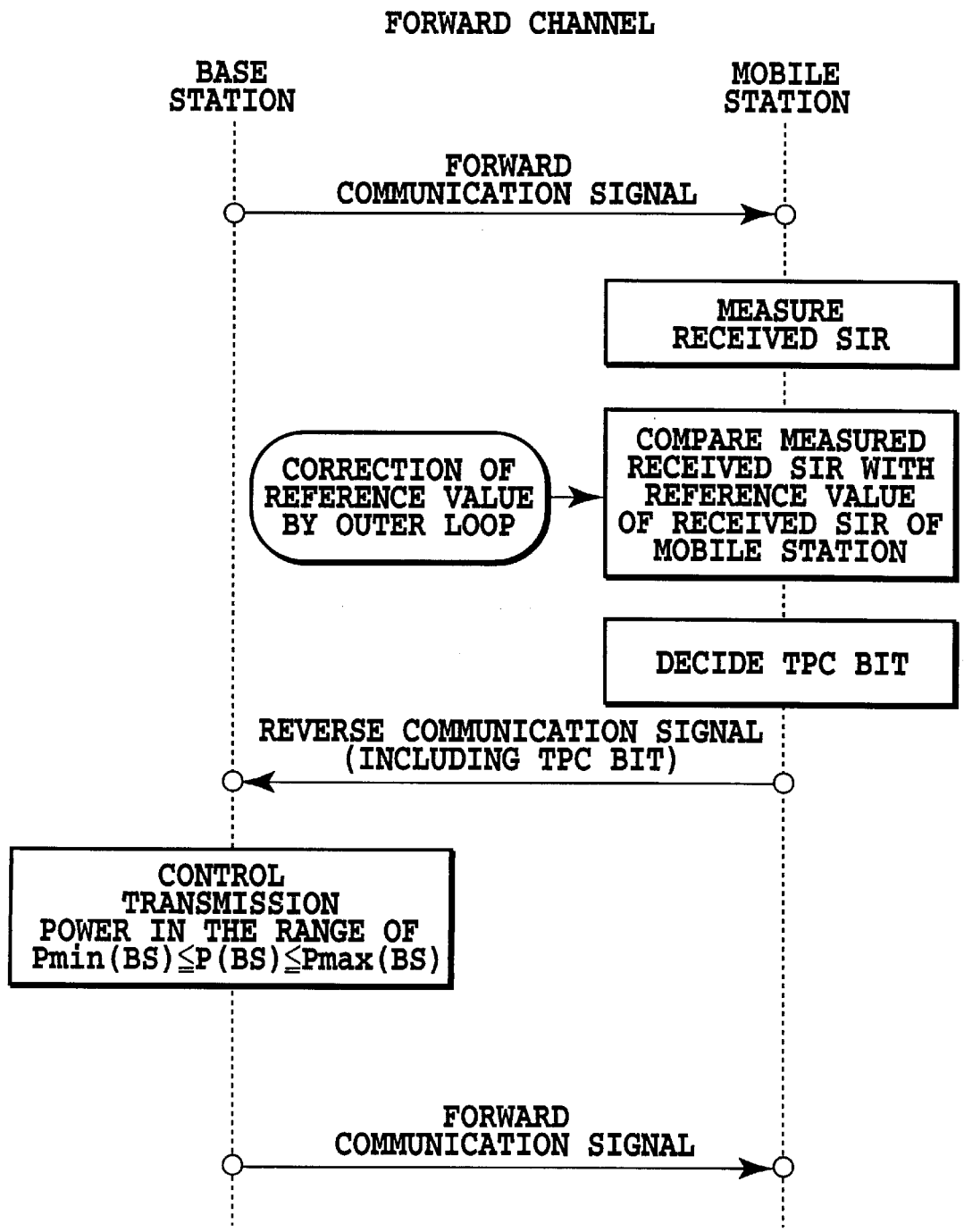

The BTS (or mobile station) measures the received SIR every transmission power control interval (0.625 ms), sets the TPC bit at "0" when the measured value is greater than the reference SIR and at "1" when it is lower than that, and transmits the TPC bit to the mobile station (or BTS) in two consecutive bits. The mobile station (or BTS) makes a soft decision of the TPC bit, decreases the transmission power by 1 dB when the decision result is "0", and increases it by 1 dB when the decision result is "1". The changing timing of the transmission power is immediately before the pilot block. The maximum transmission power is designated in the reverse link, and the maximum transmission power and minimum transmission power are designated in the forward link, so that the control is carried out in these ranges (see, FIGS. 41A and 41B).

If the TPC cannot be received because of the out-of-sync, the transmission power level is fixed.

(2) Forward/reverse frame timings.

Figure 42:
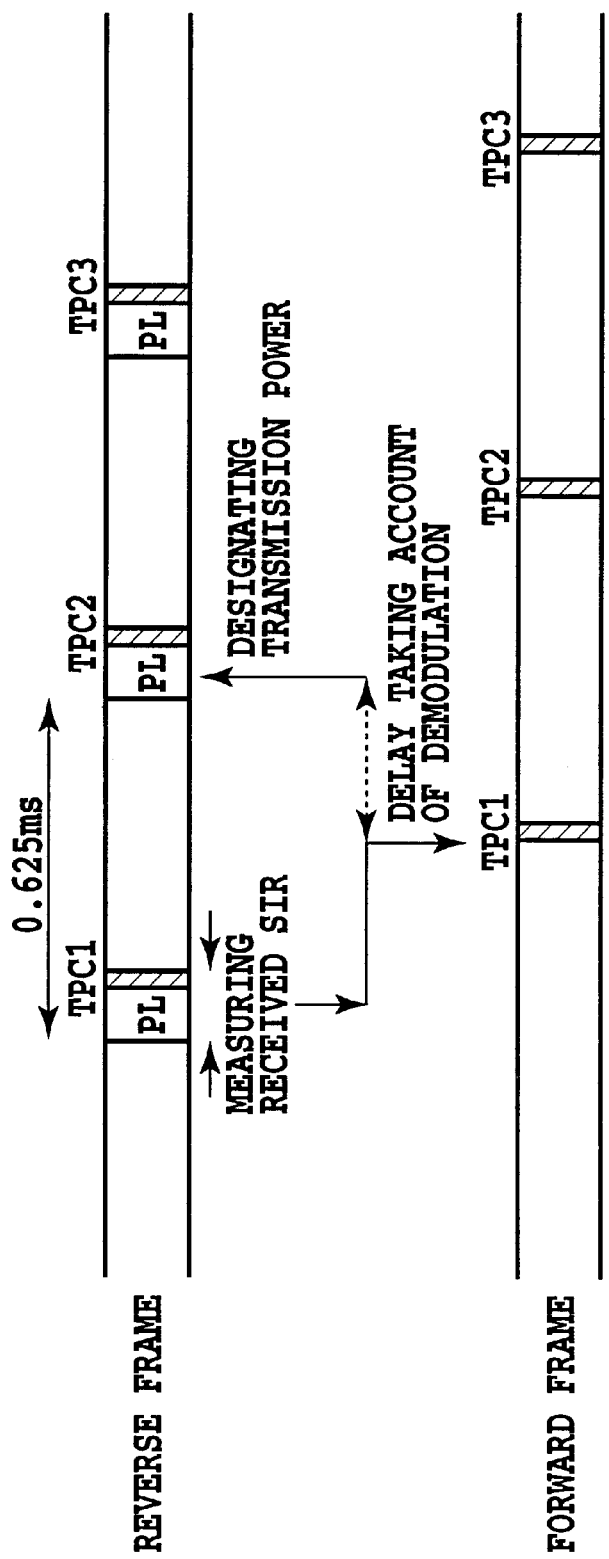
FIG. 42 is a diagram illustrating transmission power control timings.

Frame timings of the forward and reverse channels are determined such that the positions of the pilot symbols of the two channels are shifted by ½ time slot, thereby implementing the transmission power control with one slot control delay (see, FIG. 42).

(3) Initial operation.

Figure 43:
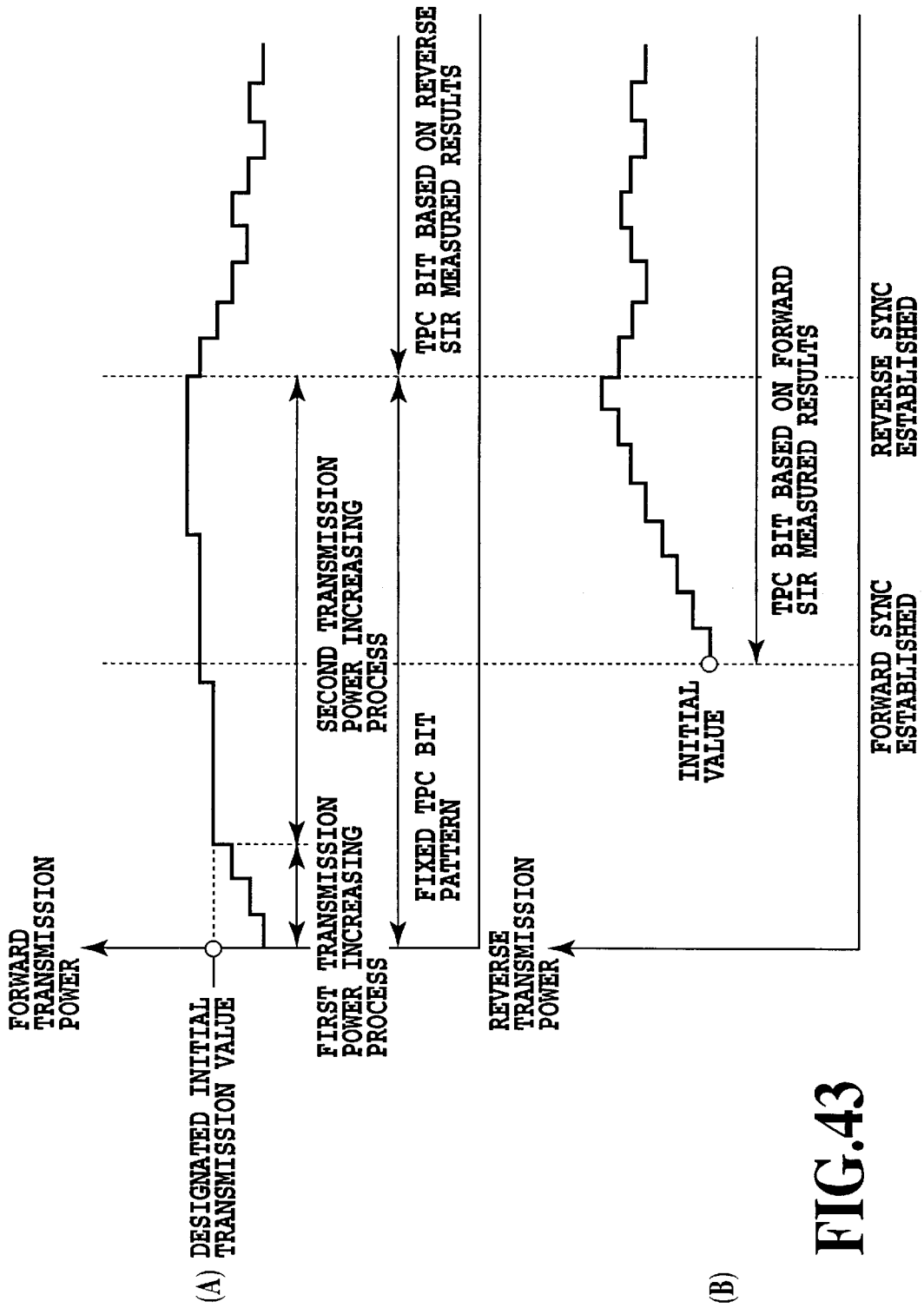
FIG. 43 is a diagram illustrating transition to the closed loop transmission power control.

FIG. 43 shows a method of shifting from the initial state to the closed loop control.

First, the forward transmission power control will be described first with reference to FIG. 43(A).

*The BTS carries out transmission in a fixed transmission power control pattern until it can receive the TPC bit based on the forward SIR measured result. This is the initial operation.

*The initial operation carries out transmission according to a control pattern that will increase the transmission power step by step. The initial operation is divided into two stages.

(a) The BTS, as the first transmission power increasing process, increases the transmission power at every predetermined interval, in the predetermined number of consecutive times, and by a predetermined magnitude. At the end of the first transmission power increasing process, the transmission power is set at the designated initial transmission power level. These values are preset. The purpose of the first transmission power increasing process is to avoid a sharp increase of interfering power to other mobile stations, which will be caused by sudden transmission at large transmission power.

The predetermined values are set in such a manner that the transmission power is increased step by step so that other mobile stations can follow by the transmission power control the variations in the interfering power magnitude. In this case, the TPC bit sequence transmitted over the forward channel is such a fixed pattern (for example, 011011011 . . . ) that increases the transmission power of the mobile station stepwise. The pattern is set in advance.

If the synchronization of the reverse dedicated physical channel is established during the first transmission power increasing process, the process is halted, and the high speed closed loop transmission power control is started in accordance with the received TPC bit from the mobile station.

(b) The BTS increases, as the second transmission power increasing process, the transmission power at every predetermined interval by a predetermined magnitude until the reverse frame alignment is established. These predetermined values are specified apart from those of the foregoing (a). The purpose of the second transmission power increasing process is to ensure the establishment of the forward radio frame alignment by increasing step by step the transmission power even in the case where the initially set transmission power level is insufficient for the mobile station to establish the forward radio frame alignment. The predetermined interval of this process is rather long of about one to a few seconds. The pattern of the forward transmission power control is variable in accordance with the interfering amount or the like.

(c) Establishing the forward frame alignment, the mobile station starts the relative control of the transmission power in accordance with the TPC bits received from the BTS using the transmission power determined in the open loop control as the initial value. In this case, the TPC bits to be transmitted through the reverse channel are determined on the basis of the measured values of the forward SIR (see, FIG. 43(B)).

(d) Establishing the reverse frame alignment, the BTS carries out the relative control of the transmission power in accordance with the TPC bits received from the mobile station.

*The BTS can change the fixed TPC pattern mentioned above depending on the interfering amount over the entire cell.

*Although the mobile station carries out the foregoing reverse transmission power control in accordance with the fixed TPC bit pattern from the base station, it can perform similar transmission power control using a fixed control pattern that is preset in the mobile station. In this case, the pattern is invariable.

*Although the initial value of the reverse transmission power which is sent from the mobile station is determined in the open loop control, an initial value sent from the base station can be used instead. In this arrangement, because the base station can determine it, a more optimal initial value can be set.

(4) SIR measurement method.

Requirements for the SIR measurement are:

*That the transmission power control with one slot control delay can be implemented as described above (2).

*That high SIR measurement accuracy can be achieved. Examples of the measurements are shown below.

(A) Measurement of received signal power (S).

(a) The measurement of the received signal power S is carried out at every slot interval (transmission power update interval) using pilot symbols after RAKE combining.

(b) The received signal power S equals the amplitude square sum of the average values of the absolute values of the inphase and quadrature components of a plurality of symbols.

(B) Measurement of interfering signal power (I).

(a) Average signal power is obtained of the pilot symbols and overhead symbol in a pilot block after the RAKE combining.

(b) The reference signal point for the individual pilot symbols is obtained by carrying out the QPSK demodulation (quadrant detection) of the pilot symbols using the root of the foregoing average signal power.

(c) The mean square is obtained of the distances between the received points and the reference signal point of the pilot symbols in the pilot block.

(d) The interfering signal power is obtained by calculating the moving average of the mean squares over M frames, where M is 1–100, for example.

5.2.1.3. Outer Loop

The BTS and MCC have an outer loop function of updating the reference SIR of the high speed closed loop transmission power control in accordance with quality information to meet the required receive quality (average FER or average BER). The MCC performs during the DHO the outer loop control in response to the quality after the selection combining.

(1) An update method of the reference SIR.

The initial value of the reference SIR is designated. The subsequent reference SIR is updated on the basis of measured results of the receive quality. Both the MCC and BTS can determine the update of the reference SIR. The following is an example of a concrete method.

i) Designating the start of the quality monitoring.

ii) Carrying out the designated quality monitoring continuously, and reporting the results of the monitoring.

iii) According to the quality monitoring results reported, a decision is made whether the update of the reference SIR is to be made or not. If the update is decided, the reference SIR is set and its update is designated.

5.2.1.4. The Transmission Power Control During the Inter-sector Diversity Handover During the inter-sector diversity handover, the measurement of the received SIR and the demodulation of the TPC bits are carried out with both the forward and reverse links after the inter-sector maximal ratio combining. With regard to the forward TPC bits, the same value is transmitted from a plurality of sectors. Thus, the transmission power control is carried out in the same manner as in the case where no diversity handover is performed.

Figure 44:
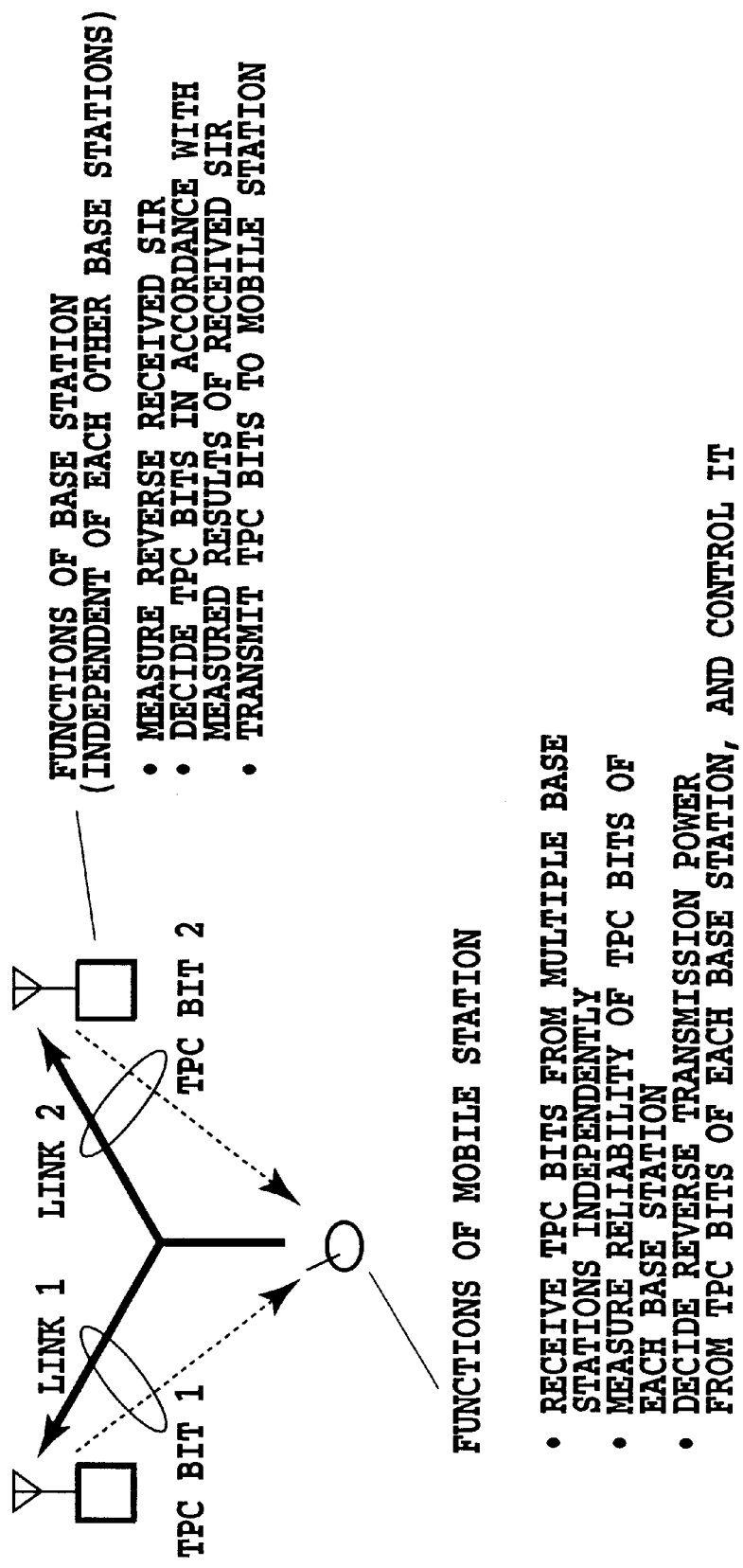
FIG. 44 is a diagram illustrating reverse transmission power control during inter-cell diversity handover.

5.2.1.5. The Transmission Power Control During the Inter-cell Diversity Handover (1) Reverse transmission power control (see, FIG. 44).

(a) BTS operation.

Each BTS measures the reverse received SIR as in the case where no diversity handover is performed, and transmits to the mobile station the TPC bits determined in accordance with the measured result.

(b) Mobile station operation.

The mobile station receives the TPC bits from each BTS independently (with carrying out the inter-sector diversity). At the same time, the mobile station measures the reliability (received SIR) of the TPC bits of each BTS. If any one of the results of the soft majority decision about the TPC bits that meet a predetermined reliability includes "0", the transmission power is reduced by 1 dB. If all the results are "1", the transmission power is increased by 1 dB.

Figure 45:
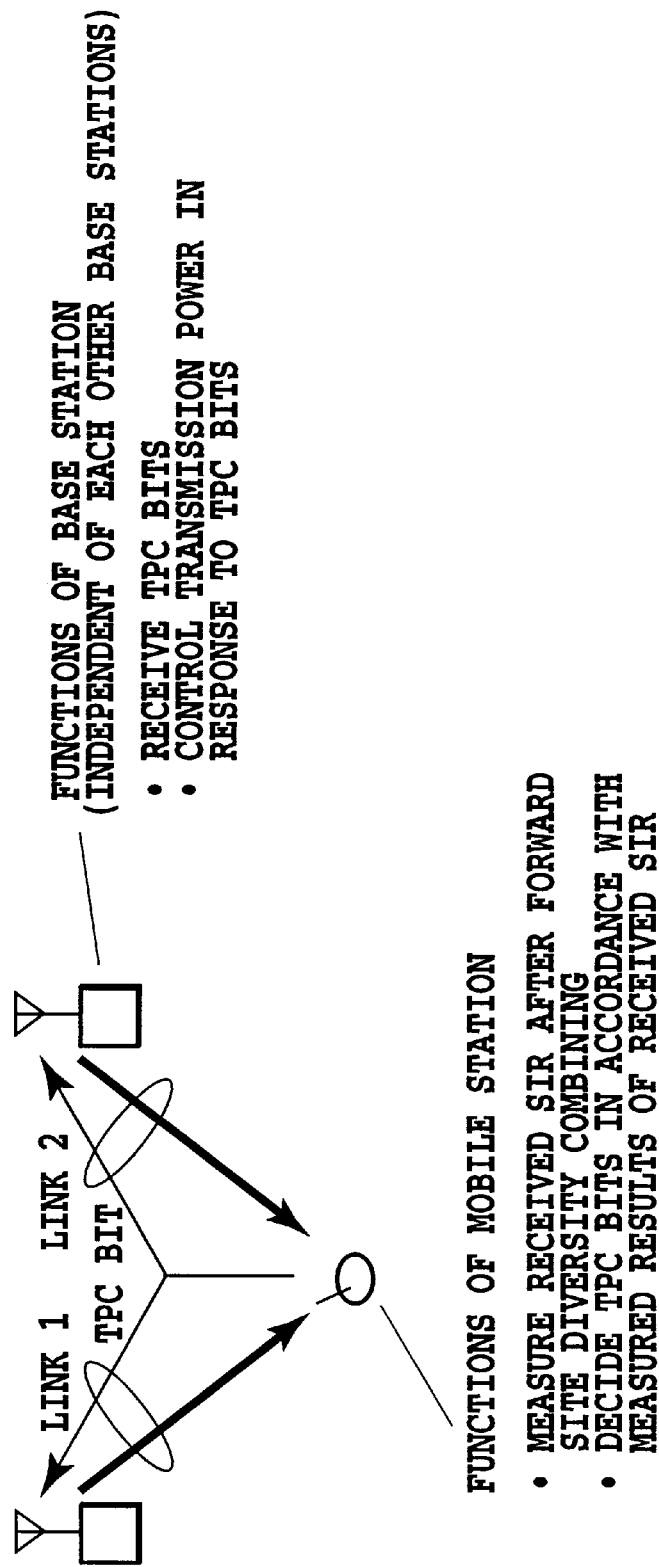
FIG. 45 is a diagram illustrating forward transmission power control during inter-cell diversity handover.

(2) Forward transmission power control (see, FIG. 45).

(a) BTS operation.

Each BTS controls the transmission power in accordance with the received TPC bits as in the case where no diversity handover is performed. If the TPC bit cannot be received because of the out-of-sync of the reverse link, the transmission power level is fixed.

(b) Mobile station operation.

The mobile station measures the received SIR after the site diversity combining, and transmits to each BTS the TPC bits which are determined in accordance with the measured results.

5.2.2. Synchronization Establishing Processing 5.2.2.1. At the Start Up of the Mobile Station (a) Each sector sends the perch channel that masks part of the long code. At the start up, the mobile station establishes the perch channel synchronization by carrying out the sector selection using a three step initial synchronization method of the long code.

(b) Each perch channel broadcasts its own sector number and the long codes of the peripheral cells. The mobile station establishes on the basis of the broadcast information the perch channel synchronization of the remaining sectors in the same cell and of the sectors in the peripheral cells, and measures the received levels of the perch channels. While the mobile station is standing by, the mobile station makes comparison between the received levels of the perch channels of respective sectors described above to judge whether the mobile station has shifted the sector or not.

5.2.2.2. At Random Access Reception

The mobile station transmits a RACH when carrying out a location registration, or an originating or terminating call. The BTS establishes the synchronization of the RACH transmitted at a plurality of frame offsets, and receives it.

As shown in FIGS. 85–88B, the RACH synchronization can be established so that the reception processing of all the RACH-Ls and RACH-S'es that are transmitted at the four offset timings per 10 msec. can be completed within 0.625 msec. The reception processing includes deinterleaving, Viterbi decoding and CRC decoding, besides the capability of making a decision as to whether the transmission of Ack is required or not.

The BTS measures the propagation delay time due to traveling between the mobile station and the BTS, using the delay time of the RACH received timing with respect to a predetermined timing.

5.2.2.3. At Establishing Synchronization of the Dedicated Physical Channel (See, FIGS. 87A and 87B)

Figure 46B:
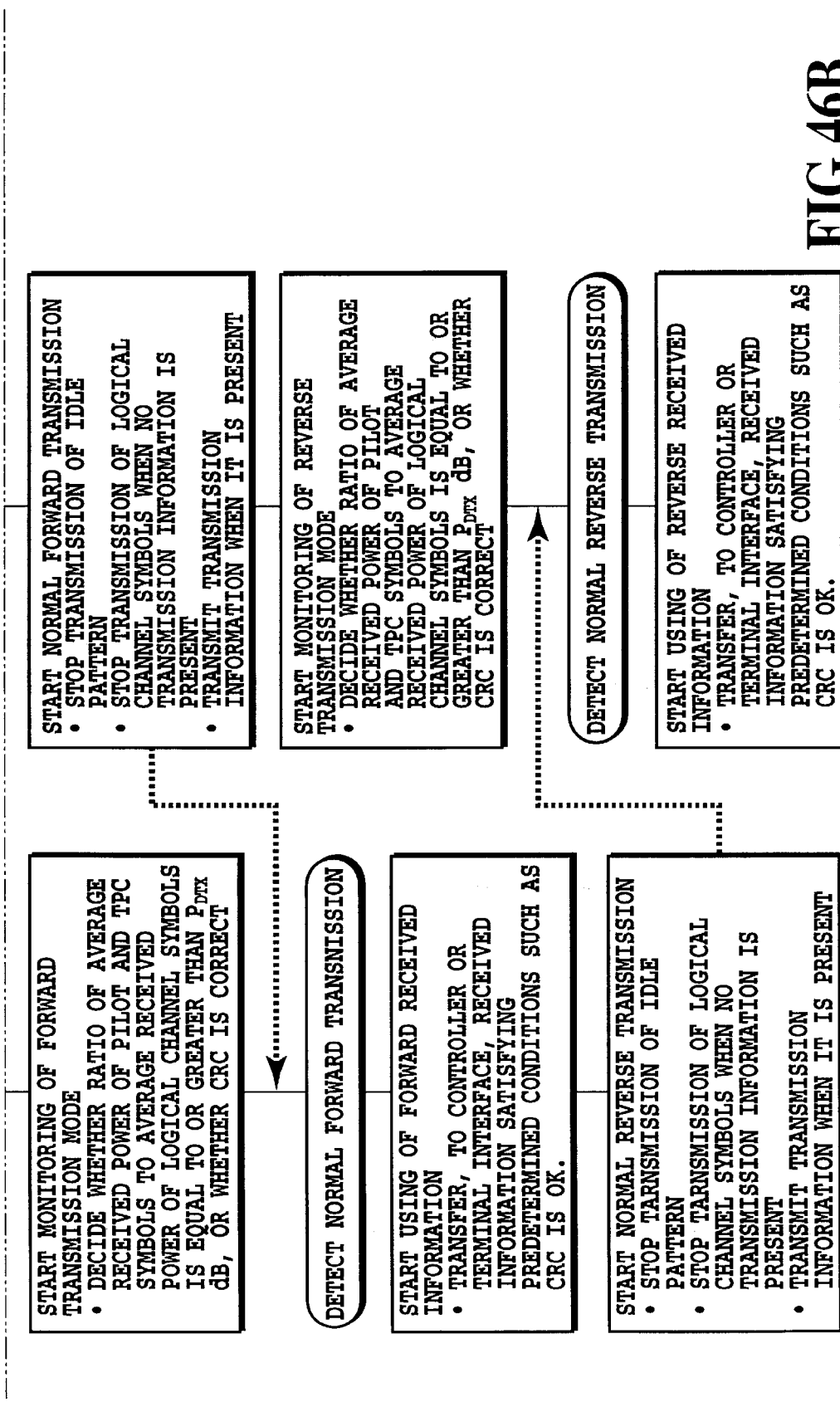
FIG. 46B is a flowchart illustrating a synchronization establishment flow of a dedicated physical channel.

The outline of the synchronization establishing procedure of the SDCCH and TCH will now be described. FIGS. 46A and 46B illustrate a detailed flow of the synchronization establishing processing.

(a) The BTS starts transmission of a forward channel.

(b) The mobile station establishes the synchronization of a forward channel on the basis of the synchronization information of the perch channel, and a frame offset group and a slot offset group which are noticed from the network.

(c) The mobile station starts transmission of a reverse channel at the same frame timing as the forward channel.

(d) The BTS establishes the reverse channel synchronization on the basis of the frame offset group and slot offset group which are designated by the MCC. In this case, the actual synchronization timings are shifted by the propagation delay time taken to make a round trip between the mobile station and the BTS. Thus, the propagation delay time measured at the random access reception can be utilized to reduce the search range for establishing the synchronization.

5.2.2.4. At the Inter-cell Diversity Handover

With regard to the reverse dedicated physical channel transmitted by the mobile station, and the forward dedicated physical channel transmitted by the BTS which originates the diversity handover, the radio frame number and long code are continuously counted up as usual even at the beginning of the diversity handover, and are not changed abruptly. The continuity of user information conveyed is fully guaranteed, and hence no instantaneous interruption takes place.

The outline of the synchronization establishing procedure at the start of the diversity handover will be described with reference to FIGS. 88A and 88B.

(a) The mobile station measures the frame time difference between the same number radio frames that the mobile station is transmitting through the reverse dedicated physical channel and the handover destination BTS is transmitting through the perch channel, and reports the measured results to the network. The measured results are obtained as the time difference of the frame timing of the reverse dedicated physical channel from the frame timing of the perch channel. They are represented in terms of chips, and take a positive value ranging from zero to "reverse long code period—1" chips.

(b) The mobile station reports, over the ACCH of the reverse dedicated physical channel, the measured results of the frame time difference in the form of a layer 3 signal to the BSC through the diversity handover originating BTS.

(c) The BSC notifies using the layer 3 signal the diversity handover destination BTS of the measured results of the frame time difference along with the frame offset and the slot offset which are set at the incoming or outgoing call connection.

(d) The handover destination BTS, receiving the notification of the measured results of the frame time difference, frame offset and slot offset, starts the transmission of the forward dedicated physical channel using the received information, and starts the synchronization establishing processing of the reverse dedicated physical channel the mobile station is transmitting. About the transmission timing of the forward dedicated physical channel, and the synchronization establishing method of the reverse dedicated physical channel, refer to 4.1.3.

5.2.2.5. Synchronization of Perch Channels of Other Sectors in the Same Cell

Each sector in the same cell transmits the perch channel which is spread using the same long code and the same short code, with keeping the phase difference specified by the system. The mobile station receives broadcast information from waiting sectors after completing the initial synchronization. The broadcast information includes the sector number of its own and the number of sectors in the same cell. The mobile station identifies the long code phases of the other sectors in the same cell, and establishes the perch channel synchronization.

5.2.2.6. A Method of Deciding the Synchronization Establishment of Dedicated Channels (a) Chip synchronization.

The BTS knows the reverse long code phase of the channel to be received. The BTS carries out path search, and RAKE reception of the paths with high correlation detection values. If the transmission characteristics described at 5.1.2. are satisfied, the RAKE reception is readily possible.

(b) Frame alignment.

Since the long code phase has one-to-one correspondence with the frame timing, the search for the frame timing is not needed principally. It is enough to check the frame alignment at the frame timing corresponding to the long code phase after the chip synchronization has been established. The decision condition of the frame alignment establishment of the BTS for the dedicated physical channel is that the radio frames whose sync words each include Nb or less unmatched bits continue for SR frames or more.

(c) Super frame alignment.

Since the dedicated physical channel does not include any bit indicating the FN, the frame number is tacitly decided to establish the super frame alignment.

As to the reverse dedicated physical channel, the frame number is set such that the frame number becomes zero at the timing lagged behind the timing at which the reverse long code phase is zero by an amount of the frame offset+ slot offset as shown in FIGS. 87A and 87B. This relationship between the long code phase and the frame number is maintained until the radio channel is released, even if the diversity handover is repeated after the incoming or outgoing call connection.

As to the forward dedicated physical channel, the frame number is determined such that the radio frame whose timing is shifted by a predetermined time period from the perch channel frame timing is provided with a frame number equal to the SFN of the perch channel, modulo 64. The predetermined time period equals frame offset+slot offset during the incoming or outgoing call connection as illustrated in FIGS. 87A and 87B. During the diversity handover, it equals the measured value of the frame time difference−½ slot−α, where α is an omitted value for expressing the measured value of the frame time difference−½ slot in terms of a symbol unit.

(2) Resynchronization.

The present system does not possess any special resynchronization establishing processing procedure because the optimum path search by the searcher is equivalent to carrying out continuous resynchronization.

(3) An out-of-phase decision method.

A out-of-phase decision method of the BTS in the radio section for the dedicated physical channel will now be described. The following two conditions are monitored.

Condition 1: Whether or not the number of unmatched bits in a sync word is equal to or less than Nb.

Condition 2: Whether or not the CRC on the DTCH selection combining unit basis or on the UPCH internal encoding unit basis is correct.

If the radio frames that satisfy neither of the two conditions continue for SF frames or more, a decision is made that the out-of-sync state takes place, where SF is the number of forward synchronization guarding stages.

If the radio frames that satisfy at least one of the two conditions continue for SR frames or more in the out-of-sync state, a decision is made that the synchronous state takes place, where SR is the number of reverse synchronization guarding stages.

5.2.4. Handover Control 5.2.4.1. Inter-sector Diversity Handover in the Same Cell It is assumed that the number of sectors involved in the inter-sector diversity handover in the same cell is three at the maximum.

(1) Reverse link.

*The maximal ratio combining is carried out for the entire symbols of the physical channel in the same manner as the space diversity of the received signals from a plurality of sector antennas.

*The forward transmission power control is carried out using the TPC symbols after the maximal ratio combining.

*The reverse transmission power control is carried out using the receive quality after the maximal ratio combining. That is, the forward TPC symbols are set using the receive quality after the maximal ratio combining.

*As for the wire transmission, the link establishment and transmission are carried out in the same manner as when the diversity handover is not being performed.

(2) Forward link.

With regard to each symbol on the physical channel, the same symbol is transmitted from the plurality of the sector antennas. The transmission timing control is carried out in the same manner as the inter-cell diversity handover (see 4.1.3. for more details).

*As for the wire transmission, the link establishment and transmission are carried out in the same manner as when the diversity handover is not being performed.

5.2.4.2. Inter-cell Diversity Handover

*The transmitted and received signal processings of both the forward and reverse links during the inter-cell diversity handover are carried out in the same manner as when the diversity handover is not being performed.

5.2.5. Packet Transmission Control 5.2.5.1. Applications

The packet transmission control is applied to the following services.

*TCP/IP packet service.

*Modem (RS-232 serial data transmission) service.

5.2.5.2. Outline

The purpose is to transmit data of various traffic characteristics from low density light traffic to high density heavy traffic with efficiently utilizing radio resources and facility resources. Major features will be described below.

(1) Switching of physical channels in use in accordance with transmission functions such as traffic.

To make effective use of the radio resources and facility resources without degradation in the quality of service, the physical channels (logical channels) are switched as needed in accordance with the transmission functions like time varying traffic volume.

During light traffic: common control physical channels (FACH and RACH).

During heavy traffic: dedicated physical channels (UPCH)

(2) Switching control of the physical channels between the MS and BTS.

The switching control between the physical channels are carried out frequently. If the switching control involves the wire transmission control, this will lead not only to an increase of a wire transmission control load, the wire transmission cost and the control load of the BSC and MSC, but also to an increase in the switching control delay, resulting in the degradation in the quality of service. To avoid this, the switching control must be carried out only between the MS and BTS, thereby obviating the wire transmission control and BSC and MSC control involved in the switching control.

(3) Inter-cell high speed HHO (hard handover).

At least while using the common control physical channel, the diversity handover is impossible because the transmitting and receiving timings cannot be set freely as in the dedicated physical channel.

In addition, if the normal DHO is applied to the dedicated physical channels during the switching control of the physical channels, it is necessary for the switching control between the dedicated physical channels to control a plurality of BTS'es, which will increase the control load and degrade the quality of service because of an increase in the control delay. For this reason, hard handover (HHO) is employed as a scheme in the packet transmission under the condition that the HHO is carried out at a high frequency to avoid an increase in the interfering power due to handover.

Since the HHO is carried out at a high frequency, if the HHO processing involves the wire transmission control, this will lead not only to an increase of a wire transmission control load, that of the wire transmission cost and that of the control load of the BSC and MSC, but also to an increase in the HHO control delay, resulting in the degradation in the quality of service. To avoid this, the wire section uses the diversity handover, and only the radio section employs the HHO. In addition, the HHO control is carried out only between the MS and BTS, thereby obviating the wire transmission control and BSC and MSC control involved in the HHO control.

5.2.5.3. Inter-cell Handover Control

Figure 47:
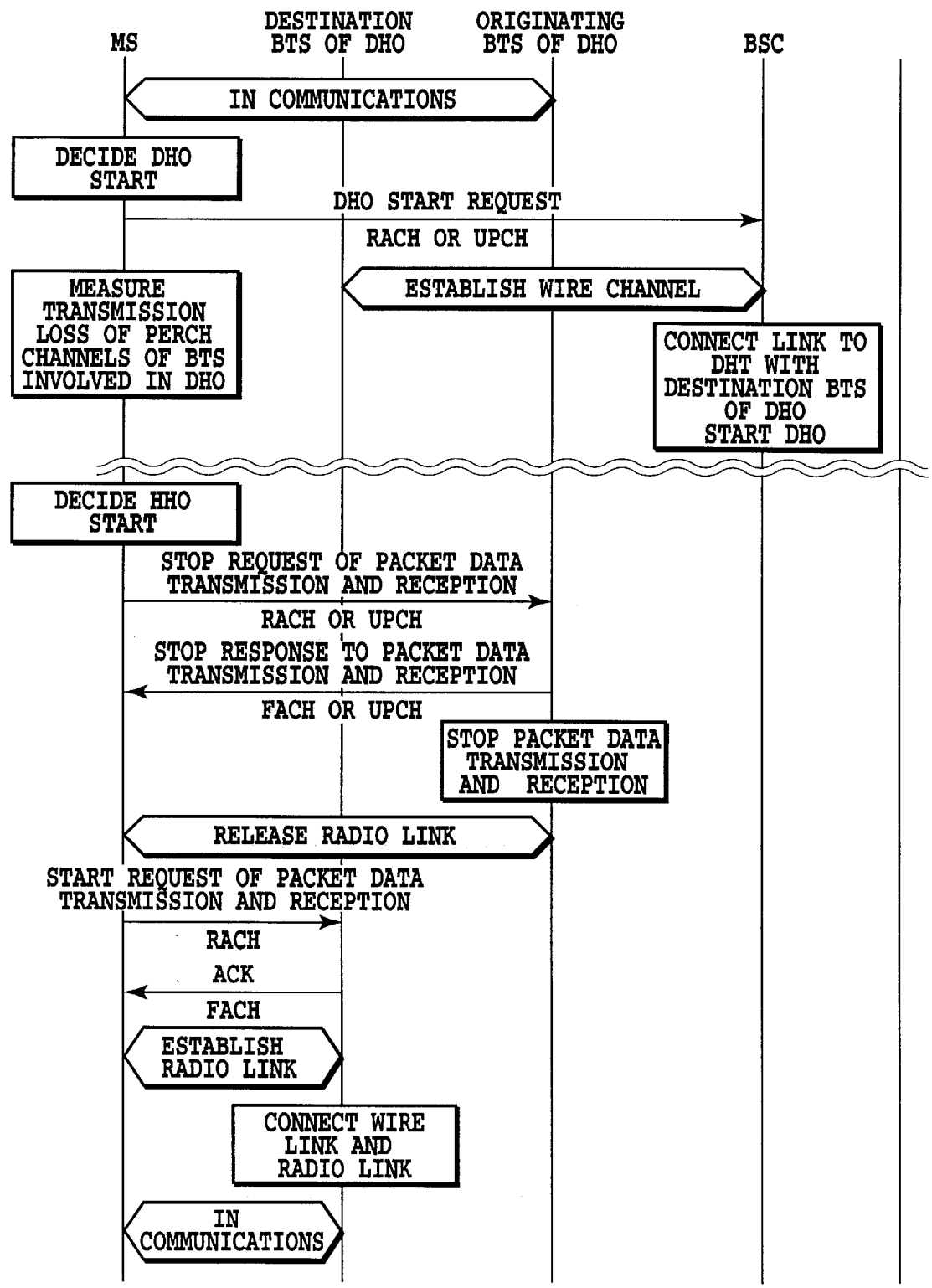
FIG. 47 is a sequence diagram illustrating an example of an inter-cell diversity handover processing in packet transmission.
Figure 48:
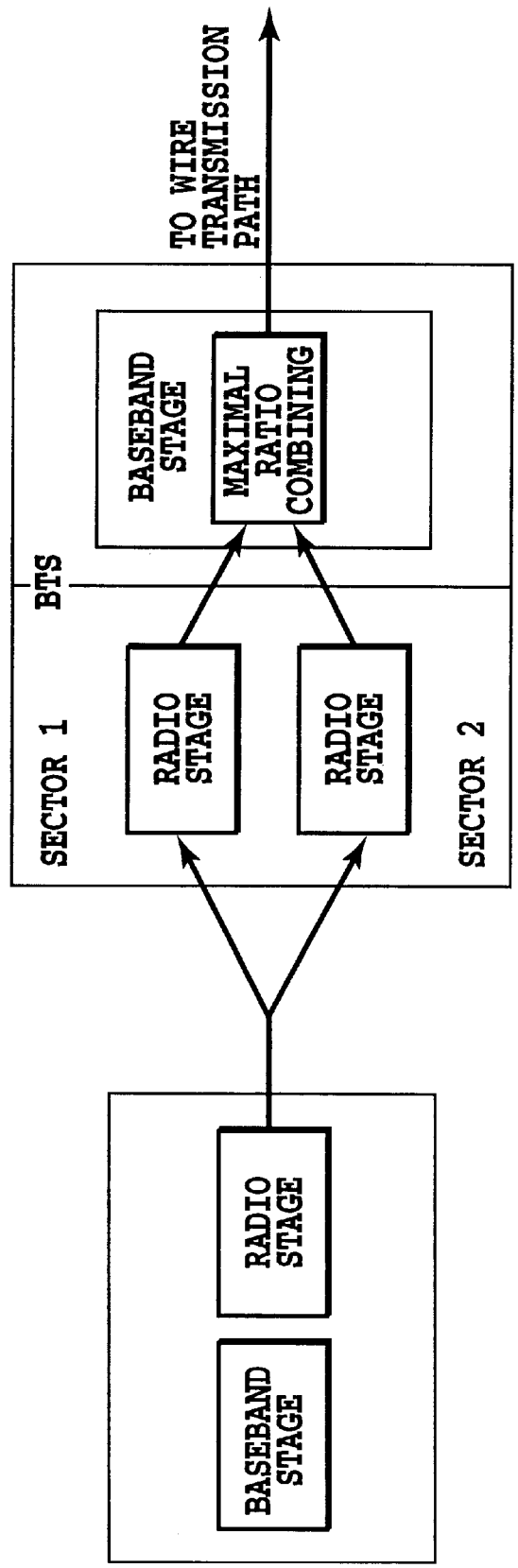
FIG. 48 is a diagram showing an example of a connection configuration during an inter-sector handover in a reverse dedicated physical channel (UPCH)
Figure 49:
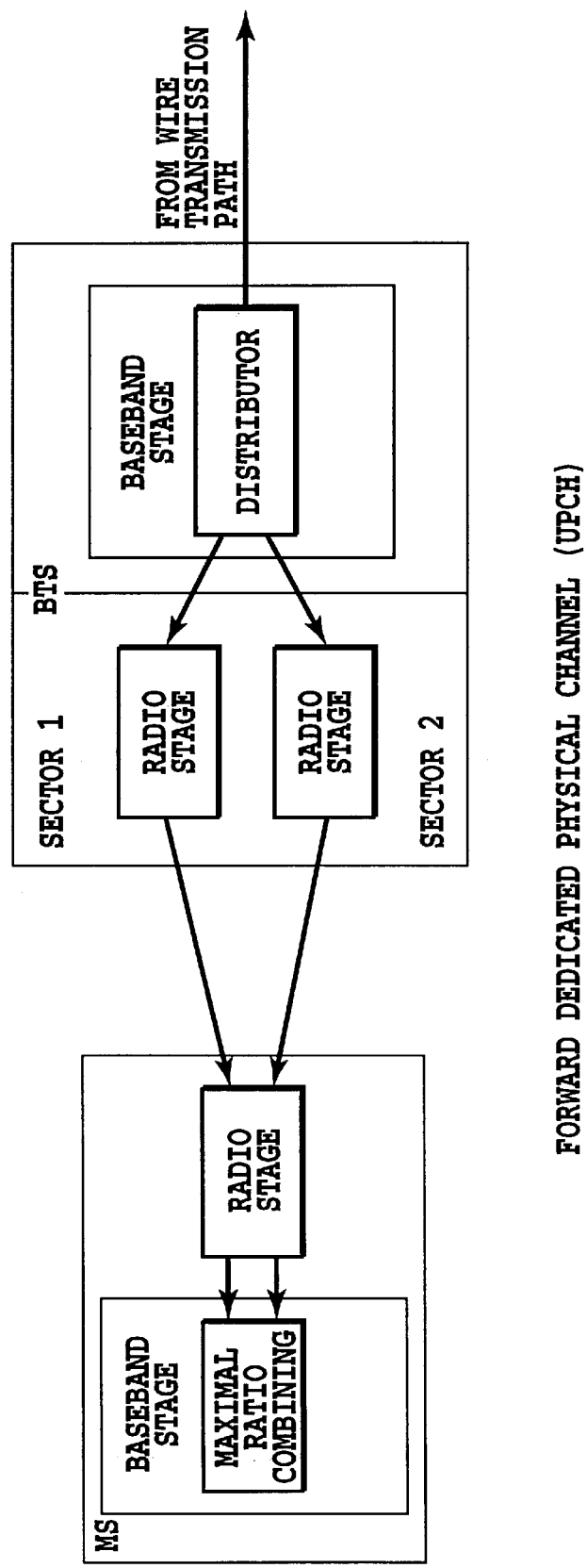
FIG. 49 is a diagram showing an example of a connection configuration during an inter-sector handover in a forward dedicated physical channel (UPCH)
Figure 50:
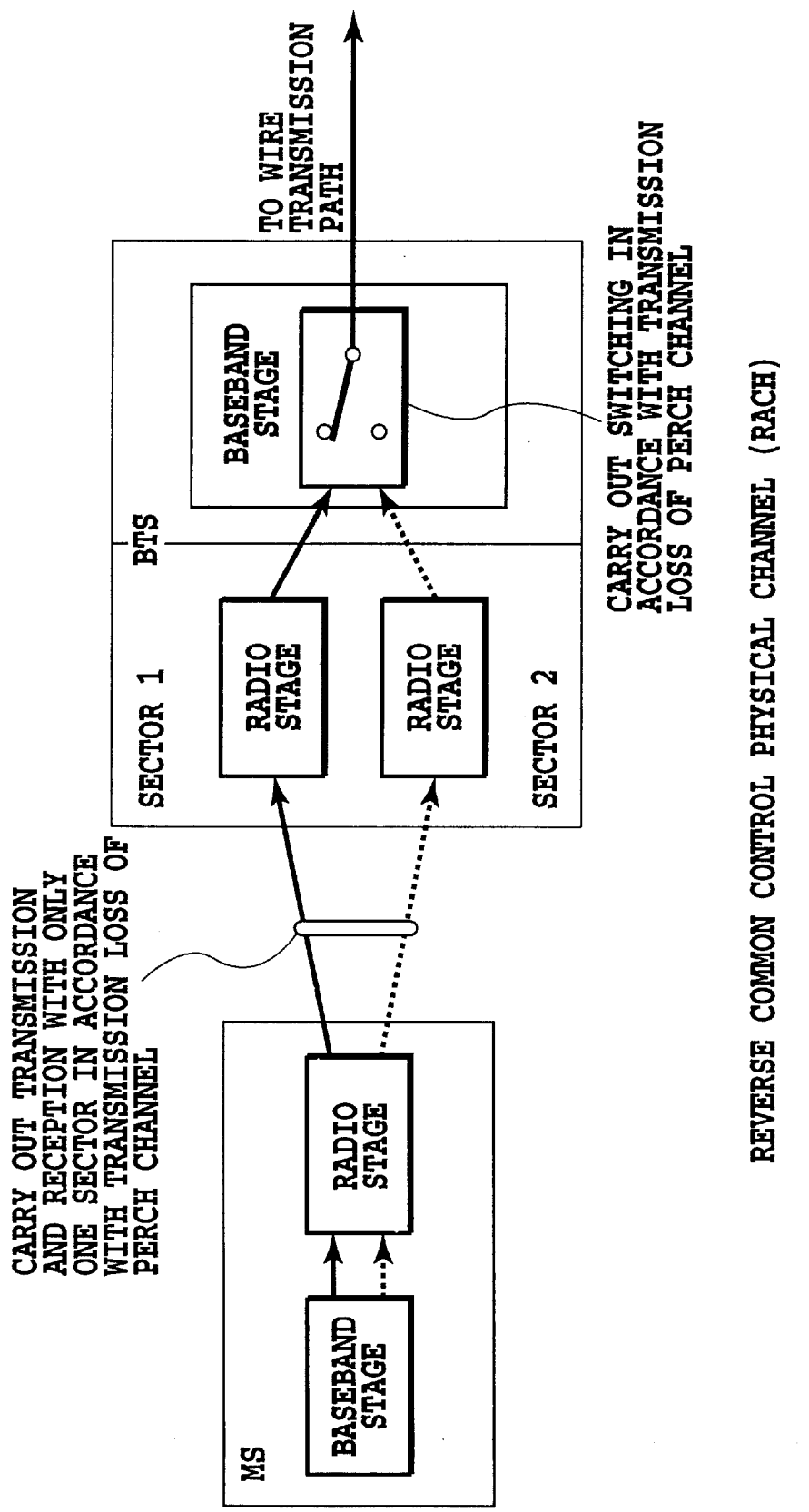
FIG. 50 is a diagram showing an example of a connection configuration during an inter-sector handover in a reverse common control physical channel (RACH)
Figure 51:
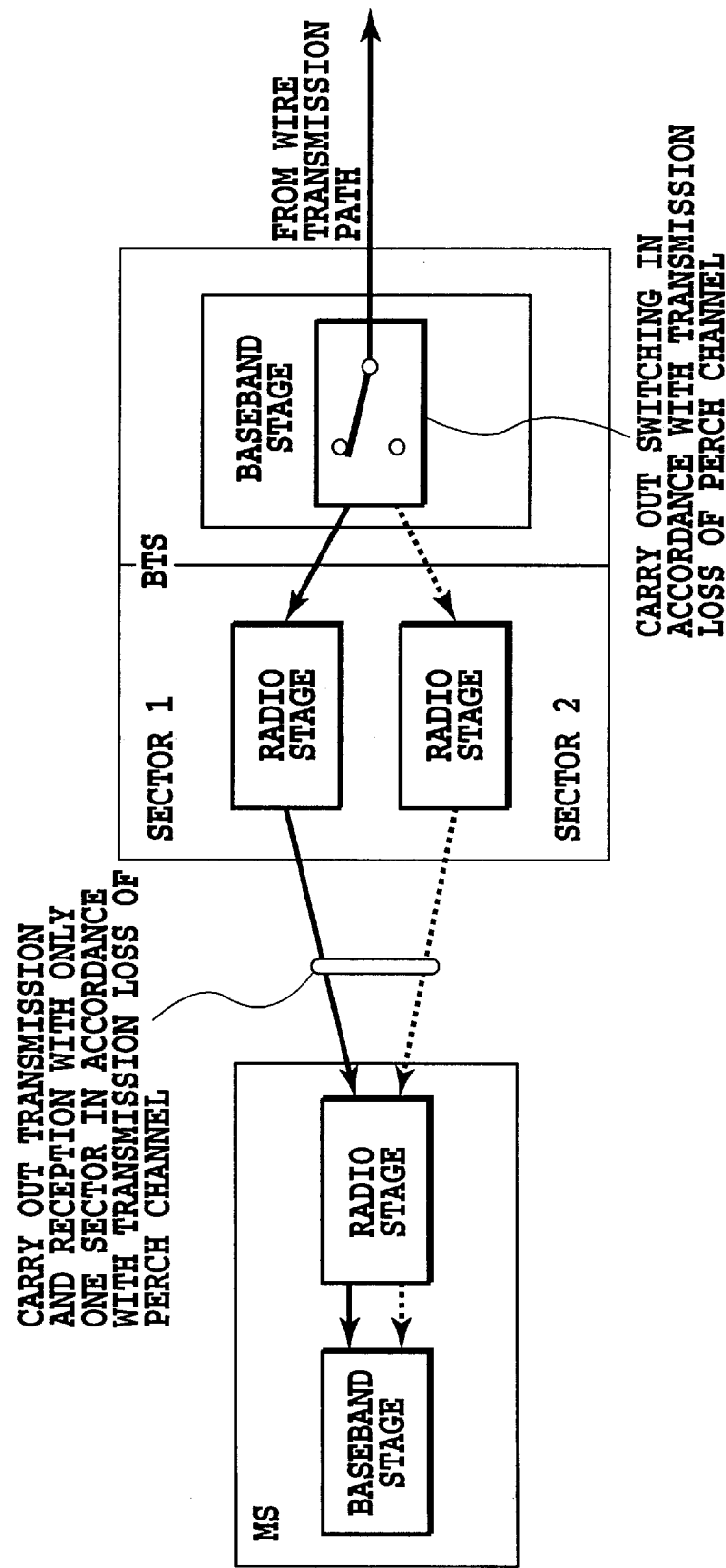
FIG. 51 is a diagram showing an example of a connection configuration during an inter-sector handover in a forward common control physical channel (FACH)

*An inter-cell handover processing procedure will now be described with reference to the processing sequence of FIG. 47.

(1) As in the normal DHO, the mobile station selects sectors that meet the diversity handover start conditions in accordance with the perch channel received levels of the peripheral sectors, and reports them to the BSC via the BTS.

(2) The BSC establishes a wire channel link with the diversity handover destination BTS so that a plurality of links are connected to the DHT, and the wire section is brought into a DHO state.

(3) The mobile station continuously measures for each BTS the propagation loss between the BTS and MS using the perch channel received level of the present location sector and the perch channel received levels of other sectors involved in the handover, and compares the measured propagation losses. If the propagation loss of one of the other sectors involved in the handover becomes less than that of the present location sector, and their difference exceeds a predetermined value, the start of the hard handover is decided. Thus, the mobile station first sends to the present location sector a request for halting the transmission and reception of the packet data.

(4) Sending a response signal back to the mobile station, the BTS in the sector in which the mobile station is located halts the transmission and reception of the packet data over the radio section, and releases the radio link. The wire link which has been established, however, is unchanged.

(5) Receiving the response signal from the BTS in the current location sector, the mobile station releases the radio channel between them, and transmits over the RACH a transmitting and receiving request signal of the packet data to the BTS in the handover destination sector. This signal is transmitted through the physical channel (common control physical channel or dedicated physical channel) which was used by the handover originating BTS.

(6) The handover destination BTS establishes a physical channel that is to be set for the packet data transmission in accordance with the received RACH signal that includes information about the physical channel (common control physical channel or dedicated physical channel) used by the handover originating BTS. Although the wire link set-up is not changed in any way, the connection between the wire link and radio link is designated.

*The sequence of the processing is the same regardless of the physical channel (common control physical channel or dedicated physical channel) in use. Only, in establishing/releasing the radio link, the physical channel establishing/releasing processing is required with the dedicated physical channel but not with the common control physical channel.

5.2.5.4. Inter-sector Handover Control

FIGS. 48–51 shows examples of the connection configuration during the inter-sector handover.

With regard to the dedicated physical channel (UPCH), since the inter-sector DHO is controllable independently of the BTS, the inter-sector DHO that uses the maximal ratio combining is carried out for both the forward and reverse links in the packet transmission as in the circuit switching mode.

With regard to the common control physical channel (FACH and RACH), since the transmitting and receiving timings cannot be set freely, the maximal ratio combining is impossible for both the forward and reverse links. For this reason, the switching control is carried out in the BTS and mobile station such that the transmission and reception are carried out with only one sector in accordance with the propagation loss of the perch channel. The switching control method is the same as the inter-cell handover processing as shown in FIG. 47.

5.2.5.5. Switching Control of the Physical Channels (1) Switching decision node.

The BTS that covers the location sector of the mobile station makes a decision of the switching on the basis of the following factors.

(2) Factors for making a switching decision.

The following factors are available, and the factors to be used are selectable. The factors 1 and 2 become available when the report of the information about the factors is started.

Factor 1: In-band information (information about the physical channel which is desired to be used) fed from the ADP of the MCC and the ADP of the MS.

Factor 2: Monitoring of the forward/reverse traffic volume by the BTS.

Factor 3: A layer 3 signal that requires from the MS to the BTS switching of the channel to be used.

(3) A switching decision method.

A decision of switching is made by comparing the information reported by the factors of the foregoing section (2) with predetermined thresholds.

(4) A switching control method.

Figure 52:
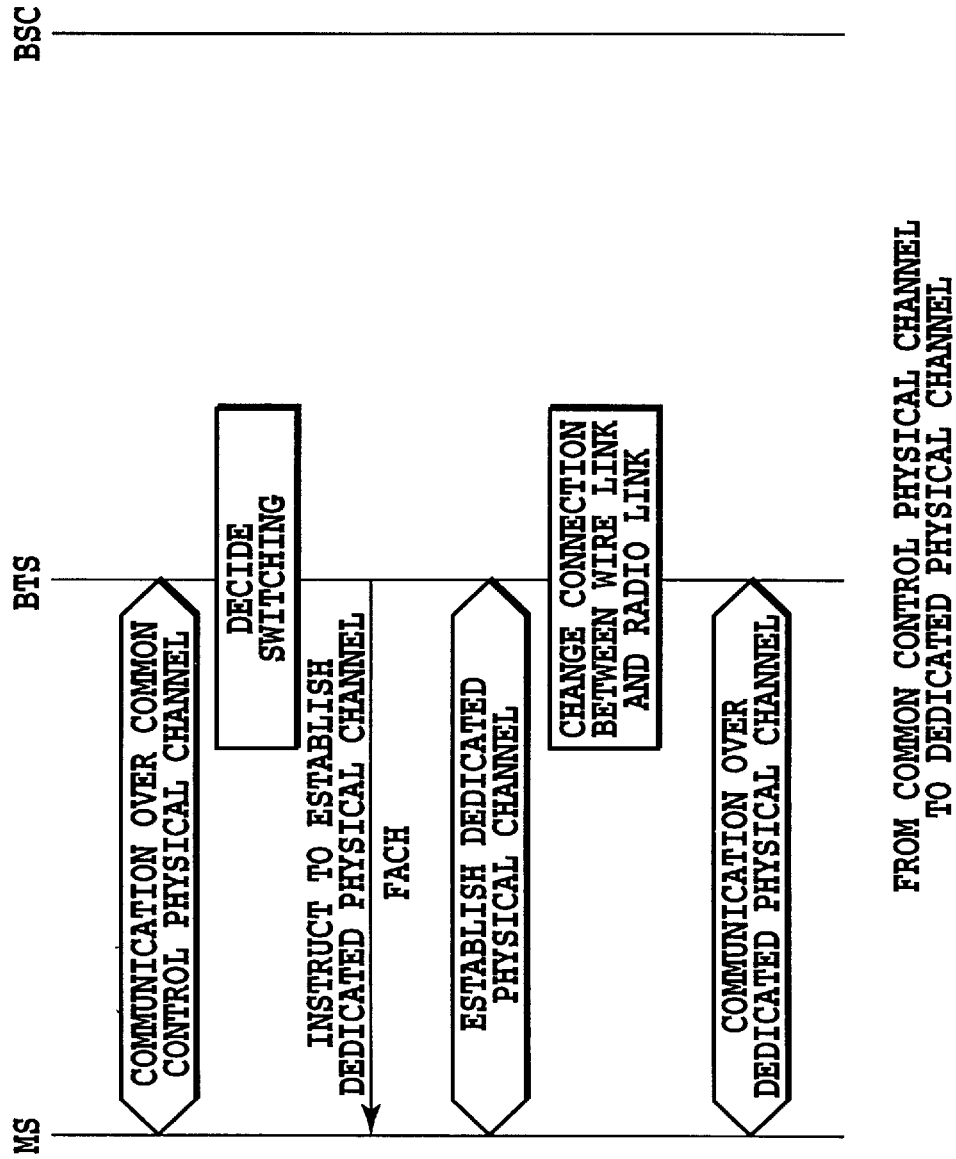
FIG. 52 is a diagram illustrating an example of a switching sequence from a common control physical channel to a dedicated physical channel.
Figure 53:
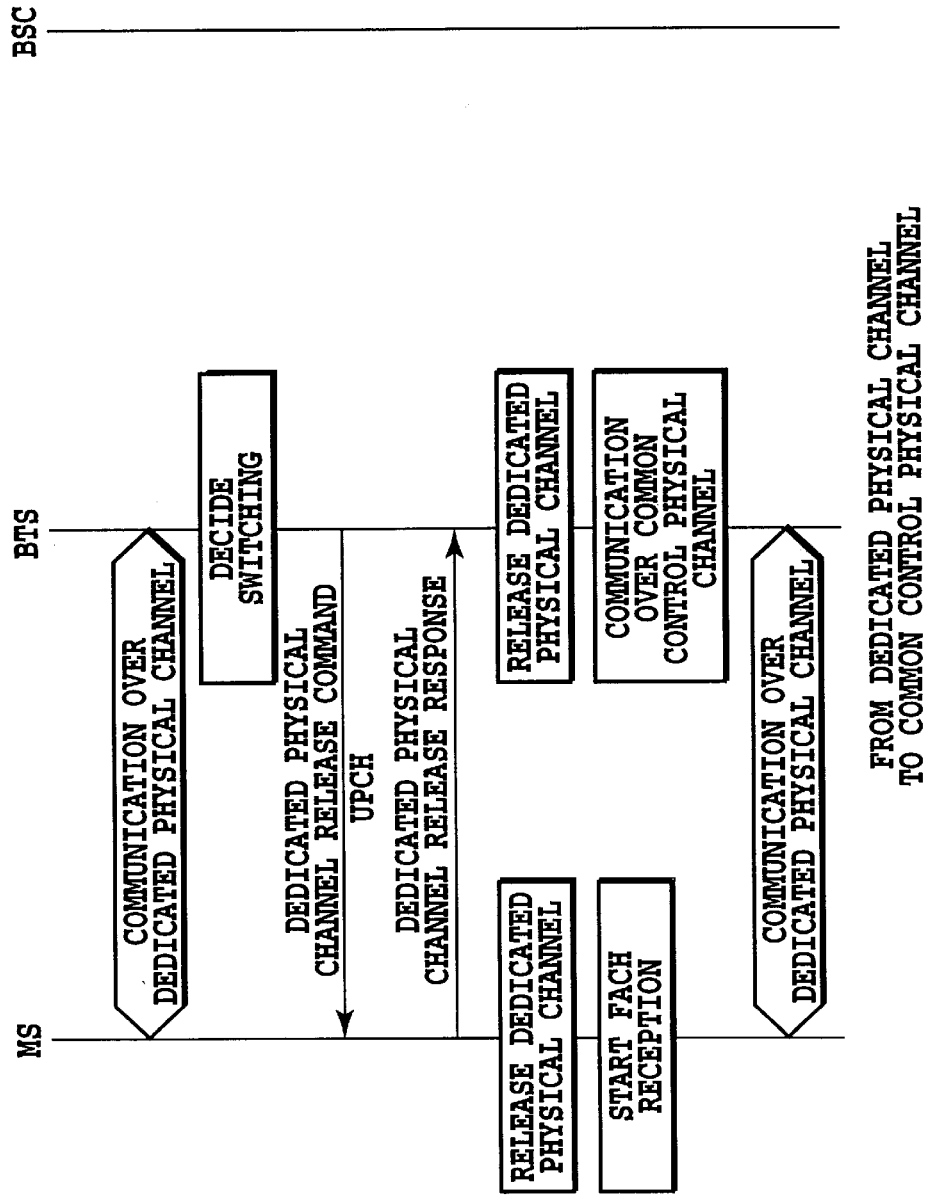
FIG. 53 is a diagram illustrating an example of a switching sequence from a dedicated physical channel to a common control physical channel.

*FIGS. 52 and 53 illustrate switching sequences.

For example, when the mobile station (MS) and the base station (BTS) is communicating through a common control physical channel (FIG. 52), the BTS makes the switching decision if any one of the foregoing switching decision factors takes place. When making a switching as a result of the decision, the BTS instructs through the FACH the MS to establish a dedicated physical channel, and establishes the designated dedicated physical channel between the MS. Then, the BTS changes the connection of the wire link and radio link with the MS from the common control physical channel to the dedicated physical channel. Subsequently, the BTS communicates over the dedicated physical channel which has been established.

On the other hand, when the mobile station (MS) and the base station (BTS) is communicating through a dedicated physical channel (FIG. 53), the BTS makes a decision of the switching to a common control physical channel. When a switching to the common control physical channel is required, the BTS instructs through the UPCH the MS to release the dedicated physical channel which is being used.

Receiving the instruction to release the dedicated physical channel, the MS makes a response to that, and releases the dedicated physical channel which is being used. Then, the MS starts the FACH reception of the common physical channel.

Receiving the response, the BTS releases the dedicated physical channel which is used between it and the MS, and changes the connection of the wire link and radio link with the MS. Subsequently, the BTS communicates over the common control physical channel which has been established.

*The switching control is processed only in the radio section between the mobile station and the BTS, without involving BSC and wire section at all.

Since the switching control is based only on the decision the base station makes, and does not involve any switching control of the wire section (between the base station and the control center (BSC), for example), it is possible to reduce the load of the switching control, and to speed up the switching control.

*The control signal between the mobile station and the BTS is a layer 3 signal, and is processed by the BTS. In this case, the BTS must change the connection between the wire link and radio link in accordance with the instructions as described before.

5.3. Transmission Path Interface 5.3.1. Physical Interface Terminating Function

*Electric level interface.

*Cell level interface.

a) Generation/termination of transmission frames.

Mapping ATM cells using a 6.3M/1.5M transmission path based on the PDH (plesiochronous digital hierarchy).

The ATM cells are transmitted at 6.3 M using TS1–TS96 without using TS97 and TS98, and at 1.5 M using all the TS1–TS24. In this case, although it is unnecessary to recognize the delimiter between the 53 bytes of the ATM cells, the delimiters between time slots and between octets of the ATM cells are transmitted in conjunction with the boundary.

On the receiving side, the ATM cells are extracted from the TS1–TS96 with ignoring the data of the TS97 and TS98, at 6.3 M. At 1.5 M, the ATM cells are extracted from the TS1–TS24.

b) Cell synchronization establishment.

1) First, to identify the cell boundary, using a fact that the delimiter of each octet is instructed from the physical channel before the cell synchronization, the header error control code on every four octet basis is calculated by the generator polynomial $X^8+X^2+X+1$ with shifting every one octet, until its result becomes equal to the mod 2 value of the fifth octet value minus "01010101".

2) Once a position is detected at which the HEC (Header Error Correction) value equals the calculation result, a pre-synchronization state is started assuming the position as the header position.

3) Subsequently, it is assumed that the header position takes place every one cell (53 bytes) interval, and the HECs are checked at the intervals. Thus, if six consecutive HECs are found to be correct, the synchronization state is started.

4) The HEC check operation is continued at every one cell interval in the synchronization state to monitor the state. Even if HEC errors are detected, if the consecutive number of the HEC errors is less than seven, the synchronization state is maintained because of the synchronization guarding. An out-of-sync state is decided if seven consecutive HEC errors take place, and the control is returned to the state of 1) for resynchronization.

c) Cell rate adjustment.

When the ATM cell rate of the ATM layer differs from the transmission path rate as in the case where no cell is present to be sent on the transmission path, the physical interface inserts idle cells for adjusting the cell rate and for matching the two rates.

Since the idle cell has a fixed pattern, its header can be identified by "00000000 00000000 00000000 00000001 01010010". Its pattern in the information field consists of iterative sequences of "01101010" (see, FIG. 32).

The idle cell is used only for cell synchronization on the receiver side, without any other role.

*Cell level scrambling (applied only to 6.3 M).
1) Only information field bits are made random by the generator polynomial $X^{43}+1$ at the cell level.
2) Descrambling is halted in the hunting state of the cell synchronization.
3) The descrambling operates over the bits equal to the information field length in the pre-synchronized state and in the synchronization established state, and halts during the period assumed to be the next header.
4) This function can be enabled or disabled by a hard switch.

5.3.2. ATM Terminating Function

*ATM cell VPI/VCI identification.

ATM cells have different VCI/VPI for each application or for each user, and transfer themselves to respective processing sections by identifying the VPI/VCI.

*ATM cell VPI/VCI multiplexing.

Since different VCIs are multiplexed on each VPI basis to be transmitted in the reverse direction signal, each application outputs its reverse direction ATM cell signal with band assurance control.

*Cell header structure.

Figure 54:
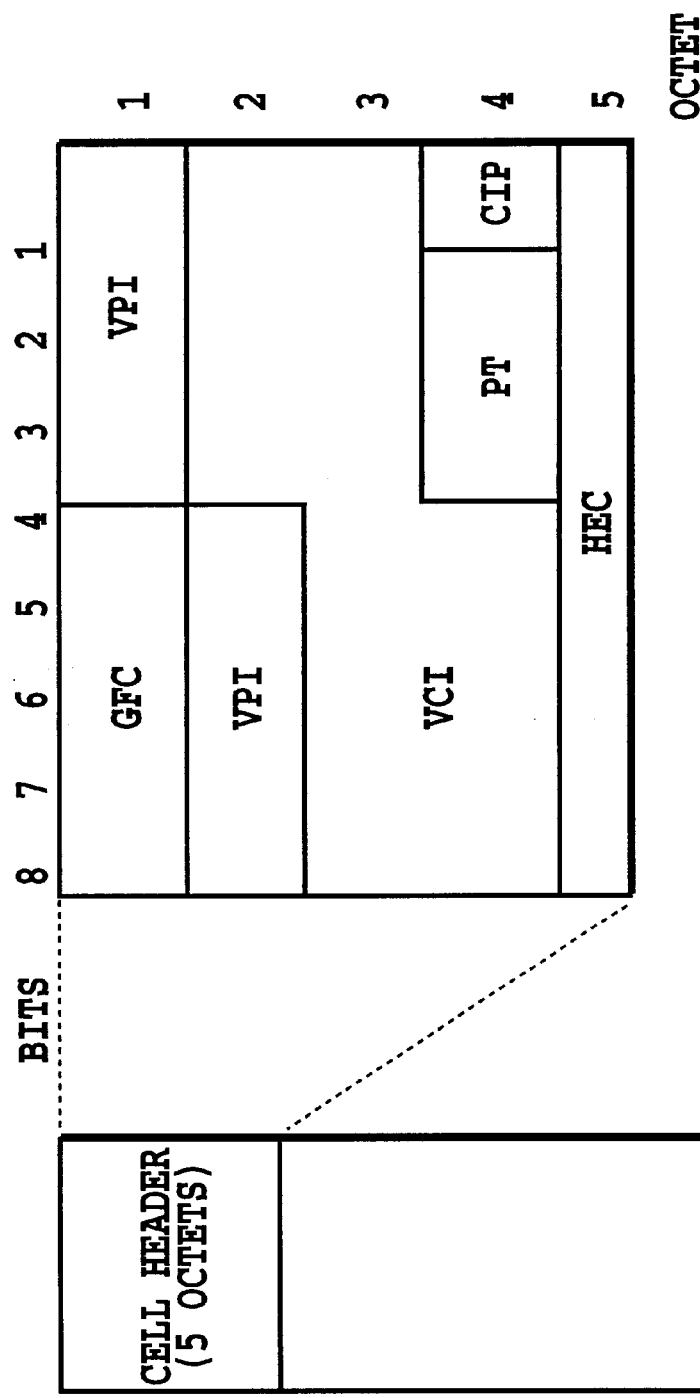
FIG. 54 is a diagram illustrating a format of a cell header.

The ATM cell comprises a cell header as shown in FIG. 54. The cell header includes 8-bit VPI and 16-bit VCI, and the details of their coding are specified separately between the switching system and the base station.

*ATM header coding.

The transmission order of bits of the ATM cell is determined such that the bits in each octet are sent from the bit number 8, and the octets are sent from the octet number 1. Thus, they are transmitted from the MSB.

As for the routing bits of the VPI/VCI, there are specified three types of VPIs in the interface between the base station and the switching center, and 256 types (8 bits) of VCIs from 0–255.

*Channel number/VPI/VCI setting (initial state).

Channel number: The channel number is fixedly corresponds to the mounted position of a HW interface card and the connector position in the card.

VPI: The VPI is always "0" (not used in practice).

VCI: The VCI is specified when a link of a wire transmission path is established.

5.3.3. AAL-Type 2 Control Function

*AAL-Type 2 protocol.

The AAL-Type 2 protocol is intended to provide variable rate services that have timing dependence between the transmitting and receiving ends, such as voices which are subjected to variable rate encoding.

The detail of the specifications is based on ITU-TI. 363.2.

a) Service types (Required conditions, etc.).

AAL-2 is required to carry out real time data transfer to the higher layer between transmitting and receiving sides at a variable rate, with particular timing conditions. In addition, it is required to achieve information transfer for matching the clock and timing between the transmitting and receiving sides, and to carry out transfer of information about data structure.

b) Functions of AAL-2

The AAL-2 must have the capability of dealing with, besides the timing conditions like those of AAL-1, multiplexing for multimedia multiplexing of data and voice, and of handling a variable rate, cell loss and cell priority.

5.3.4. Forward Direction Signal Separation Procedure

*The control signal and traffic signal in a forward direction signal can be separated by first identifying the AAL type. There are AAL-2 and AAL-5 in the AAL type, and they can be identified by the VCI (see, 4.2.2.1.).

*Likewise, the control signal between the BTS and MCC in the AAL-5 connection can be separated from the super frame phase correction cell by the VCI because their VCIs are different.

*The AAL-2 connection further includes CIDs for identifying users, and carries out the separation using the CIDs that are different for each call.

5.3.5. Band Assurance Control

Figure 55:
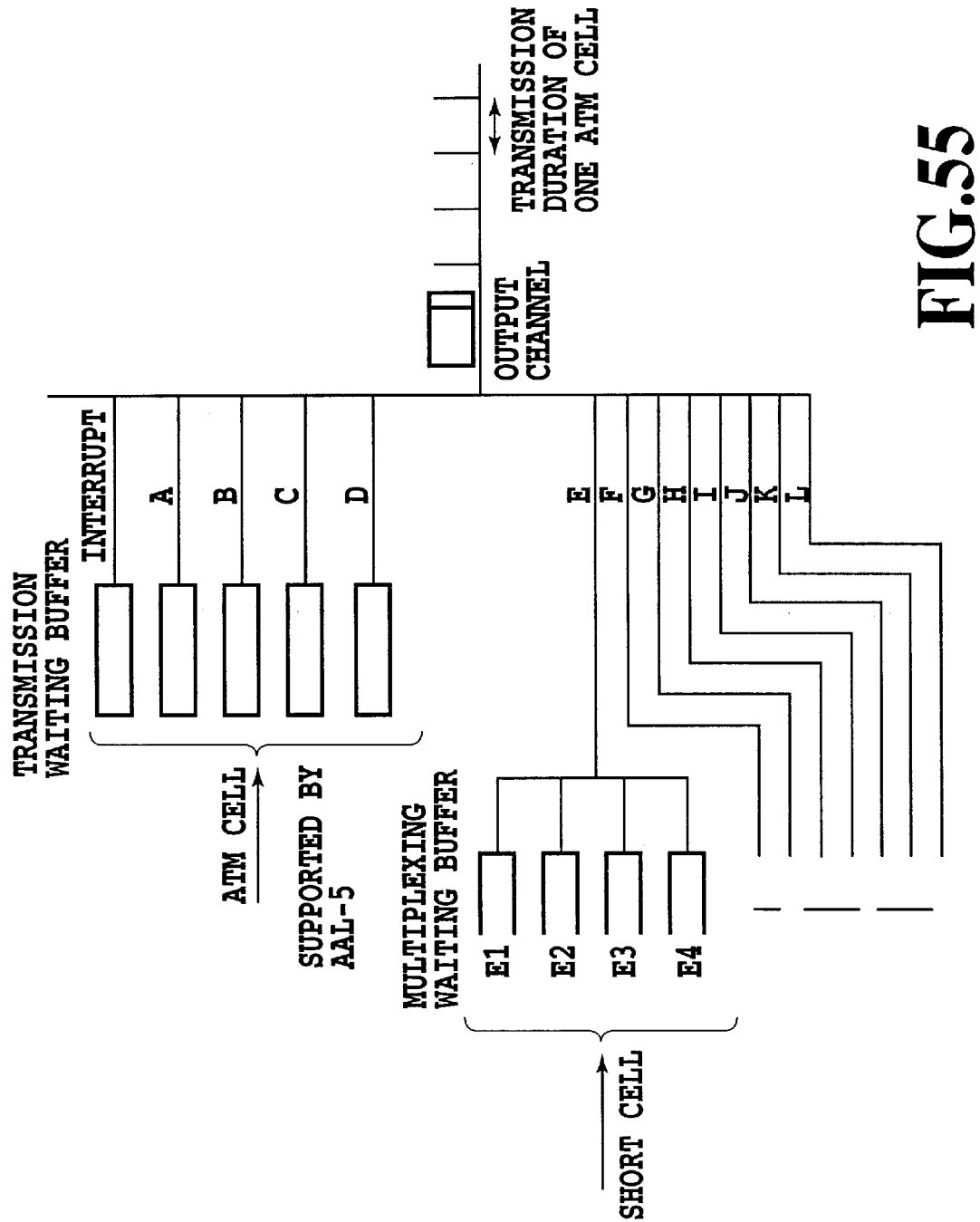
FIG. 55 is a diagram illustrating an outline of band assurance control.

*FIG. 55 illustrates the outline of the band assurance control.

*The band assurance control determines the transmission order of short cells and standard cells in accordance with the following quality classes, and establishes respective bands. More specifically, the band assurance control, being based on the precondition that the short cells and standard cells are discarded if they exceed a maximum tolerable delay time, determines transmission orders of the short cells and standard cells for respective quality classes such that the cell loss ratio becomes equal to a maximum cell loss ratio. The setting method of the transmission order is specified.

*As with the VCs to which the AAL-Type 5 is applied, the VCI is associated with one of the following AAL-Type 5 quality classes by setting a MATM connection ID.

*As with the VCs to which the AAL-Type 2 is applied, the VCI and CID are associated with one of the following AAL-Type 2 quality classes by setting the MATM connection ID.

5.3.5.1. Quality Classes 5.3.5.1.1. AAL-Type 5 Quality Classes

*The following six requirements are needed for the AAL-Type 5 quality classes. Table 28 shows the correspondence between services and the quality classes. In practice, the quality class is set in conjunction with the connection establishment of the wire transmission path. The timing cell VC is always assigned top priority (delay time is 0 ms, and loss rate is 0).

(maximum tolerable delay time; allowable cell loss ratio)
(top priority of 0 ms delay; loss ratio 0)
(5 ms; $10^{-4}$)
(5 ms; $10^{-7}$)
(50 ms; $10^{-4}$)
(50 ms; $10^{-7}$)
(AAL-Type 2)

5.3.5.1.2. AAL-Type 2 Quality Classes

*The following four requirements are needed for the AAL-Type 2 quality classes. Table 28 shows the correspondence between services and the quality classes. In practice, the quality class is set in conjunction with the connection establishment of the wire transmission path.

(maximum tolerable delay time; allowable cell loss ratio)
(5 ms; $10^{-4}$)
(5 ms; $10^{-7}$)
(50 ms; $10^{-4}$)
(50 ms; $10^{-7}$)

*When there are a plurality of AAL-Type 2 VCs as shown in Table 28, the band assignment to the AAL-Type 2 quality classes can be made different for each VC. In other words, the transmission order of the short cells can be changed for each VC.

5.3.5.2. Band Assurance Function of Reverse Direction Signals

Figure 56:
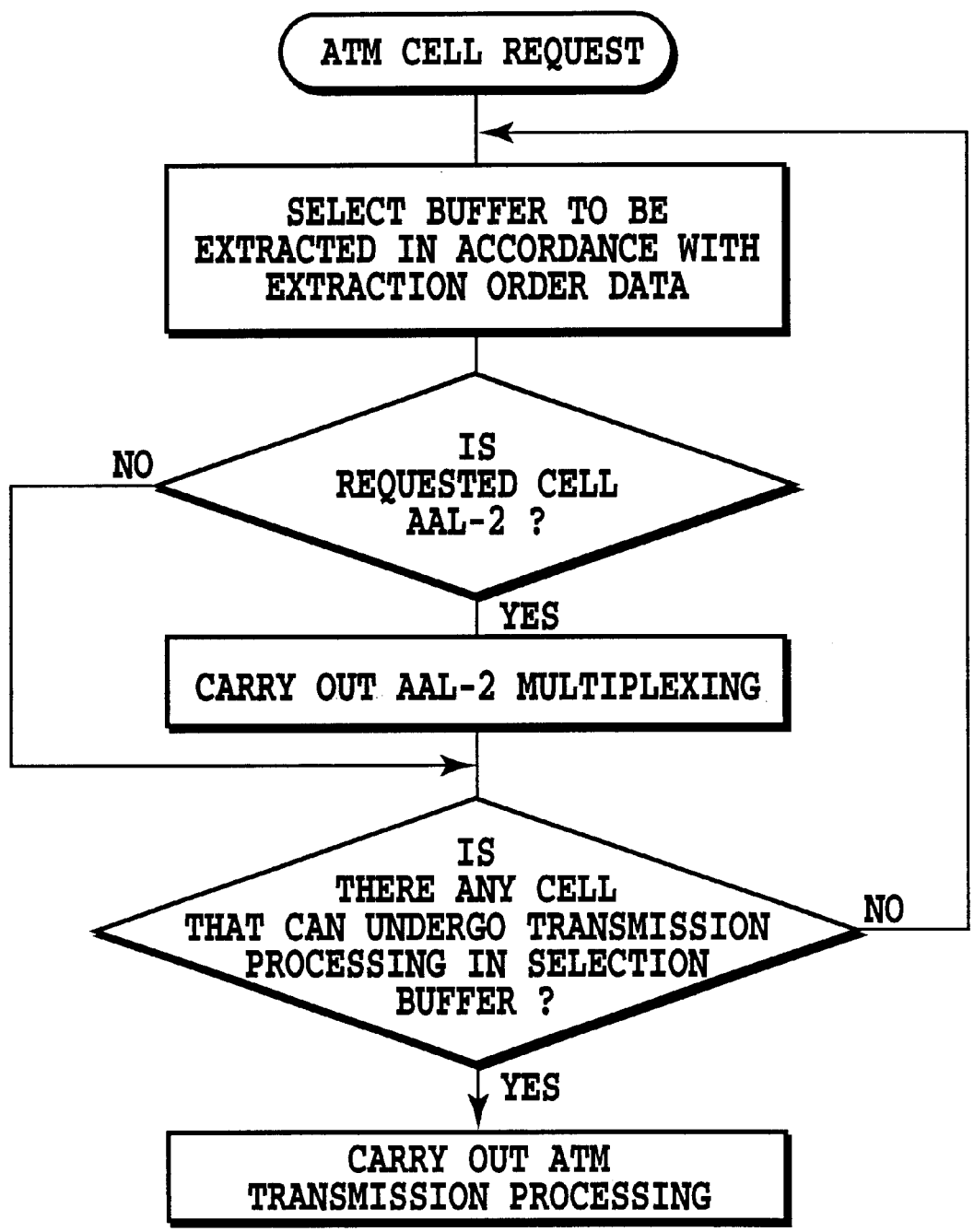
FIG. 56 is a flowchart illustrating ATM cell transmission control.
Figure 57:
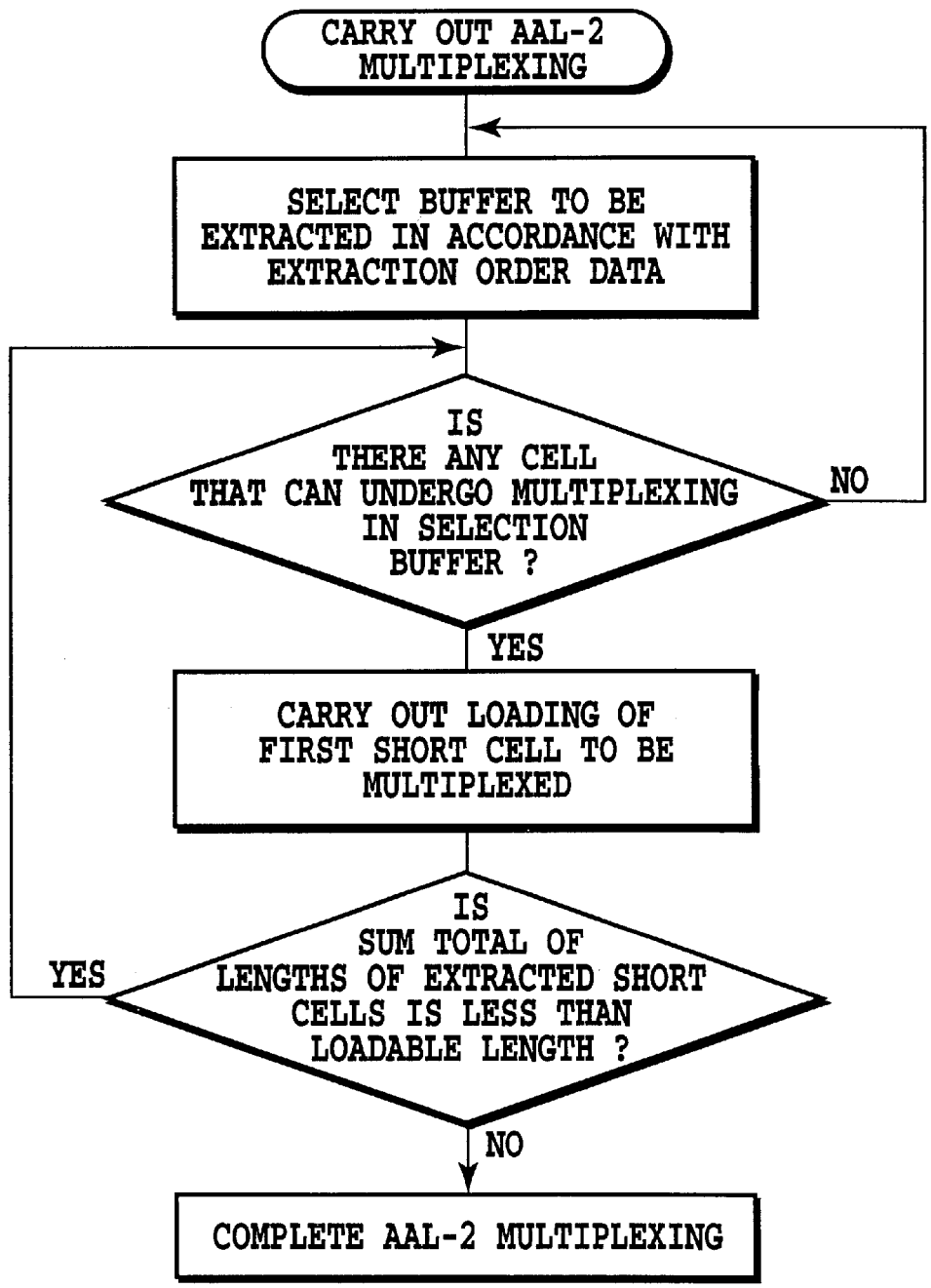
FIG. 57 is a flowchart illustrating an AAL type 2 cell assembling processing.

*As with the reverse direction signals, it is necessary to achieve both an AAL-Type 2 level band assurance and an ATM cell level band assurance which includes both the AAL-Type 2 and the AAL-Type 5. FIG. 56 illustrates a transmission procedure of the reverse direction ATM cell, and FIG. 57 illustrates an assembling procedure of reverse direction co-transmitted cells of the AAL-Type 2 level.

*The cell transmission sequence data is specified in correspondence with the quality classes at the start up of the BTS. In accordance with the cell transmission sequence data, short cells and standard cells to be transmitted are selected from the quality classes, subjected to the multiplexing, and formed into transmission cells. If a cell of the target quality is not present in the buffer, a cell in the next quality can be transmitted.

*According to the tolerable delay times determined for the individual quality classes, a cell in the buffer that exceeds the tolerable delay time of its class is discarded.

*FIGS. 58A–58C show examples of the cell transmission sequence data corresponding to Table 28. Transmission cycles of A, B, C, . . . , L are determined in accordance with allocated bands of respective ATM bands A, B, C, . . . , F (for example, ACADAFAC . . . ).

In addition, transmission sequences for compositing the short cells are determined depending upon respective SC bands E1–F4 such that the respective quality classes are satisfied (for example, F2F1F2F3F4 . . . )

If a cell is not present in the target class, a cell in the next priority is transmitted.

*A cell in the interrupt class is always transmitted with the top priority.

TABLE 28

Correspondence between services and quality classes.

| ATM quality classes (Tolerable delay, Cell loss ratio) | SC quality classes (Tolerable delay, Cell loss ratio) | Services | ATM band | SC band |
|---|---|---|---|---|
| (Top priority) | — | Timing cell | — | — |
| (5 ms, $10^{-7}$) | | Packet | A | — |
| (5 ms, $10^{-4}$) | — | Packet | B | — |
| (50 ms, $10^{-7}$) | — | Control between BTS, MMC and SIM, Paging signal | C | — |
| (50 ms, $10^{-4}$) | — | Packet | D | — |
| | (5 ms, $10^{-7}$) | unrestricted 32 kbps unrestricted 64 kbps or more | | E1 |
| AAL-Type 2 VC1 | (5 ms, $10^{-4}$) | voice | E | E2 |
| | (50 ms, $10^{-7}$) | ACCH (all symbol rates) | | |
| | | Packet | | E3 |
| | (50 ms, $10^{-4}$) | Modem Fax | | E4 |
| | (5 ms, $10^{-7}$) | unrestricted 32 kbps unrestricted 64 kbps or more | F | F1 |
| AAL-Type 2 VC2 | (5 ms, $10^{-4}$) | voice | | F2 |
| | (50 ms, $10^{-7}$) | ACCH (all symbol rates) | | |
| | | Packet | | F3 |
| | (50 ms, $10^{-4}$) | Modem Fax | | F4 |

5.3.6. AAL-Type 5 +SSCOP Function

*Service types.

The AAL-5 is a simplified AAL type that is provided for transferring signaling information. It differs from the other AAL types in that its payload has no header trailer, and hence can transfer 48 bytes with a minimum communication overhead.

*Functions of the AAL-5.

The AAL-5 carries out the error detection not on a cell by cell basis but on a user frame by user frame basis to improve the efficiency of the data transmission. The error detection is performed using CRC-32 check bits. The CRC is given for each user frame, and is effective in a poor transmission quality environment because of its high detection capability due to 32 bits.

Figure 59:
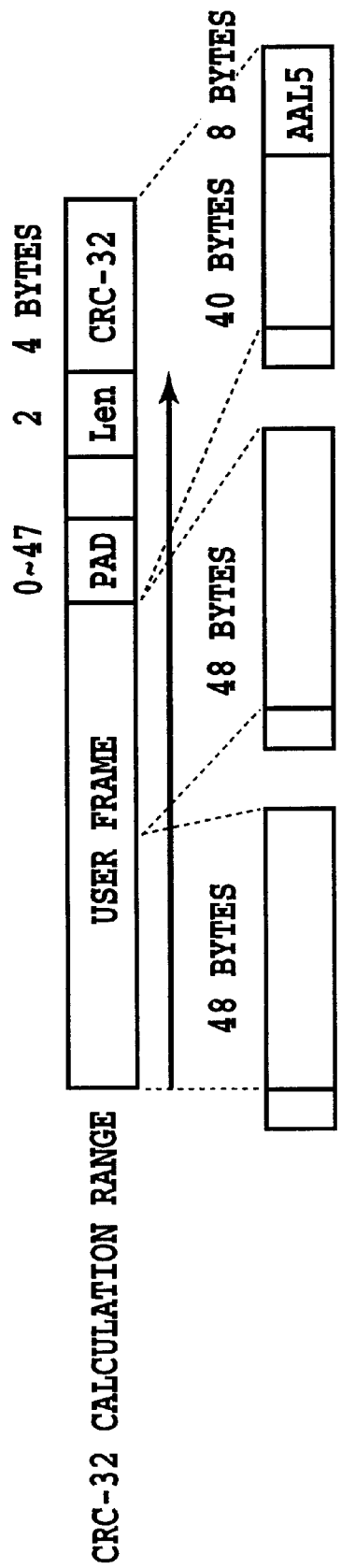
FIG. 59 is a diagram illustrating an example of an AAL type 5 format.

FIG. 59 shows the format of the AAL-5.

The receiving side carries out the following operations.
1) It identifies the delimiters of data considering the value of the PT (payload type) of the ATM header.
2) It checks the extracted payload by calculating the CRC.
3) It identifies the user data by verifying the LENGTH information.

*SSCOP protocol sequence (link establishment and release).

Figure 60:
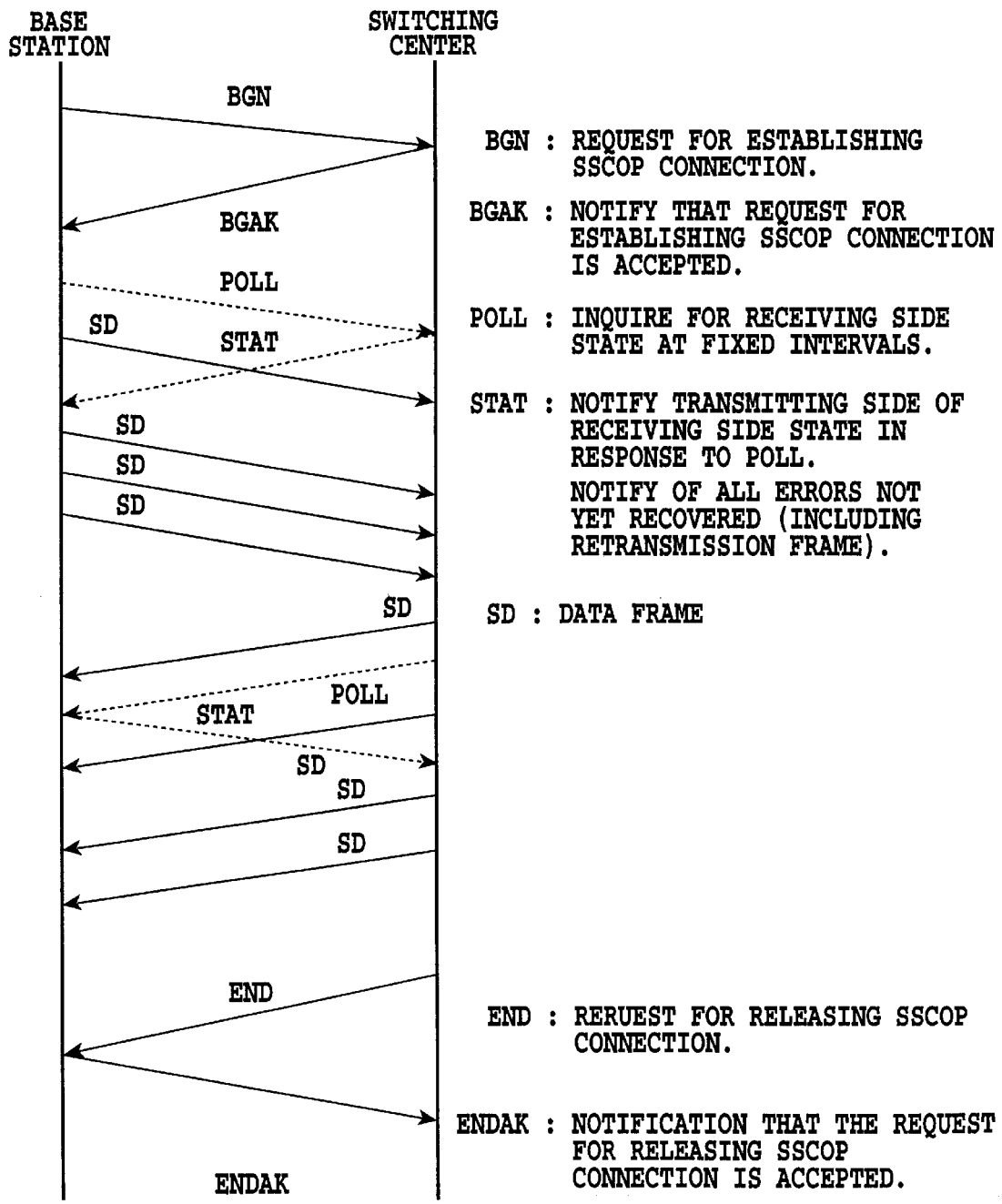
FIG. 60 is a diagram illustrating an example of a SSCOP (service specific connection oriented protocol) sequence.

In the SSCOP, the acknowledge or flow control information is not transferred on the data frame between the base station and switching center, and the role of the data frame is completely separated from that of the control frame. FIG. 60 illustrates an example of the sequence from the establishment to the release of the SSCOP link.

5.3.7. Reverse Direction Delay Adding Function

*The SSCOP is applied to the control signal VC and paging VC between the BTS and MCC, and is processed by the BTS and MCC.

The reverse direction delay adding function is provided for measuring system immunity by adding delays to reverse signals when carrying out a test of combining reverse signals between different base stations.

A delay up to a maximum of 100 ms can be added to the reverse signal at every 0.625 ms step (frame offset step).

The delay amount can be set by a dip switch.

5.3.8. Reference Timing Generating Function (Radio Frame Alignment Function)

5.3.8.1. SFN Synchronization

The BTS carries out with the MCC the time synchronization establishing processing of the SFN (System Frame Number) which will be described below. The SFN clock the MCC generates is the master clock of the entire system. The SFN synchronization processing is provided for establishing in the BTS the time synchronization with the SFN clock of the MCC. The target for the range of the time synchronization error is set within 5 msec. The BTS uses as its internal reference clock the SFN clock after the synchronization is established. The timings of the transmitting and receiving radio channels in respective sectors under the control of the BTS are generated from the reference SFN clock of the BTS (see, FIGS. 85–88B).

Figure 61:
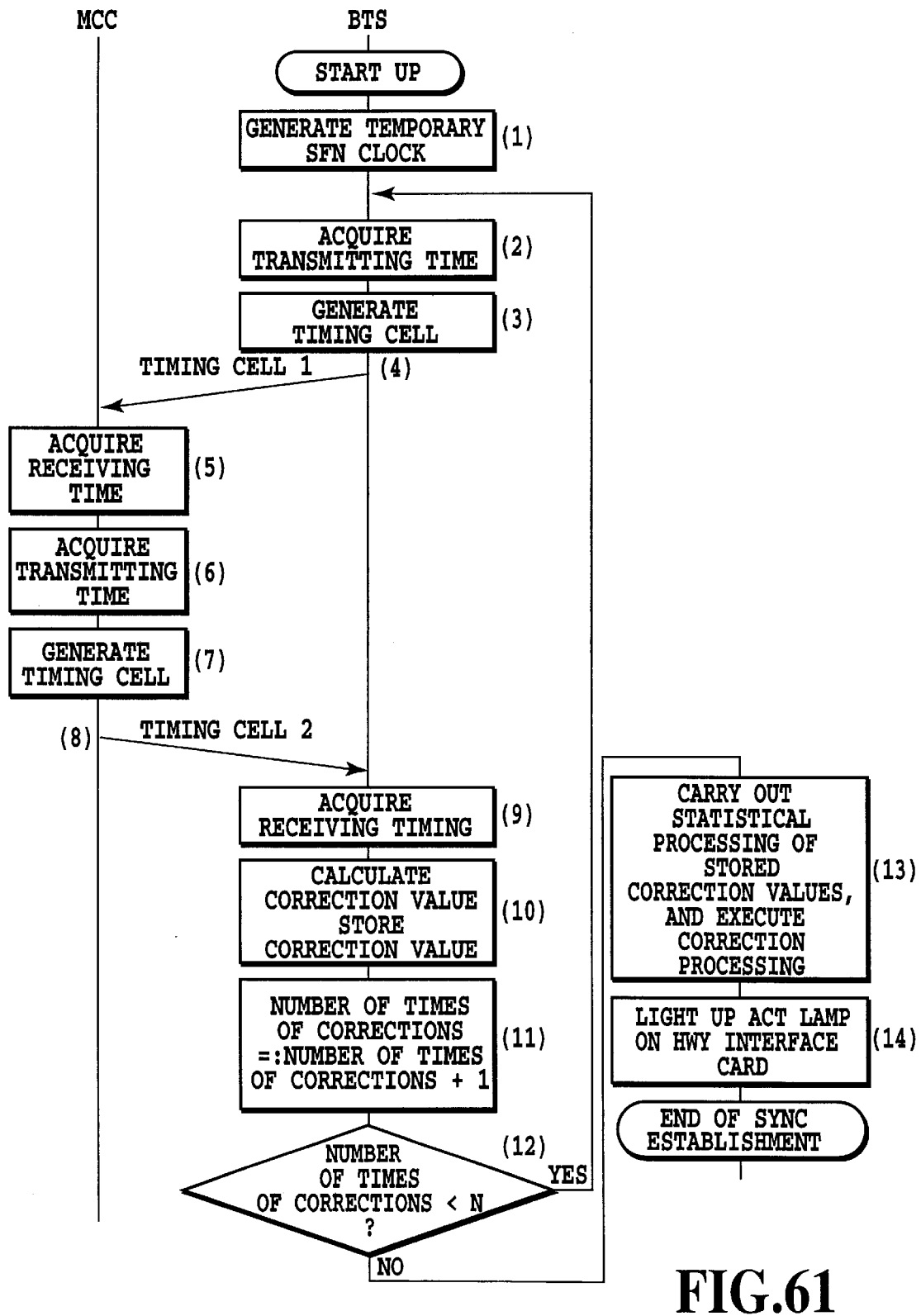
FIG. 61 is a flowchart illustrating a procedure of establishing SFN time synchronization in a BTS.

The SFN synchronization establishment is implemented by exchanging the timing cells between the MCC and BTS. FIG. 61 illustrates the detail of the procedure which will be described below. The numerals in FIG. 61 correspond to the numbers in the following descriptions.

(1) The BTS, at turn-on or at start up after a reset, generates a temporary SFN clock signal.

(2) The BTS acquires a transmitting time (a time within a super frame, and the super frame position in a long code period) of a timing cell 1 to be transmitted from the BTS to the MCC. The transmitting time is based on the temporary SFN clock signal.

(3) The BTS generates the timing cell 1. Values of information elements in the timing cell 1 are set as shown in Table 29.

TABLE 29

| Information elements | Specified values |
| --- | --- |
| Message ID | 03h; Timing Report (BTS÷MCC) |
| SF time information (received, MCC-SIM side) | all 0 |
| SF time information (transmitted, MCC-SIM side) | all 0 |
| SF time information (transmitted, BTS side) | The time within the super frame in the time information acquired in (2). |
| LC counter information (received, MCC-SIM side) | all 0 |
| LC counter information (transmitted, MCC-SIM side) | all 0 |
| LC counter information (transmitted, BTS side) | The super frame position in the long code period in the time information acquired in (2). |
| Other information elements | In accordance with Table 26. |

(4) The BTS transmits the timing cell 1 it generated in (3) at the transmission timing it acquired in (2).

(5) The MCC receives the timing cell 1, and acquires the received time (the time within the super frame and the super frame position in the long code period). This time is based on the SFN clock generated by the MCC.

(6) The MCC acquires a transmitting time (a time within a super frame, and the super frame position in a long code period) of a timing cell 2 to be transmitted from the MCC to the BTS. This time is a transmitting time based on the temporary SFN clock generated by the MCC.

(7) The MCC generates the timing cell 2. Values of information elements in the timing cell 2 are set in accordance with Table 30.

TABLE 30

| Information elements | Specified values |
| --- | --- |
| Message ID | 02h; Timing Report (MCC÷BTS) |
| SF time information (received, MCC side) | The time within the super frame in the time information acquired in (5). |
| SF time information (transmitted, MCC side) | The time within the super frame in the time information acquired in (6). |
| SF time information (transmitted, BTS side) | The time within the super frame in the time information acquired in (2) (The MCC sets this information element in the timing cell received in (5) to the same value again). |
| LC counter information (received, MCC side) | The super frame position in the long code period in the time information acquired in (5). |

TABLE 30-continued

| Information elements | Specified values |
| --- | --- |
| LC counter information (transmitted, MCC side) | The super frame position in the long code period in the time information acquired in (6). |
| LC counter information (transmitted, BTS side) | The super frame position in the long code period in the time information acquired in (2) (The MCC sets this information element in the timing cell received in (5) to the same value again). |
| Other information elements | In accordance with Table 26. |

(8) The MCC transmits the timing cell 2 it generated in (7) at the transmission timing it acquired in (6).

(9) The BTS receives the timing cell 2, and acquires the received time (the time within the super frame and the super frame position in the long code period). This time is a received time based on the temporary SFN clock in the BTS.

Figure 62:
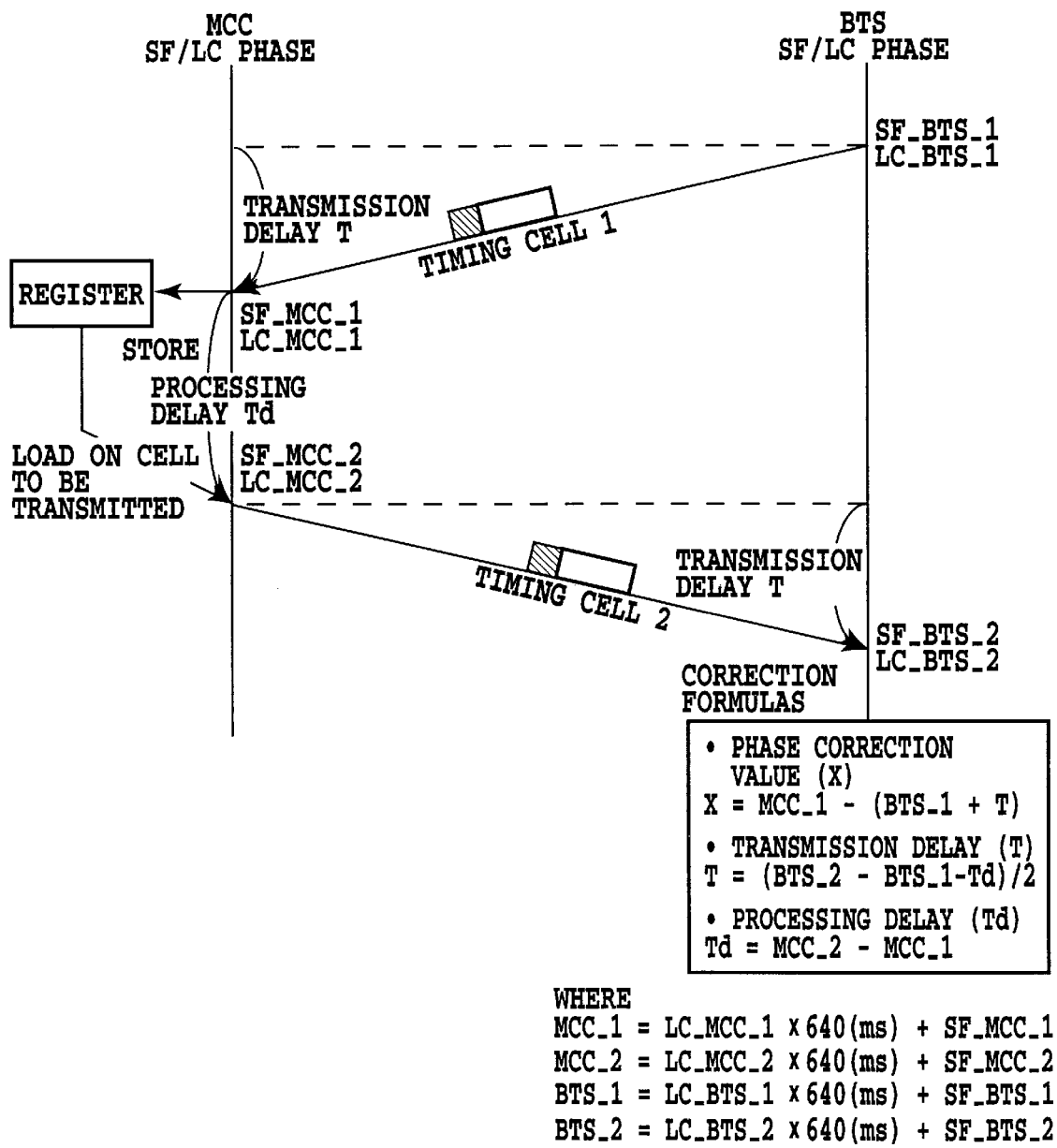
FIG. 62 is a diagram illustrating a BTSSFN clock phase compensation value calculation method.

(10) The BTS calculates the corrected value X of the temporary SFN clock phase from the information elements of the timing cell 2 it receives. FIG. 62 illustrates the calculation method and calculation basis of the corrected value. Calculation results of the corrected value are stored in a memory.

In FIG. 62,

SF_BTS-1: SF time information about BTS transmission of the timing cell 1.

LC_BTS-1: LC counter time information about BTS transmission of the timing cell 1.

SF_MCC-1: SF time information about MCC-SIM reception of the timing cell 1.

LC_MCC-1: LC counter time information about MCC-SIM reception of the timing cell 1.

SF_BTS-2: SF time information about BTS reception of the timing cell 2.

LC_BTS-2: LC counter time information about BTS reception of the timing cell 2.

SF_MCC-2: SF time information about MCC-SIM transmission of the timing cell 2.

LC_MCC-2: LC counter time information about MCC-SIM transmission of the timing cell 2.

(11) The BTS counts the number of corrections, calculates corrected values, and increments the counter each time it stores the corrected value.

(12) The BTS stores as one of the system parameters an upper limit N of the number of corrections. The BTS iterates the foregoing (2)–(11) until the counter value exceeds the upper limit N which is equal to or less than 255.

(13) When the number of corrections reaches the upper limit N, a statistical processing is carried out of calculated results of the corrected values stored. (The statistical processing temporarily selects the maximum value from among the calculated results). The BTS shifts its temporary SFN clock by the corrected value calculated by the statistical processing, thus carrying out the correction processing of the SFN clock of the BTS.

(14) Completing the foregoing operations, the BTS lights up an ACT lamp on the HWY interface card of the BTS assuming that the SFN time synchronization has been completed between the BTS and MCC.

If the synchronization is not yet established even after a predetermined time has elapsed from the beginning of the transmission of the timing cell, the BTS stops the transmission of the timing cell, and lights up an ERR lamp on the card including the transmission path interface. In addition, the BTS brings the SFN timing into a free-running state, and performs the transmission control of the radio section in accordance with the free-running SFN.

5.3.8.2. Synchronization Holding Function

*The BTS generates the reference clock from the HWY, and generates various clock signals from the reference clock.

*When the BTS is connected with a plurality of 1.5 M HWYs, it can select with a hard switch like a dip switch the HWY used for generating the clock.

*The BTS generates, after establishing the SFN time synchronization at the start up, the reference SFN clock only from the clock that is generated from the HWY. If a restart processing is not carried out, the reference SFN clock of the BTS will not be changed by any other factors. The BTS does not perform autonomous SFN synchronization correction. Besides, it does not carry out a synchronization correction processing triggered by a synchronization correction request from the MCC.

5.4. Transfer Processing Method of the Transmission Information Between the MCC and MS A transfer processing method by the BTS of the information transmitted between the MCC and MS varies depending on the type of the logical channels in the radio section. The processing method will be described below. The following description has nothing to do with the transmission information between the MCC and BTS.

5.4.1. Correspondence between Radio Link and Wire Link

As for the correspondence between radio section links (physical channels and logical channels) and wire section links (channel number, VPI, VCI and CID), such correspondence is provided as needed.

5.4.2. Processing Method of Transmission Information 5.4.2.1. Forward Direction

Table 31 shows, for each logical channel, a processing method of the transmission information which is received from the wire section.

TABLE 31

| Logical channel | Processing method of transmission information received from wire section. Description |
|---|---|
| DTCH | *Assembles a radio unit from the transmission information in a received short cell, and transmits it in a radio frame with the same frame number as the FN in the SAL of the short cell.<br>*Discards the user information in the received short cell if the transmission to the wire section is not completed before the expiration of a timer ADTCH which is started when the short cell is received.<br>*The value of the timer ADTCH is specified as one of the system parameters in the range from 0.625 msec to 640 msec at every 0.625 msec step.<br>*Makes OFF the transmission of the DTCH symbols or transmits dummy data as for a radio frame that does not receive any transmission information from the wire section. |
| ACCH | *Assembles, when one radio unit is placed in one radio frame (in the case of a 256 ksps dedicated physical channel), a radio unit from the transmission information in a received short cell, and transmits it in a radio frame with the same frame number as the FN in the SAL of the short cell. |

TABLE 31-continued

| Logical channel | Processing method of transmission information received from wire section. Description |
|---|---|
| | *Assembles, when one radio unit is placed in a plurality of radio frames (in the case of 128 ksps or less dedicated physical channel), a radio unit from the transmission information in a received short cell, and transmits it beginning from a radio frame with the same frame number as the FN in the SAL of the short cell, followed by the remainder of the plurality of the successive radio frames.<br>*Discards the user information in the received short cell if the transmission to the wire section is not completed before the expiration of a timer AACCH which is started when the short cell is received.<br>*The value of the timer AACCH is specified as one of the system parameters in the range from 0.625 msec to 640 msec at every 0.625 msec step.<br>*Makes OFF the transmission of the ACCH symbols as for a radio frame that does not receive any transmission information from the wire section. |
| SDCCH | *Assembles the CPD PDU for the transmission information in a received short cell, carries out dividing processing at every internal encoding unit, performs processings up to assembling of a radio unit, and transmits it in a radio frame that can be transmitted first.<br>*The controller of the MCC transmits the control information on a CPS-SDU unit basis with spacing such that the rate of the SDCCH in the radio section is not exceeded. Thus, it is enough for a receiving buffer of the information from the SDCCH wire transmission path to have an area that can accommodate only a few frames corresponding to the CPS-SDU with a maximum length. |
| FACH (for packet transmission) | *Assembles the CPD PDU for the information in a received short cell or in a standard cell, carries out dividing processing at every internal encoding unit, performs processings up to assembling of a radio unit, and transmits it in a radio frame that can be transmitted first. If divided into a plurality of internal encoding units, a plurality of radio units are transmitted successively. |
| UPCH | *The EX-interface for packets of the MCC transmits the control information on a CPS-SDU unit basis with spacing such that the rate of the UPCH in the radio section, which rate is required at the call setup as a peak rate, is not exceeded. Thus, it is enough for a receiving buffer of the information from the UPCH wire transmission path to have an area that can accommodate only a few frames corresponding to the CPS-SDU with a maximum length. In a state in which the FACH is established, because the rate of the radio section can be lower than the peak rate, a FACH buffer must have a rather large size.<br>*Makes OFF the transmission of the UPCH symbols as for a radio frame that does not receive any transmission information from the wire section. |

5.4.2.2. Reverse Direction

Table 32 shows, for each logical channel, a processing method of the transmission information which is received from the radio section.

TABLE 32

Processing method of transmission information received from radio section.

| Logical channel | Description |
| --- | --- |
| DTCH (32 ksps dedicated physical channel) | *Assembles a short cell upon receiving a radio frame, and transmits it to the wire section at a timing as early as possible.<br>*The following two modes are prepared for the transmission to the wire section. The mode is designated each time a radio link is established.<br>Mode 1:<br>As with the radio frame to which the information presence or absence decision of 4.1.9.2. gives a result that no transmission information is present, transmission to the wire section is not carried out.<br>Even if the CRC check for each selection combining unit produces an incorrect result, if the information presence or absence decision of 4.1.9.2. gives a result that transmission information is present, the transmission information is sent to the wire section after the Viterbi decoding.<br>Mode 2:<br>Transmission information is always sent to the wire section after the Viterbi decoding. |
| DTCH (64 ksps or more dedicated physical channel) | *Assembles a short cell upon receiving a radio frame, and transmits it to the wire section at a timing as early as possible.<br>*Transmission information is always sent to the wire section after the Viterbi decoding. |
| ACCH | *Assembles a radio frame from ACCH bits in one or more radio frames, and carries out the Viterbi decoding and CRC checking. Assembles a short cell immediately only when the CRC checking produces a correct result, and transmits the short cell to the wire section at a timing as early as possible.<br>*Discards the received information if the CRC checking produces an incorrect result, and does not carry out any transmission to the wire section. |
| SDCCH | *Carries out the Viterbi decoding and CRC checking for the transmission information in a radio frame. Generates the CPS PDU in accordance with the W bits only when the CRC checking is correct. Assembles a short cell when the generation of the CPS PDU is completed and the CRC checking of the CPS is correct, and sends it to the wire section at the earliest timing available.<br>*Discards the received information if the CRC checking for each internal encoding unit produces an incorrect result, so that it is not involved in generating the CPS. In this case, the CPS PDU is discarded in its entirety, and the transmission to the wire section is not carried out. |
| RACH (for packet transmission) | *Carries out the Viterbi decoding and CRC checking for the transmission information in a radio frame. Generates, for only the transmission information with TN bit = 0, the CPS PDU in accordance with the W bits and S bits only when the CRC checking is correct. Assembles a short cell when the generation of the CPS PDU is completed and the CRC checking of the CPS is correct, and sends it to the wire section at the earliest timing available. |
| UPCH | *Discards the received information if the CRC checking for each internal encoding unit produces an incorrect result, so that it is not involved in generating the CPS. In this case, the CPS PDU is discarded in its entirety, and the transmission to the wire section is not carried out. |

5.4.3. SAL Setting Method

A method for generating the SAL in a short cell or standard cell will now be described with reference to FIG. 36, when reverse direction transmission information is sent from the radio section to the wire section. Refer to Table 22 for a fundamental setting method.

5.4.3.1. SAT

SAT is always set at "00" for all logical channels.

5.4.3.2. FN (1) DTCH.

*The FN of a received radio frame is used as the FN of the SAL of the short cell or standard cell including the transmission information which is transmitted by the radio frame.

*As illustrated in FIGS. 87A and 87B, the first chip of the radio frame of FN=0 is shifted from the position at which the reverse long code phase=0 by the sum of the frame offset value and the slot offset value, and the relation is not changed by the iteration of the DHO. Thus, the FN of the received radio frame is determined on the basis of the reverse long code phase by the following expression.

$$FN=((P_{TOP}-P_{OFS})/C) \bmod 64$$

where $P_{TOP}$ is the phase of the first chip of the received radio frame, $P_{OFS}$ is the sum of the frame offset value and the slot offset value, and C is the number of chips per radio frame, where C=10240, 40960, 81920 and 163840 (chip rate= 1.024, 4.096, 8.192 and 16.384 Mcps).

(2) ACCH

*When a single radio unit overlays a plurality of radio frames (in the case of 128 ksps or less dedicated physical channels), the FN of the first one of the plurality of radio frames is used as the FN in the SAL.

*A method for deciding the FN of the radio frame is the same as that of the foregoing (1).

(3) SDCCH, RACH and UPCH.

*The FN of the first radio frame of one or more radio frames constituting the CPS-PDU is adopted as the FN in the SAL.

*A method for deciding the FN of the radio frame is the same as that of the foregoing (1).

5.4.3.3. Sync (1) DTCH, UPCH and SDCCH.

*The sync is set to "0" if the received radio frame is in the synchronization state, and to "1" if it is in the out-of-sync state.

*For details of the processing in the out-of-sync state, refer to 5.4.4. below. As for the out-of-sync decision method, refer to 5.2.3.

*When one CPS-PDU consists of a plurality of radio frames in the UPCH or SDCCH, the sync is set to "1" only if all the radio frames are out-of-sync.

(2) ACCH and RACH.

*The sync is set to "0".

5.4.3.4. BER (1) DTCH.

*The value of the BER is set on the basis of a result of the BER estimated value degradation decision which is carried out for each radio frame.

(2) ACCH.

*The value of the BER is set on the basis of a result of the BER estimated value degradation decision which is carried out for each radio frame.

(3) SDCCH, UPCH and RACH.

*The value of the BER is set on the basis of a result of the BER estimated value degradation decision which is carried out for each CPS-PDU.

5.4.3.5. Level (1) DTCH.

*The value of the Level is set on the basis of a result of the level degradation decision which is made for each radio frame.

(2) ACCH.
*The value of the Level is set on the basis of a result of the level degradation decision which is made for each radio frame.
(3) SDCCH, UPCH and RACH.
*The value of the Level is set on the basis of a result of the level degradation decision which is made for each CPS-PDU.
5.4.3.6. CRC
(1) DTCH
*The value of the CRC is set on the basis of a result of the CRC checking which is carried out for each selection combining unit.
(2) ACCH.
*The value of the CRC is set on the basis of a result of the CRC checking which is carried out for each radio unit.
(3) SDCCH, UPCH and RACH.
*The value of the CRC is set on the basis of a result of the CRC checking which is carried out for each CPS-PDU. However, since the transmission to the wire link is carried out only when the CRC is correct, it is substantially "0", normally.
5.4.3.7. SIR
(1) DTCH
*The value of the SIR is set on the basis of a result of the SIR measurement which is carried out for each radio unit.
(2) ACCH.
*The value of the SIR is set on the basis of a result of the SIR measurement which is carried out for each radio unit.
(3) SDCCH, UPCH and RACH.
*The value of the SIR is set on the basis of a result of the SIR measurement which is carried out for each CPS-PDU (if the CPS-PDU ranges over a plurality of radio frames, the average value over the plurality of radio frames is used as the result).
5.4.3.8. RCH and RSCN
The values of the RCN and RSCN are set in accordance with Table 24.
5.4.4. A Processing Method During the Out-of-sync Decision
Table 33 shows a processing for each logical channel, when the out-of-sync method as described in 5.5.2.3. makes an out-of-sync decision, in which RACH is not handled because the out-of-sync decision is not applied to the common control physical channel.

TABLE 33

| Logical | Description |
| --- | --- |
| DTCH SDCCH | *Generates a cell whose Sync bit in the SAL is set at "1", and sends the short cell to the wire section every 10 msec interval until the synchronization is recovered. |
| UPCH | *A short cell of the UPCH does not include user information.<br>*The remaining bits of the SAL are as follows:<br>SAT: 00<br>FN: As an estimated value, one of the values 0–63 is set which is incremented at every 10 msec interval. It is set such that it keeps continuity from before the out-of-sync decision.<br>BER: 1<br>Level: 1<br>CRC: 1<br>SIR: all 0s<br>RCN, RSCN: according to Table 27 (as in the synchronization holding state). |
| ACCH | *Halts transmission to the wire section. |

Figure 63:
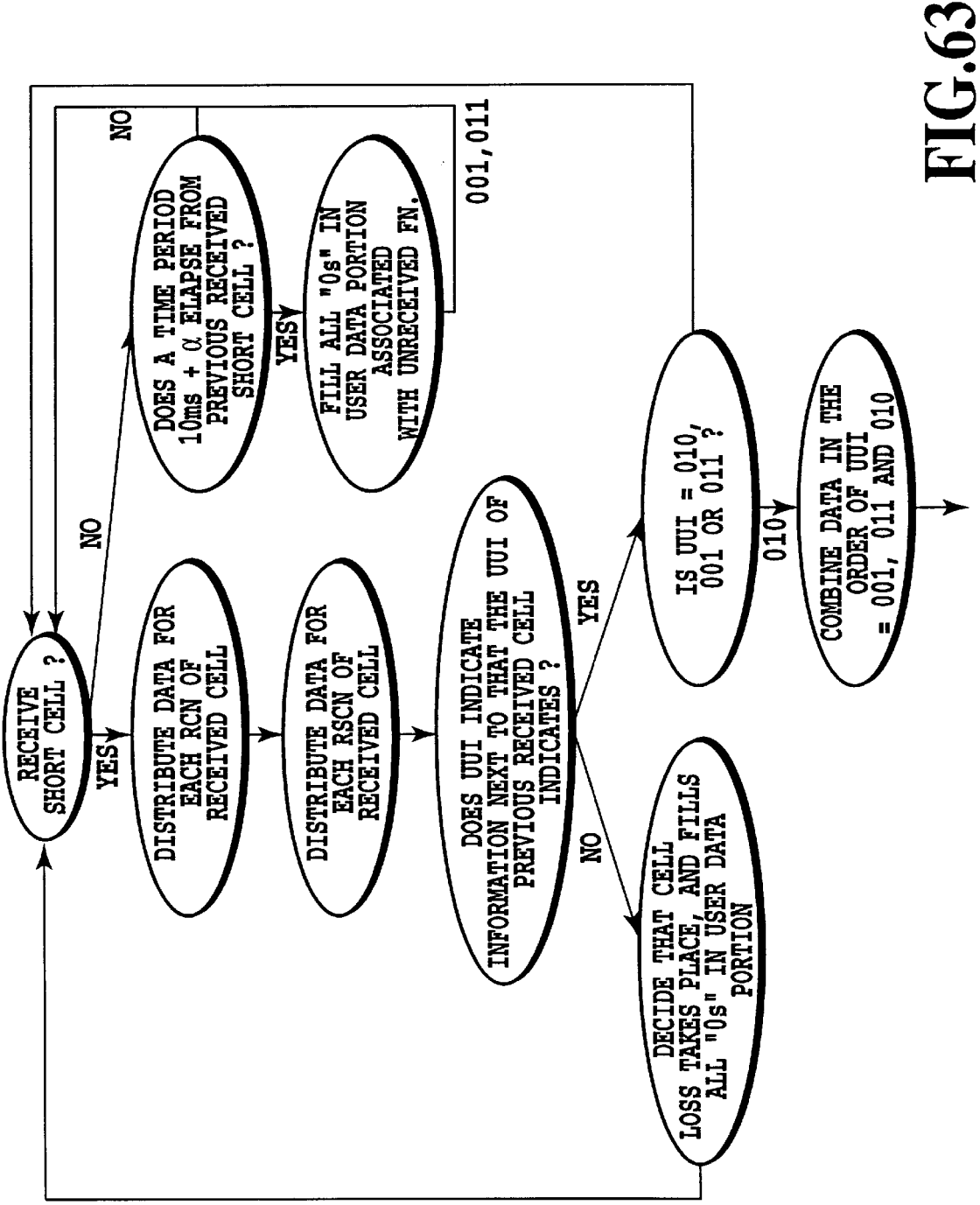
FIG. 63 is a flowchart illustrating a cell loss detection process.

5.4.5. Cell Loss Detection
The position at which the cell loss takes place is located from the following parameters, if the forward data from the MCC does not reach the BTS because of the cell loss in the ATM section. FIG. 63 illustrates a flow of the cell loss detection.
*Frame number (FN): It is used for the cell loss detection in all the unrestricted services.
*Radio subchannel number (RSCN): It is used in the unrestricted services (128 kbps or more unrestricted services) including within 10 ms two or more internal encoding CRC providing units.
*Radio channel number (RCN): It is used in the unrestricted services implemented by multicodes.
*UUI (CPS-User to User Indication): It is used when the internal encoding CRC providing unit exceeds the user payload length of the short cell, which is 42 octets when either the RCN or RSCN is used, and 43 octets when none of the RCN and RSCN is used.
The cell loss is detected using the foregoing four parameters.
Table 34 shows the processing method of the cell loss detection.

TABLE 34

Processing method of cell loss detection.

| Logical channel | Processing method |
| --- | --- |
| DTCH | *Inserts dummy data (all "0s") for each short cell in the cell loss portion, assembles one or more radio frames and transmits them. |
| ACCH | *Not necessary to consider the cell loss. |
| SDCCH FACH (for packet transmission) UPCH | *Discards the entire CPS-SDU including as its part the cell loss portion. |

As described above, the novel base station equipment of the mobile communication system in accordance with the present invention is best suited for high speed CDMA digital communications.

What is claimed is:
1. A communication system comprising a first communication apparatus and a second communication apparatus, wherein
the first communication apparatus comprises:
means for generating signals for a plurality of physical channels; and
means for transmitting the signals for the plurality of physical channels over the plurality of physical channels, and
the means for generating inserts known pilot symbols only into one of the signals for the plurality of physical channels, and
the second communication apparatus comprises:
means for receiving the signals for the plurality of physical channels over the plurality of physical channels; and
means for carrying out coherent detection for all the plurality of physical channels by using the pilot symbols inserted into one of the signals for the plurality of physical channels, and
wherein the means for transmitting makes, when transmitting the signal into which the pilot symbols have been inserted, transmission power of portions into which the pilot symbols have been inserted greater than transmission power of other portions, and wherein the first communication apparatus spreads each of the signals for the plurality of physical channels by using a different spreading code and transmits the spread signal, and the second communication apparatus despreads each of the received signals for the plurality of physical channels by using the different spreading code, and the means for transmitting makes, when transmitting the signal into which the pilot symbols have been inserted, the transmission power of the portions into which the pilot symbols have been inserted n times greater than the transmission power of the other portions, where n is a number of the plurality of physical channels.

2. A communication apparatus comprising:

means for generating signals for a plurality of physical channels; and means for transmitting the signals for the plurality of physical channels over the plurality of physical channels, wherein the means for generating inserts known pilot symbols only into a signal for a first channel which is one of the plurality of physical channels, and the means for transmitting does not transmit portions of signals for the channels of the plurality of physical channels other than the first channel, the portions corresponding to portions of the signal for the first channel into which the pilot symbols have been inserted.

3. A communication system comprising a first communication apparatus and a second communication apparatus, wherein the first communication apparatus comprises:

means for generating signals for a plurality of physical channels; and means for transmitting the signals for the plurality of physical channels over the plurality of physical channels, and the means for generating inserts transmission power control information only into one of the signals for the plurality of physical channels, and the second communication apparatus comprises:

means for receiving the signals for the plurality of physical channels over the plurality of physical channels; and means for carrying out transmission power control for all the plurality of physical channels by using the transmission power control information inserted into one of the signals for the plurality of physical channels.

4. The communication system as claimed in claim 3, wherein the means for transmitting makes, when transmitting the signal into which the transmission power control information have been inserted, transmission power of portions into which the transmission power control information have been inserted greater than transmission power of other portions.

5. The communication system as claimed in claim 4, wherein the first communication apparatus spreads each of the signals for the plurality of physical channels by using a different spreading code and transmits the spread signal, and the second communication apparatus despreads each of the received signals for the plurality of physical channels by using the different spreading code, and the means for transmitting makes, when transmitting the signal into which the transmission power control information have been inserted, the transmission power of the portions into which the transmission power control information have been inserted n times greater than the transmission power of the other portions, where n is a number of the plurality of physical channels.

6. A communication apparatus comprising:

means for generating signals for a plurality of physical channels; and means for transmitting the signals for the plurality of physical channels over the plurality of physical channels, wherein the means for generating inserts transmission power control information only into a signal for a first channel which is one of the plurality of physical channels, and the means for transmitting does not transmit portions of signals for the channels of the plurality of physical channels other than the first channel, the portions corresponding to portions of the signal for the first channel into which the transmission power control information has been inserted.

7. A communication apparatus comprising:

means for receiving signals for a plurality of physical channels over the plurality of physical channels; and means for carrying out transmission power control for all the plurality of physical channels by using transmission power control information inserted into one of the signals for the plurality of physical channels.

8. A communication apparatus comprising:

means for generating signals for a plurality of physical channels; and means for transmitting the signals for the plurality of physical channels over the plurality of physical channels, wherein the means for generating inserts transmission power control information only into one of the signals for the plurality of physical channels, and the means for transmitting makes, when transmitting the signal into which the transmission power control information have been inserted, transmission power of portions into which the transmission power control information have been inserted greater than transmission power of other portions.

9. A communication system comprising a first communication apparatus and a second communication apparatus, wherein the first communication apparatus comprises:

means for generating signals for a plurality of physical channels including known pilot symbols;

means for spreading the signals for the plurality of physical channels; and means for transmitting the spread signals for the plurality of physical channels over the plurality of physical channels, and the means for spreading spreads, when spreading the signals for the plurality of physical channels, portions of the pilot symbols by using a spreading code common to the plurality of physical channels, and other portions by using a different spreading code for each of the plurality of physical channels, and the second communication apparatus comprises:

means for receiving the spread signals for the plurality of physical channels over the plurality of physical channels;

means for despreading the spread signals for the plurality of physical channels;

means for carrying out coherent detection by using the pilot symbols included in the signals for the plurality of physical channels, and the means for despreading despreads, when despreading the spread signals for the plurality of physical channels, portions of the pilot symbols by using the spreading code common to the plurality of physical channels, and other portions by using the different spreading code for each of the plurality of physical channels.

10. A communication apparatus comprising:

means for generating signals for a plurality of physical channels including known pilot symbols;

means for spreading the signals for the plurality of physical channels; and means for transmitting the spread signals for the plurality of physical channels over the plurality of physical channels, wherein the means for spreading spreads, when spreading the signals for the plurality of physical channels, portions of the pilot symbols by using a spreading code common to the plurality of physical channels, and other portions by using a different spreading code for each of the plurality of physical channels.

11. A communication apparatus comprising:

means for receiving spread signals for a plurality of physical channels over the plurality of physical channels;

means for despreading the spread signals for the plurality of physical channels; and means for carrying out coherent detection by using known pilot symbols included in the signals for the plurality of physical channels, wherein the means for despreading despreads, when despreading the spread signals for the plurality of physical channels, portions of the pilot symbols by using a spreading code common to the plurality of physical channels, and other portions by using a different spreading code for each of the plurality of physical channels.

12. A communication system comprising a first communication apparatus and a second communication apparatus, wherein the first communication apparatus comprises:

means for generating signals for a plurality of physical channels including transmission power control information;

means for spreading the signals for the plurality of physical channels; and means for transmitting the spread signals for the plurality of physical channels over the plurality of physical channels, and the means for spreading spreads, when spreading the signals for the plurality of physical channels, portions of the transmission power control information by using a spreading code common to the plurality of physical channels, and other portions by using a different spreading code for each of the plurality of physical channels, and the second communication apparatus comprises:

means for receiving the spread signals for the plurality of physical channels over the plurality of physical channels;

means for despreading the spread signals for the plurality of physical channels; and means for carrying out transmission power control by using the transmission power control information included in the signals for the plurality of physical channels, and the means for despreading despreads, when despreading the spread signals for the plurality of physical channels, portions of the transmission power control information by using the spreading code common to the plurality of physical channels, and other portions by using the different spreading code for each of the plurality of physical channels.

13. A communication apparatus comprising:

means for generating signals for a plurality of physical channels including transmission power control information;

means for spreading the signals for the plurality of physical channels; and means for transmitting the spread signal for the plurality of physical channels over the plurality of physical channels, wherein the means for spreading spreads, when spreading the signals for the plurality of physical channels, portions of the transmission power control information by using a spreading code common to the plurality of physical channels, and other portions by using a different spreading code for each of the plurality of physical channels.

14. A communication apparatus comprising:

means for receiving spread signals for a plurality of physical channels over the plurality of physical channels;

means for despreading the spread signals for the plurality of physical channels; and means for carrying out transmission power control by using transmission power control information included in the signals for the plurality of physical channels, wherein the means for despreading despreads, when despreading the spread signals for the plurality of physical channels, portions of the transmission power control information by using a spreading code common to the plurality of physical channels, and other portions by using a different spreading code for each of the plurality of physical channels.

* * * * *

UNITED STATES PATENT AND TRADEMARK OFFICE
CERTIFICATE OF CORRECTION

| | | |
|---|---|---|
| PATENT NO. | : 6,782,035 B1 | |
| APPLICATION NO. | : 09/403161 | |
| DATED | : August 24, 2004 | |
| INVENTOR(S) | : Nakamura et al. | |

It is certified that error appears in the above-identified patent and that said Letters Patent is hereby corrected as shown below:

Cover Page,
Page 2, Item (56), under "FOREIGN PATENT DOCUMENTS", Column 2, Line 7, remove the following line: [WO  WO95/12943   11/1995]

Figures 64, 64A:
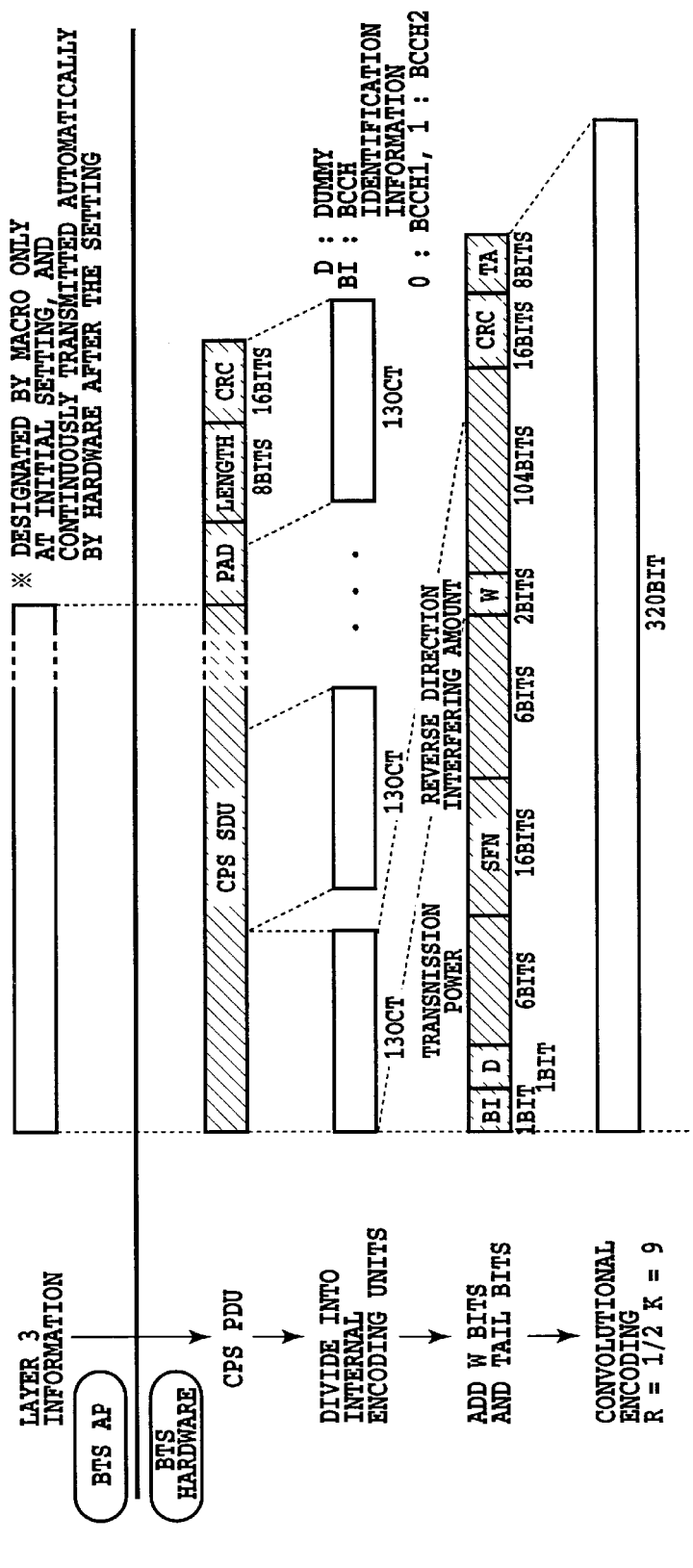
FIG. 64 is a diagram showing the relationship of FIGS. 64A and 64B.
FIG. 64A is a diagram illustrating a coding scheme of a BCCH1 or BCCH2 (16 ksps) logical channel.
Figure 64B:
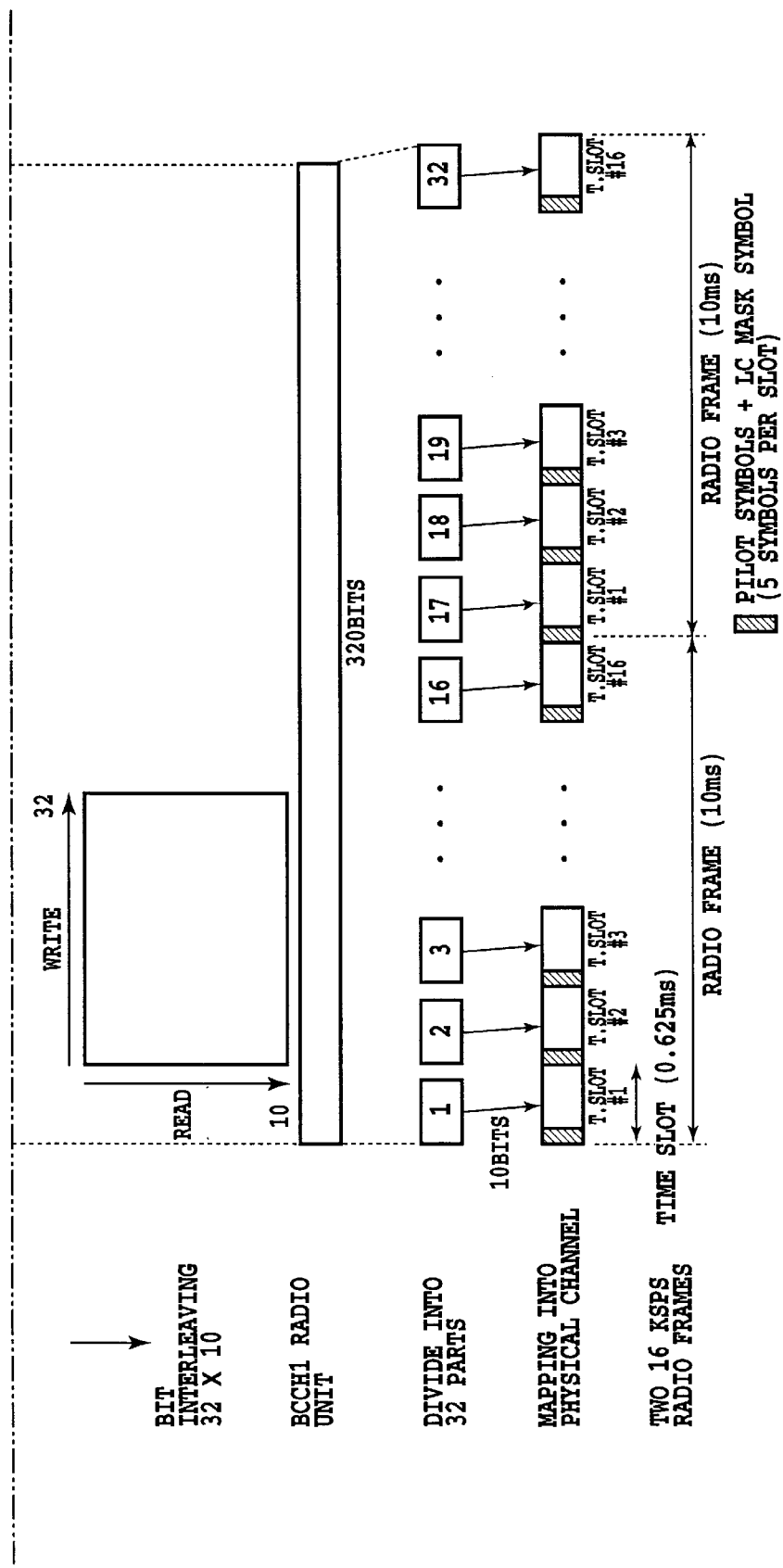
FIG. 64B is a diagram illustrating a coding scheme of a BCCH1 or BCCH2 (16 ksps) logical channel.
Figure 65A:
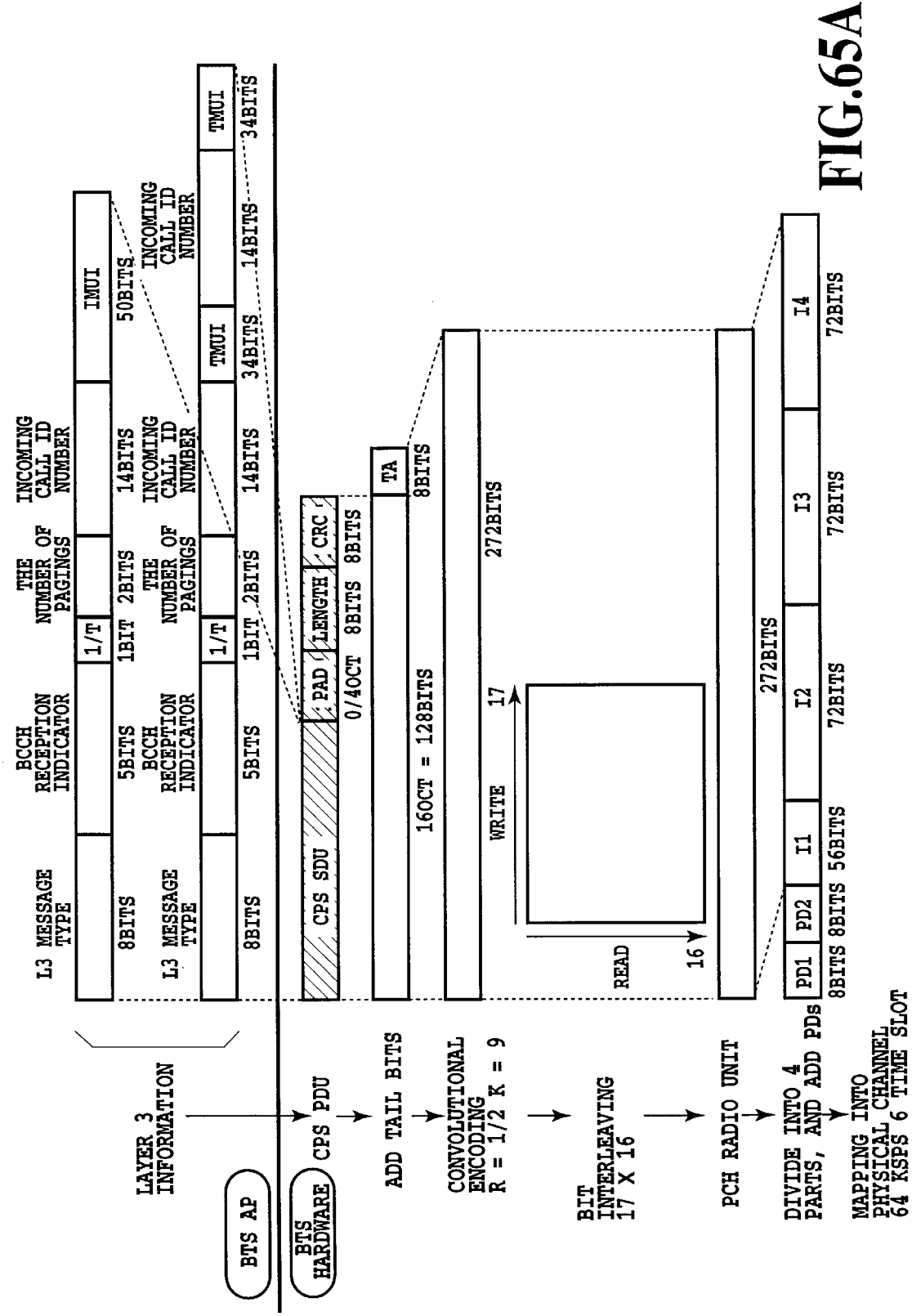
FIGS. 65A and 65B are diagrams illustrating a coding scheme of a PCH (64 ksps) logical channel.
Figure 65B:
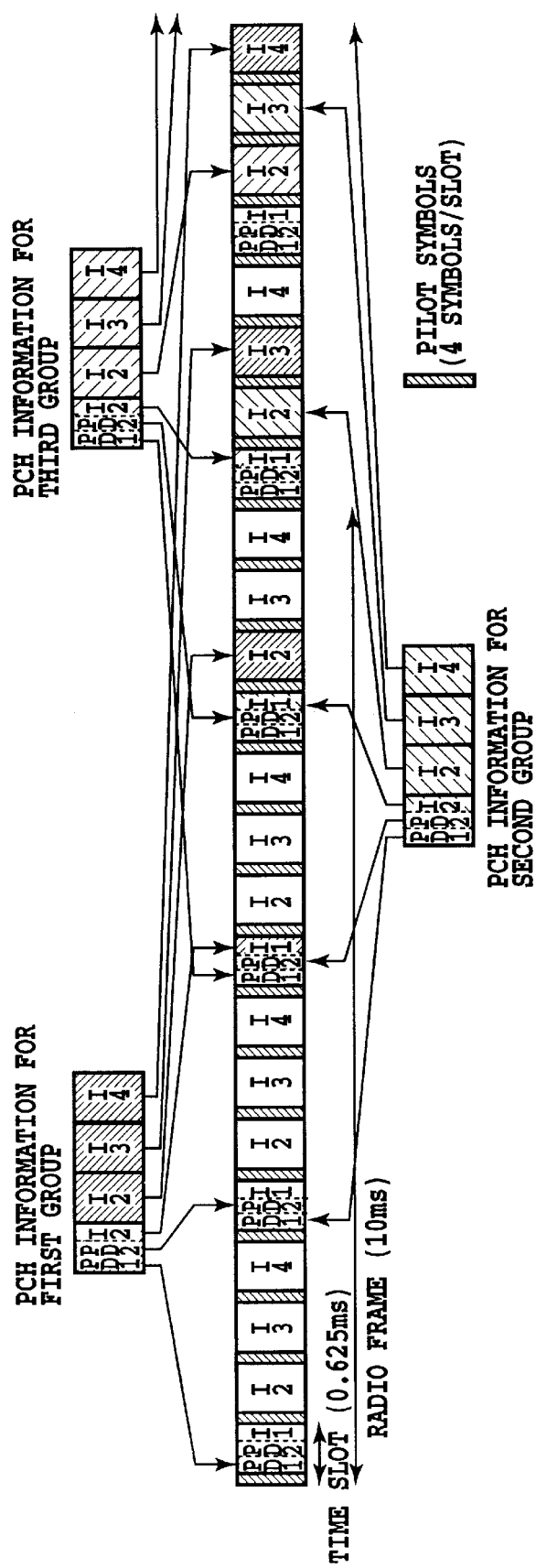
Figure 66B:
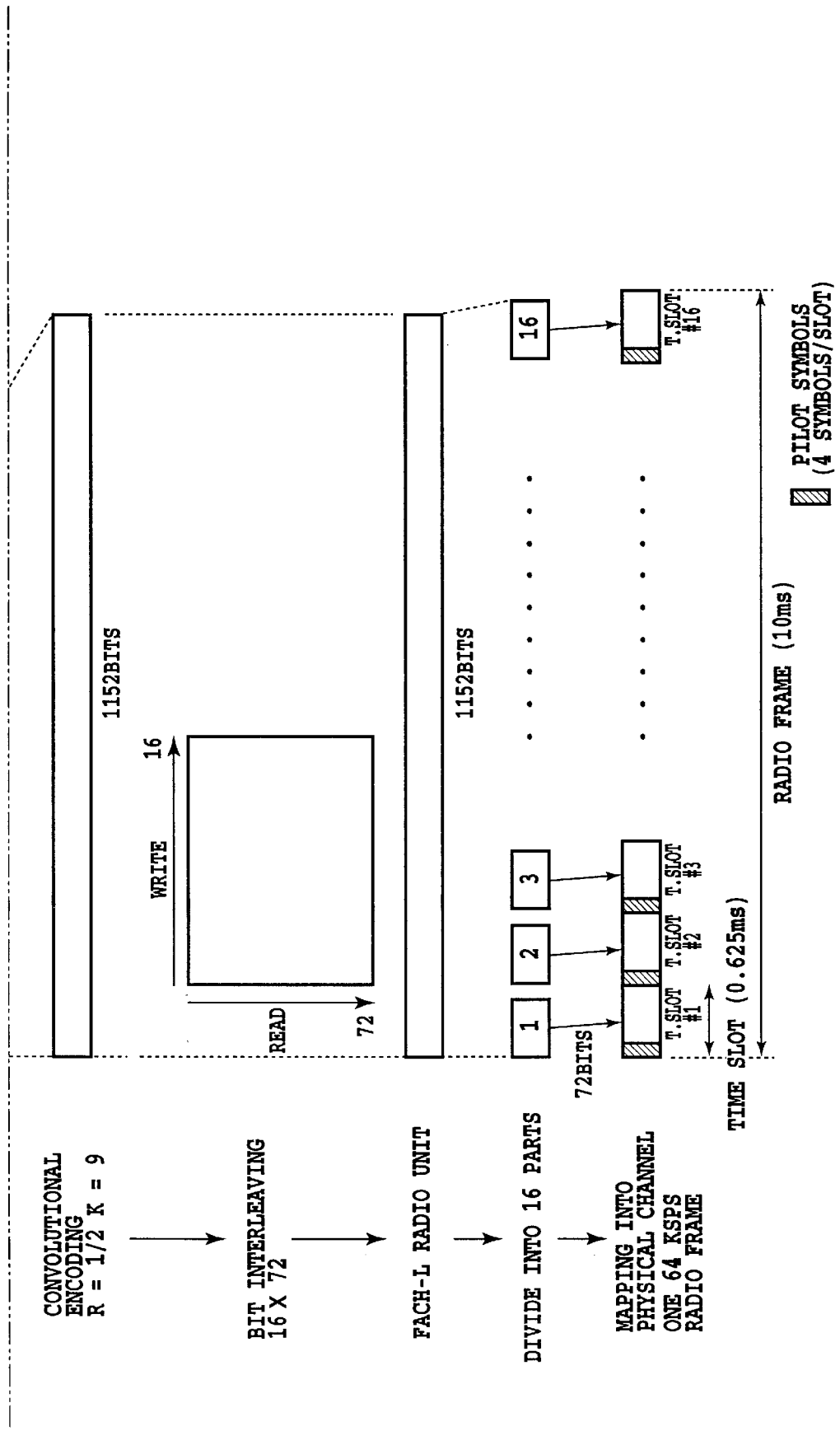
FIG. 66B is a diagram illustrating a coding scheme of a FACH-long (64 ksps) logical channel.
Figure 67B:
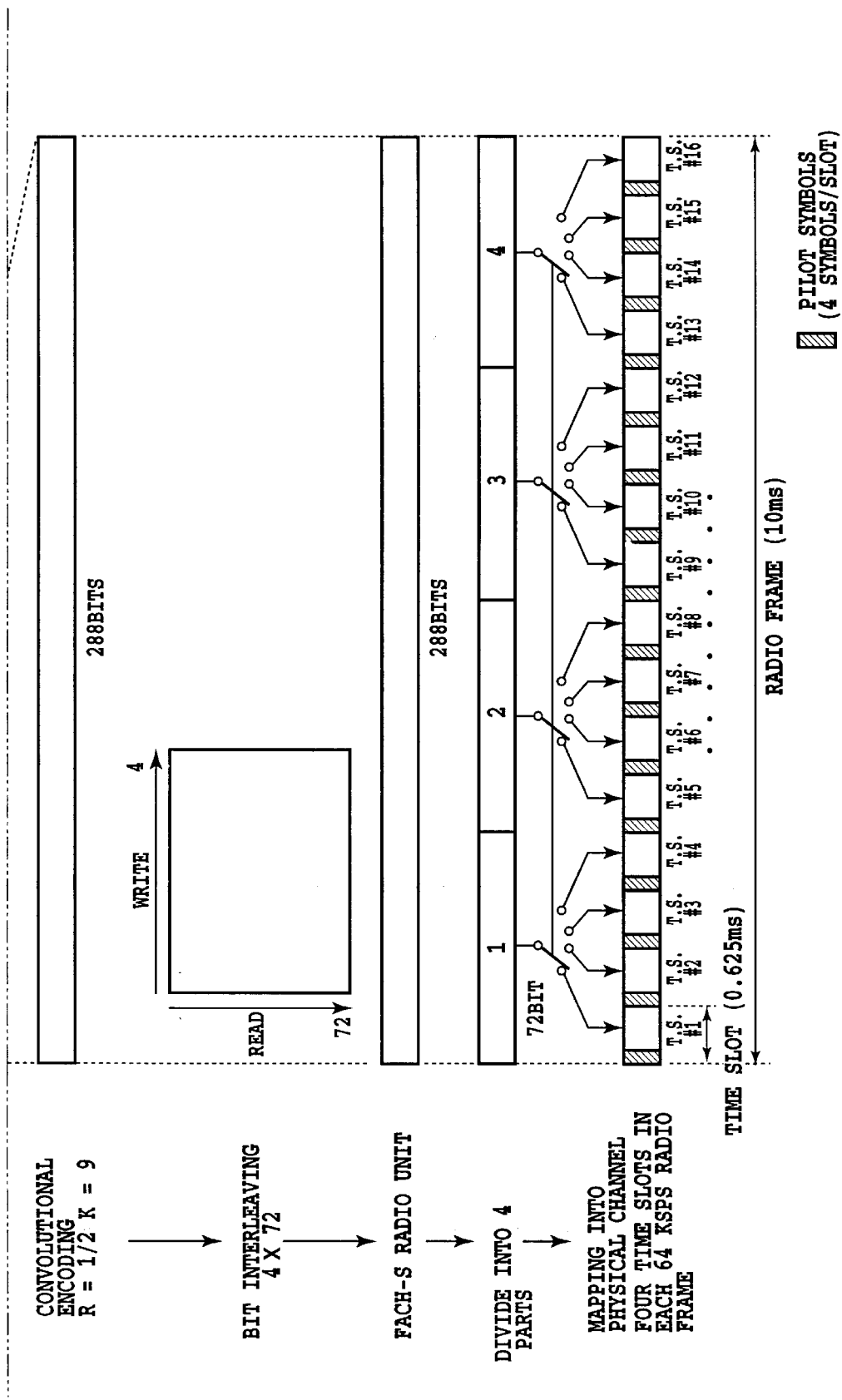
FIG. 67B is a diagram illustrating a coding scheme of a FACH-short (normal mode) (64 ksps) logical channel.
Figure 68B:
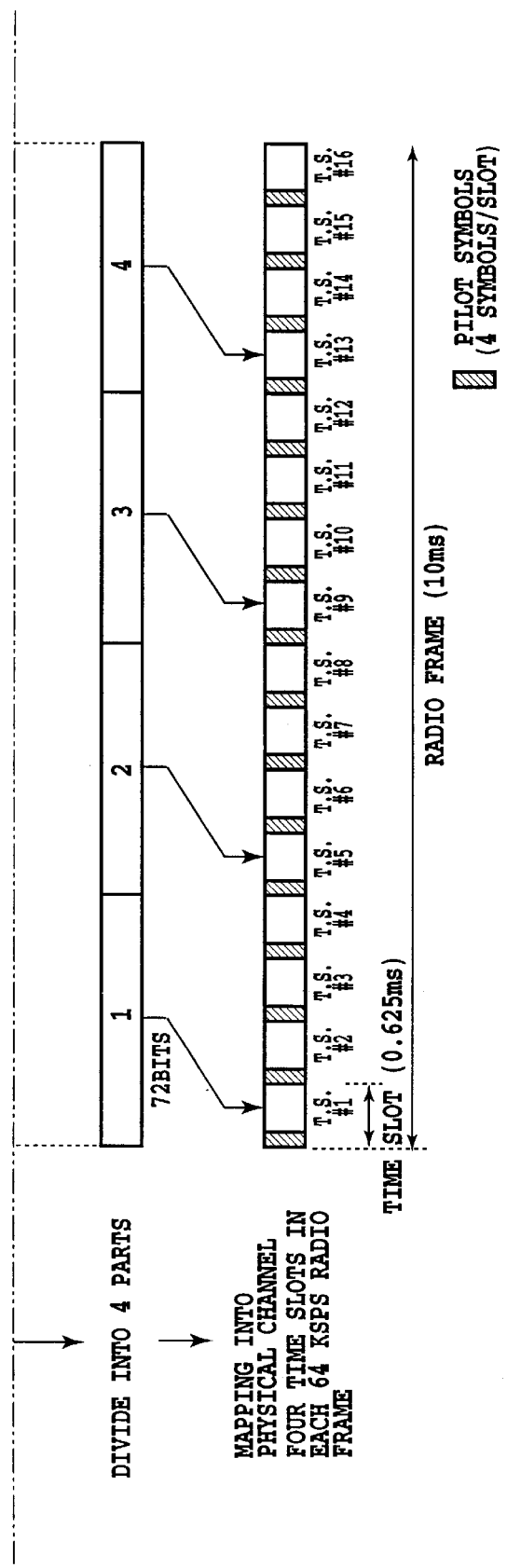
FIG. 68B is a diagram illustrating a coding scheme of a FACH-short (Ack mode) (64 ksps) logical channel.
Figure 69B:
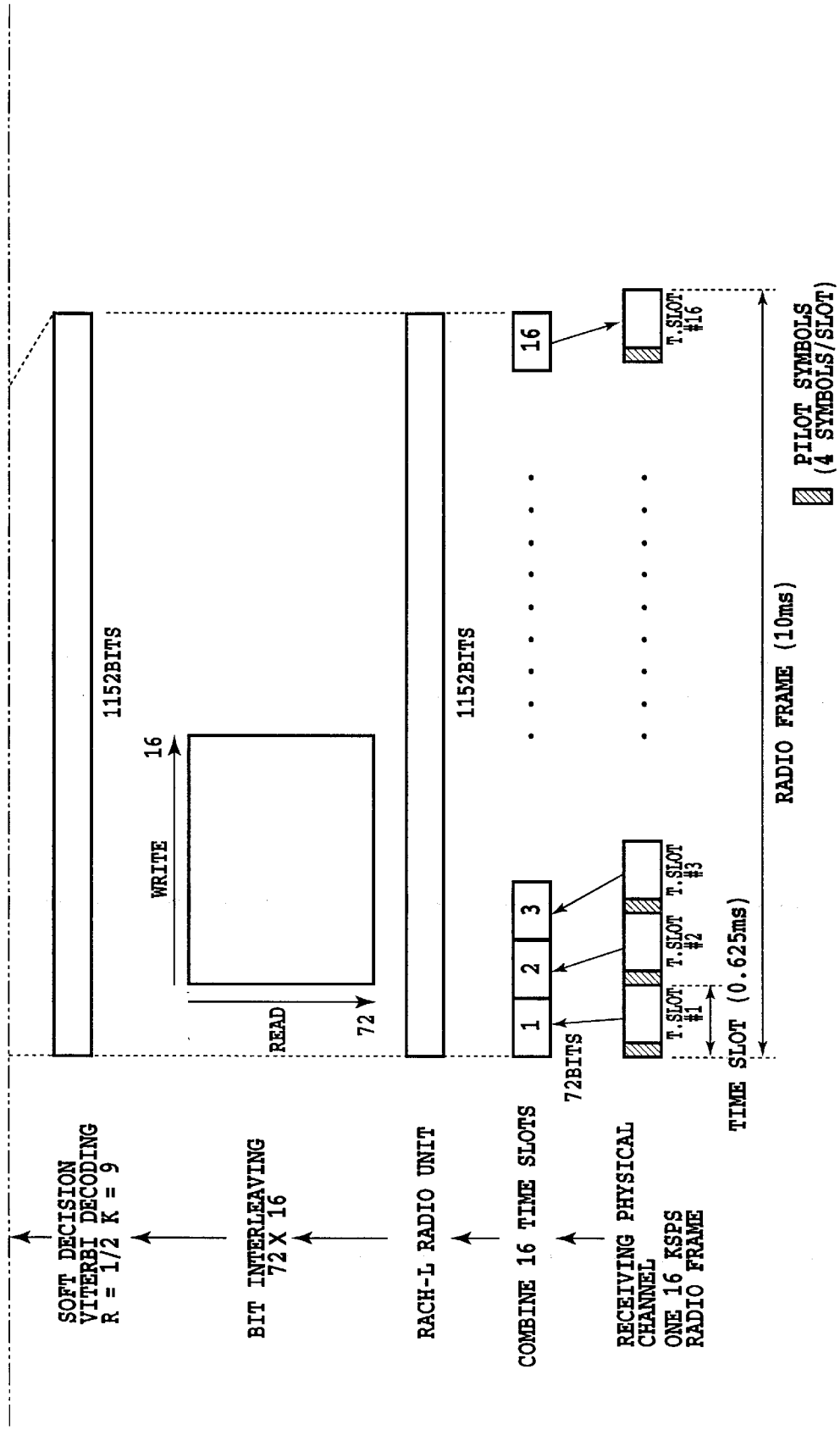
FIG. 69B is a diagram illustrating a coding scheme of a RACH-long (64 ksps) logical channel.
Figure 70B:
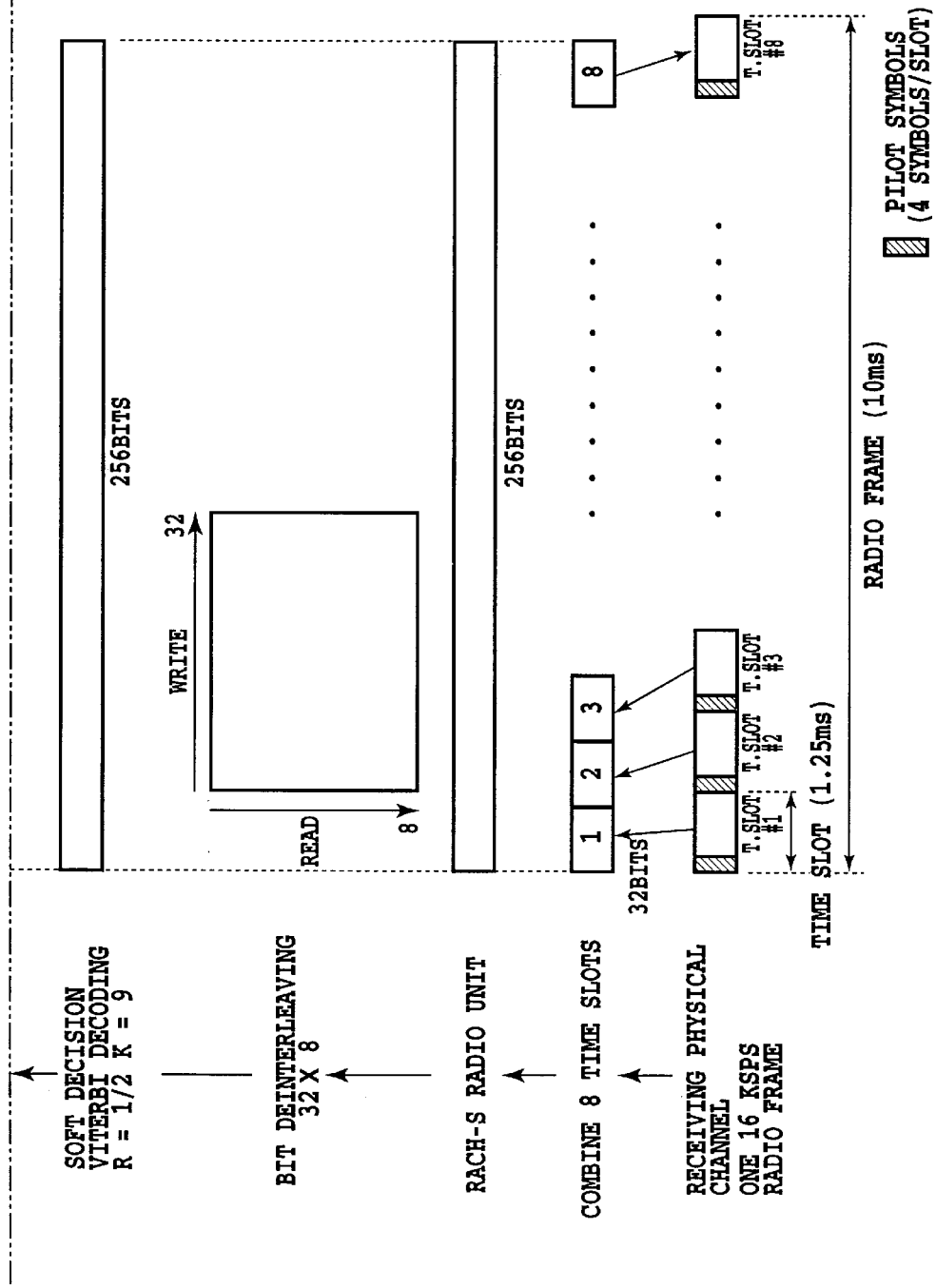
FIG. 70B is a diagram illustrating a coding scheme of a RACH-short (64 ksps) logical channel.
Figure 71A:
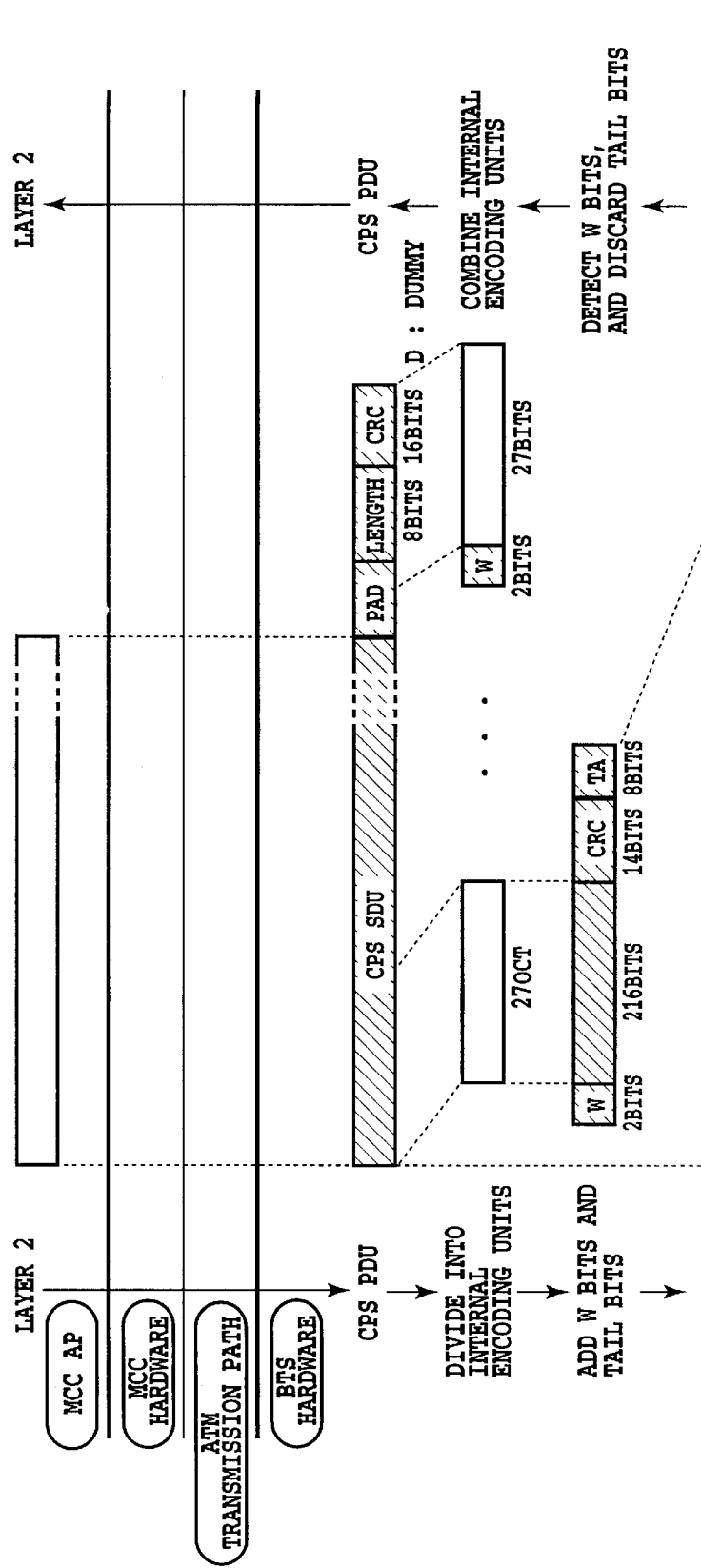
FIG. 71A is a diagram illustrating a coding scheme of an SDCCH (32 ksps) logical channel.
Figure 71B:
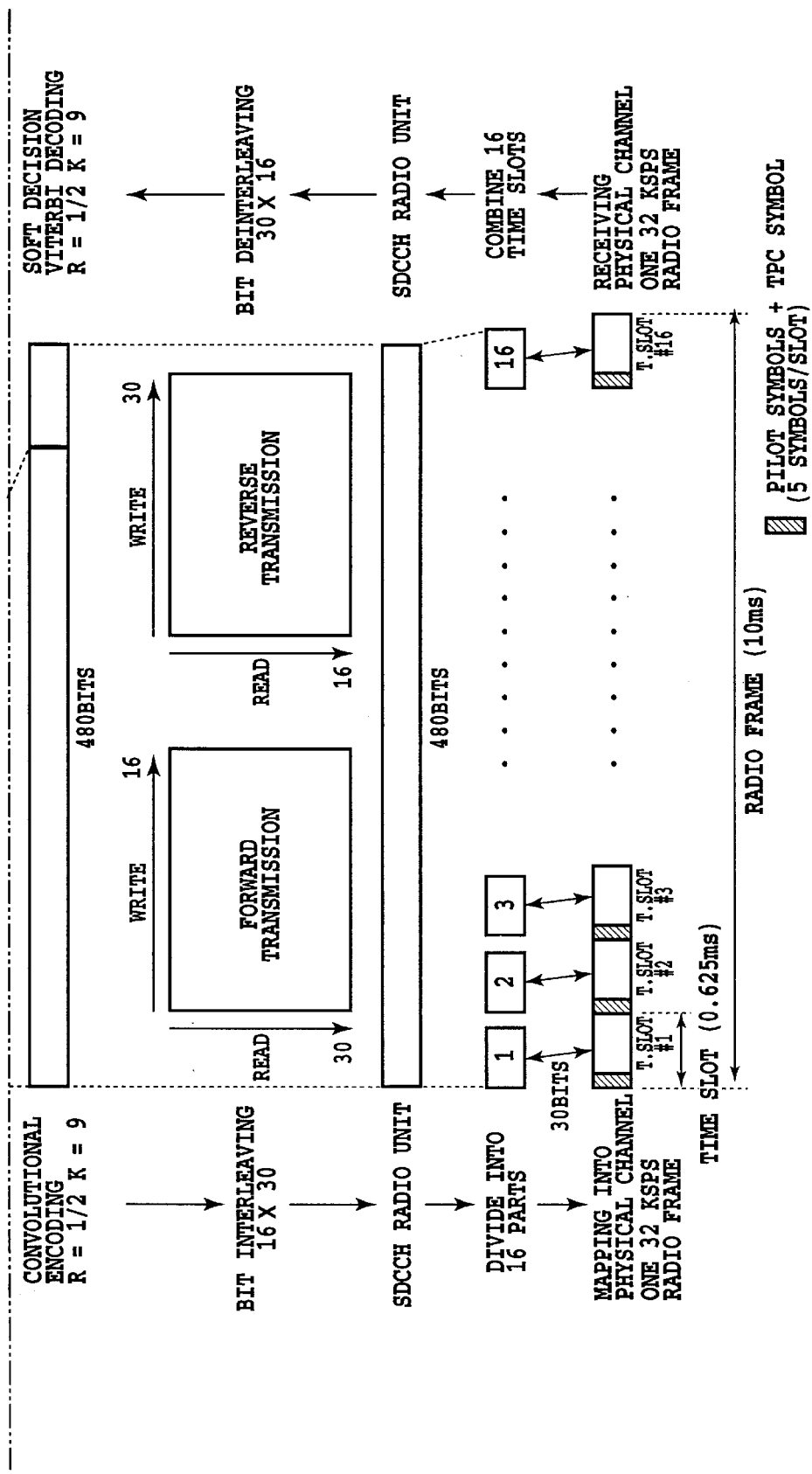
FIG. 71B is a diagram illustrating a coding scheme of an SDCCH (32 ksps) logical channel.
Figure 81B:
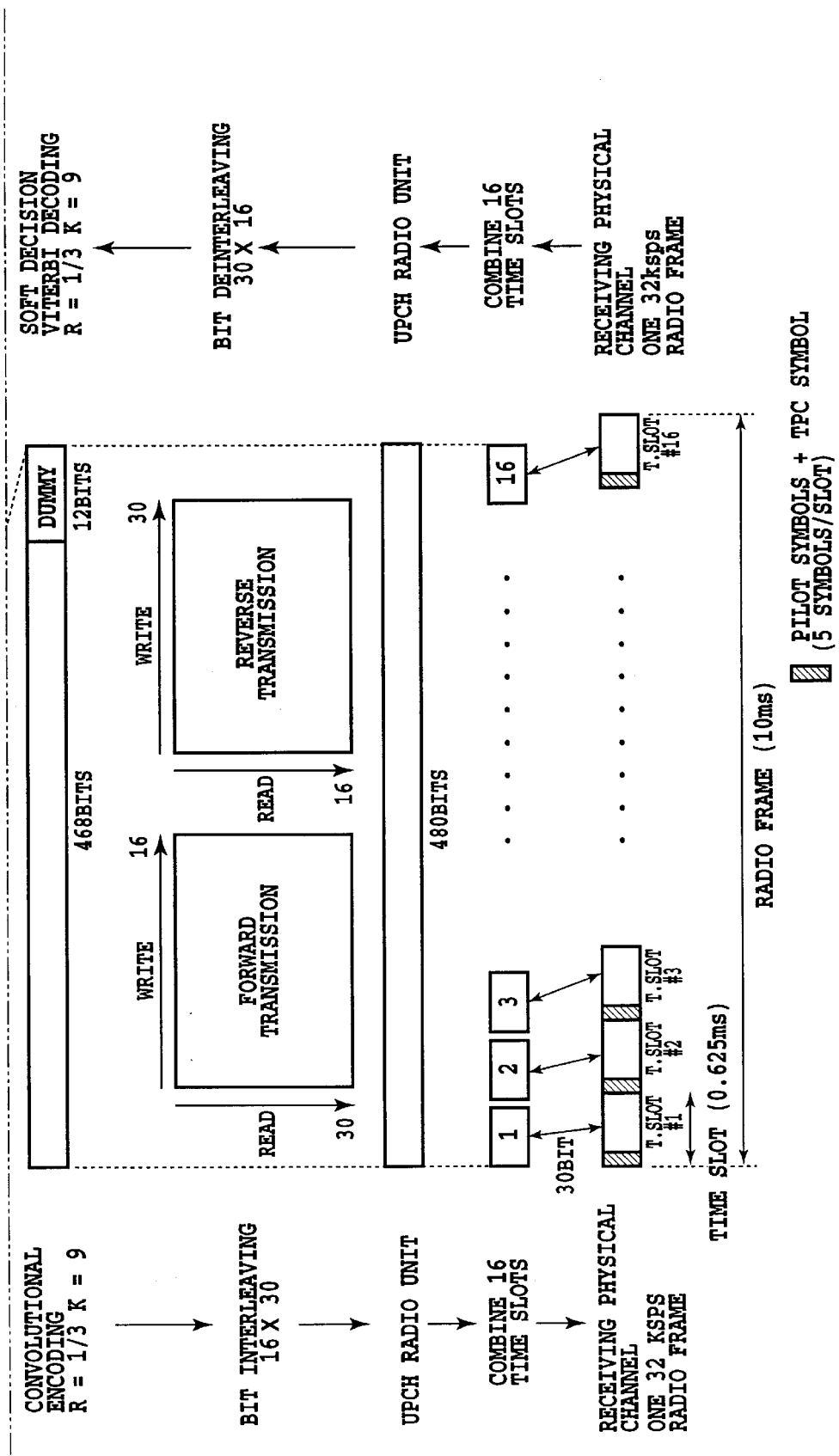
Figure 82B:
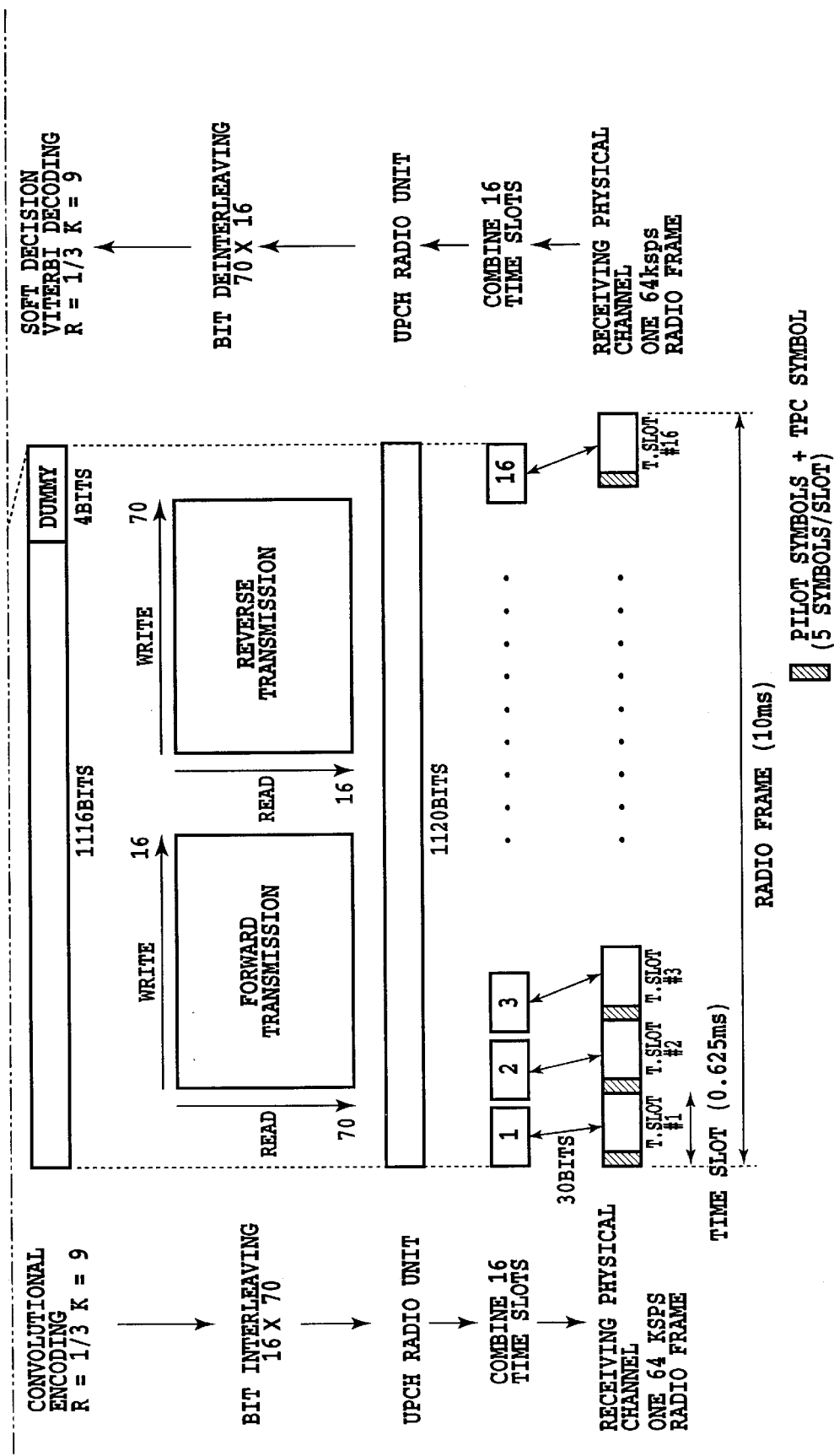
Figure 83B:
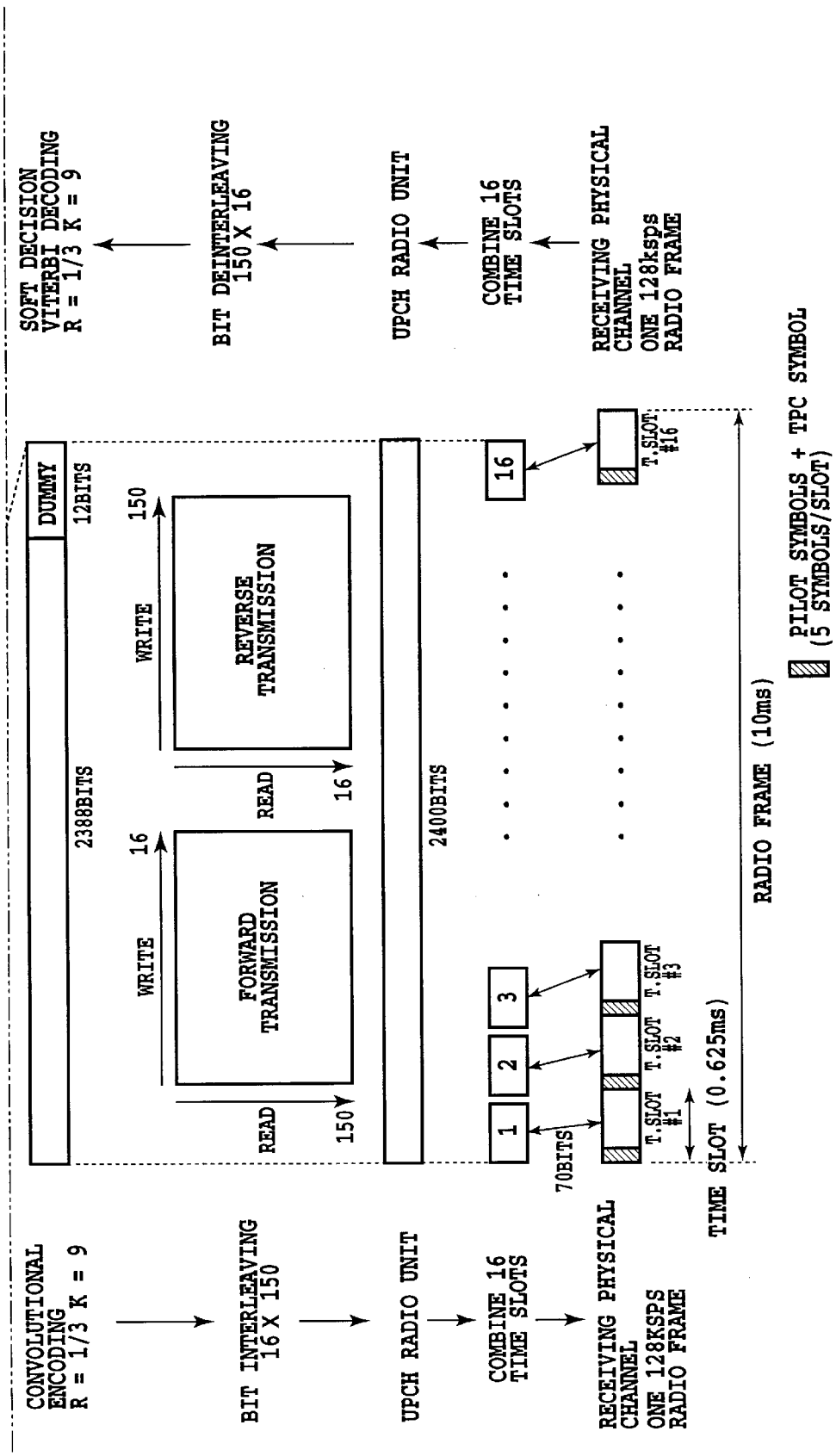

Drawings,
Sheet 32, Fig. 27, upper left corner of figure, change "TRANASMISSION TIMING" TO --TRANSMISSION TIMING--
Sheet 54, Fig. 46B, lower left box, Line 4, change "TARNSMISSION" to --TRANSMISSION--
Sheet 65, Fig. 57, lower diamond shaped box, line 4, change "CELLS IS LESS THAN" to --CELLS LESS THAN--
Sheet 71, Fig. 63, middle large oval, replace text with the following sentence:
--DOES UUI INFORMATION OF NEXT CELL INDICATE UUI INFORMATION OF PREVIOUS RECEIVED CELL?--
Sheet 72, Fig. 64A, center of page, change "TRANSNISSION POWER" to --TRANSMISSION POWER--
Sheet 82, Fig. 69A, lower right corner, change "USER ONFO." to --USER INFO.--
Sheet 110, Fig. 81A, lower right corner, change "USER ONFO." to
--USER INFO.--
Sheet 112, Fig. 82A, lower right corner, change "USER ONFO." to
--USER INFO.--
Sheet 114, Fig. 83A, lower right corner, change "USER ONFO." to
--USER INFO.--
Sheet 116, Fig. 84A, lower right corner, change "USER ONFO." to
--USER INFO.--
Sheet 132, Fig. 95B, center of page, upper diamond shaped box, change "(STAER AND END?)" to --(START AND END ?)--
Sheet 134, Fig. 96B, center of page, upper diamond shaped box, change "(STAER AND END?)" to --(START AND END ?)--

Column 1,
Line 17, before "become possible" insert --have--
Line 62, after "pilot symbols make" insert --it--

UNITED STATES PATENT AND TRADEMARK OFFICE
CERTIFICATE OF CORRECTION

PATENT NO. : 6,782,035 B1
APPLICATION NO. : 09/403161
DATED : August 24, 2004
INVENTOR(S) : Nakamura et al.

It is certified that error appears in the above-identified patent and that said Letters Patent is hereby corrected as shown below:

Column 2,
Line 5, after "logical" change "channel." to --channels.--
Line 10, change "broadcasted" to --broadcast--
Line 13, change "broadcasted" to --broadcast--
Line 17, change "broadcasted" to --broadcast--
Line 30, change "using CDMA, the" to --using CDMA. The--
Line 61, after "carrying out" insert --,--
Line 62, after "channels" insert --,--

Column 3,
Line 14, after "physical channels" insert --the--
Line 21, after "carrying out" insert --,--
Line 22, after "channels" insert --,--

Column 10,
Table 2, right hand column, line 21, after "despreading data" remove [and]

Column 11,
Lines 42-43, change "a one-way channel" to --one way channels--
Line 43, after "broadcasting" insert --,--
Line 43, after "mobile stations" insert --,--
Line 55, after "transmitting" insert --,--
Line 55, after "mobile stations" insert --,--
Line 58, before "large amount" change "rather a" to --a rather--
Line 62, after "transmitting" insert --,--
Line 62, after "mobile stations" insert --,--
Line 65, before "small amount" change "rather a" to --a rather--

Column 12,
Line 3, after "transmitting" insert --,--
Line 3, after "base station" insert --,--
Line 6, before "large amount" change "rather a" to --a rather--
Line 9, after "transmitting" insert --,--
Line 9, after "base station" insert --,--
Line 12, before "large amount" change "rather a" to --a rather--
Table 4, column 2, line 6, change "are" to --is--
Table 4, column 3, line 8, after "No symbols" insert --,--
Table 4, column 3, line 9, after "pilot symbols" insert --,--
Table 4, column 4, line 4, after "High speed" insert --,--
Line 62, after "Besides" remove [,]

UNITED STATES PATENT AND TRADEMARK OFFICE
CERTIFICATE OF CORRECTION

PATENT NO. : 6,782,035 B1
APPLICATION NO. : 09/403161
DATED : August 24, 2004
INVENTOR(S) : Nakamura et al.

It is certified that error appears in the above-identified patent and that said Letters Patent is hereby corrected as shown below:

Column 13,
Line 2, after "all the time" change ";" to --,--
Line 44, change "in the case of which" to --in which case--
Line 47, before "received power" insert --the--
Line 53, change "two" to --both--
Line 64, after "symbols also" change "vary" to --varies--
Line 65, after "symbol rate" insert --,--

Column 14,
Line 2, change "symbol rate." to --symbol rates.--

Column 15,
Table 5, first column, remove the line between "Pilot symbol" and "number" and place the 3 lines in the region that "Pilot symbol" currently lies
Line 61, after "is contained" insert --in--

Column 16,
Line 39, after "in accordance with" insert --the--
Lines 48-49, these lines are sub-bullets of the paragraph immediately above them Column 17,
Line 5, after "be transmitted" change "with" to --by--

Column 18,
Line 13, change "transmitted up to four with" to --transmitted, up to four, by--
Line 21, after "physical channel" insert --,--
Line 35, after "transmitted" change "at first," to --first,--

Column 19,
Line 31, after "time slots" insert --,--
Line 40, change "to increae" to --an increase in--

Column 20,
Line 64, after "uses thereof" change "is" to --are--

Column 21,
Table 8, first column, change "UPCH (64 sps)" to --UPCH (64 ksps)--
Line 60, change "interval independently of" to --interval, independent of--
Line 63, change "symbols independently" to --symbols, independent--

UNITED STATES PATENT AND TRADEMARK OFFICE
CERTIFICATE OF CORRECTION

PATENT NO. : 6,782,035 B1
APPLICATION NO. : 09/403161
DATED : August 24, 2004
INVENTOR(S) : Nakamura et al.

It is certified that error appears in the above-identified patent and that said Letters Patent is hereby corrected as shown below:

Column 22,
Line 20, after "The bits" change "takes" to --take--

Column 23,
Line 2, change "broadcasted" to --broadcast--
Line 19, after "for sending" insert --,--
Line 20, after "through the RACH" insert --,--
Line 21, after "mobile station" insert --,--
Line 22, after "FACH" insert --,--

Column 24,
Line 48, after "reception quality" change "owing" to --due--

Column 25,
Table 15, footnotes, line 1, before "down into" change "round" to --rounded--

Column 26,
Line 6, after "Offset values" insert --of--
Line 20, after "offset values" insert --of--

Column 27,
Line 6, after "value is" change "round" to --rounded--
Line 16, before "in the base station" change "processings" to --processing--
Line 32, after "value is" change "round" to --rounded--
Line 48, after "actually fluctuate" change "owing to" to --due to the--
Line 56, before "one slot interval" insert --a--
Line 58, before "of the timing difference" change "scheme" to --schemes--

Column 28,
Line 3, after "simultaneously" insert --,--

Column 30,
Line 30, after "perch channels use" insert --,--
Line 30, after "short codes" insert --,--

Column 31,
Line 22, before "long code mask" insert --the--
Line 22, after "long code mask" change "symbol" to --symbols--

UNITED STATES PATENT AND TRADEMARK OFFICE
CERTIFICATE OF CORRECTION

| | |
|---|---|
| PATENT NO. | : 6,782,035 B1 |
| APPLICATION NO. | : 09/403161 |
| DATED | : August 24, 2004 |
| INVENTOR(S) | : Nakamura et al. |

It is certified that error appears in the above-identified patent and that said Letters Patent is hereby corrected as shown below:

Column 32,
Line 28, after "at a timing which" change "are" to --is--
Line 63, after "is present" insert --,--

Column 33,
Line 29, after "physical channel at" change "the" to --a--

Column 34,
Line 9, before "the pilot symbol" remove [only]
Line 9, before "a short" insert --only--
Line 10, before "a particular" insert --that--

Column 38,
Line 28, after "one or more slots" remove [,]
Line 29, after "the radio frame" insert --,--

Column 39,
Line 63, after "own group" insert --,--

Column 41,
Line 37, before "connecting configuration" insert --the--

Column 42,
Line 12, before "connecting configuration" insert --the--
Line 60, before "for the receiving side" insert --in order--

Column 43,
Line 6, before "specifying conditions" change "a" to --the--

Column 44,
Line 21, before "unrestricted digital service" insert --of--
Line 23, after "is the unit" remove [,]
Line 63, after "length in" change "byte" to --bytes--

Column 45,
Table 26, second column, line 11, change "Resolution in" to --Resolution is--

UNITED STATES PATENT AND TRADEMARK OFFICE
CERTIFICATE OF CORRECTION

PATENT NO. : 6,782,035 B1
APPLICATION NO. : 09/403161
DATED : August 24, 2004
INVENTOR(S) : Nakamura et al.

It is certified that error appears in the above-identified patent and that said Letters Patent is hereby corrected as shown below:

<u>Line 47,</u>
Line 1, after "The BTS decides" insert --,--
Line 1, after "the information" insert --,--
Line 17, before "required receive quality" insert --the--
Line 41, change "The changing timing" to --The change in timing--
Line 42, before "immediately before" insert --performed--

<u>Column 48,</u>
Line 10, before "transmission" change "large" to --high--
Line 14, after "can follow" insert --,--
Line 15, before "the variations" insert --,--
Line 18, before "increases the transmission" insert --it--
Line 32, after "by increasing" insert --,--
Line 32, after "step by step" insert --,--
Line 33, before "even in the case" insert --,--
Line 36, change "long of about" to --long, about--

<u>Column 49,</u>
Line 16, before "the pilot symbols" change "of" to --from--

<u>Column 50,</u>
Line 15, change "of the out-of-sync of the reverse link," to
--the reverse link is out-of-sync,--
Line 30, after "establishes" insert --,--
Line 30, after "broadcast information" insert --,--
Lines 34-35, change "makes comparison between" to --compares--

<u>Column 51,</u>
Line 14, after "up as usual" insert --,--
Line 36, after "The BSC notifies" insert --,--
Line 36, after "layer 3 signal" insert --,--
Line 47, before "the transmission" change "About" to --For information about--

<u>Column 52,</u>
Line 44, before "out-of-phase decision method." change "An" to --A--

<u>Column 53,</u>
Line 38, before "efficiently utilizing" change "with" to --by--

UNITED STATES PATENT AND TRADEMARK OFFICE
CERTIFICATE OF CORRECTION

| | | |
|---|---|---|
| PATENT NO. | : 6,782,035 B1 | |
| APPLICATION NO. | : 09/403161 | |
| DATED | : August 24, 2004 | |
| INVENTOR(S) | : Nakamura et al. | |

It is certified that error appears in the above-identified patent and that said Letters Patent is hereby corrected as shown below:

Column 54,
Line 35, after "continuously measures" insert --,--
Line 35, after "each BTS" insert --,--

Column 55,
Line 8, after "FIGS. 48-51" change "shows" to --show--
Line 40, after "that requires" insert --,--
Line 41, after "BTS" insert --,--
Line 49, after "station (BTS)" change "is" to --are--
Line 53, after "BTS instructs" insert --,--
Line 53, after "through the FACH" insert --,--
Line 62, after "base station (BTS)" change "is" to --are--
Line 66, after "BTS instructs" insert --,--
Line 66, after "through the UPCH" insert --,--

Column 56,
Line 13, after "without involving" insert --the--
Line 41, after "TS1-TS24" change "with" to --while--
Line 45, change "using a fact" to --using the fact--

Column 57,
Line 3, after "transmission path rate" insert --,--
Lines 42-43, change "there are specified three types of VPIs" to --three types of VPIs are specified--
Line 47, after "The channel number" remove [is]
Line 66, after "carry out" insert --the--
Line 67, before "data structure." insert --the--

Column 59,
Table 28, column 4, move "E" up to the line labeled in column 2 as "(5 ms, $10^{-7}$)"

Column 60,
Line 43, change "out with the MCC" to --out, with the MCC,--
Line 47, after "for establishing" insert --,--
Line 48, after "in the BTS" insert --,--

UNITED STATES PATENT AND TRADEMARK OFFICE
CERTIFICATE OF CORRECTION

| | | |
|---|---|---|
| PATENT NO. | : 6,782,035 B1 | Page 8 of 8 |
| APPLICATION NO. | : 09/403161 | |
| DATED | : August 24, 2004 | |
| INVENTOR(S) | : Nakamura et al. | |

It is certified that error appears in the above-identified patent and that said Letters Patent is hereby corrected as shown below:

Column 61,

Table 29, column 2, line 1, after "Timing Report" change "(BTS÷MCC)" to --(BTS→MCC)--

Table 30, column 2, line 1, after "Timing Report" change "(BTS÷MCC)" to --(BTS→MCC)--

Column 71,
Line 2, after "physical channels;" insert --and--

Signed and Sealed this

Fifth Day of September, 2006

JON W. DUDAS
*Director of the United States Patent and Trademark Office*